(12) United States Patent
Advincula

(10) Patent No.: US 8,932,671 B2
(45) Date of Patent: Jan. 13, 2015

(54) POLYMER NANOCOMPOSITE PRECURSORS WITH CARBON NANOTUBES AND/OR GRAPHENE AND RELATED THIN FILMS AND PATTERNING

(75) Inventor: Rigoberto Advincula, Friendswood, TX (US)

(73) Assignee: The University of Houston System, Houston, TX (US)

( * ) Notice: Subject to any disclaimer, the term of this patent is extended or adjusted under 35 U.S.C. 154(b) by 167 days.

(21) Appl. No.: 13/309,111

(22) Filed: Dec. 1, 2011

(65) Prior Publication Data

US 2012/0164433 A1 Jun. 28, 2012

Related U.S. Application Data

(60) Provisional application No. 61/418,652, filed on Dec. 1, 2010.

(51) Int. Cl.
| | |
|---|---|
| *B05D 7/00* | (2006.01) |
| *B05D 5/00* | (2006.01) |
| *B05D 1/32* | (2006.01) |
| *B05D 3/02* | (2006.01) |
| *C09C 1/46* | (2006.01) |
| *B82Y 30/00* | (2011.01) |

(52) U.S. Cl.
CPC .............. *C09C 1/46* (2013.01); *C01P 2004/13* (2013.01); *C01P 2002/88* (2013.01); *C01P 2004/133* (2013.01); *C01P 2002/84* (2013.01); *C01P 2002/72* (2013.01); *C01P 2002/82* (2013.01); *B82Y 30/00* (2013.01)
USPC ........... 427/220; 427/487; 427/384; 427/256; 427/277; 427/282

(58) Field of Classification Search
None
See application file for complete search history.

(56) References Cited

U.S. PATENT DOCUMENTS

| | | | |
|---|---|---|---|
| 7,357,984 B2 | 4/2008 | Otobe et al. | |
| 7,566,410 B2 | 7/2009 | Song et al. | |
| 2007/0131915 A1 | 6/2007 | Stankovich et al. | |
| 2010/0052995 A1* | 3/2010 | Lee et al. | 343/700 MS |

OTHER PUBLICATIONS

Baibarac, M. et al. Poly(N-vinyl carbazole) and carbon nanotubes based composites and their application to rechargeable lithium batteries. Composites Science and Technology. 2007, vol. 67, pp. 2556-2563 1-15,18-28 See abstract and 2. Experimental section.
PCT ISR.
PCT IPER.
PCT WO.

* cited by examiner

*Primary Examiner* — Sheeba Ahmed
(74) *Attorney, Agent, or Firm* — Robert W Strozier

(57) ABSTRACT

Nano-composites include a graphite material such as nanotubes or graphene sheets and a partial or complete coating of a polymer including sufficient π-conjugated moieties to interact with surfaces of the graphite material. The polymers may also include electropolymerizable or oxidatively polymerizable moieties so the films may be crosslinked. The films may be used to form layers on substrates or patterned layers on substrates.

16 Claims, 88 Drawing Sheets

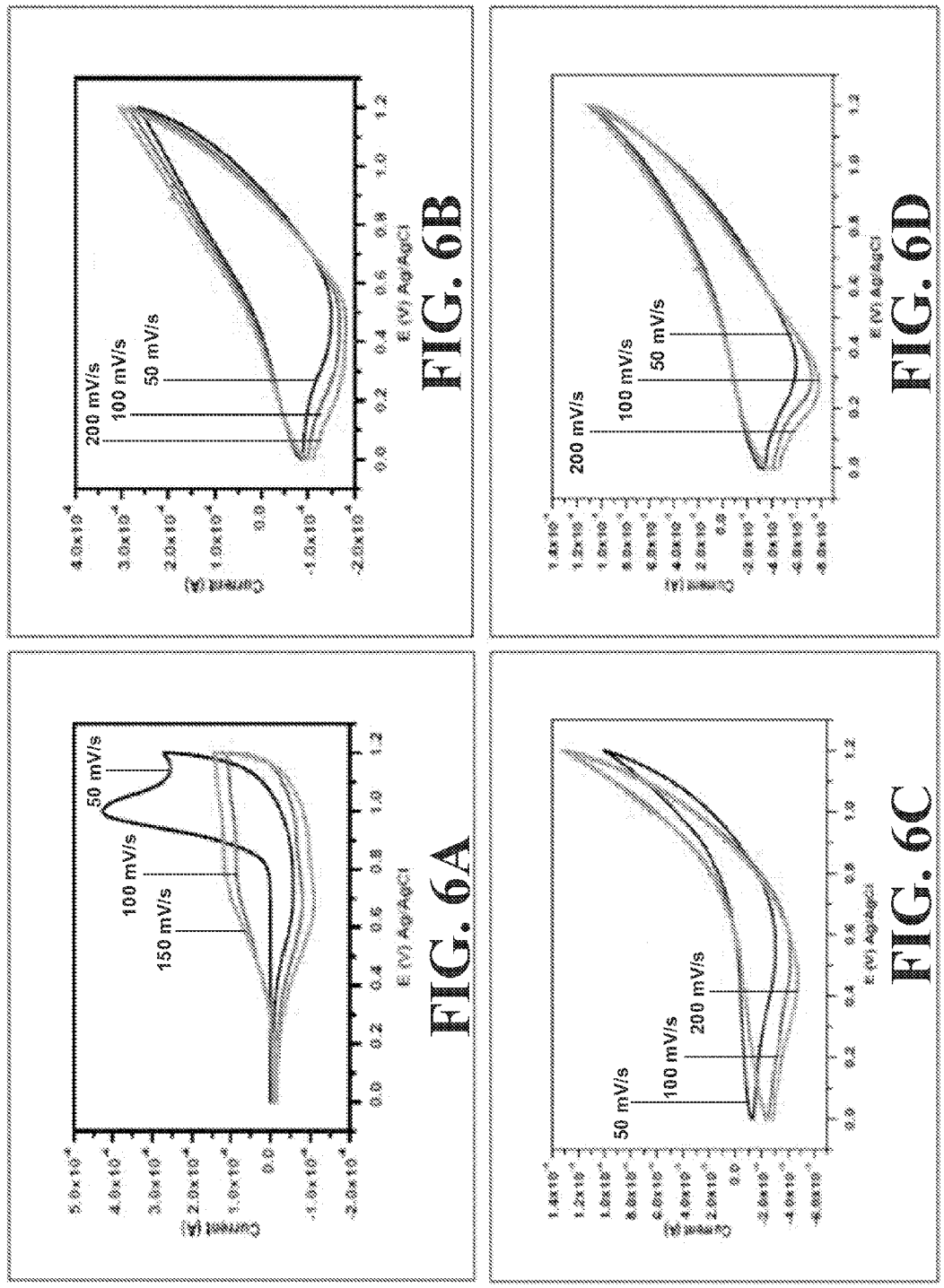

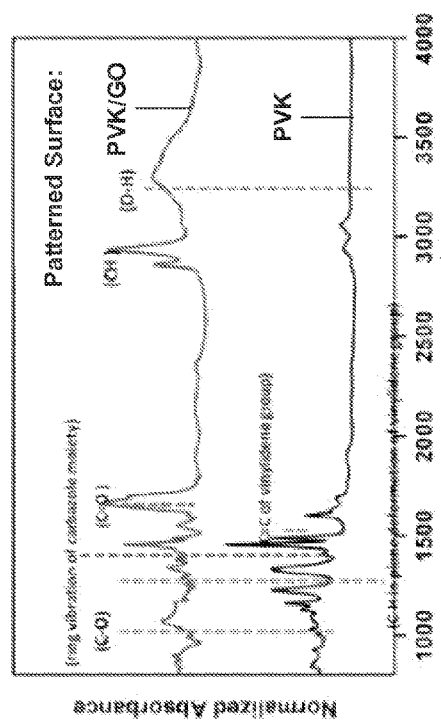
FIG. 33A
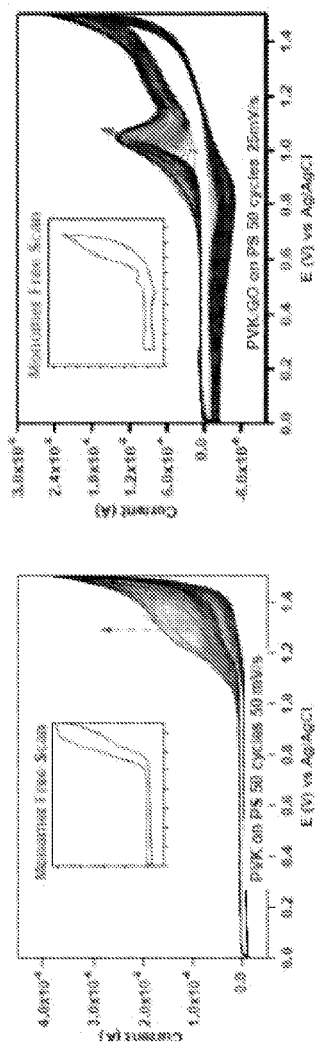
FIG. 33B
FIG. 33C

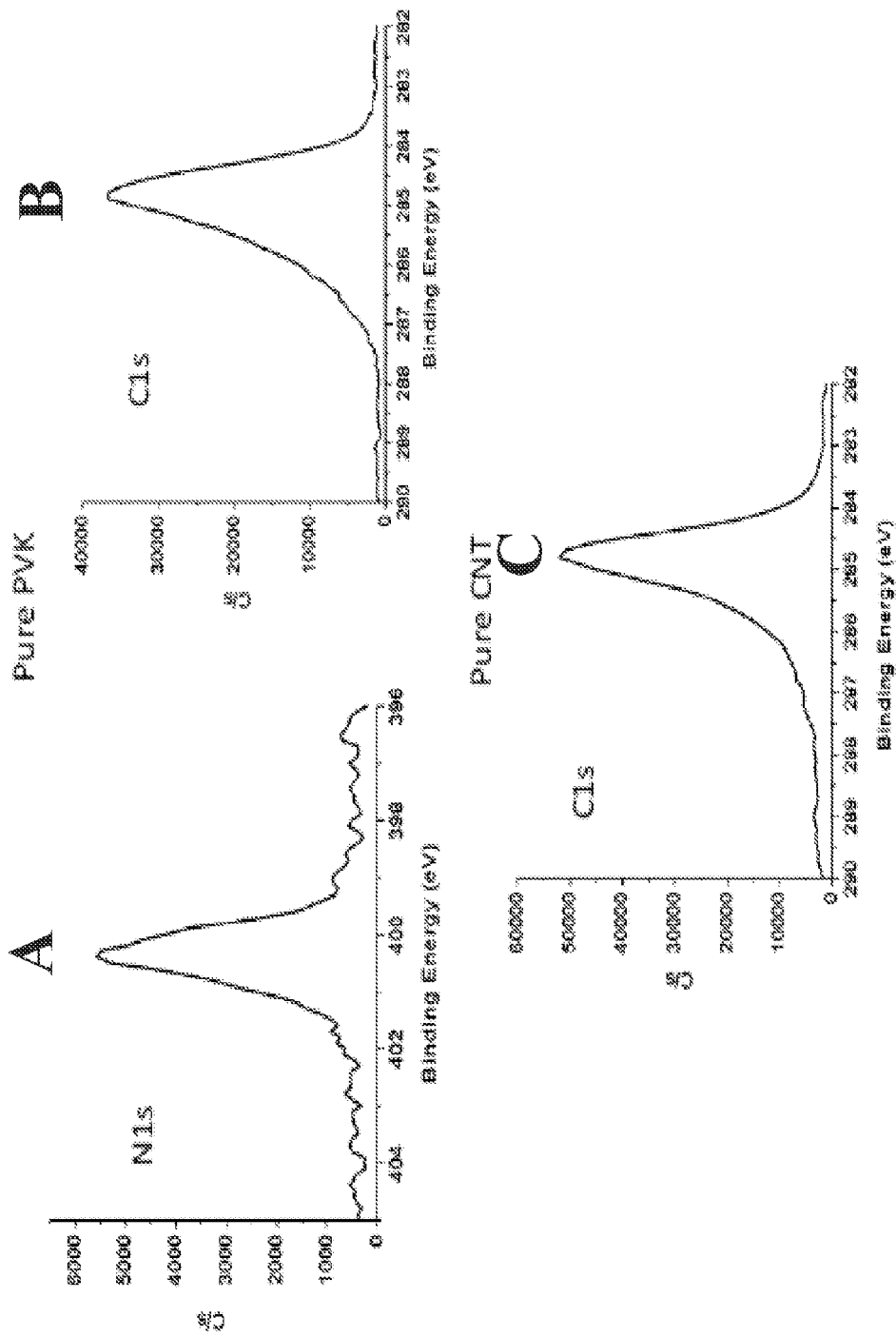
FIG. 52A-C

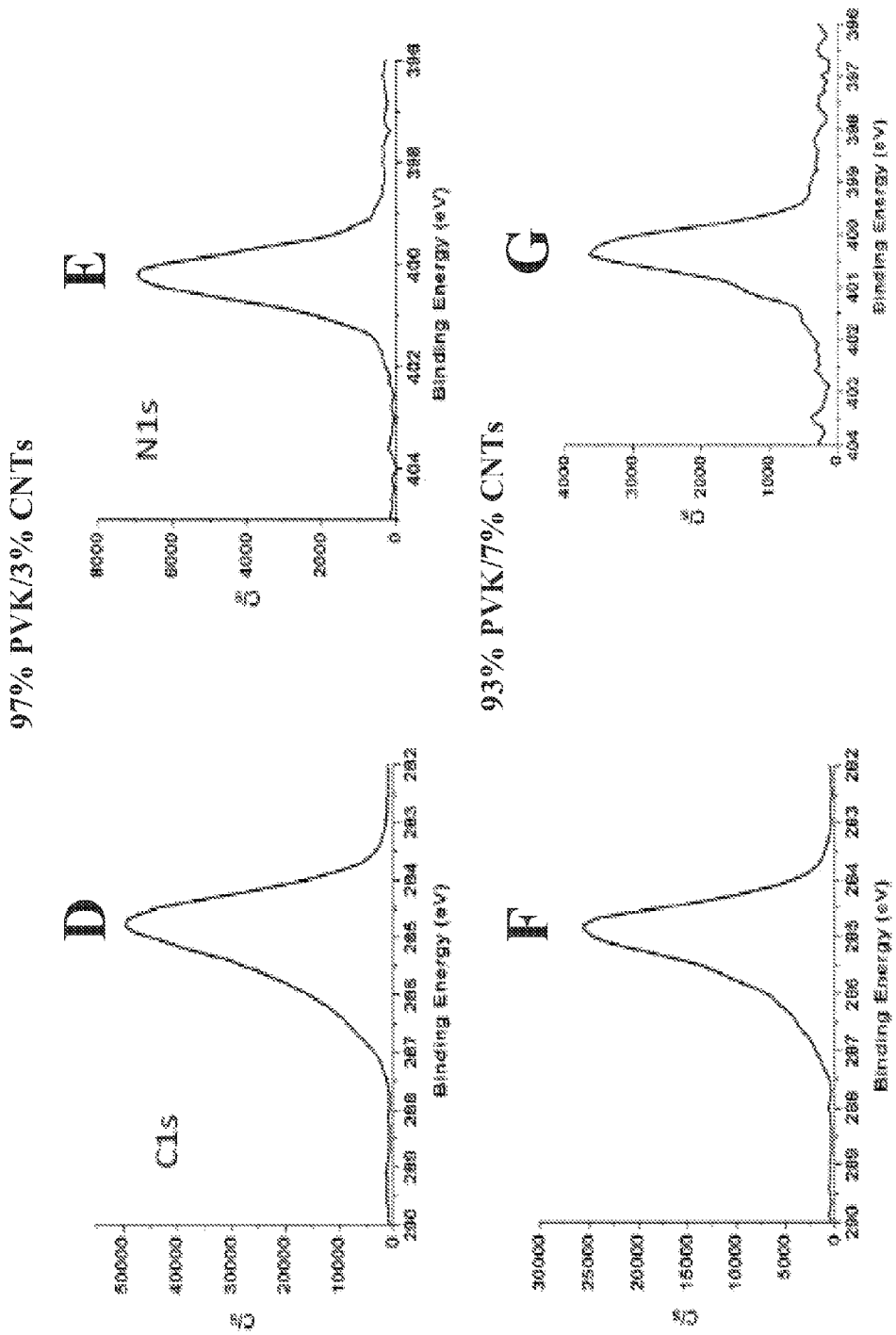
FIG. 52D-G

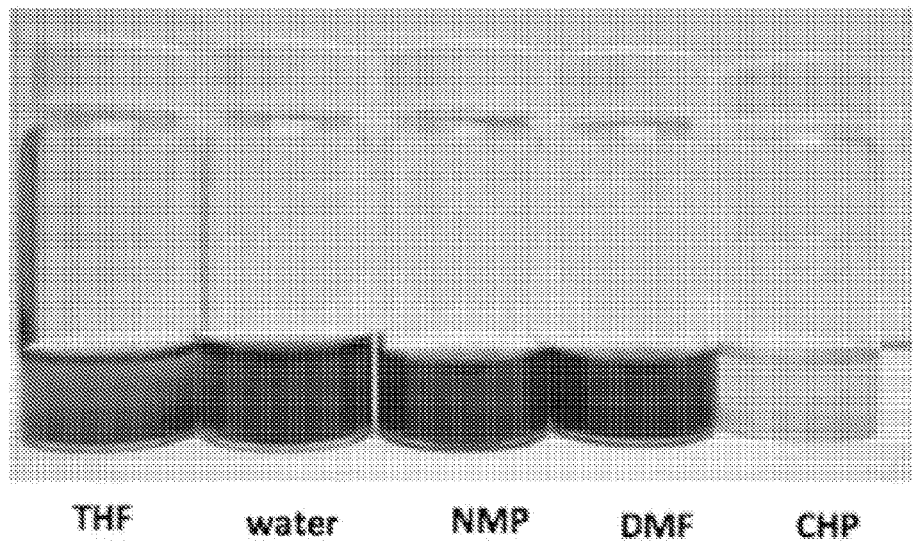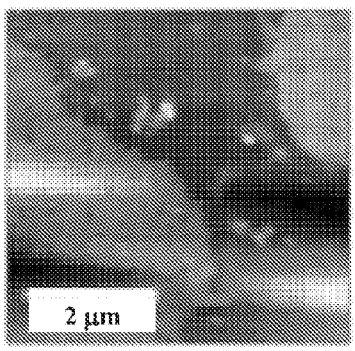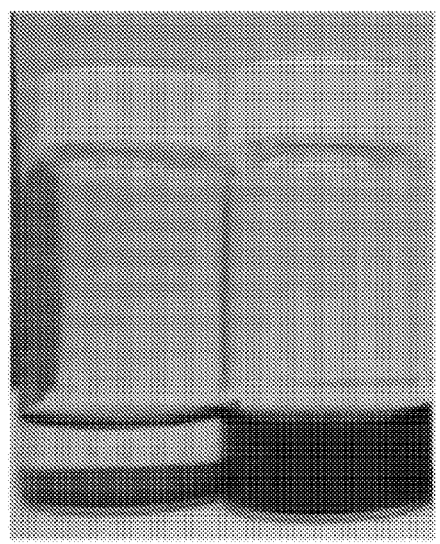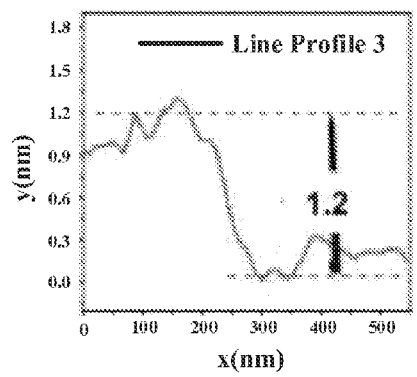
FIGS. 55A-C

FIGS. 64A-C

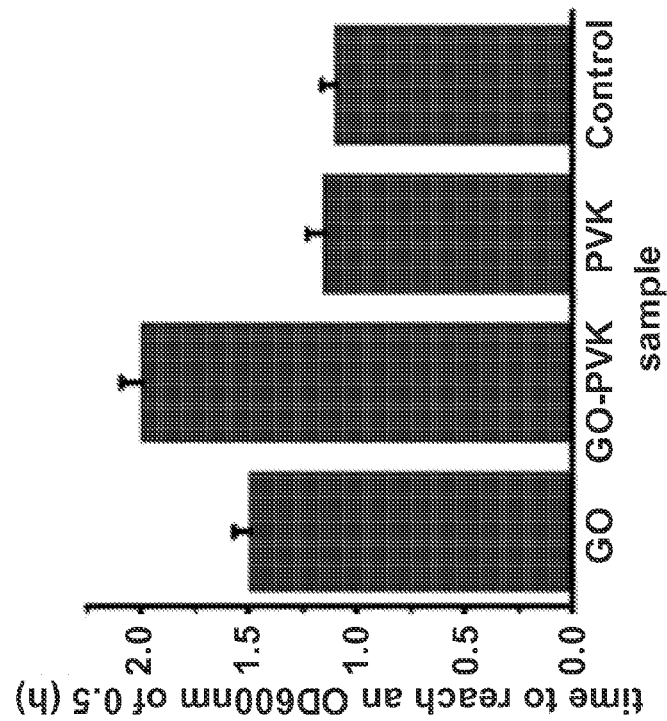
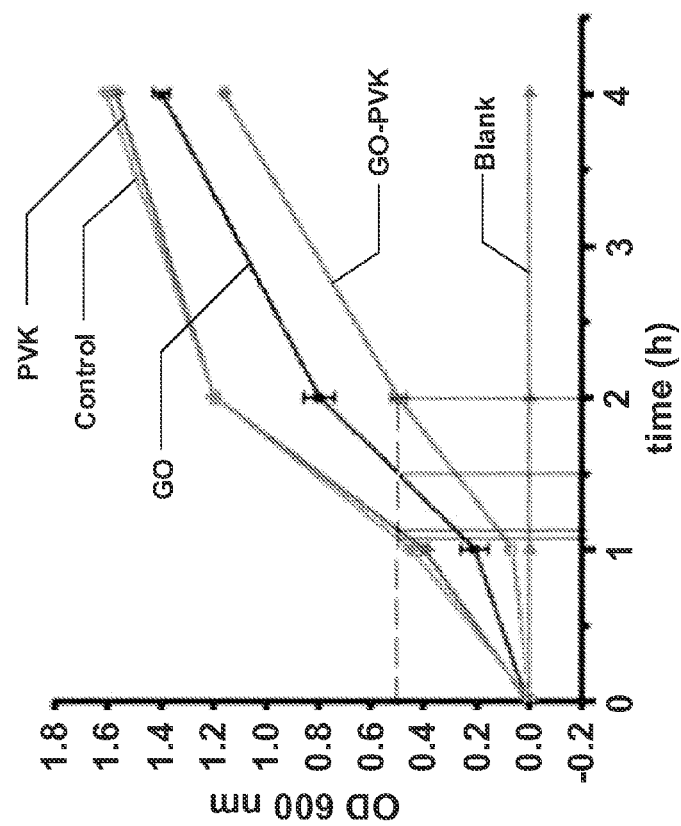
FIGS. 67B
FIGS. 67A

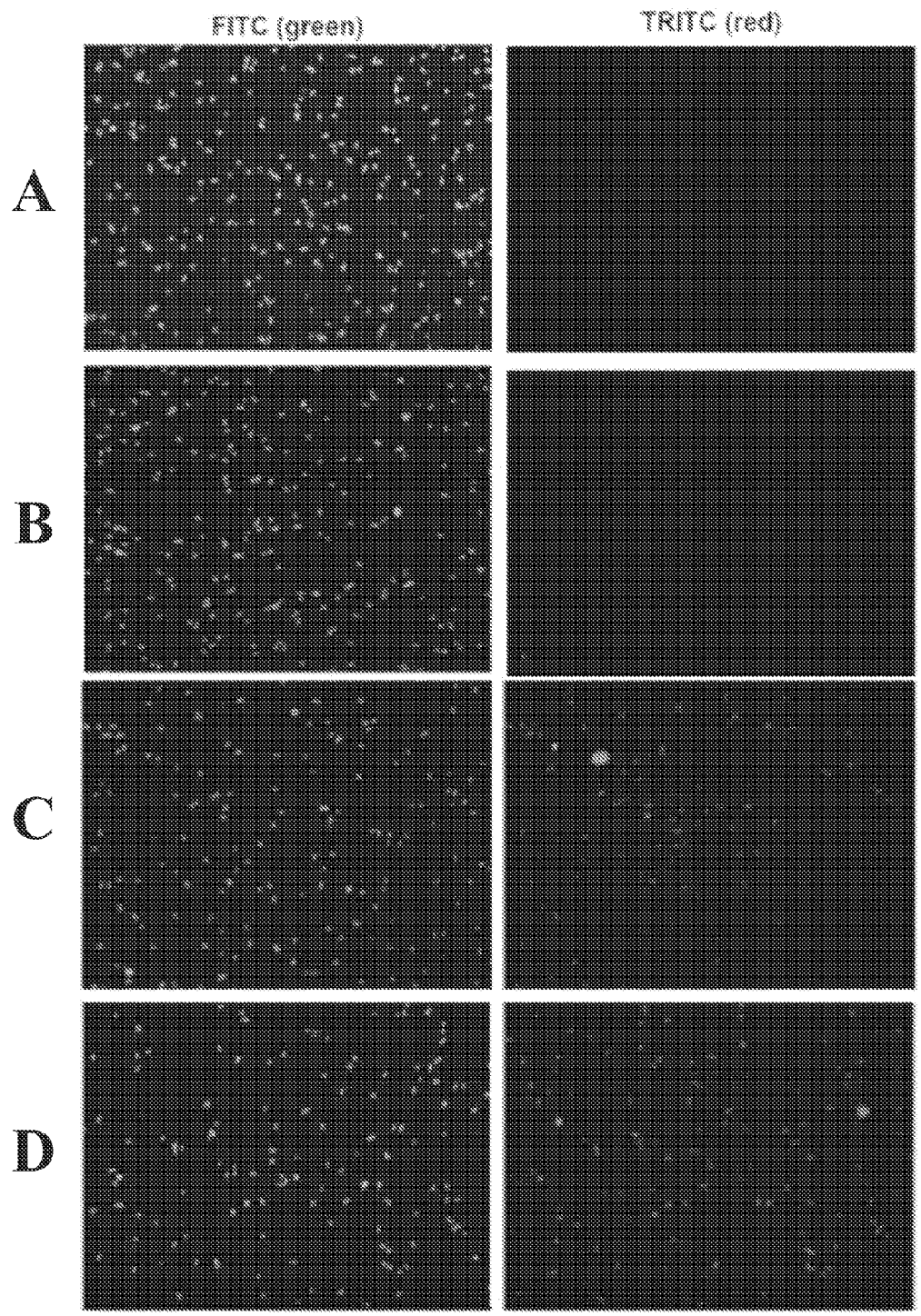
FIGS. 68A-D

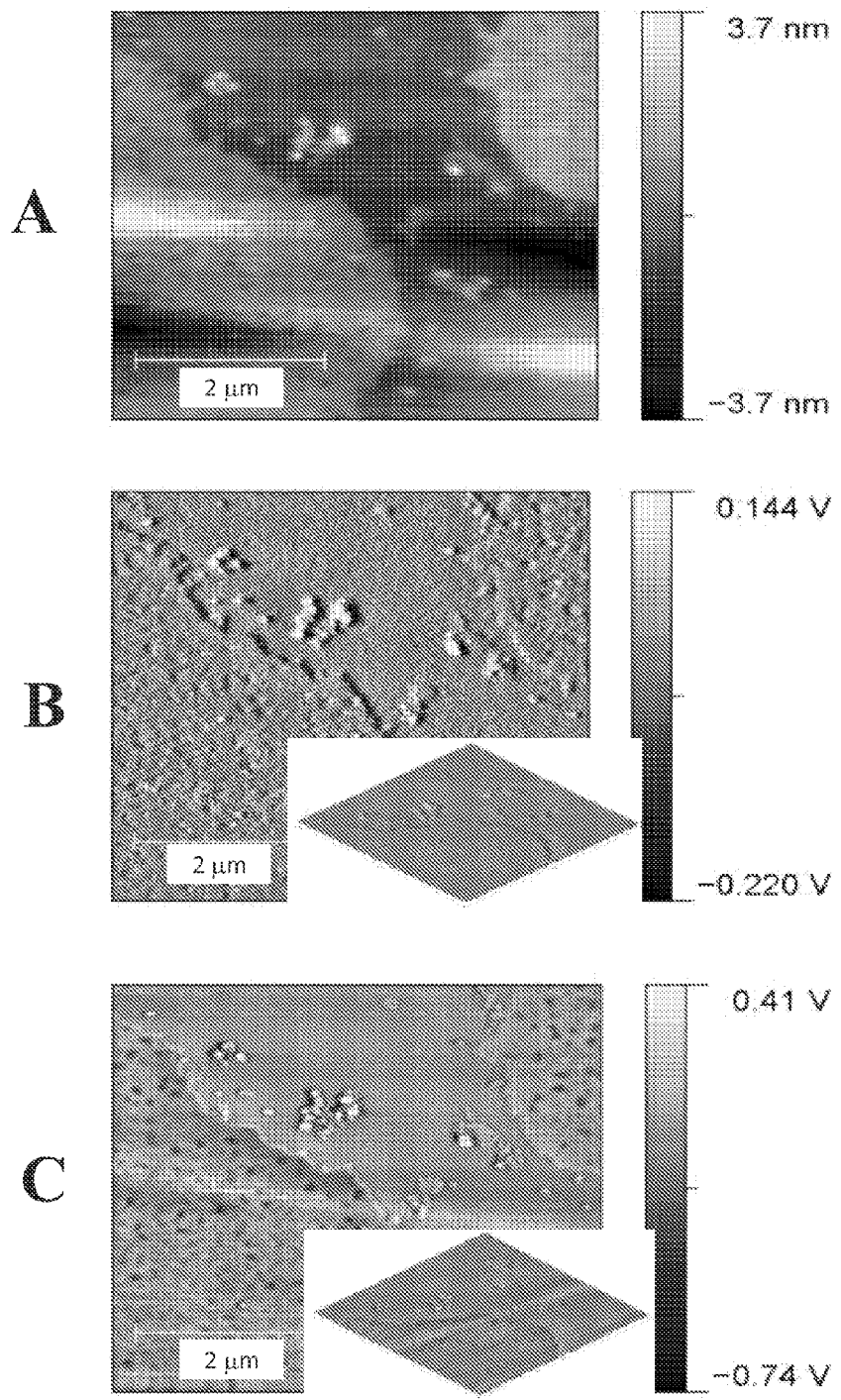
FIG. 75A-C

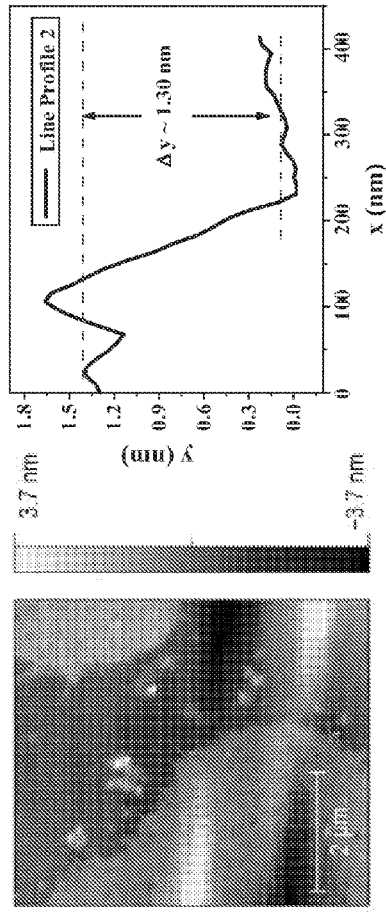
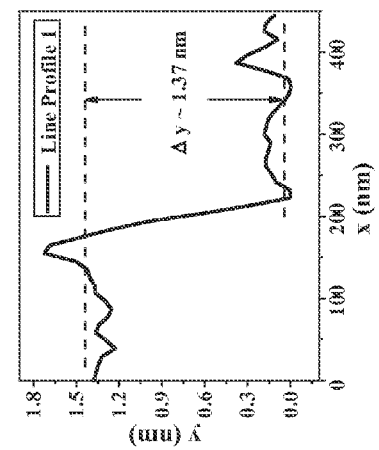
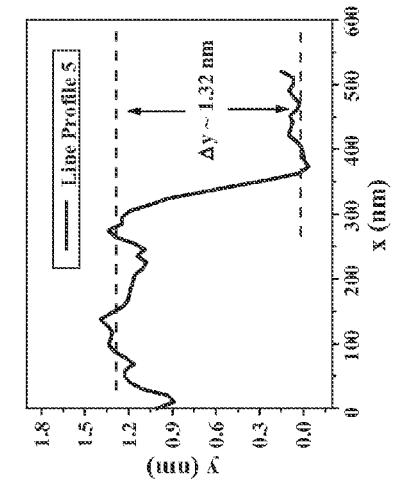
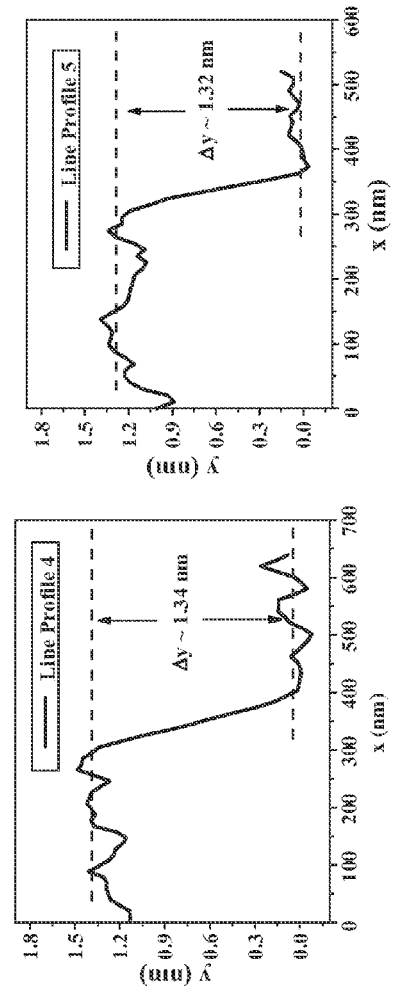
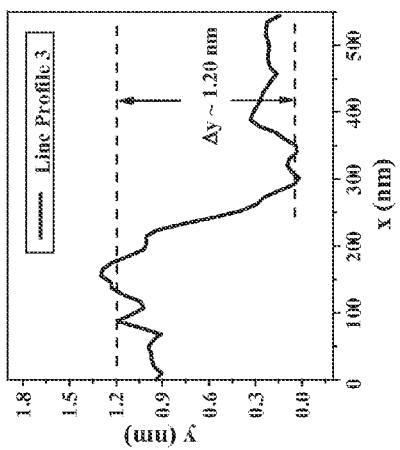
FIG. 76A
FIG. 76B
FIG. 76C
FIG. 76D
FIG. 76E
FIG. 76F

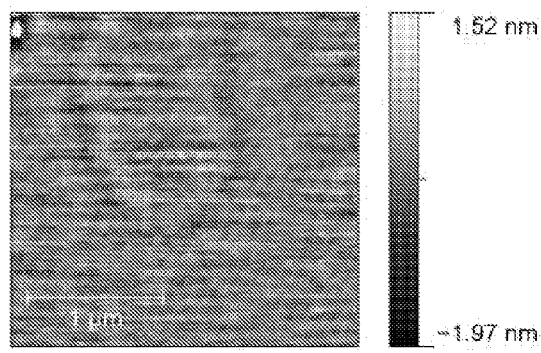 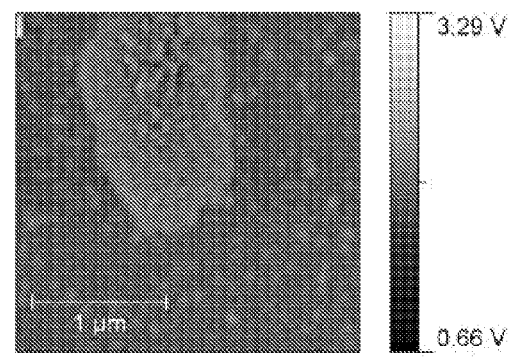
FIG. 77A  FIG. 77B
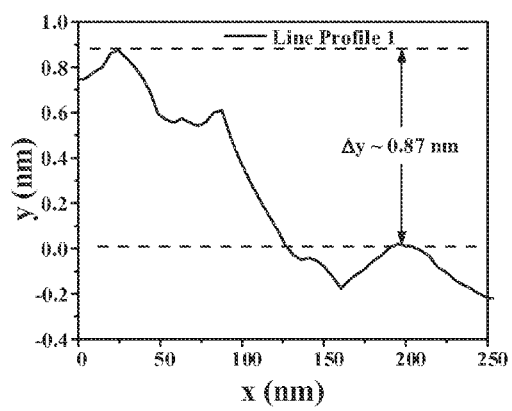 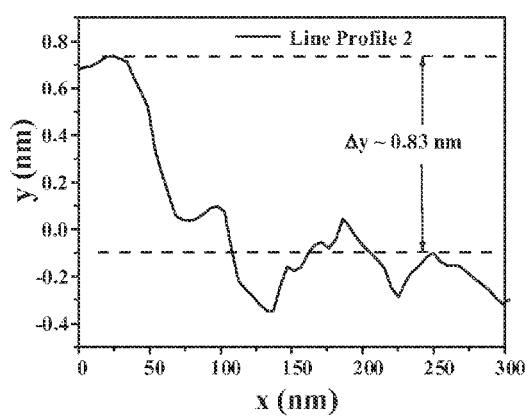
FIG. 77C  FIG. 77D
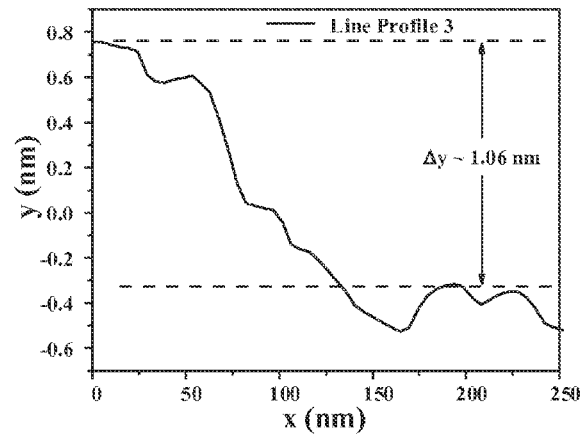
FIG. 77E

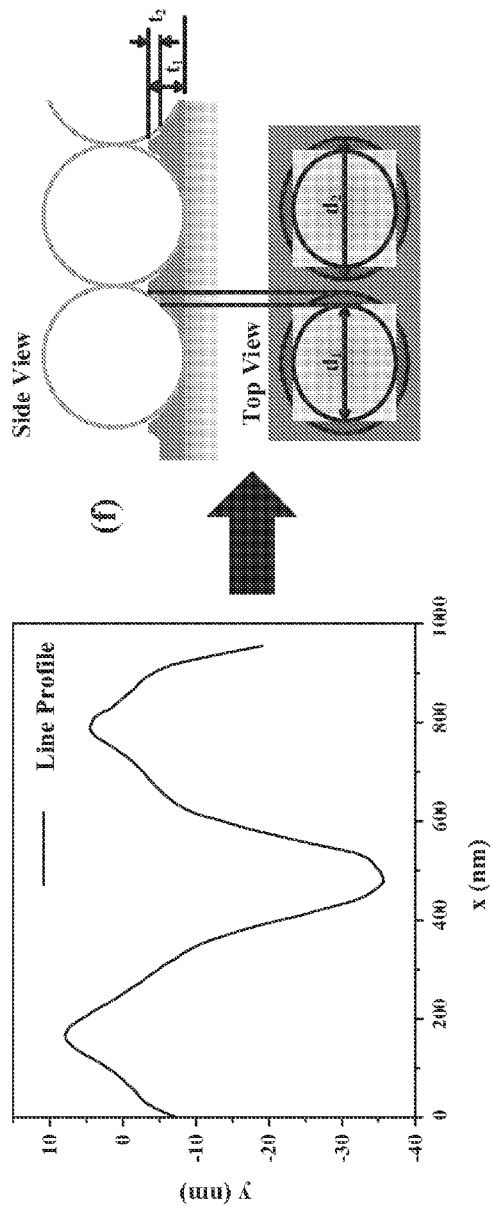
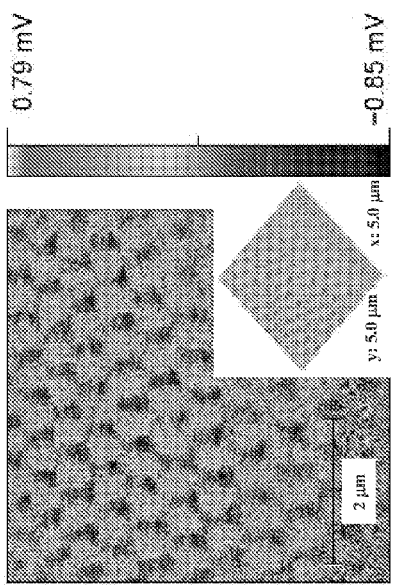
FIG. 79E    FIG. 79F    FIG. 79G

US 8,932,671 B2

POLYMER NANOCOMPOSITE PRECURSORS WITH CARBON NANOTUBES AND/OR GRAPHENE AND RELATED THIN FILMS AND PATTERNING

RELATED APPLICATIONS

This application claims the benefit of and priority to U.S. Provisional Patent Application Ser. No. 61/418,652, filed Dec. 1, 2010 (01-DEC-2010), incorporated by reference through the action of the last paragraph of the specification. This application also claim the benefit and priority to U.S. patent application Ser. No. 13/179,515, filed Jul. 9, 2011 and Ser. No. 13/179,516 filed Jul. 9, 2011 for their teaching on electropolymerization and electropolymerizable moieties, incorporated by reference through the action of the last paragraph of the specification.

GOVERNMENTAL INTEREST

The United States Government may have certain rights concerning some of the aspects of this invention due to the following grant funding: National Science Foundation CBET-0854979 and DMR-10-06776.

BACKGROUND OF THE INVENTION

1. Field of the Invention

Embodiments of this invention relate to the design, synthesis, fabrication, characterization, and use of new coatings including soluble precursor conjugated polymers and nanotubes or graphene sheets to form new nanocomposites and dispersions or formulations. The coatings maybe used to form thin films and/or to create patterned surfaces.

More specifically, embodiments of this invention relate to the design, synthesis, fabrication, characterization, and use of new coatings, where a soluble precursor conjugated polymer is able to aid in the dispersion and/or deaggregation of nanotubes and/or graphene sheets to form clear and stable solutions polymer coated nanotubes and/or graphene sheets to form new nanocomposites and dispersions or formulations. Being polymerizable, the solutions are suitable for film formation and patterning substrate surfaces and the resulting films and patterned surfaces are amenable to crosslinking, e.g., electropolymerized and/or oxidatively polymerized on a surface, as homogeneous crosslinked films. The films find utility as electrically conducting films, electro-optically active films, and in electropatterning thin film applications. The films and patterns find utility as electrically conducting films, electro-optically active films, sensing, solid-state devices and in electropatterning thin film applications.

2. Description of the Related Art

The discovery of carbon nanotubes (CNTs) and graphene sheets (G) with their combination of extraordinary physical properties and ability to be dispersed in various polymer matrices has created a new class of polymer nanocomposites. Polymer nanocomposites containing CNTs and graphene have received high interest due to their unique properties, such as adjustable electrical conductivity, robust thermo-mechanical properties, and the potential to create new materials with improved characteristics coupled with good chemical stability.

Graphene has recently attracted attention due to its novel electronic, mechanical and thermal properties that have been well documented. However, just as with the newly discovered allotropes of carbon, such as carbon nanotubes, the limited availability of graphene and the lack of known adequate processes to transform it into valuable commercial products have been the rate-determining steps in the evaluation of graphene applications. However, the exploitation of the unique properties of nanocomposites made of carbon nanotubes and/or graphene depends on the quality of their dispersion at the molecular level and the level of polymer-CNTs/graphene interfacial interactions and/or bonding through covalent bonding interactions and/or non-covalent interactions.

An important challenge remaining for CNTs and graphene utilization in commercial products is achieving homogeneous dispersion of individual CNTs and individual graphene sheets to accelerate the use of such dispersions in various applications and especially in large scale applications. At the same time, it is desirable that such dispersions be easily made into films or paenabling the electro-optical and thermo-mechanical properties of the CNT/graphene to be exhibited.

The manufacture of composites including carbon nanotubes and/or graphene require not only that carbon nanotubes and/or graphene sheets to be produced on a large enough scale, but also that they be incorporated and homogeneously distributed into various matrices. However, it is known that carbon nanotubes and graphene sheets are very hydrophobic and easily from irreversible agglomerates in polar solvents (in the absence of dispersing reagents) as a result of strong pi-pi ($\pi$-$\pi$) stacking and van der Waals interactions. Thus, various methods have been developed to stabilize these materials either by covalent modification or noncovalent modification using chemical agents such as aromatic molecules, surfactants, and polymers. Among those two strategies, the noncovalent modification is favored because it is more convenient to use and the electronic structure of CNTs and graphene sheets can be maintained.

The lack of dispersibility of graphite materials including carbon nanotubes and graphene in aqueous media and in organic solvents constitutes a significant barrier to the use of graphite materials. Thus, colloidal dispersions of oxidized graphite sheets are preferentially used in making composite materials. One such oxidized graphite is graphene oxide (GO), which is a graphene (G) material including oxygen functional groups, such as epoxide, —OH, and —COOH groups that make the graphene hydrophilic and, through electrostatic repulsion, are dispersible in polar solvents. Such dispersions may be stabilized by strong stirring or ultrasonication. Exfoliated GO may then be subjected to chemical or electrochemical reduction to obtain graphene as individual sheets typically using hydrazine as reducing agent. While the chemical reduction of GO resulted in significant restoration of $sp^2$ carbon sites in the sheet, the reduction is unable to completely remove all the oxygen functionalities.

As the processing of CNTs is generally difficult due to their insolubility in most common organic solvents, only low weight/weight (w/w) or weight/volume (w/v) concentrations are usually obtained. It is necessary to obtain a homogeneous dispersion of CNTs in an organic solvent for film preparation. It is desirable to have a convenient and facile route for the formation of such homogeneous dispersions through solution mixing methods including a dispersant polymer and CNTs. One such approach, that has been commonly employed, is the direct grafting of small molecules or polymers on the surface of the CNTs, e.g. surface initiated polymerization (SIP). However, a drawback of SIP is a reduction in the electro-optical properties of the CNT. Another approach involves the use of non-covalently adsorbed initiators or end-grafted polymers on the surface of the CNT without disrupting the $\pi$-conjugation of the aromatic rings on the CNT.

While various methods for preparing composite materials including carbon nanotubes and/or graphene sheets have been proposed, they all suffer from certain drawbacks. Thus, there is a need in the art for methods for making compositions including carbon nanotubes and/or graphene sheets that are readily scalable, render homogeneous nanocomposites having unique properties and that do not suffer from the drawback of prior art methods. Patterning is also of high interest, because patterning surfaces can lead to more integration of these materials in devices and miniaturization.

SUMMARY OF THE INVENTION

Embodiments of this invention provide nano-composites, dispersion or formulations including a graphite derived material and allotropes and a polymer including sufficient π-conjugated moieties to interact with surfaces of the graphite material to form a graphite material partially or completely coated with the polymer, and provide methods for making nano-composites and using the nano-composites.

Embodiments of this invention provide compositions comprising nano-composites including graphite material having a partial or complete coating of a polymer including sufficient π-conjugated moieties to interact with surfaces of the graphite material. In certain embodiments, the polymer further includes electropolymerizable moieties, reductively polymerizable moieties, and/or oxidatively polymerizable moieties.

Embodiments of this invention provide dispersions comprising nano-composites including a polymer coated graphite material, where the polymer including sufficient π-conjugated moieties to interact with surfaces of the graphite material. In certain embodiments, the polymer further includes electropolymerizable moieties, reductively polymerizable moieties, and/or oxidatively polymerizable moieties. The dispersions may be used to prepare formulations including a blend or mixture of the dispersions of this invention and other solutions, emulsions, or dispersion. The dispersions of this invention may also be used as additives and blends to bulk solid polymer or formulations to improve compatibilization or other properties of the formulations, where the formulations include plastic master batches, paints, inks, coatings, emulsions, microemulsions, latex, resin, or other similar formulations. Procedures for addition and blending can use the original nanocomposite in the form or derived form of solutions, emulsions, or solid material.

Embodiments of this invention provide films comprising nano-composites including a polymer coated graphite material, where the polymer including sufficient π-conjugated or planar aromatic moieties to interact with surfaces of the graphite material. In certain embodiments, the polymer further includes electropolymerizable moieties, reductively polymerizable moieties, and/or oxidatively polymerizable moieties.

Embodiments of this invention provide crosslinked films comprising crosslinked nano-composites including a polymer coated graphite material, where the polymer includes sufficient π-conjugated moieties to interact with surfaces of the graphite material and sufficient electropolymerizable moieties, reductively polymerizable moieties, and/or oxidatively polymerizable moieties to form the crosslinked film.

Embodiments of this invention provide methods for making nano-composites including a polymer coated graphite material of this invention, where the methods include forming a dispersion of a graphite material in a first solvent system with mixing and/or sonicating. The methods also include forming a solution of a polymer including sufficient π-conjugated moieties to interact with surfaces of the graphite material in a second solvent system with mixing and/or sonicating. The two solvent systems are miscible and are the same or different. The methods also include slowly adding the polymer solution to the graphite material dispersion with mixing and/or sonicating to form a dispersion including partially or completely polymer coated graphite material and non-coated graphite material. The methods also include separating the non-coated graphite material by centrifugation. The methods also include collecting the partially or completely polymer coated graphite material by adding a solvent to precipitate the partially or completely polymer coated graphite material. In certain embodiments, the polymer further includes electropolymerizable moieties, reductively polymerizable moieties, and/or oxidatively polymerizable moieties. The polymer increases the exfoliation of the graphite material and thereby increases yield of partially or completely polymer coated graphite material.

Embodiments of this invention provide methods for making nano-composite films including preparing a substrate. The methods also include applying the partially or completely polymer coated graphite material to the substrate to form a substrate including a layer comprising a partially or completely polymer coated graphite material. The methods may also include crosslinking the layer electrochemically, reductively polymerizable moieties, and/or oxidatively to form a substrate having a crosslinked layer disposed thereon. In certain embodiment, the film is uniform. In other embodiments, the film is non-uniform. In other embodiments, the layer comprises a pattern. In other embodiments, the layer comprises a pattern of two or more partially or completely polymer coated graphite material differing either in the graphite material, the polymer or both. The pattern may be pre-defined, regular or random.

Embodiments of this invention provide devices including a substrate having a layer formed thereon, where the layer comprises a graphite material and a polymer, where the polymer includes sufficient π-conjugated moieties to interact with surfaces of the graphite material to form a graphite material partially or completely coated with the polymer. In certain embodiments, the polymer further includes electropolymerizable moieties, reductively polymerizable moieties, and/or oxidatively polymerizable moieties. In certain embodiments, the layer comprises a film comprising a graphite material partially or completely coated with the polymer. In other embodiments, the layer comprises crosslinked film a graphite material partially or completely coated with the polymer, where the crosslinks are formed between electropolymerizable, reductively polymerizable moieties, and/or oxidatively polymerizable moieties in the polymer. The films or patterned layers may be prepared by lithographic or non-lithographic methods. It is important to emphasize that the dispersions of this invention are equally useful for mixing or blending with liquids and solids such as in melt processing, internal mixing, extruding, coextruding, reactive extruding, or other liquid or solid blending and mixing processes. In embodiments of this invention, patterns of the nano-composites of this invention may be formed by any procedure known in the art including masking, spraying, lithography, non-lithographic methods, deposition and etching methods, photolithography, or other similar methods for forming a pattern on a surface of a substrate. Because the nano-composites of this invention may be formulated as a transparent or clear dispersion, the dispersion may be applied like an ink to a patterned so that spraying, etching, masking, and/or templating may be used to form patterns of any complexity on a substrate surface. The derived or improved properties of the film may be due to the presence of the polymer or the graphite material or both compared to other similar materials and methods minus a key component as described in these embodiments.

Embodiments of this invention provide methods for using compositions comprising nano-composites including graphite material having a partial or complete coating of a polymer including sufficient π-conjugated moieties to interact with surfaces of the graphite material. The methods include atomic separations, selective atomic migrations, selective atomic attachments/adsorptions/absorptions, molecular separations, selective molecular migrations, selective molecular attachments/adsorptions/absorptions, cell/microogranism separations, selective cell/microogranism mitigation, selective cell/microogranism attachment and selective cell/microogranism differentiation. In certain embodiments, the polymer further includes electropolymerizable moieties, reductively polymerizable moieties, and/or oxidatively polymerizable moieties. The microorganisms include viruses, bacteria, archeae, algea, protists, fungi, extremophiles, soil microbes, symbiotic microbes, or other microorganisms. The atoms include any atom in the periodic table of elements. The molecules include any molecular species including biochemical and biological species such as viral vectors, plasmids, polynucleotides, nucleosides, nucleic acids (DNA or RNA), amino acid, polypeptides, proteins, protein assemblages, or any other assemblage of molecules or molecular species.

BRIEF DESCRIPTION OF THE DRAWINGS

The invention can be better understood with reference to the following detailed description together with the appended illustrative drawings in which like elements are numbered the same:

Section I Figures

FIGS. 6A-D depict cyclic voltammograms recorded on Au electrode spin-coated with PVK and PVK/MWNTs nanocomposite in 0.1 M $LiClO_4$ in ACN at different scan rates; (A) pure PVK (upper left), (B) 97% PVK/3% MWNTs (upper right), (C) 95% PVK/5% MWNTs (lower left), and (D) 93% PVK/7% MWNTs (lower right). In all cases the 1st cyclic voltammogram is presented. Potentials reported against Ag/AgCl reference electrode.

FIG. 33 depicts a FTIR-ATR analysis and cyclic voltammograms of the patterned PVK and PVK/GO nanocomposite film.

Section II Figures

Figure 34:
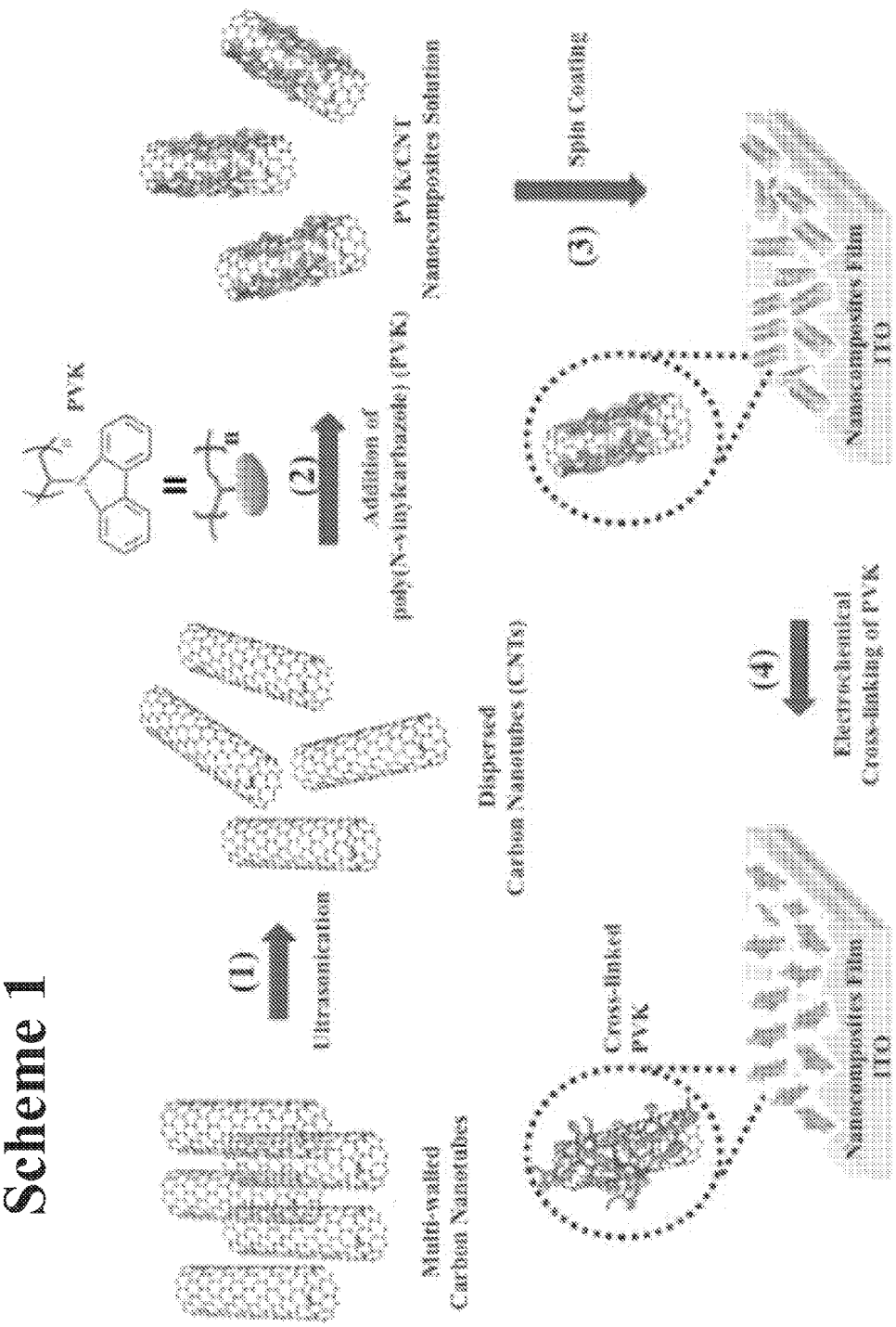

FIG. 34 depicts a schematic representation describing CNT dispersion and CPN nanocomposite film formation, Scheme 1.

Figures 35A, 35B:
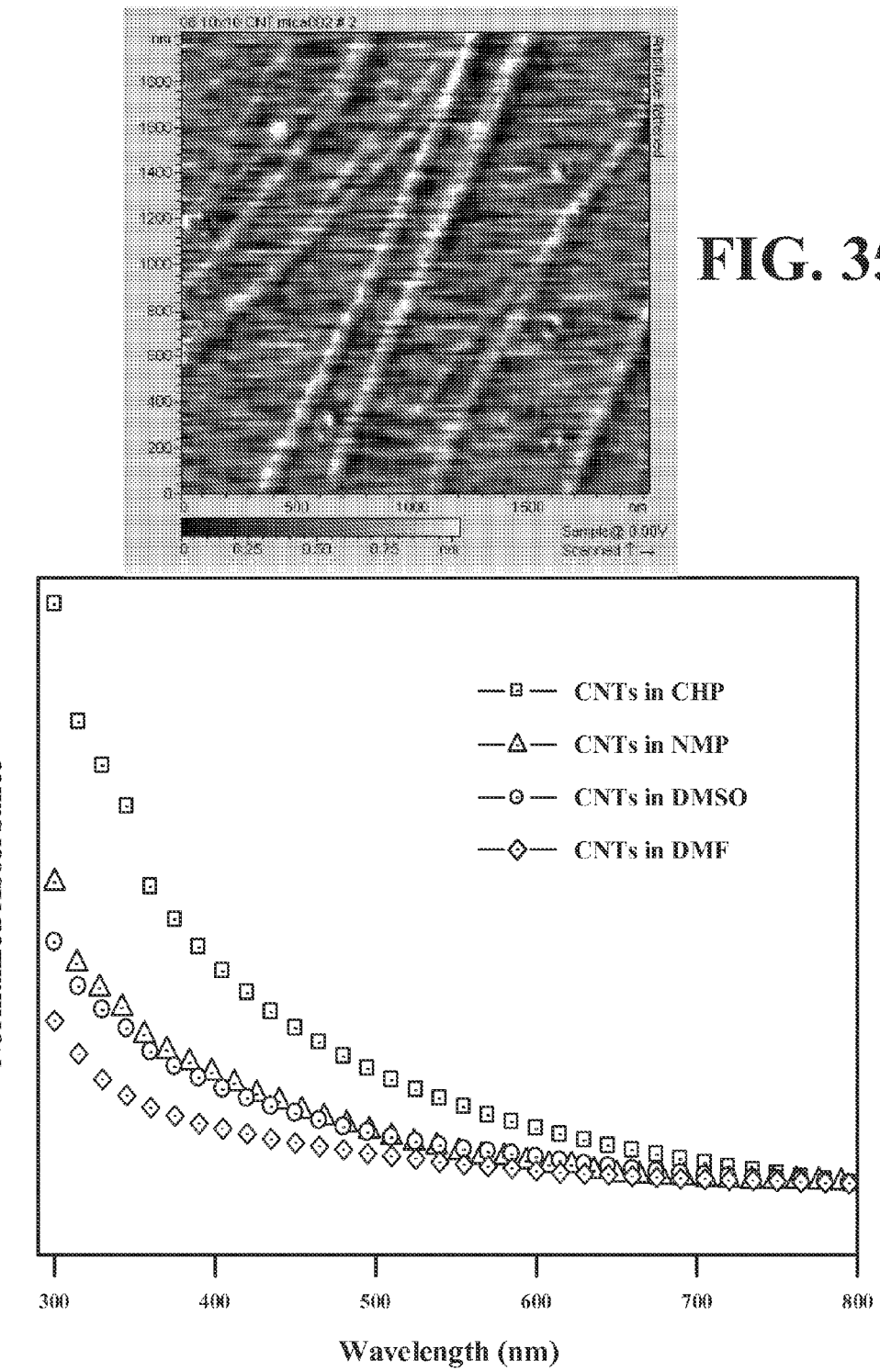

FIGS. 35A&B depict (A) UV-vis spectra of MWNT solution using different solvents at a concentration of 5 mg/mL. Spectra were taken after 24 h the solution had been sonicated for an hour. (B) The AFM image of a spin cast dilute solution of CHP on mica.

Figure 36A:
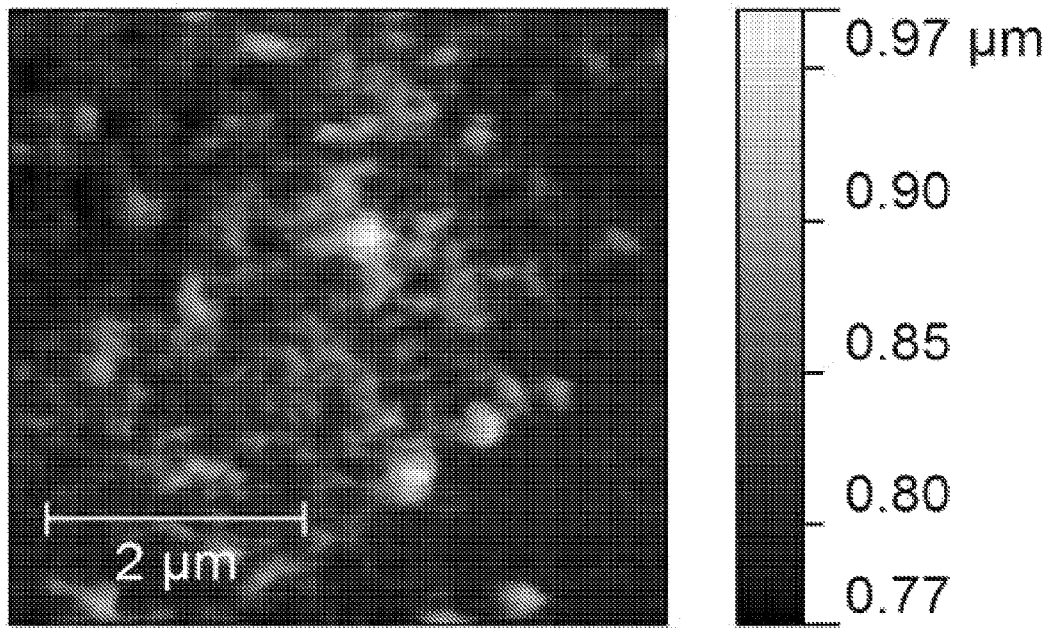

FIGS. 36A&B depict AFM analyses of CNTs (A) before and (B) after 4 hours of sonication of CNTs in CHP. Individual CNTs are observed.

Figure 37:
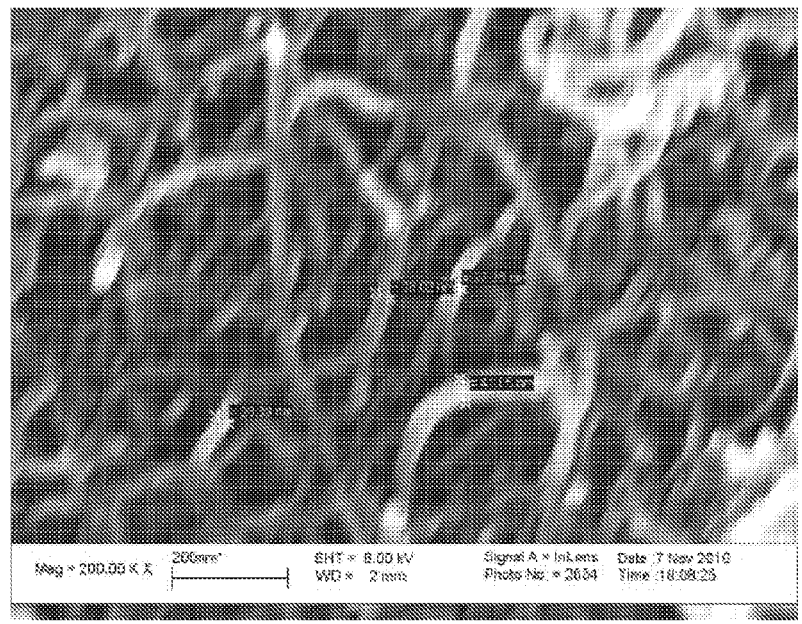

FIG. 37 depicts an SEM image of CNTs after 4 h of sonication in CHP.

Figure 38:
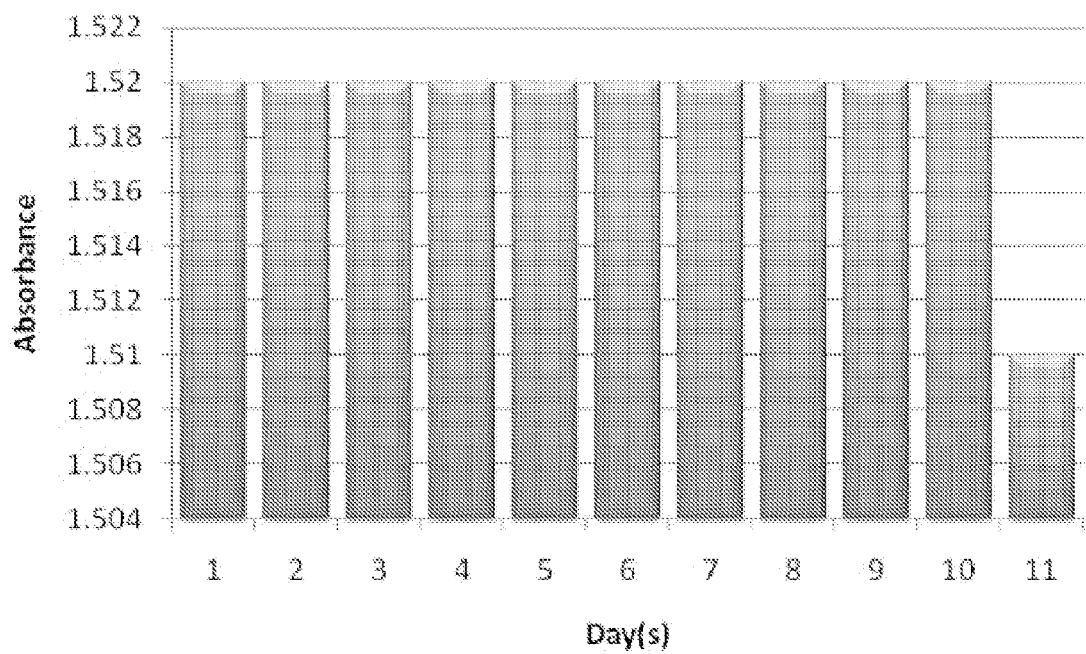

FIG. 38 depicts an intensity of the absorbance of the sonicated MWNTs in CHP for 4 h. It is to be noted that the absorbance dropped after $11^{th}$ day, signifying the start of the aggregation.

Figure 39:
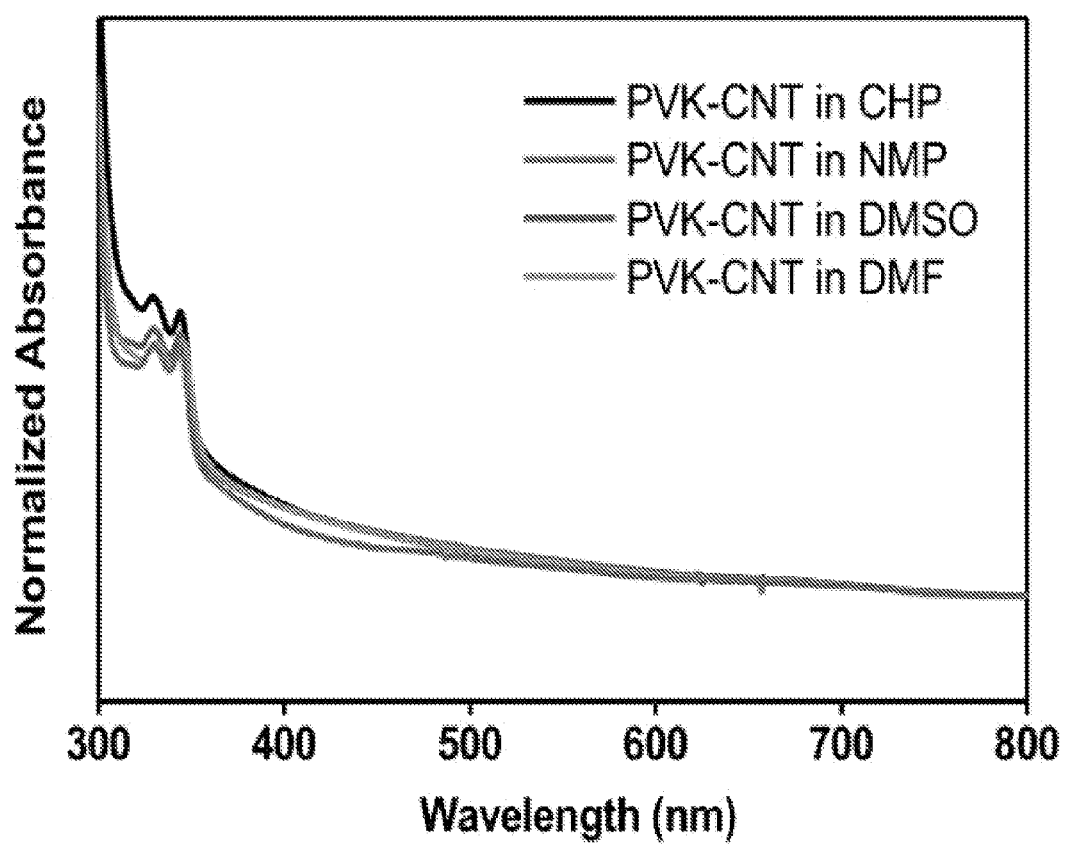

FIG. 39 depicts a UV-vis spectra of the PVK-CNT nanocomposites in different organic solvents.

Figure 40:
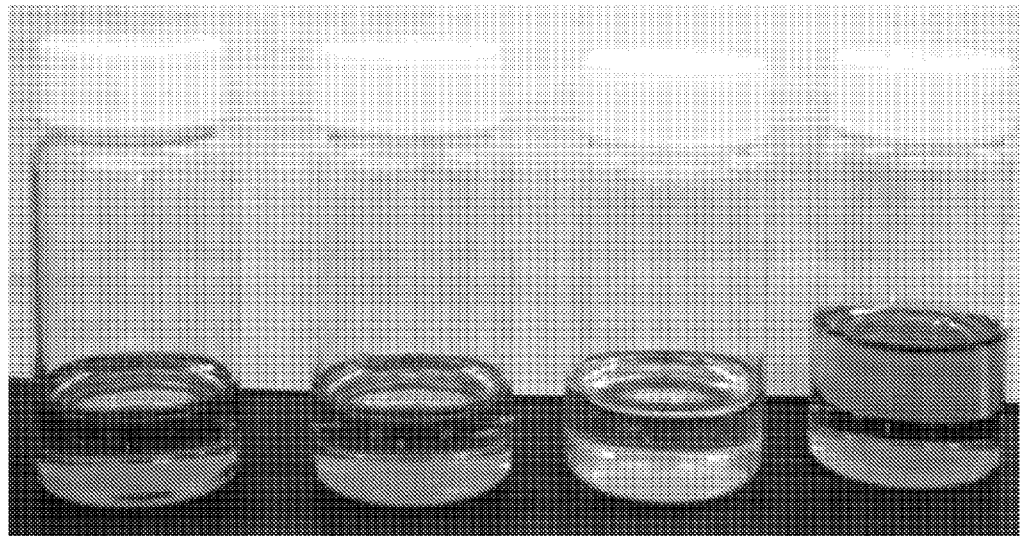

FIG. 40 depicts an actual photograph of PVK/MWNTs solution in CHP/DCM after 90 days incubation at room temperature. (From left to right: 97:3 PVK/CNT, 95:5 PVK/CNT, pure PVK in DCM, 93:7 PVK/CNT).

Figure 41:
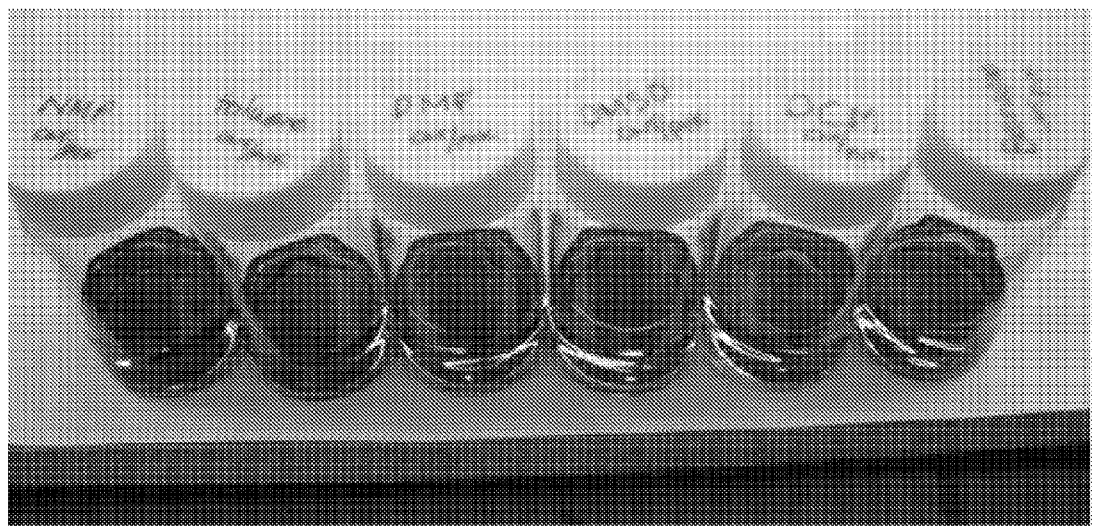

FIG. 41 depicts a digital image of the PVK/MWNTs nanocomposite solutions in different organic solvents.

Figure 42A:
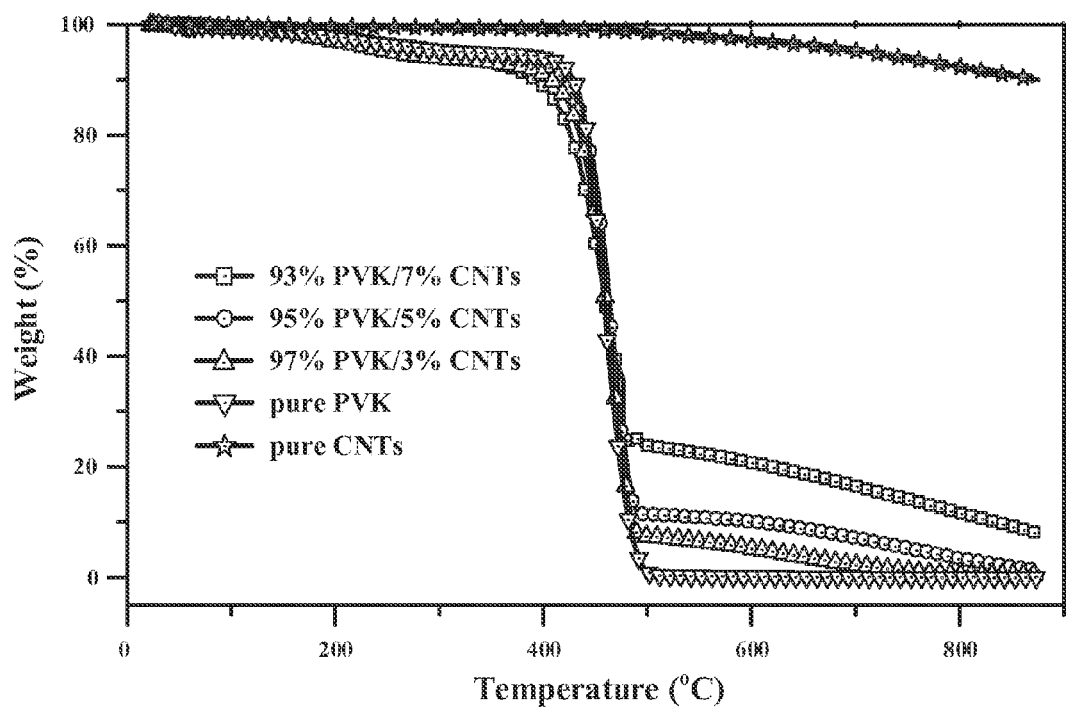

FIGS. 42A&B depict (A) TGA thermograms of pure MWNTs, pure PVK and PVK/MWNTs solutions under $N_2$ at a heating rate of 20° C./min; (B) Graph of 1st derivative (dTGA) curves of pure MWNTs, pure PVK and PVK/MWNTs nanocomposite solutions.

Figure 43A:
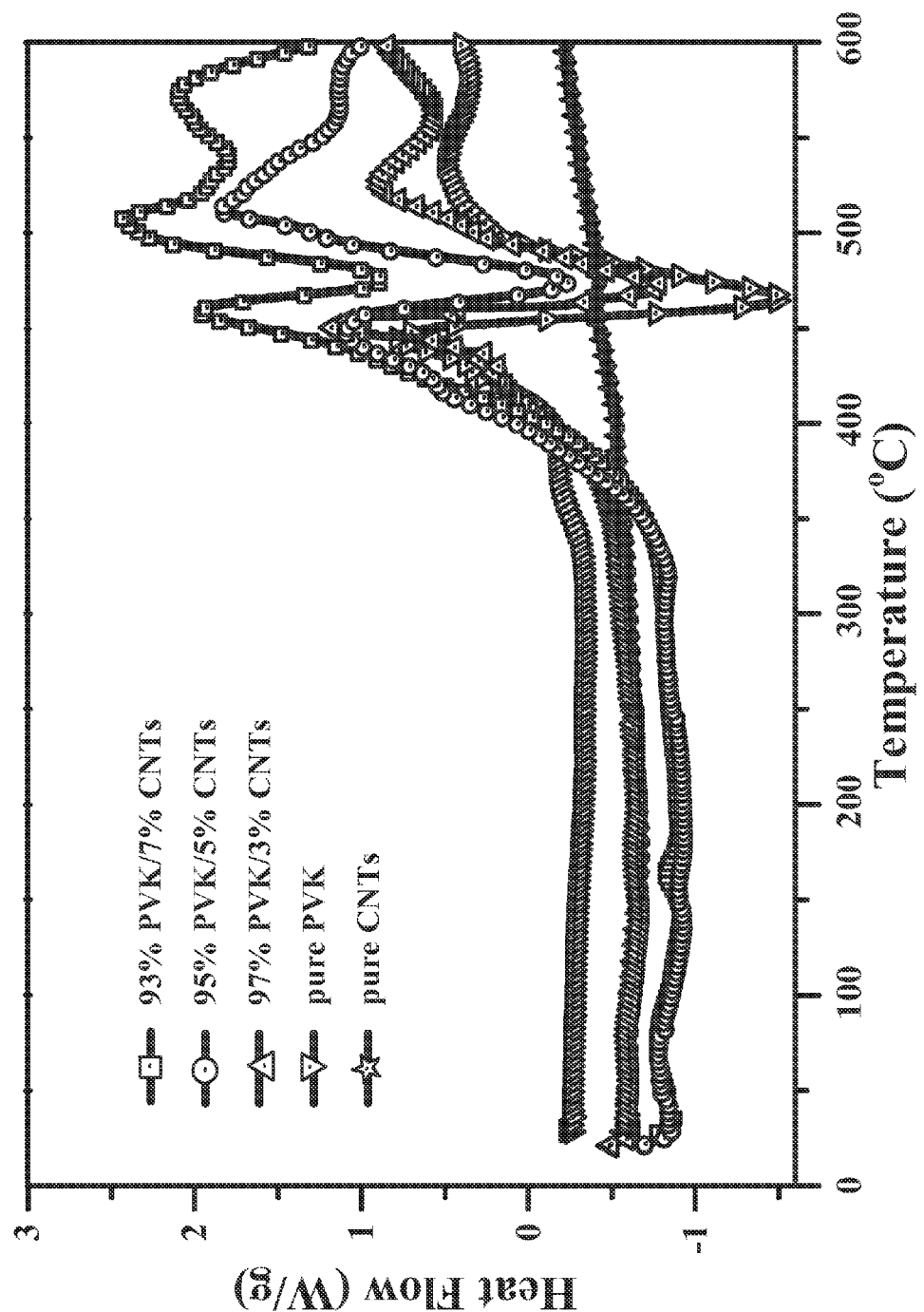

FIGS. 43A&B depict (A) DSC curve of pure MWNTs, pure PVK and PVK/MWNTs nanocomposites at a heating rate of 20° C./min; (B) Graph showing the increase in $T_m$ and $T_g$ as the MWNTs loading increases.

Figures 44A, 44B:
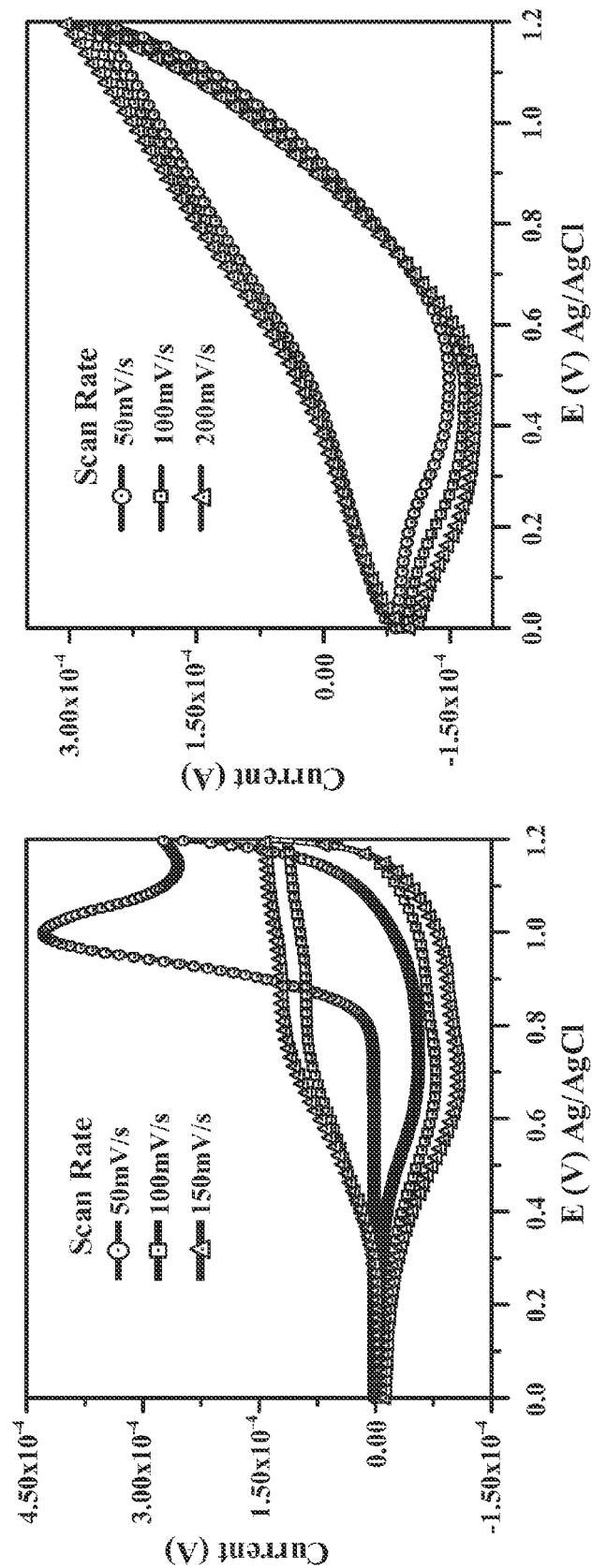

FIGS. 44A&B depicts cyclic voltammograms at different scan rates of (A) pure PVK and (B) 97% PVK/3% MWNTs. In all cases, the 1st cyclic voltammogram is presented. Potentials reported against Ag/AgCl reference electrode.

Figure 45A:
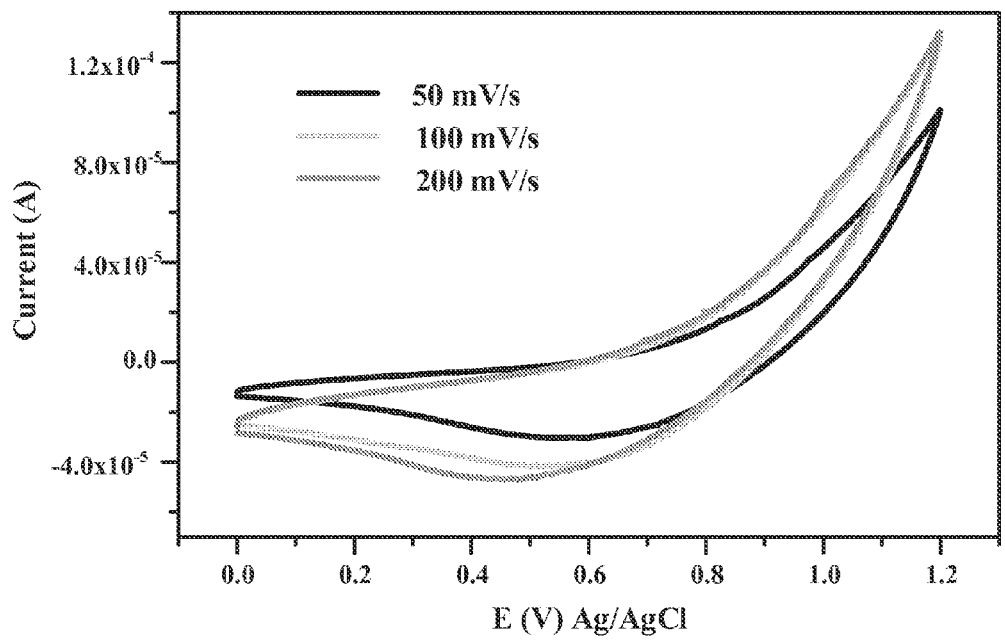

FIGS. 45A&B depict cyclic voltammograms recorded on Au electrode spin-coated with PVK and PVK/MWNTs nanocomposite in 0.1 M $LiClO_4$ in ACN at different scan rates: (A) 95% PVK/5% MWNTs and (B) 93% PVK/7% MWNTs. In all cases the 1st cyclic voltammogram is presented. Potentials reported against Ag/AgCl reference electrode.

Figure 46A:
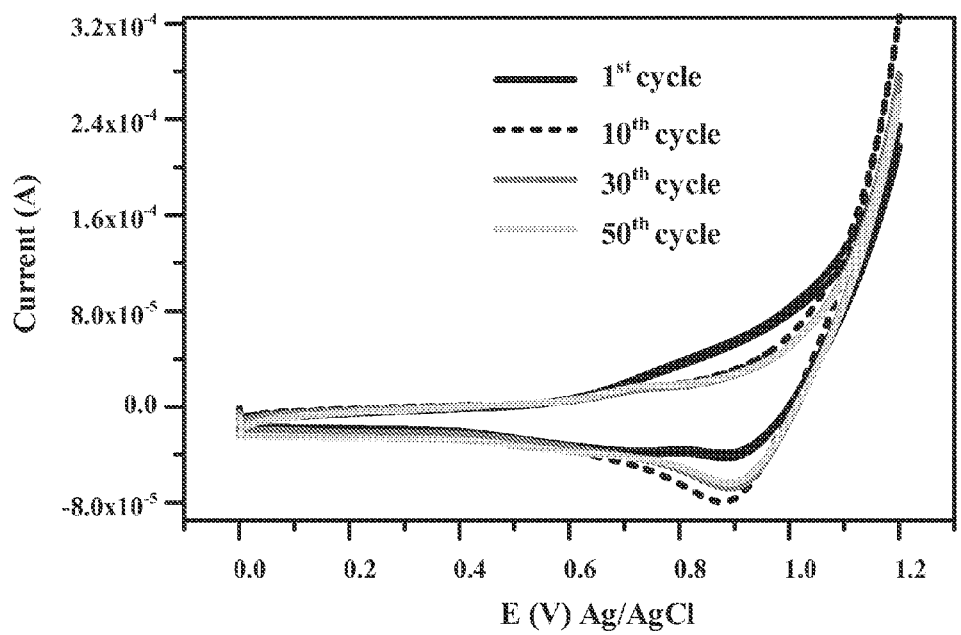

FIGS. 46A&B depict cyclic voltammograms recorded on ITO glass electrode spin-coated with (A) pure PVK and (B) 97% PVK/3% MWNTs CPN film in 0.1 M $LiClO_4$ in ACN at 50 mV/s for 50 cycles. Potentials reported against Ag/AgCl reference electrode.

Figures 47A, 47B:
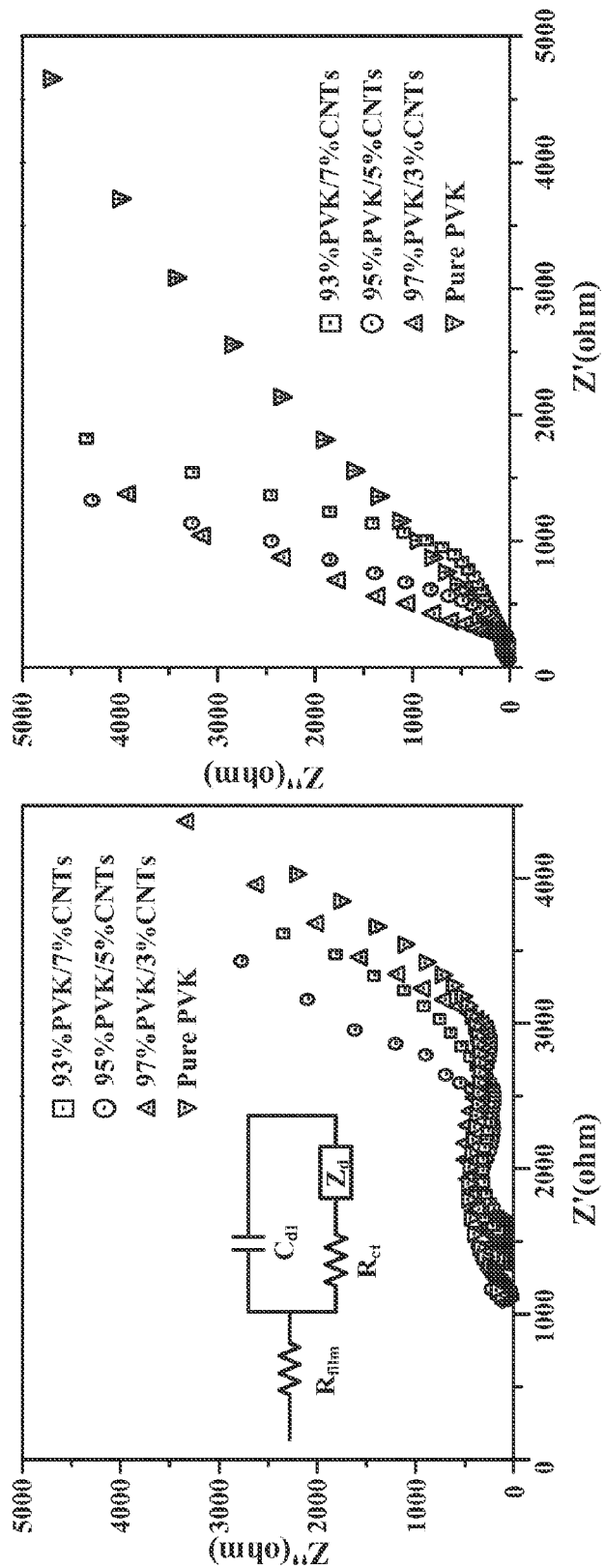

FIGS. 47A&B depict EIS nyquist plot of the PVK/MWNTs nanocomposite films prepared via spin-coating in ITO glass substrate; (A) PVK/MWNTs nanocomposites film and (B) PVK/MWNTs CPN nanocomposite films. The equivalent circuit is given in the inset graph.

Figure 48A:
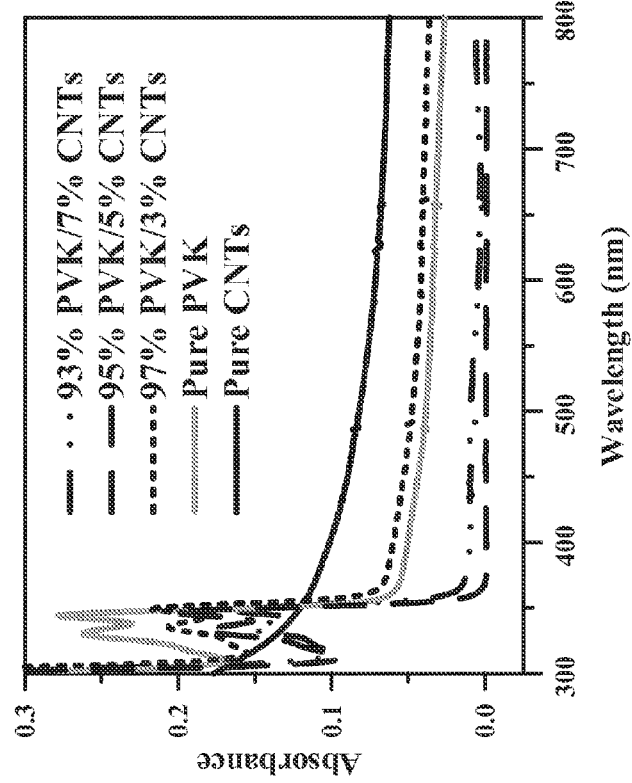

FIGS. 48A&B depict UV-vis spectra of (A) the spin-casted films of pure PVK and PVK/MWNTs nanocomposite and (B) the electrochemically cross-linked PVK and PVK/MWNTs CPN films.

Figure 49:
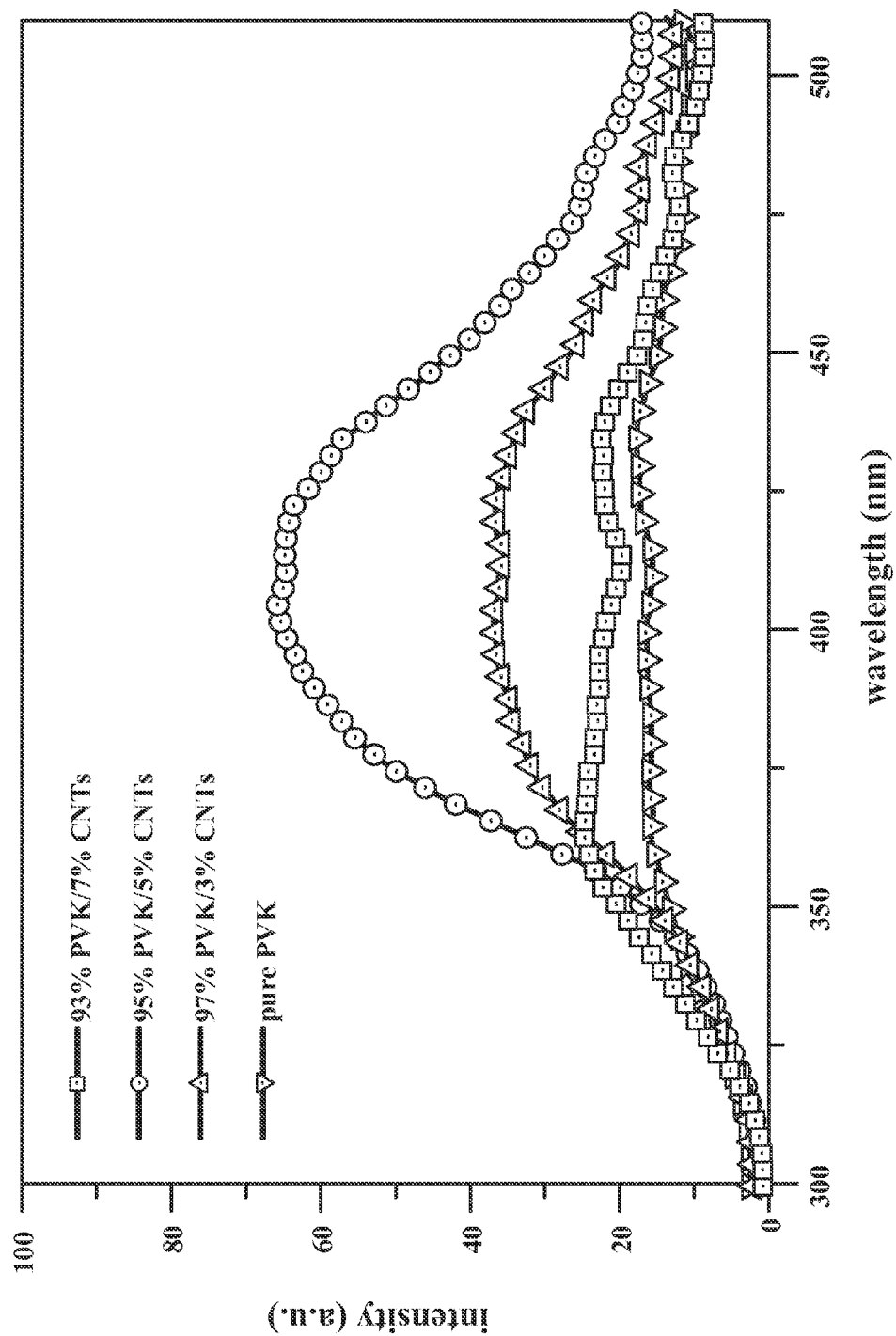

FIG. 49 depicts fluorescence spectra of the pure PVK and the PVK/MWNTs nanocomposite solutions.

Figure 50:
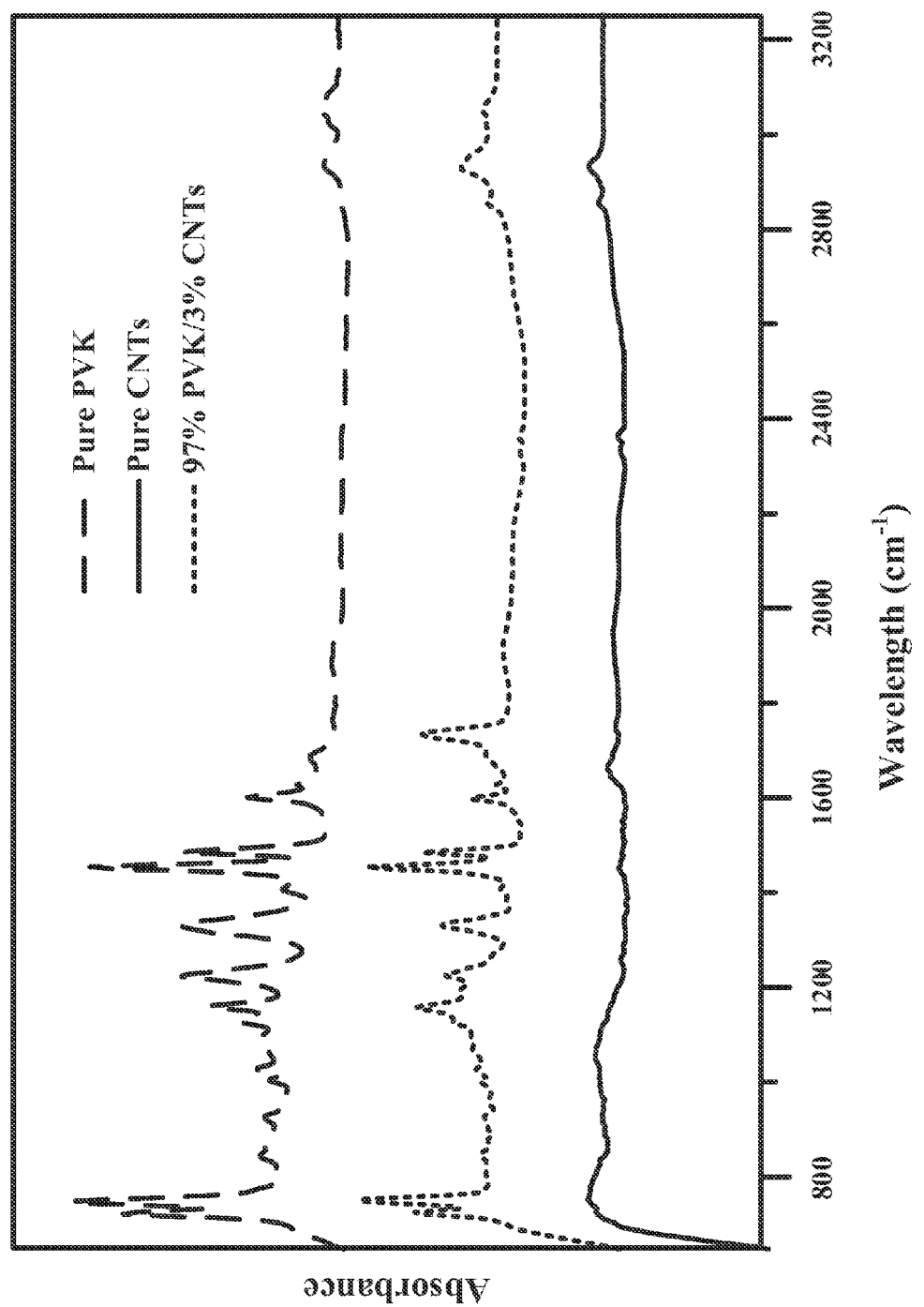

FIG. 50 depict FT-IR-ATR spectra of PVK/MWNTs CPN films pure PVK, 97% PVK/3% MWNTs CPN film and pure MWNTs.

Figure 51B:
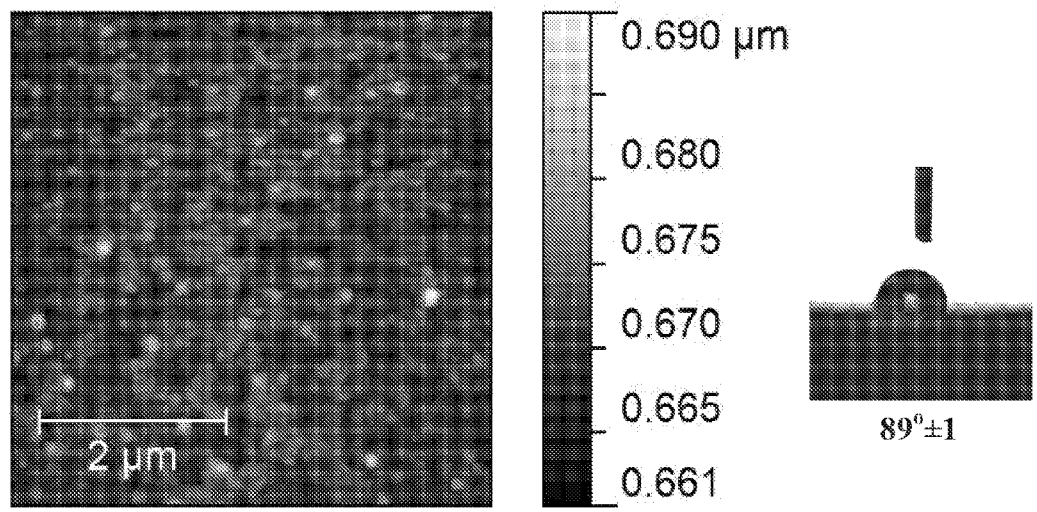
Figure 51A:
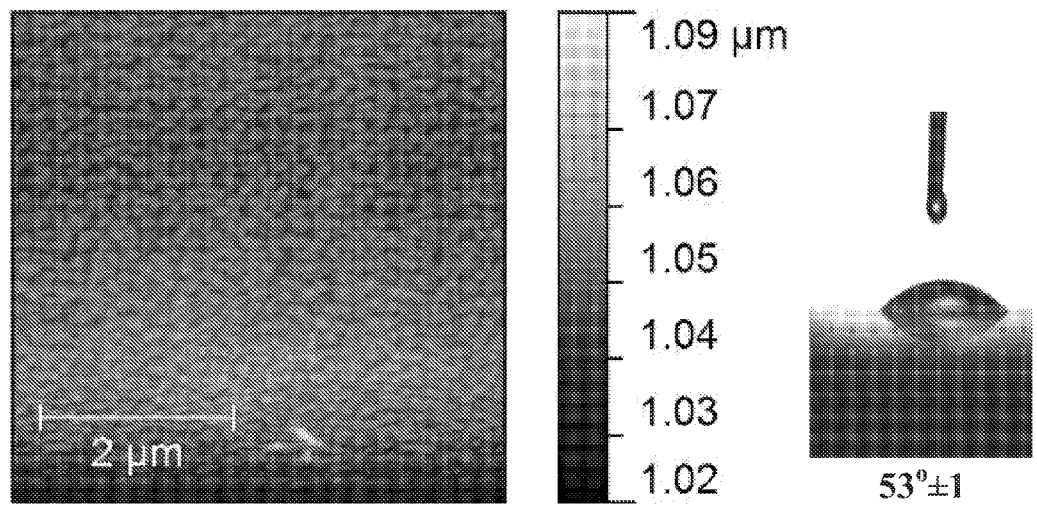

FIGS. 51A&B depict AFM topography images and static water contact angles (inset) of the ITO-spin coated nanocomposite films of 97% PVK and 3% MWNTs (A) before and (B) after electrochemical cross-linking (50 cycles at 50 mV/s with scan range of 0 V-1.4 V).

FIG. 52A-G depict XPS spectra investigating the elemental composition of the pure PVK and PVK/CNTs CPN nanocomposite film on Au substrate. From high-resolution XPS scans presented that the nitrogen/carbon (N/C) ratio was found to be 0.109 for pure PVK compared to 0.102 for PVK/CNT nanocomposite. Both FT-IR ATR and XPS data confirmed the spectral data and distribution in the binding energy associated with the cross-linking of the carbazole units.

Figure 53:
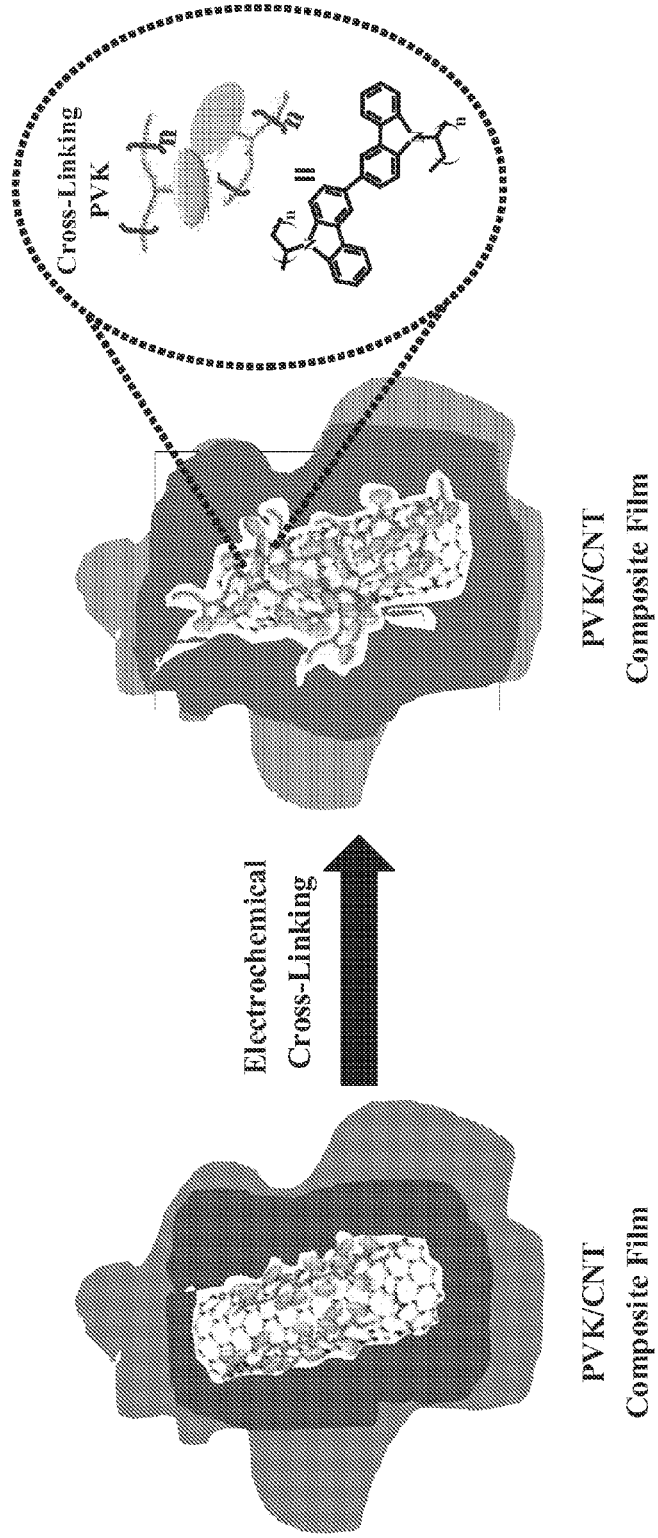

FIG. 53 depicts a surface sensitive analytical technique which is XPS was carried out to investigate the elemental composition of the pure PVK and PVK/CNTs CPN nanocomposite

Section III Figures

Figure 54:
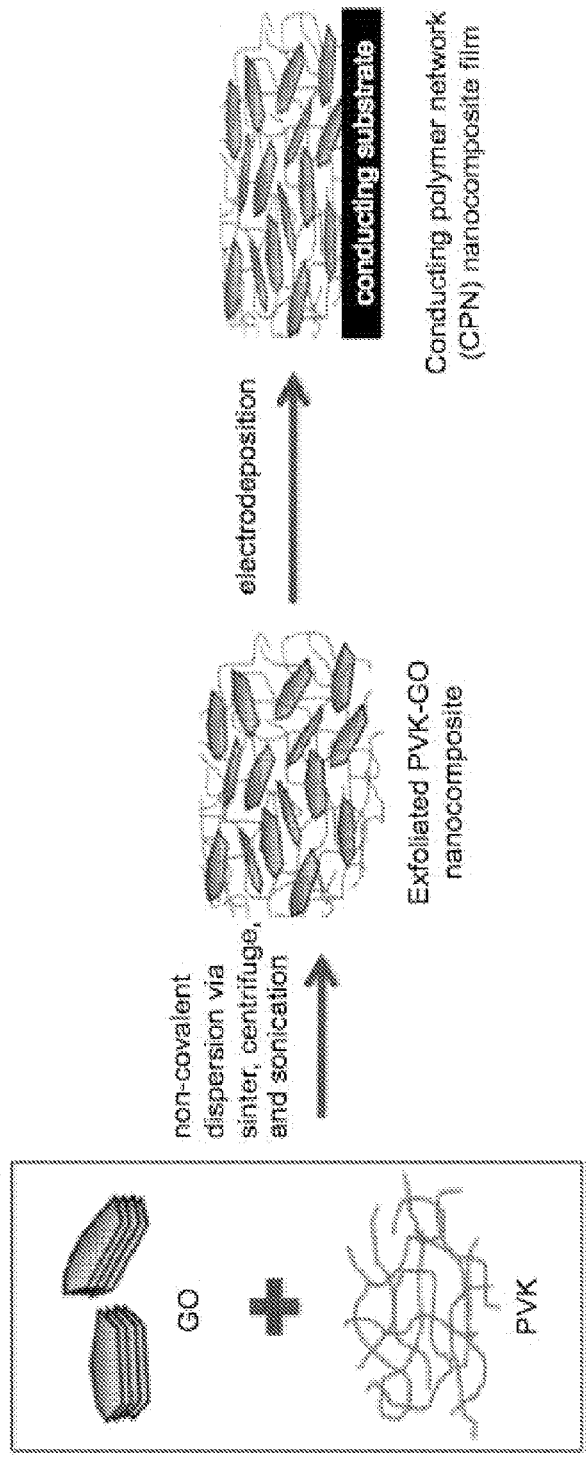

FIG. 54 depicts a schematic representation for the preparation of stable conducting polymer, nanocomposite film of PVK-GO on any conducting substrate, Scheme 1.

FIGS. 55A-C depict (A) Digital images of the as prepared GO dispersion (1 mg/ml) in THF, water, NMP, DMF, and CHP; (B) AFM topography image (5 mm×5 mm) of GO dispersion in NMP that was spin-coated on a mica substrate. Below the image shows the line profile of GO with an average height of about 1 nm; (C) Digital images of GO (1 mg/ml, left image) and PVK-GO nanocomposite (3 wt % GO) in NMP after 30 days.

Figure 56:
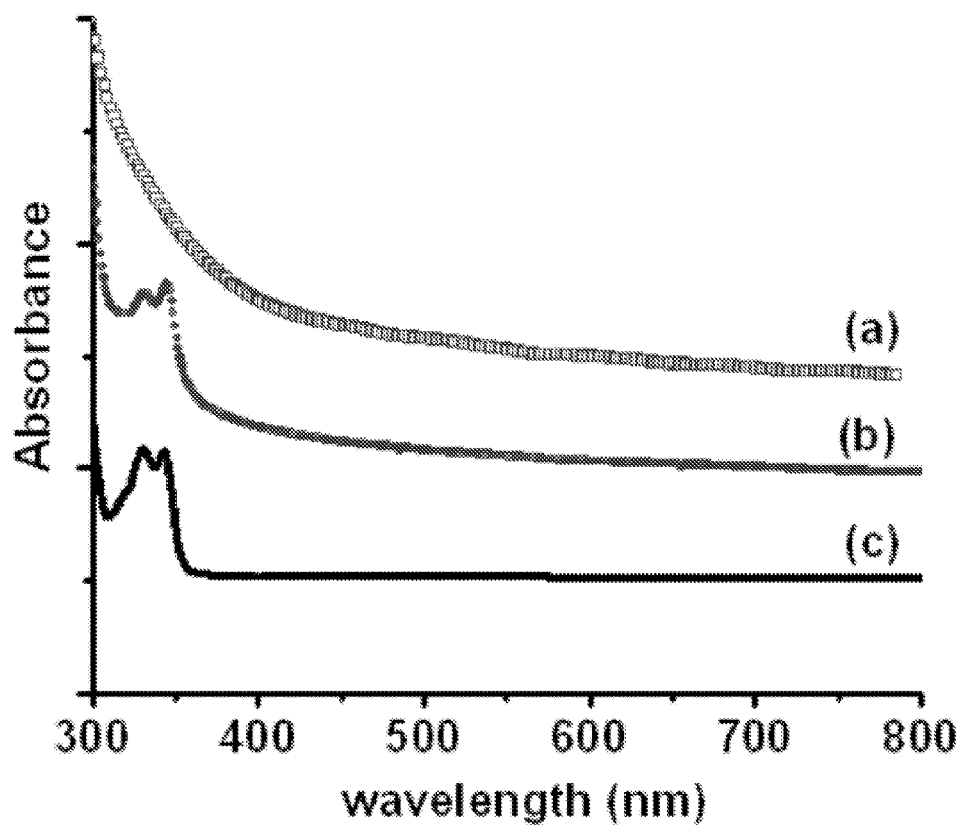

FIGS. 56A-C depict UV-vis absorption spectra of (A) GO, (B) PVK-GO nanocomposite (3 wt % loading of GO), and (C) pure PVK in NMP.

FIGS. 57A-C depict XRD patterns of (A) PVK-GO nanocomposite (3 wt % GO), (B) pure PVK, and (C) GO.

Figure 58:
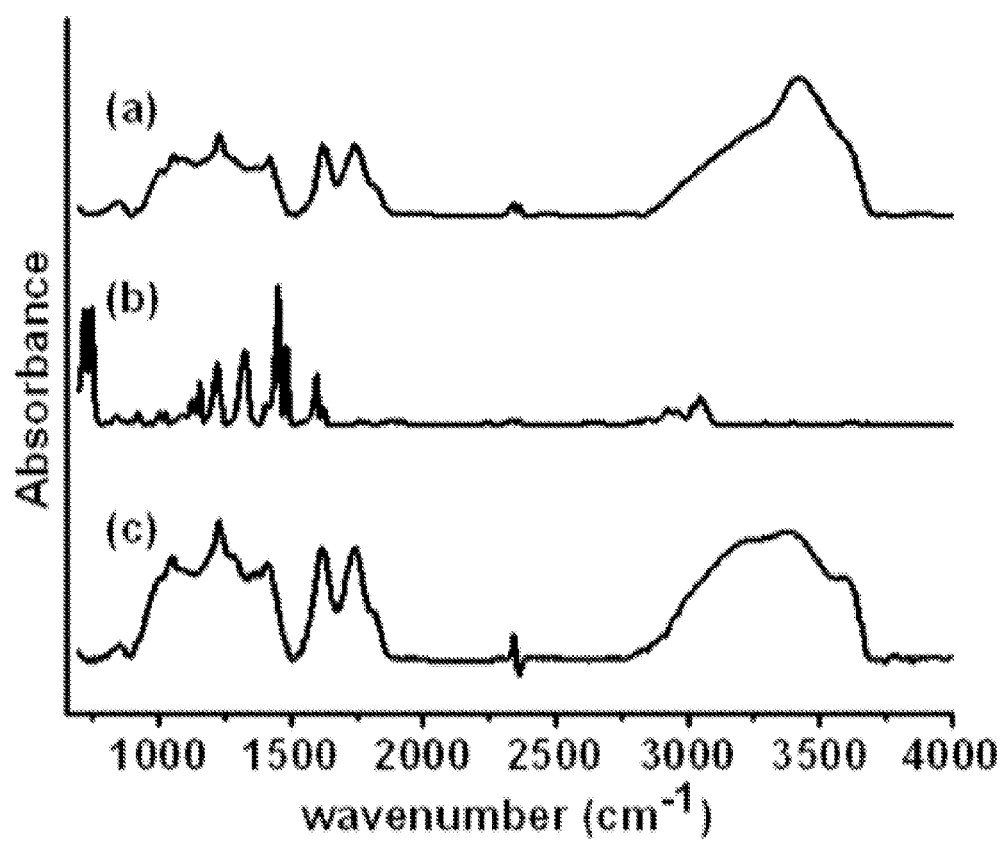

FIGS. 58A-C depict FTIR spectra of the (A) GO, (B) pure PVK, and (C) PVK-GO nanocomposite with 3 wt % GO.

Figure 59:
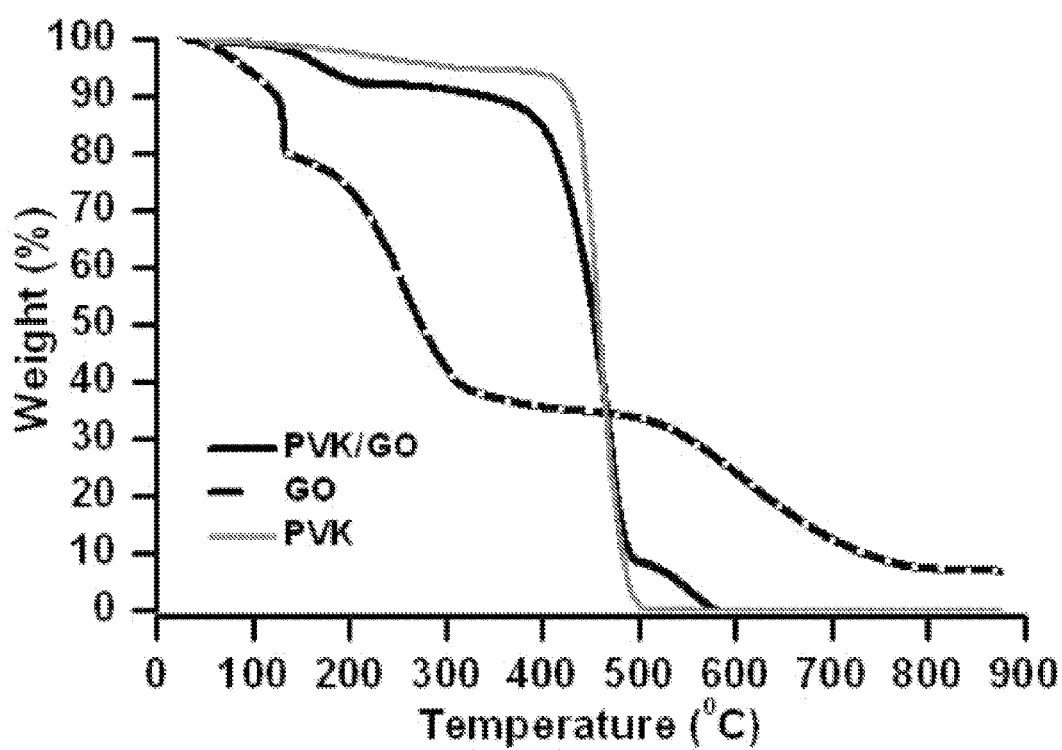

FIG. 59 depicts TGA profiles of GO, PVK, and PVK-GO nanonocomposite with 3 wt % loading of GO. The samples were measured in $N_2$ with heating rate of 20° C./min.

Figure 60:
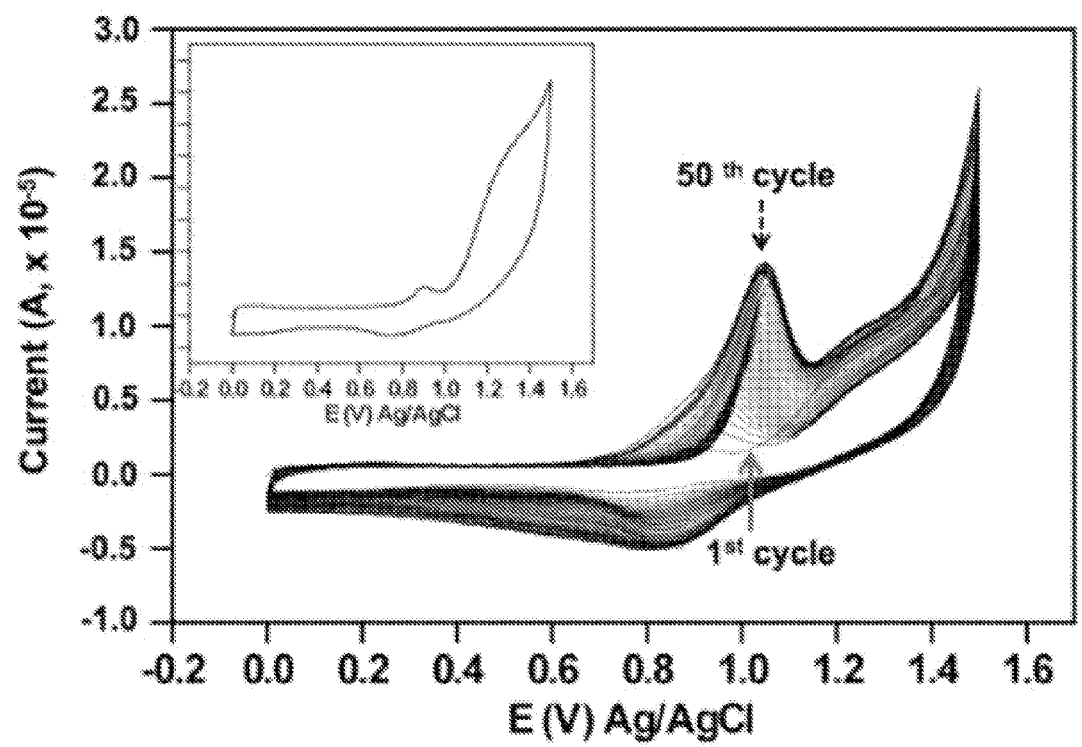

FIG. 60 depicts a CV plot of the electrodeposited PVK-GO nanocomposite deposited from 0 to 1500 mV at a scan rate of 10 mV/s for 50 cycles. (Inset: Monomer-free scan of the electrodeposited film).

Figure 61:
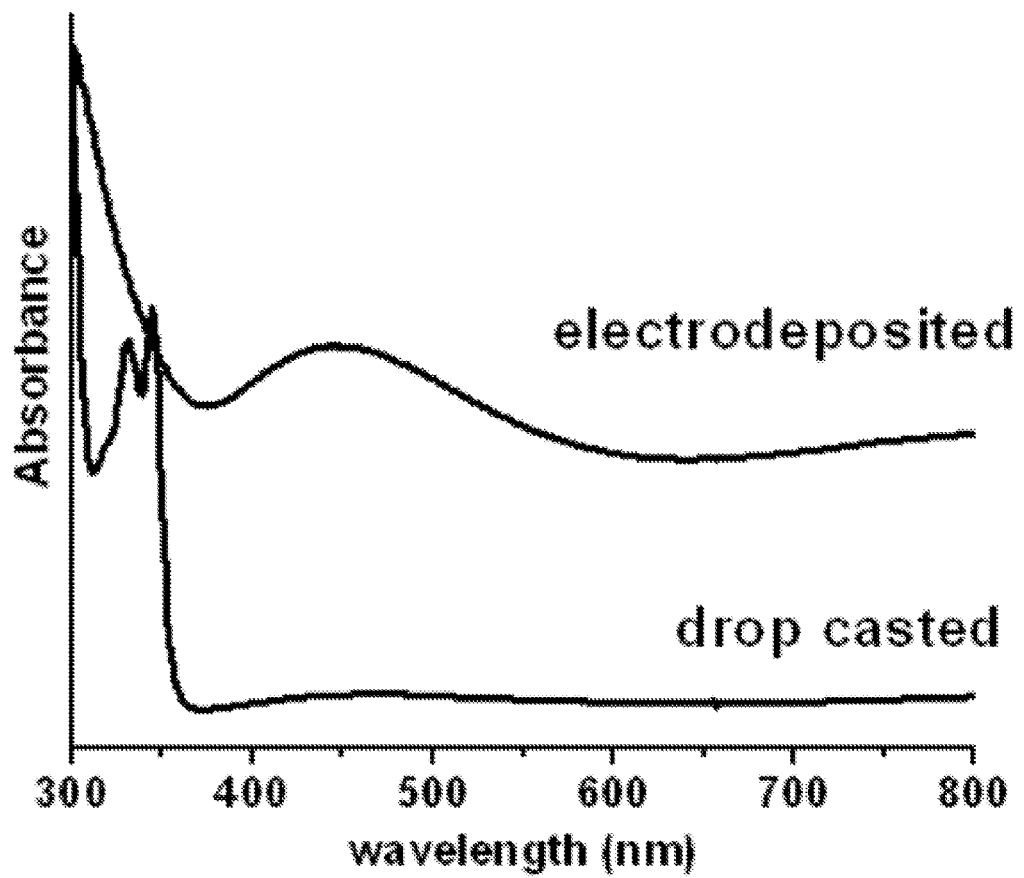

FIG. 61 depicts UV-vis spectra of the drop-casted and electrodeposited PVK-GO nanocomposite.

Figure 62B:
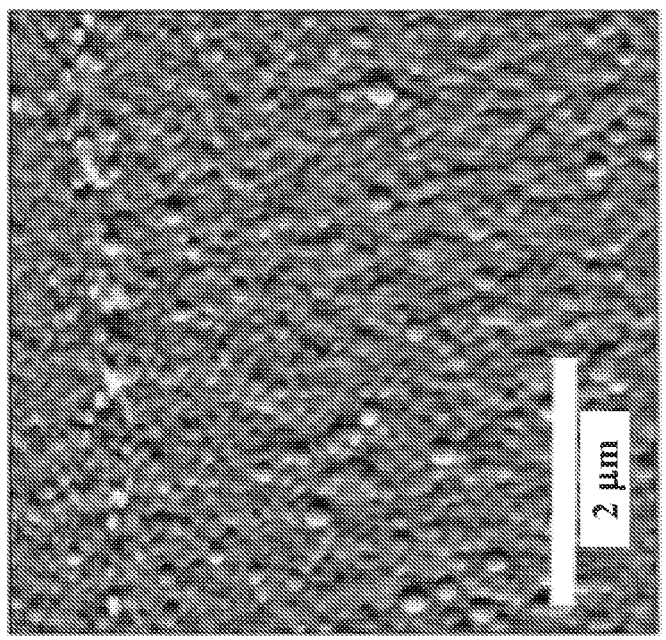
Figure 62A:
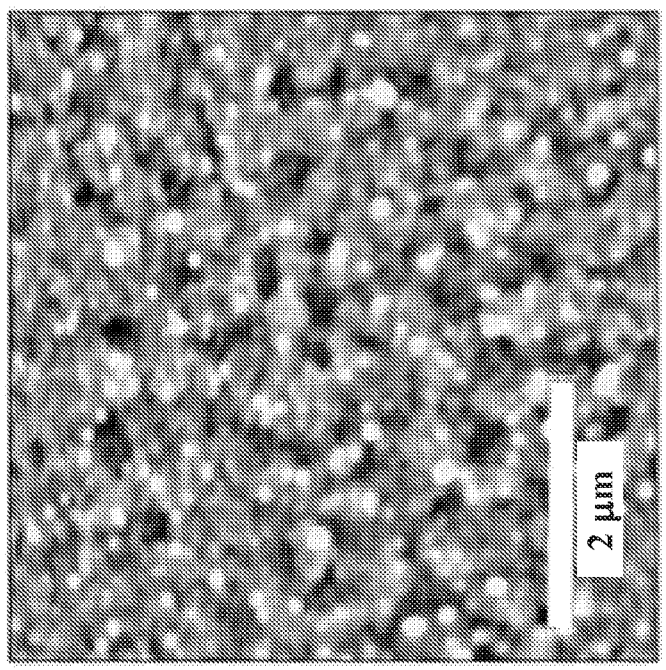

FIGS. 62A&B depict representative AFM image (5×5 $mm^2$) of the electrodeposited PVK-GO film on ITO substrate. (A) topography (B) phase. Scale bar represents 2 mm.

FIGS. 63A&B depict ATR spectra of the electrodeposited (A) PVK-GO nanocomposite and (B) PVK films.

Section IV Figures

Figure 64:
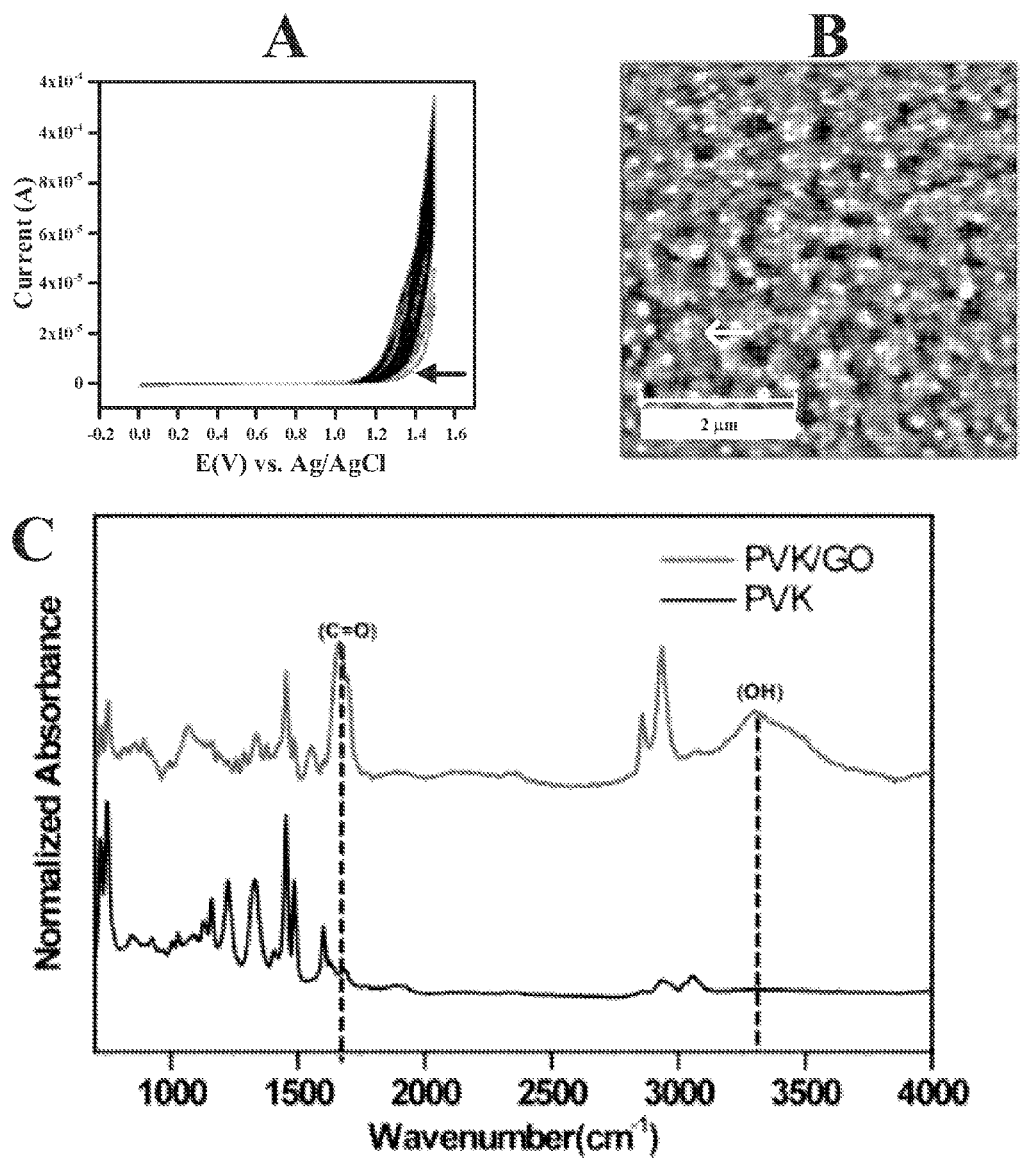
Figure 65:
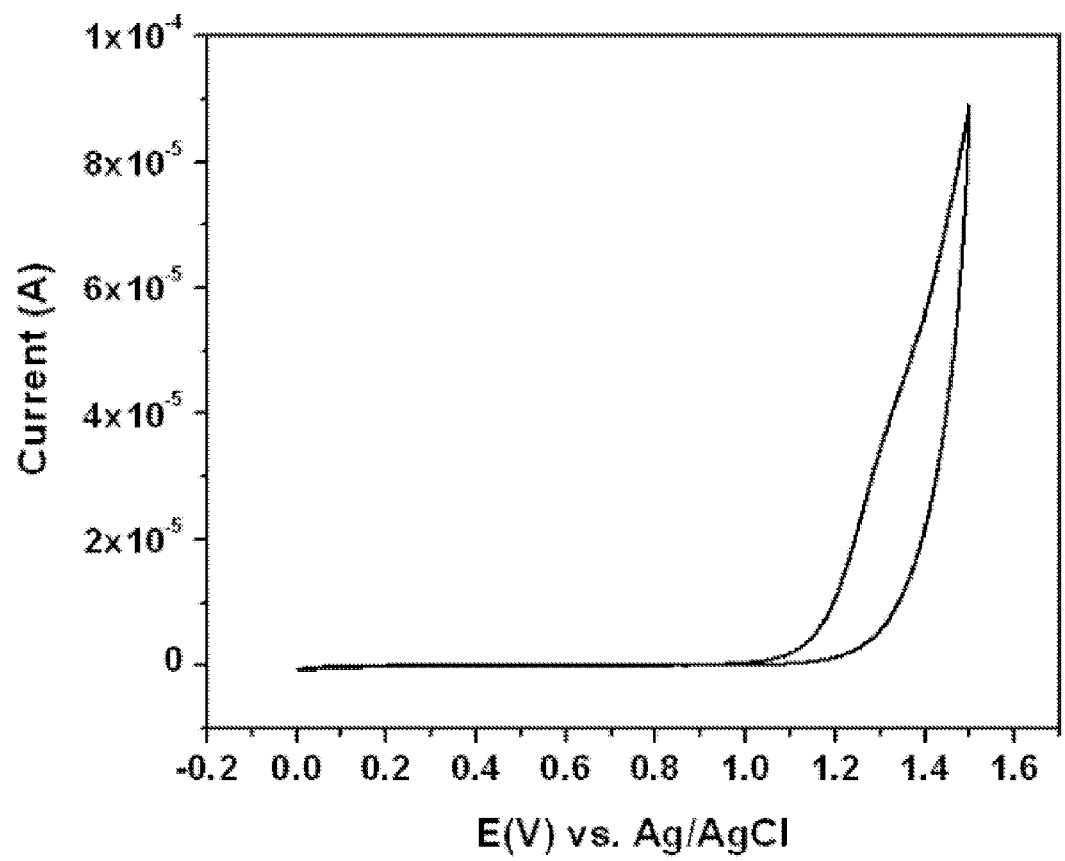

FIGS. 64A-C depict (A) Cyclic Voltammograms (CV) of the electropolymerized PVK-GO on ITO. The red arrow points to the first oxidation peak at 1.4 eV. (B) AFM Topography images (5×5 mm$^2$) of PVK-GO nanocomposites on ITO surface. Scale bar represents 2 mm. (C) ATR-FTIR spectra of the PVK (black) and PVK-GO (red) modified films. Dashed lines represent the signature peaks indicative of the presence of GO on the surface: C=O stretch 1700 cm$^{-1}$ and OH stretch 3000-3600 cm$^{-1}$ FIG. 65 depicts monomer-free scan of the electrodeposited PVK-GO film on ITO using TBAH/acetonitrile.

Figure 66A:
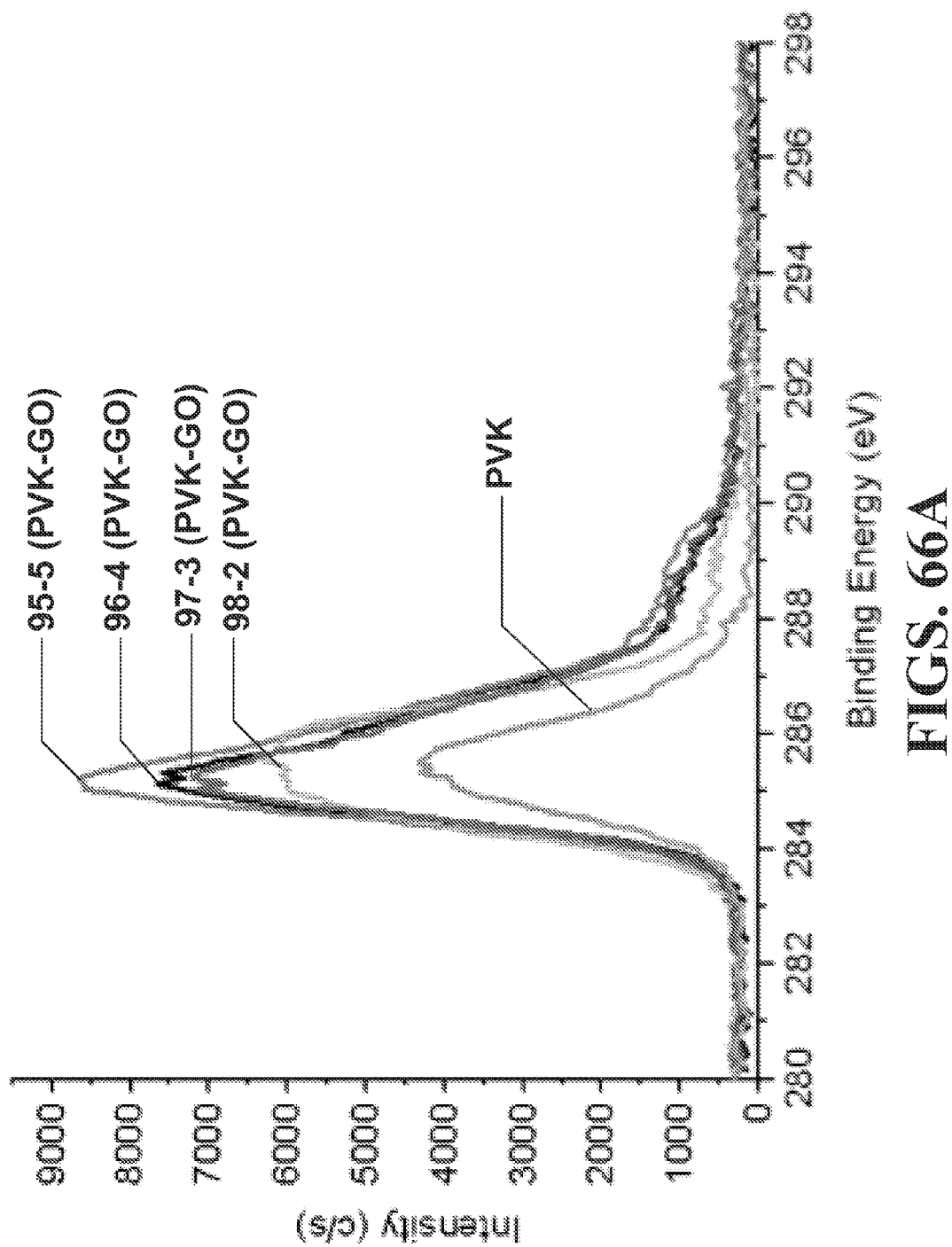

FIGS. 66A&B depicts XPS narrow scans of the electrodeposited PVK-GO films on ITO. (A) C 1s (B) N 1s regions.

FIGS. 67A&B depicts (A) OD growth curves of E. coli cells (107 cfu/ml) that were exposed to GO (1000 µg/ml), GO-PVK (1000 µg/ml) nanocomposite, PVK for 1 h prior to their growth on TSB. (B) The time required by the bacteria to reach an OD600 nm of 0.5 for samples treated with each of the above conditions.

FIGS. 68A-F depict fluorescence images of the E. coli on (A) unmodified ITO, (B) electrodeposited PVK, (C) spin-coated GO, and (D) electrodeposited PVK-GO films. Images were obtained with a 100× oil immersion objective using a FITC filter for green fluorescence from SYTO 9 in all bacteria presented on the left column and a TRITC filter for red fluorescence from PI in membrane-compromised bacteria presented on the right column. (E) Plot of the total number of bacteria (green) and among them the number of PI-positive bacteria (red) on the field of view (90×70 mm$^2$), which were adsorbed on the modified surfaces. The blank is the unmodified ITO substrate as the control. (F) Correlation of the % non-viable E. coli (% PI-positive) attached on each of the surfaces. Note: Data were expressed as the mean number of bacteria±standard deviation of four experiments (4 replicates prepared at 2 different times).

Figure 69:
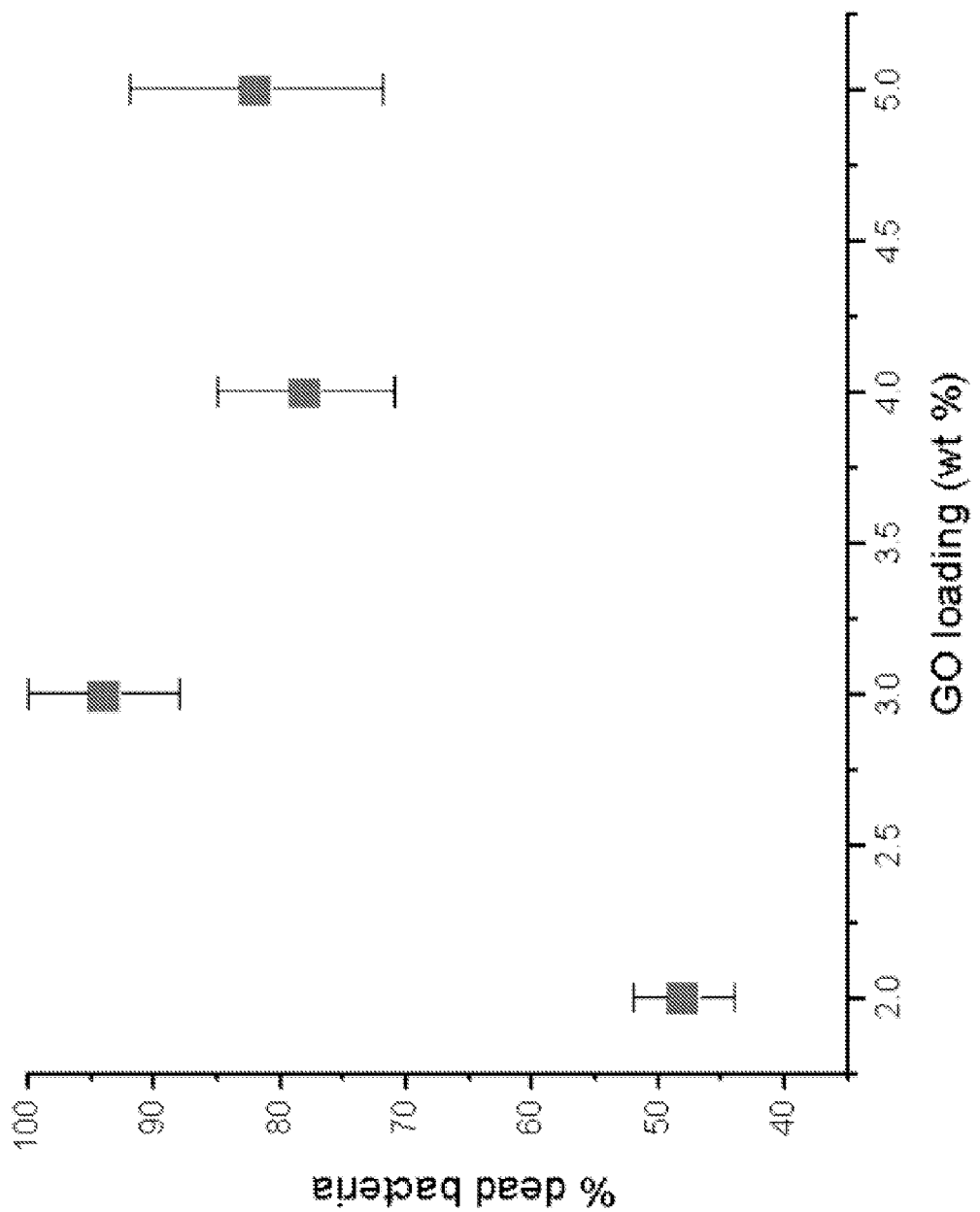

FIG. 69 depicts correlation between GO loading on the bacterial toxicity of PVK-GO films against E. coli.

Section V Figures

FIGS. 70A-E depict fabrication scheme of the GO/PVK electro-patterned and nanocomposite film: (A) LB-like deposition of PS colloidal templates, (B) CV-electrodeposition of GO/PVK nanocomposite film, and (C) PS template removal. (D-E) 3D computer generated images of the predicted optimized geometries of the GO/PVK nanocomposite using DFT B3LYP 6-31G* calculations using the Spartan 08 software.

FIGS. 71A-D depict CV diagram (monomer free scan on inset) of the electrodeposition of (A) GO/PVK nanocomposite on PS-coated ITO and (B) pure PVK on bare ITO substrate. (C) UV-Vis and (D) ATR IR spectra of the electro-patterned GO/PVK nanocomposite film and electrodeposited pure PVK film (control) on ITO substrates.

Figure 72:
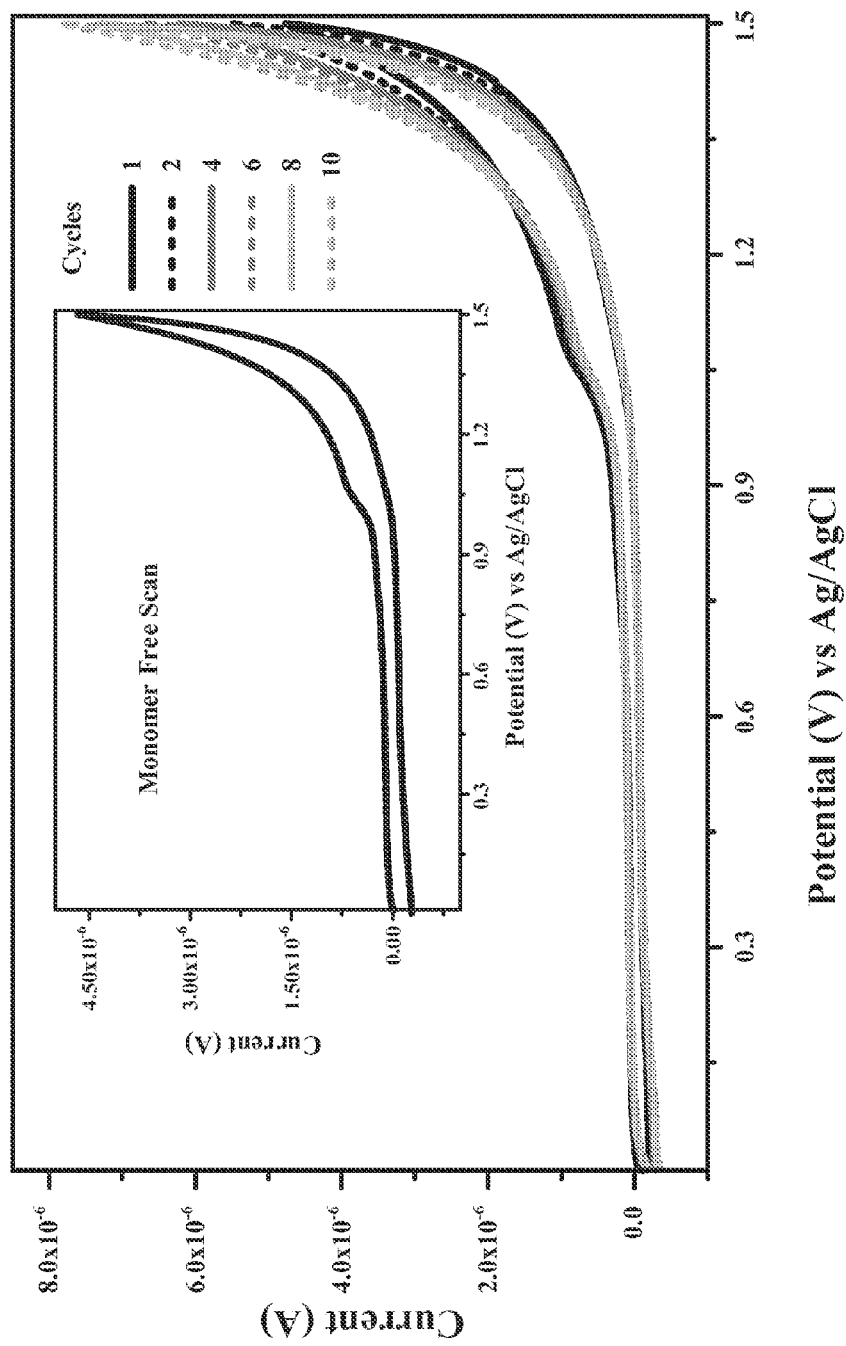

FIG. 72 depict CV diagram of the electrodeposition of GO/PVK on bare ITO substrate with monomer free post polymerization scan (CV 1 cycle in ACN with 0.1 M TBAH) on inset.

Figure 73A:
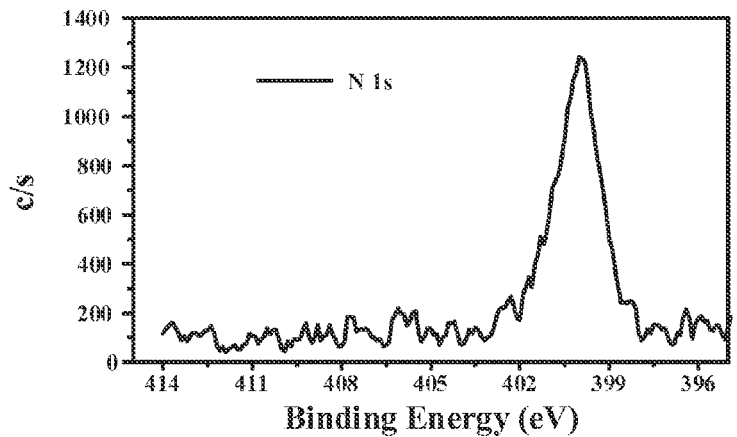
Figure 73B:
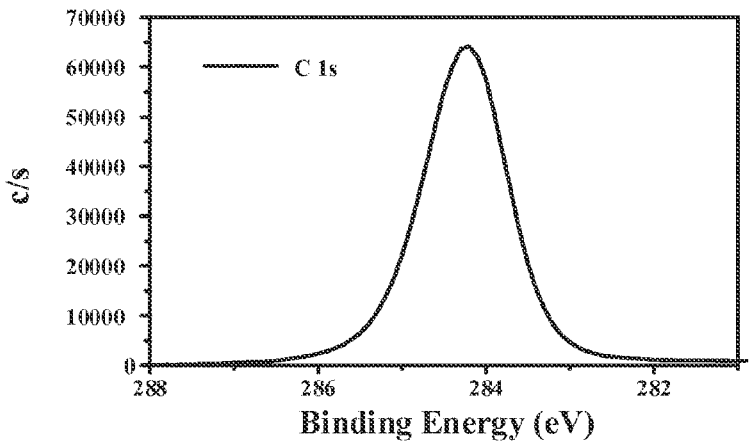
Figure 73C:
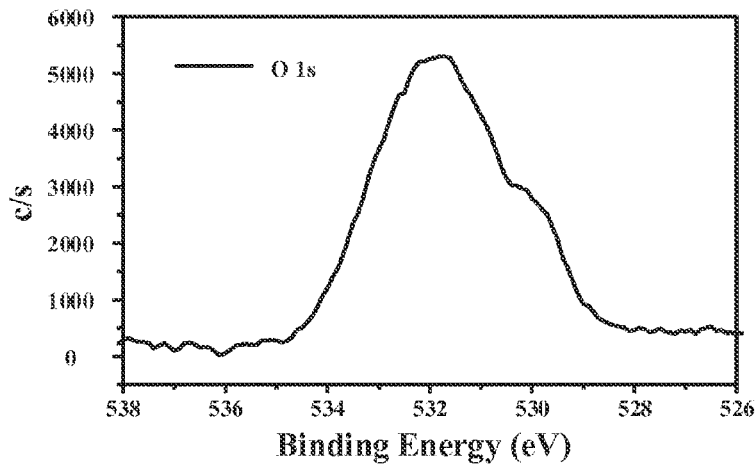

FIGS. 73A-C depict XPS high resolution scans of the GO/PVK nanocomposite and electro-patterned film: (A) N 1 s, (B) C 1 s, and (C) 01 s.

Figure 74:
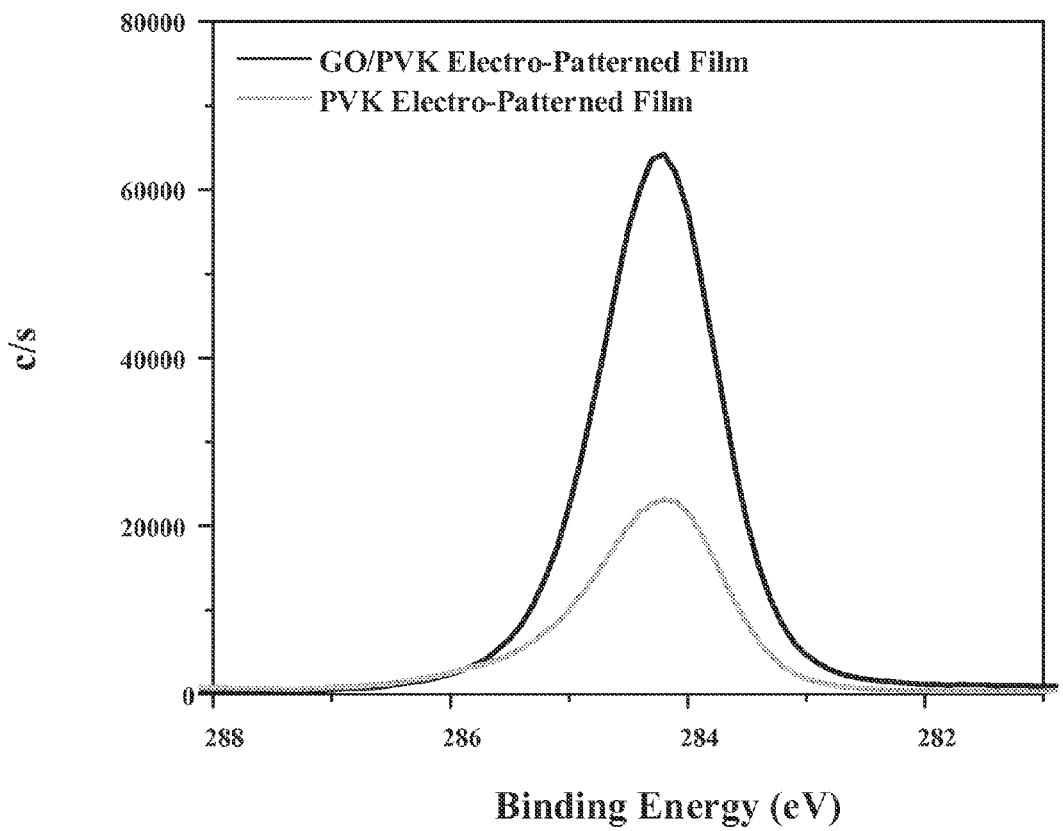

FIG. 74 depicts X-Ray spectra of C 1 s high resolution scan of the (black curve) GO/PVK nanocomposite and electro-patterned and (red curve) pure PVK electro-patterned film on ITO.

FIGS. 75A-C depict AFM topography 2D images (3D on inset) of the spin coated GO on mica: (A) Topography, (B) Amplitude, (C) Phase.

FIGS. 76A-F depict (A) AFM topography 2D image with (B-F) line profile of the spin coated GO on mica.

FIGS. 77A-E depict AFM (A) topography and (B) phase 2D images with (C-E) line profile analysis of the reduced graphene oxide (RGO).

Figure 78A:
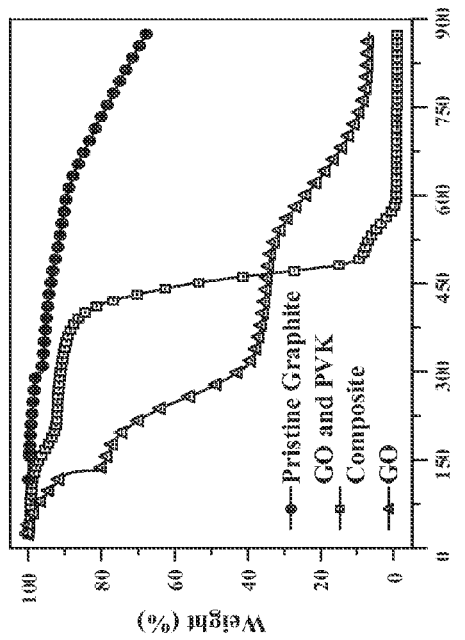
Figure 78B:
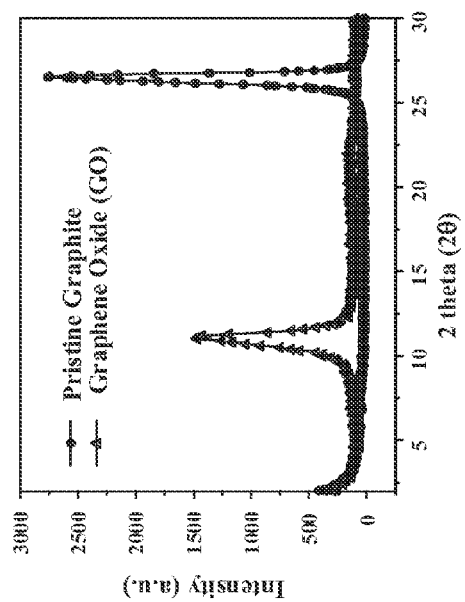
Figure 78C:
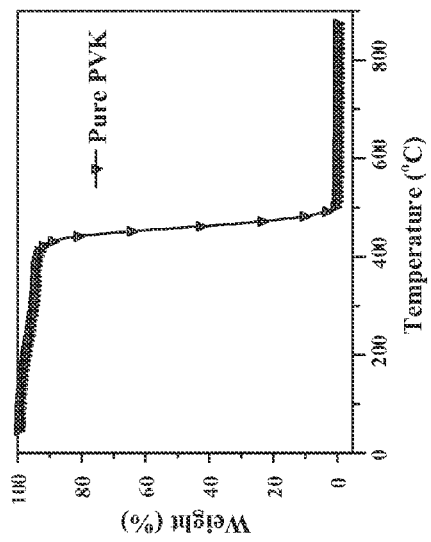

FIGS. 78A-C depict (A) TGA thermogram and (B) XRD data of GO/PVK nanocomposite as compared to pristine GO or graphite. (C) TGA thermogram of pure PVK as control.

FIGS. 79A-G depict AFM topography 2D images (3D on inset) of (A) PS-colloidal template array and (B) (D) electro-patterned nanocomposite film of GO-PVK after colloidal template removal. (C) AFM amplitude 2D image and (E) line profile of the high magnification topography image. (G) Current-sensing-AFM 2D image (5 µm×5 µm) with 3D image on the inset.

FIGS. 80A-D depict (A) Contact topography and (B-D) current sensing (CS)-AFM 2D images (3D images on inset) of the GO/PVK nanocomposite and electro-patterned films.

Figure 81A:
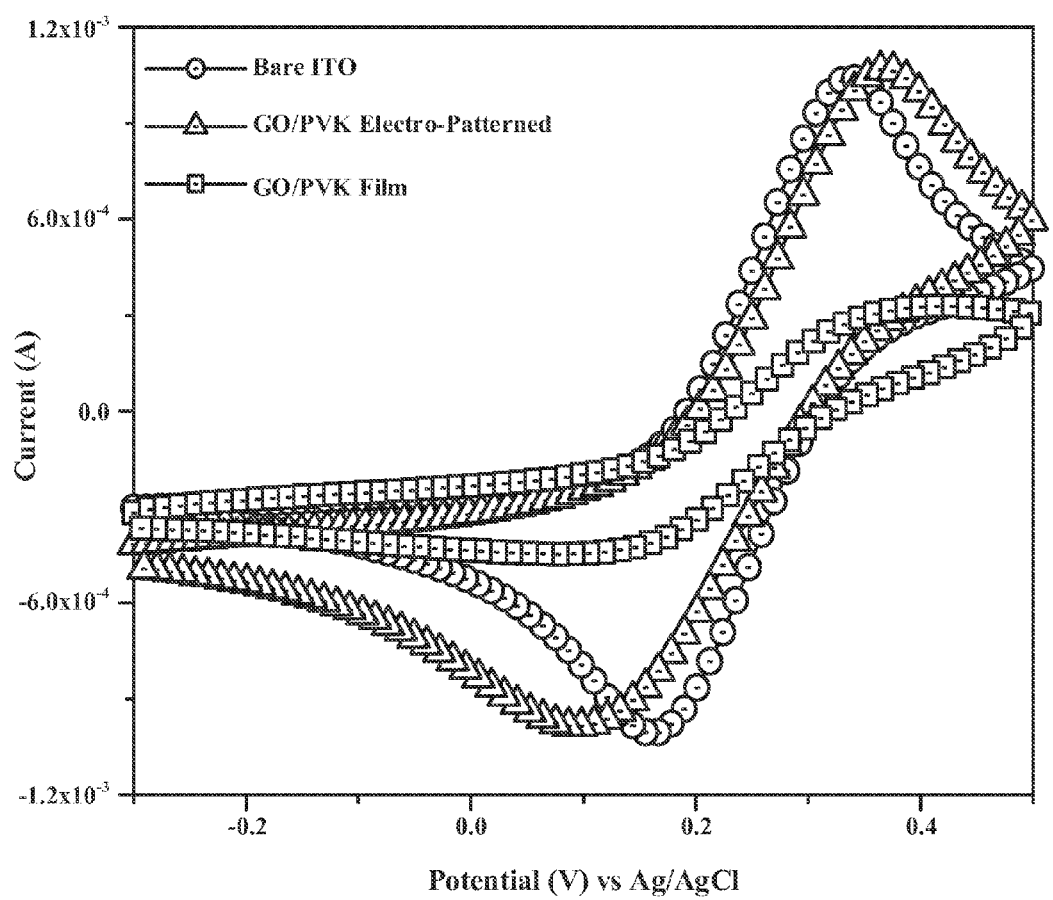
Figure 81B:
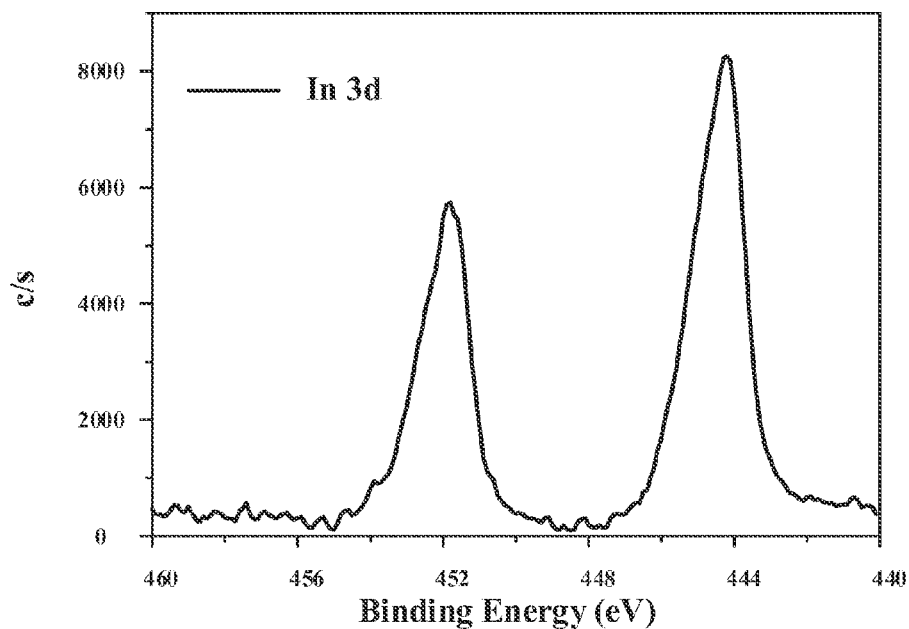
Figure 81C:
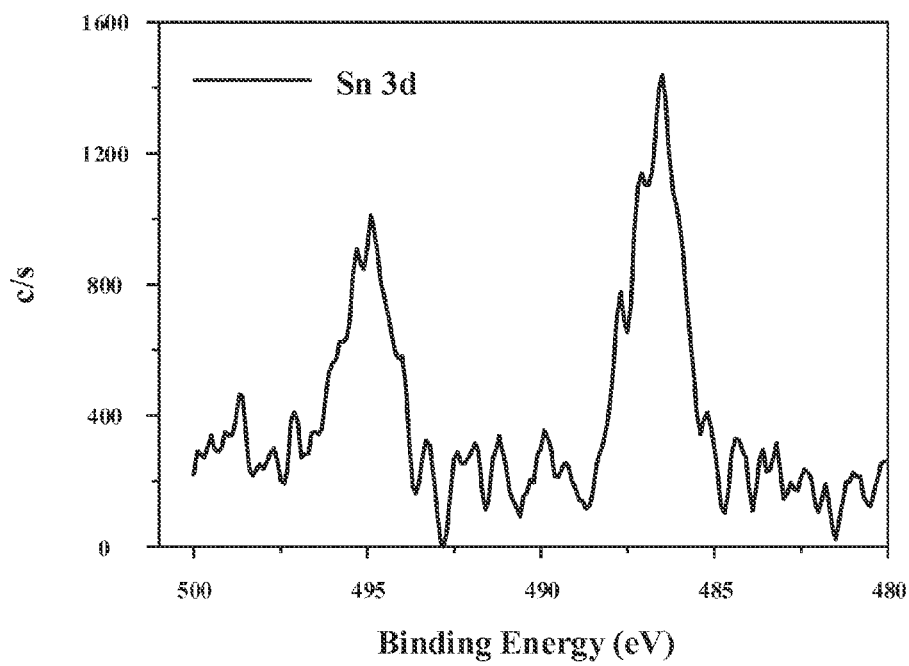

FIGS. 81A-C depict (A) CV permeability studies using $K_3Fe(CN)_6$ of bare ITO (●), GO/PVK electro-patterned film after PS removal (▲), and GO/PVK electrodeposited film on bare ITO (■). (B) In 3d and (C) Sn 3d XPS measurements of the GO/PVK electro-patterned film.

DEFINITIONS USED IN THE INVENTION

The term "NT" means a nanotube.

The term "NTs" means nanotubes.

The term "CNT" means a carbon nanotube and includes both a multi-walled carbon nanotube and a single-walled carbon nanotubes with other allotropes or polymorphs.

The term "CNTs" means carbon nanotubes and includes both multi-walled carbon nanotubes and/or single-walled carbon nanotubes with other allotropes or polymorphs.

The term "MWNT" means a multi-walled nanotube.

The term "SWNT" and a single-walled nanotube.

The term "MWNTs" means multi-walled nanotubes.

The term "SWNTs" and single-walled nanotubes.

The term "MWCNT" means a multi-walled carbon nanotube.

The term "SWCNT" and a single-walled carbon nanotube.

The term "MWCNTs" means multi-walled carbon nanotubes.

The term "SWCNTs" and single-walled carbon nanotubes.

The term "G" means a graphene sheet.

The term "GO" means an oxidized graphene sheet.

The term "PVK" means poly (N-vinyl carbazole).

The term "PS" means polystyrene.

The term "SIP" means surface initiated polymerization.

The term "CPN" means a π-conjugated polymer network.

The term "LbL" layer-by-layer such as a LbL film.

The term "AFM" means atomic force microscopy.

The term "CS-AFM" means current sensing atomic force microscopy.

The term "CV" means cyclic voltammetry.

The term "EIS" means electrochemical impedance spectroscopy.

The term "FT-IR" means Fourier Transformed Infra Red spectroscopy

The term "FT-IR ATR" means Fourier Transformed Infra Red Attenuated Total Reflectance spectroscopy The term "TGA" means thermogravimetric analysis.

The term "DSC" means differential scanning calorimetry.

The term "π-conjugated polymers" and/or "PVK-type polymers" collectively mean precursor polymers for forming π-conjugated polymer networks or polymer capable of forming cross-links.

The term "about" means±10%. In certain embodiments, the term means±5%. In other embodiments, the term means±2.5%. In certain embodiments, the term means±1%.

The term "substantially" means greater than or equal to (≥) 80%. In certain embodiments, the term means greater than or equal to (≥) 85%. In other embodiments, the term means greater than or equal to (≥) 90%. In certain embodiments, the term means greater than or equal to (≥) 95%. In other embodiments, the term means greater than or equal to (≥) 97.5%. In certain embodiments, the term means greater than or equal to (≥) 99%.

SUITABLE REAGENTS USED IN THE INVENTION

Suitable graphite materials include, without limitation, carbon nanotubes, allotropes and/or polymorphs, graphene sheets, allotropes and/or polymorphs, oxidized graphene sheets, allotropes and/or polymorphs, boron-nitride analogs, oxides, and mixtures or combinations thereof.

Suitable NTs for use in the present invention include, without limitation, carbon nanotubes, boron-nitride nanotubes, any other tube having a continuous walls, other allotropes or polymorphs, and mixtures or combinations thereof with.

Suitable precursor polymers for use in the present invention include, without limitation, a polymeric backbone including tethered electropolymerizable groups and mixtures or combinations thereof.

Suitable backbone polymers include, without limitation, ethylenic polymers, π-conjugated polymers, dendrimers of ethylenic polymers and/or π-conjugated polymers, and mixtures or combinations thereof. Exemplary examples of ethylenic polymers include, without limitation, vinylic polymers, styrenic polymers, acrylate polymers, methacrylate polymers, polyester polymers, polyamide polymers, polysiloxane polymers, other backbone polymers derived from ethylenically unsaturated monomers, and mixtures or combinations thereof. Exemplary examples of π-conjugated polymers include, without limitation, polythiophene, polypyrrole, polyaniline, polyfluorene, other conducting polymers, and mixtures or combinations thereof.

Suitable electropolymerizable group include, without limitation, thiophene, terthiophene, carbazole, fluorene, aniline, pyrrole, other radical cation forming monomers, and mixtures or combinations thereof.

Suitable solvents include aqueous solvent systems, non-aqueous solvent systems, polar solvents or solvent systems, polar aprotic solvents or solvent systems, and non-polar organic solvents or solvent systems, or liquids including ionic liquids capable of effectively solubilizing a two component solute of the precursor polymer and the nanoparticle.

Suitable substrates on which the coating of this invention may be deposited include, without limitation, metal substrates, metal oxide substrates, plastics substrates, ceramic substrates, cellulosic substrates, crystalline substrates, or mixtures and combinations thereof. For substrates transparent substrate, the substrates include optically transparent ceramics such as glass, transparent plastics such as polycarbonates, polyethylene, polypropylenes, polystyrenes, transparent metals or mixtures and combinations thereof. Exemplary metals including iron and iron alloys (e.g., steels, stainless steel, etc.), aluminum and aluminum alloys, copper and copper alloys, tungsten and tungsten alloys, nickel and nickel alloys, other transition metals and their alloys or mixtures or combinations thereof.

Suitable conducting layer include, without limitation, any suitable metal, metal alloy, metal oxide, polymer, and non-polymer surface, where the metal or metal alloys comprise gold (Au), platinum (Pt), indium tin oxide (ITO), iridium (Ir), rhodium (Rh), iron (Fe), titanium (Ti), Zinc (Zn), aluminum (Al) and other metal, metal oxide, or metal alloy electrode and conducting electrodes, mixtures or combinations thereof.

GENERAL DETAILED DESCRIPTION OF THE INVENTION

Embodiments of this invention broadly relate to nano-composites including a graphite material and a polymer including sufficient π-conjugated moieties to interact with surfaces of the graphite material to form a graphite material partially or completely coated with the polymer, and broadly relate to methods for making nano-composites and using the nano-composites.

Embodiments of this invention broadly relate to nano-composite solutions and/or dispersions including graphite material having a partial or complete coating of a polymer including sufficient π-conjugated moieties to interact with surfaces of the graphite material. In certain embodiments, the polymer further includes electropolymerizable moieties, reductively polymerizable moieties, and/or oxidatively polymerizable moieties.

Embodiments of this invention broadly relate to films comprising nano-composites including a polymer coated graphite material, where the polymer including sufficient π-conjugated moieties to interact with surfaces of the graphite material. In certain embodiments, the polymer further includes electropolymerizable moieties, reductively polymerizable moieties, and/or oxidatively polymerizable moieties.

Embodiments of this invention broadly relate to crosslinked films comprising crosslinked nano-composites including a polymer coated graphite material, where the polymer includes sufficient π-conjugated moieties to interact with surfaces of the graphite material and sufficient electropolymerizable moieties, reductively polymerizable moieties, and/or oxidatively polymerizable moieties to form the crosslinked film or patterned film.

Embodiments of this invention broadly relate to methods for making nano-composites including a polymer coated graphite material of this invention, where the methods include forming a dispersion of a graphite material in a first solvent system with mixing and/or sonicating. The methods also include forming a solution of a polymer including sufficient π-conjugated moieties to interact with surfaces of the graphite material in a second solvent system with mixing and/or sonicating. The two solvent systems are miscible and are the same or different. The methods also include slowly added the polymer solution to the graphite material dispersion with mixing and/or sonicating to form a dispersion including partially or completely polymer coated graphite material and non-coated graphite material. The methods also include separating the non-coated graphite material by centrifugation. The methods also include collecting the partially or completely polymer coated graphite material by adding a solvent to precipitate the partially or completely polymer coated graphite material. In certain embodiments, the polymer further includes electropolymerizable moieties, reductively polymerizable moieties, and/or oxidatively polymerizable moieties. The polymer increases the exfoliation of the graphite material and thereby increases yield of partially or completely polymer coated graphite material.

Embodiments of this invention broadly relate to methods for making nano-composite films including preparing a substrate. The methods also include applying the partially or completely polymer coated graphite material to the substrate to form a substrate including a layer comprising a partially or completely polymer coated graphite material. The methods may also include crosslinking the layer electrochemically, reductively polymerizable moieties, and/or oxidatively to form a substrate having a crosslinked layer disposed thereon. In certain embodiment, the film is uniform. In other embodiments, the film is non-uniform. In other embodiments, the layer comprises a pattern. In other embodiments, the layer comprises a pattern of two or more partially or completely polymer coated graphite material differing either in the graphite material, the polymer or both. The pattern may be pre-defined, regular or random. The methods for patterning may be lithographic and/or non-lithographic methods. In certain embodiments, the methods include depositing a templating agent on a substrate prior to depositing a dispersion or solution of this invention onto the substrate, where the templated surface provides an effective method for forming a micropatterned surface on the substrate. After depositing the nano-composite film of this invention, the templating agent may be removed. In other embodiments, the nano-composite film of this invention may be crosslinked prior or after removal of the templating agent. In certain embodiments, the templating agent may be uniform micro polystyrene beads. Of course, any other templating agent may be used and the resulting nano-composite film may assume a micropattern or micro uniform or micro non-uniform film, depending on the templated substrate surface.

Embodiments of this invention broadly relate to devices including a substrate having a layer formed thereon, where the layer comprises a graphite material and a polymer, where the polymer includes sufficient π-conjugated moieties to interact with surfaces of the graphite material to form a graphite material partially or completely coated with the polymer. In certain embodiments, the polymer further includes electropolymerizable moieties, reductively polymerizable moieties, and/or oxidatively polymerizable moieties. In certain embodiments, the layer comprises a continuous film, a discontinuous film and/or a patterned film comprising a graphite material partially or completely coated with the polymer. In other embodiments, the layer comprises crosslinked film a graphite material partially or completely coated with the polymer, where the crosslinks are formed between electropolymerizable, reductively polymerizable moieties, and/or oxidatively polymerizable moieties in the polymer.

Section I

Detailed Description of the Invention Section I

The inventor has found that the combination of the unique properties of carbon nanotubes and/or graphene sheets with organic polymers such as poly (N-vinyl carbazole) (PVK) provide unique materials for the development of practical semi-conductor devices. PVK is well-known for its high chemical and thermal stability, photoconductivity, and optoelectronic properties, e.g., hole transporting properties. See, Xia, C.; Advincula, R. *Chemistry of Materials* 2001, 13, 1682. Thus, the inventor has found that the incorporation of carbon nanotubes and/or graphene oxide sheets into a PVK matrices to prepare polymer-CNTs nanostructured materials provide unique and interesting ways to extend the electro-optical properties of PVK. We have previously reported methods for the deposition of high optical quality ultrathin films made of π-conjugated polymer network (CPN) films on a flat conducting substrate including electro-nanopatterning. See, Baba, A.; Onishi, K.; Knoll, W.; Advincula, R. C. *J. Phys. Chem. B* 2004, 108, 18949 and Taranekar, P.; Fulghum, T.; Baba, A.; Patton, D.; Ponnapati, R.; Clyde, G. Advincula, R. *J. Am. Chem. Soc.* 2007, 129, 12537. In such instances, a polymer precursor is first synthesized and by design contains pendant electroactive monomer units. The precursor is then electropolymerized on the conducting substrate forming an insoluble cross-linked network of π-conjugated polymer (oligomer) segments. Various polymer backbones and dendrimers have been utilized. See, Taranekar, P.; Fulghum, T.; Baba, A.; Patton, D. and Advincula, R. *Langmuir* 2007, 23, 908. The addition of more monomers during the formation of the π-conjugated polymer network is important because the increased monomers facilitate the formation of more linear polymer species, thereby increasing the amount of π-conjugation and enhancing electrical conducting properties. See, Taranekar, P., Baba, A., Fulghum, T., Advincula, R. *Macromolecules* 2005, 38, 3679-3687. We have investigated this method dubbed "precursor polymer route" by depositing films using electrochemical methods and applying them in the fabrication of OLED devices. Fulghum, T.; Karim, S. M. A.; Baba, A.; Taranekar, P.; Nakai, T.; Masuda, T.; Advincula, R. C. *Macromolecules* 2006, 39, 1467. Other approaches involved the use of layer-by-layer (LbL) films and electro-nanopatterning using current sensing atomic force microscopy (CS-AFM). See, Waenkaew, P.; Taranekar, P.; Phanichphant, P.; Advincula, R. *Macrom. Rapid Commun.* 2007, 28, 1522. Huang, C.; Jiang, G.; Advincula, R. *Macromolecules* 2008, 41, 4661. Huang, C.; Jiang, G.; Advincula, R. *Macromolecules* 2008, 41, 4661. We have also reported our results on the electropolymerization, and ultrathin film formation of PVK as a precursor polymer for hole transporting materials and for electronanopatterning. See, Jegadesan, S.; Sindhu, S.; Advincula, R.; Valiyaveettil, S. *Langmuir* 2006, 22, 3807. (j) Deng, S.; Advincula, R. *Chem. Mater.* 2002, 14, 4073. (k) Park, J.; Ponnapati, R.; Taranekar, P.; Advincula, R. *Langmuir* 2010, 26(9), 6167. (l) Kaewtong, C.; Jiang, G.; Felipe, J.; Pulpoka, B. and Advincula, R. *ACS Nano,* 2008, 2: 1533-1542.

Polymer/CNT and Polymer/GO Compositions

Embodiments of this invention relate to methods for making poly (N-vinyl carbazole)/carbon nanotubes (PVK/CNTs) and poly (N-vinyl carbazole)/graphene oxide (PVK/GO) by sonication-dispersion of the CNTs/GO with PVK in a mixed solvent system. The dispersion may then be spin-coated onto a substrate including a film of PVK/CNTs, PVK/GO or mixtures an combinations thereof. The film may then be electropolymerization/crosslinking by cyclic voltammetry (CV) to achieve film crosslinking and fixing onto the substrate. The initial dispersion of PVK and CNTs is performed in a highly miscible solvent for both. PVK is slowly and continuously added to a CNTs dispersion in order to form PVK/CNTs solutions having various composition ratios. It is believed that the PVK polymers wrap around the CNTs to form partially PVK coated or wrapped CNTs. The method and order of this procedure and method for making is important and is an integral part of the invention set forth in the claims.

Embodiments of this invention relate to methods for making PVK/GO nanocomposites is achieved by first oxidizing the G to form GO and subsequently adding PVK to disperse the GO through electrostatic repulsion and π-π stacking. The method and order of this procedure and method for making is important and is an integral part of the invention set forth in the claims. These dispersions are then used to form solutions or spin-cast films that are electropolymerizable by cyclic voltammetry to form π-conjugated polymer network nano-composite films. While cyclic voltammetry (CV) is used herein to illustrate the present invention, other potentiodynamic and potentiostatic methods or constant potential electropolymerization (chronoamperometric) methods maybe used to achieve a similar goal—as described in another section. Similarly a chemical oxidant such as $FeCl_3$ or $NH_4S_2O_8$ or other oxidizing agents maybe used for polymerization, the common mechanism being the formation of a radical cation during the polymerization process. The formation of PVK/CNTs and PVK/GO nano-composites were investigated using fluorescence and UV-Vis absorption spectroscopy, CV, electrochemical impedance spectroscopy (EIS), FT-IR ATR spectroscopy, and Raman spectroscopy. The thermal properties of PVK/CNTs nano-composites were analyzed using thermogravimetric analysis (TGA) and differential scanning calorimetry (DSC). Correlation of the EIS impedance and dc conductivity data and atomic force microscopy (AFM) images provide a morphological and structural rationale for PVK/CNTs nano-composite composition differentiation. Finally, films of nano-composites made of PVK/CNTs and PVK/GO were used to create patterns of the film surface.

Other embodiments of this invention relate to the design, synthesis, fabrication, characterization, and use of new types of electrodeposited (or chemically oxidized) polymer coatings (soluble precursor conjugated polymer) that are co-dispersed with carbon nanotubes or graphene sheets that are subsequently used to form thin films and/or to create patterns on surfaces. Methods of this invention have the ability to use polymer precursors or composite precursors to disperse or deaggregate carbon nanotubes and graphene such that they form optically clear and transparent solutions (as shown in FIG. I.2). This, in turn, allows them to be electropolymerized on electrode surfaces (or oxidatively polymerized by oxidizing agents or reductively polymerized by a reducing agent) as homogeneous films, which may then be used for electrically conducting, electro-optically active, and electropatterning thin film applications. An aspect of the methods of this invention is the use of a polymer or composite precursor that has the ability to deaggregate or delaminate carbon nanotube and graphene oxide sheet dispersions in order to avoid the formation of undesired clusters of nanotubes or graphene oxide sheets, as carbon nanotubes and graphene oxide sheets tend to spontaneously form clusters in absence of the polymer or composite precursors of this invention. The role of the polymer or composite precursor is to facilitate the process of deaggregation and delamination inside the dispersions, enabling the formation of clear solutions. The clear solutions then allows for the formation of homogeneous thin films and eventually nano-patterned surfaces. It should be emphasized also that electropolymerization (or chemical oxidative polymerization or chemical reductive polymerization) brings about the formation of π-conjugated polymer units through a radical cation reaction mechanism of the electroactive monomers such as the carbazole unit in PVK. The formation of clear and transparent solutions of nanotubes or graphene oxide sheets allows for the successful use of spin-casting or solution casting to make high quality clear and transparent films as wells as allows the successful use of other films forming methods such as doctor blade methods, painting, brushing, roll-to-roll processing, and other solution based film forming methods designed to apply films on small area or wide area surfaces. Also their ability to form clear, homogeneous, and transparent films make them useful for transparent and window-type applications. An important derivative procedure is that the films or patterns prepared from this dispersion, can be applied to a non-conducting or non-electrode substrate such as glass or plastic. This can in turn be crosslinked or oxidatively polymerized or reductively polymerized using a chemical oxidizing agent or initiator, which does not require an electrochemical procedure.

In other embodiments, the present invention relates to methods for synthesize nano-composites, where the methods include either a mix of poly (N-vinyl carbazole) (PVK) and multiwalled carbon nanotubes (MWCNTs) or a mix of PVK and graphene oxide (GO). The MWCNTs (purity 95%) used herein were obtained commercially as Baytubes (C150 P). These MWCNTs are produced in a high-yield catalytic process based on chemical vapor deposition (CVD). The outer and inner diameter, length, and density of the MWCNTs are 13 nm, 4 nm, 1 μm, and 130-150 $kg/m^3$, respectively. The obtained MWCNTs are further purified by heating at 200° C. for 6 hours prior to use. The nano graphene platelets (NGPs) (purity 99.5%) used herein were obtained commercially from XG Sciences. These NGPs have thicknesses between 5 nm and 15 nm and widths between 5 μm and 25 μm. The obtained NGPs were oxidized using Hummers method prior to use. PVK was purchased from Sigma-Aldrich Chemicals (USA) (ca MW between 25,000 g/mol and 50,000 g/mol). All solvents are analytical grade solvents and used without further purification.

The synthesis of poly (N-vinyl carbazole)/multiwalled carbon nanotubes (PVK/MWCNTs) nano-composites were achieved using a solution mixing process. In a typical synthesis, different weight/volume (mg/mL) (w/v) ratios of PVK were prepared in methylenedichloride ($CH_2Cl_2$) or dimethylchloride (DMC) or in a mixing vessel with MWCNTs in N-cyclohexyl-2-pyrrolidone (CHP). The purified MWCNTs (5 mg/mL) were dispersed in N-cyclohexyl-2-pyrrolidone (CHP) and ultrasonically agitated for 4 hours. The PVK was dissolved in $CH_2Cl_2$ using sonication process for 30 minutes to disperse the PVK in the solvent. The PVK solution was then slowly added into the MWCNTs dispersion, followed by another 1 hour sonication. The PVK/MWCNTs dispersion was subjected to a high-speed centrifugation (4400 rpm, 1 hour). A black precipitate settled at the bottom of the tube, which are mostly aggregates of MWNTs. The precipitate was removed (ca 1 mg CNTs). The remaining solution of PVK/MWCNTs dispersion was then treated with 5 mL of methanol and again placed in a high speed centrifugation (4400 rpm for 30 minutes). A batch of a blackish precipitate comprising MWCNTs wrapped by PVK was collected. From the initial mass of PVK and MWCNTs used and the small amount of MWCNTs that are removed after sonication/centrifugation, the mass ratio of PVK to CNTs is about 1:1. The above PVK/MWCNTs precipitate was redispersed in DCM (mg/mL) followed by 20 minutes of ultrasonication, which furnishes a stable PVK/MWCNTs solutions. The inventor has found that it is possible to optimize various concentrations in different miscible solvent systems of the PVK/MWCNT using this method. It should be emphasized that the procedure outlined here constitutes a concentrated "mother solution" of the PVK/CNT, which maybe diluted or mixed with other miscible solvents to achieve a particular viscosity, transparency, volatility, miscibility, and chemical inertness. The method and order of this procedure and method for making is important and is an integral part of the invention set forth in the claims.

The initial step for the synthesis of poly (N-vinyl carbazole)/graphene oxide (PVK/GO) nano-composites includes preparing graphene oxide (GO) from exfoliated graphite nanoplatelets. The procedure goes as follows: To 1 g of graphite powder, 23 mL of cooled concentrated $H_2SO_4$ were added. Three grams of $KMnO_4$ were then added gradually with stirring and cooling to maintain the temperature below 20° C. The mixture was stirred at 35° C. for 30 minutes and 46 mL of distilled water were slowly added to cause an increase in temperature to 98° C. The temperature of the prepared mixture was maintained for 15 minutes. The reaction was terminated by adding 140 mL of distilled water. After termination, 10 mL of 30% $H_2O_2$ solution were added. The mixture was subjected to centrifugation to separate a solid product. The solid product was washed repeatedly with 5% HCl solution until sulfate could not be detected with $BaCl_2$. The product was then washed 3-4 times with acetone and dried in an oven overnight. The colloidal dispersion of GO sheets was obtained by dispersing 50 mg of GO in different solvents by sonication for 30 minutes. The method and order of this procedure and method for making is important and is an integral part of the invention set forth in the claims.

The PVK/GO nano-composites were prepared using a solution mixing process. In a typical synthesis, the weight/volume (mg/mL) (w/v) ratios of PVK and GO are prepared in N-cyclohexyl-2-pyrrolidone (CHP). The prepared GO is dissolved in N-cyclohexyl-2-pyrrolidone (CHP) and ultrasonically agitated for 1 hour. The PVK was dissolved in DCM using sonication process for 30 minutes to disperse the PVK in the solvent. The PVK solution was slowly mixed to a GO dispersion, followed by another 30 minutes sonication. The PVK/GO dispersion was subjected to a high-speed centrifugation (4400 rpm, 30 minutes) and a grayish precipitate that settled at the bottom of the tube was collected as PVK/GO nano-composites. The above precipitate was redispersed in CHP followed by 20 minutes of ultrasonication, which furnishes a stable PVK/GO solution. Note that it is possible to optimize various concentrations in different miscible solvent systems of the PVK/GO using this method. It should be emphasized that the procedure outlined here constitutes a concentrated "mother solution" of the PVK/GO, which may be diluted or mixed with other miscible solvents for a particular viscosity, transparency, volatility, miscibility, and chemical inertness. The method and order of this procedure and method for making is important and is an integral part of the invention set forth in the claims.

In other embodiments, the present invention relates to a method for the fabrication of thin films made of PVK/MWNTs and PVK/GO nanocomposites. Indium tin oxide (ITO)-coated glass plate (1 inch×0.5 inch) is used as the substrate for PVK/MWNTs and/or PVK/GO nanocomposites using π-conjugated polymer network (CPN) film fabrication. The ITO-coated glass plates were cleaned by sequentially sonicating the plates in deionized water, isopropanol, hexane and toluene, each for 15 minutes. The clean plates or substrates were dried in an oven and under a stream of $N_2$. The ITO glass substrate was plasma cleaned for 3 minutes prior to use. A spin-coating speed was set based on the viscosity of the solution to be spin-coated onto the substrate. A thin PVK/MWNTs and PVK/GO film was spin-coated onto the ITO glass substrate at 500 rms for 60 seconds and 1500 rms for 30 seconds consecutively to deposit a film on the ITO substrate surface. After spin-coating deposition, the nanocomposite films were thoroughly dried in a vacuum oven for 24 hours at 70° C. to remove any solvent.

Cyclic voltammetry (CV) experiments were carried out with a Princeton Applied Research Parstat 2263 using a three (3) electrode set-up from a solution of 0.1 M $LiClO_4$ dissolved in acetonitrile (ACN). The coated ITO glass substrate was used as the working electrode (WE), Pt wire as the counter electrode (CE) and Ag/AgCl as the reference electrode (RE). Electrochemical cross-linking of PVK/MWNTs and/or PVK/GO nanocomposite films was accomplished by repeatedly cycling an electrode potential between the limits 0 to 1.4 V for up to 50 cycles at a potential scan rate of 50 mV/s. The π-conjugated polymer network (CPN) nanocomposite film being insoluble in ACN solvent was thoroughly washed with ACN and dried in nitrogen before the analysis of the film to remove excess PVK. Alternatively, the PVK/NWNT and/or PVK/GO films may be crosslinked using a prior art method comprising a chemical oxidant to provide for the reaction of carbazole (or other electro-active monomer units) via a radical cation coupling mechanism. This alternative method may involve the spin-coating or casting of the solution to a non-conducting or conducting (electrically) substrate followed by drying. The dried film is then treated with a solvent (immiscible to the film) containing the chemical oxidant. This will result in a similar polymerization mechanism and conversion of the precursor to a conjugated polymer network composite.

The dispersion and interfacial interaction of MWNTs and GO within PVK polymer matrix films prepared by solution mixing cast on ITO glass substrate was determined by UV-vis absorption and fluorescence spectroscopic methods. UV-vis spectra were recorded using an Agilent 8453 spectrometer. Fluorescence spectra were obtained on a Perkin-Elmer LS-45 luminescence spectrometer. Electrochemical impedance spectroscopy (EIS) (Princeton Applied Research Parstat 2263) was used to investigate the change of electrochemical system and interface within PVK/MWNTs and PVK/GO nanocomposites. The EIS measurements for the nanocomposite films were performed under open circuit potential in an ac frequency range from 100,000 Hz to 0.01 Hz with an excitation signal of 5 mV. All electrochemical experiments were carried out at room temperature. The dc conductivity of pure PVK polymer and PVK/MWNTs nanocomposite films were measured by an Alessi four point probe method at room temperature (Keithley 2400). For the four-point probe test, a fixed current was applied to the substrate through two outer probes and a voltage was measured between two inner probes. The measured resistances were converted into conductivity by multiplying by the constant 4.532. The product was the sheet resistance in Ω/surface area of the film being measured. The calculated sheet resistance was then multiplied by the film thickness to get the conductivity of the prepared film. The data shown represented mean measurement values from at least 10 trials for every sample. FT-1R-attenuated total internal reflection (ATR) spectra were recorded with a FTS 7000 Digilab Spectrometer within the 700-3500 $cm^{-1}$ range in multiple ATR geometry at the surface of the waveguide prism equipped with a liquid $N_2$-cooled MCT detector. The Raman analysis of pure MWNTs and its nanocomposites were recorded using FTS 7000 Digilab Spectrometer. The excitation wavelength was of 1064 nm using an Nd:YAG laser having an energy setting of 500 mW. X-ray diffraction (XRD) was taken on D5000 diffractometer using Cu Kα.

Thermal stabilities of the prepared PVK/MWNTs and PVK/GO nanocomposites were performed from 20° C. to 900° C. at a heating rate of 20° C./min by thermogravimetric analysis (TGA) on a TA Instruments 2950 thermogravimetric analyzer. All experiments were performed under a $N_2$ atmosphere at a purge rate of 80-90 mL/min. The experimental samples weighing from 5 to 10 mg were prepared from 5 mL of nanocomposite solutions, which was precipitated using 3 mL methanol. Differential scanning calorimetry (DSC) measurements were carried out on all samples from 20° C. to 600° C. at a heating rate of 20° C./min. TGA and DSC data were analyzed using TA Instruments' Universal Analysis software. The morphology before and after electropolymerization of PVK/MWNTs and PVK/GO on ITO glass substrates were characterized by Atomic force microscopy (AFM). AFM imaging was done under ambient conditions with a PicoSPM II (PicoPlus, Molecular Imaging—Agilent Technologies) in the Magnetic AC mode (MAC mode) using a magnetic field to drive a magnetically coated cantilever in the top-down configuration. Type II MAC levers with a spring constant of 2.8 nN/M with about 10 nm tip radius were used for all scans. The contact angle goniometry was measured using a KSV CAM 200 instrument utilizing bubble drop method with water.

In other embodiments, the present invention relates to the preparation of solutions of PVK/MWNTs by initially dispersing carbon nanotubes in an appropriate medium. Carbon nanotubes (CNTs) have unique structural, mechanical, thermal and electronic properties, and have extensive applications in many fields. However, the manipulation and processing of CNTs have been limited by their insolubility in most common organic solvents and tendency to aggregate. UV-vis absorption spectroscopy was employed to gain further insight into the capability of solvents and sonication time to disperse multiwall carbon nanotubes (MWCNTs) as optical inspection of dispersions only indicated the presence or absence of particles that are larger than 10 μm. The UV-vis spectra were obtained under identical conditions, and the solutions were diluted by the same factor so that qualitative comparisons between the different solvents could be made. UV-vis absorbance as a function of organic solvent to the length of sonication time in the range of 300-800 nm are presented in FIG. 1. All the solutions had the same starting concentration of MWCNTs and the observed increase in absorbance indicated an increase in concentration of unbundled MWCNTs remaining in the solution after the sonication/centrifugation process. Different organic solvents including CHP, NMP, DMF and DMSO demonstrated stability and it can be observed from the spectra that CHP exhibited the highest absorbance compared to NMP, DMF, and DMSO. Sonication has been proven to be necessary to help the dispersion of MWCNTs in a solvent. However, excessive sonication has been reported to damage and cut the MWCNTs. To monitor the dispersion as a function of sonication time used in this work, UV-vis spectroscopy was carried out on the solutions. With increasing sonication time up to 4 hours, the intensity of whole spectral region increased and the dispersion of MWNTs became better.

Figure 1:
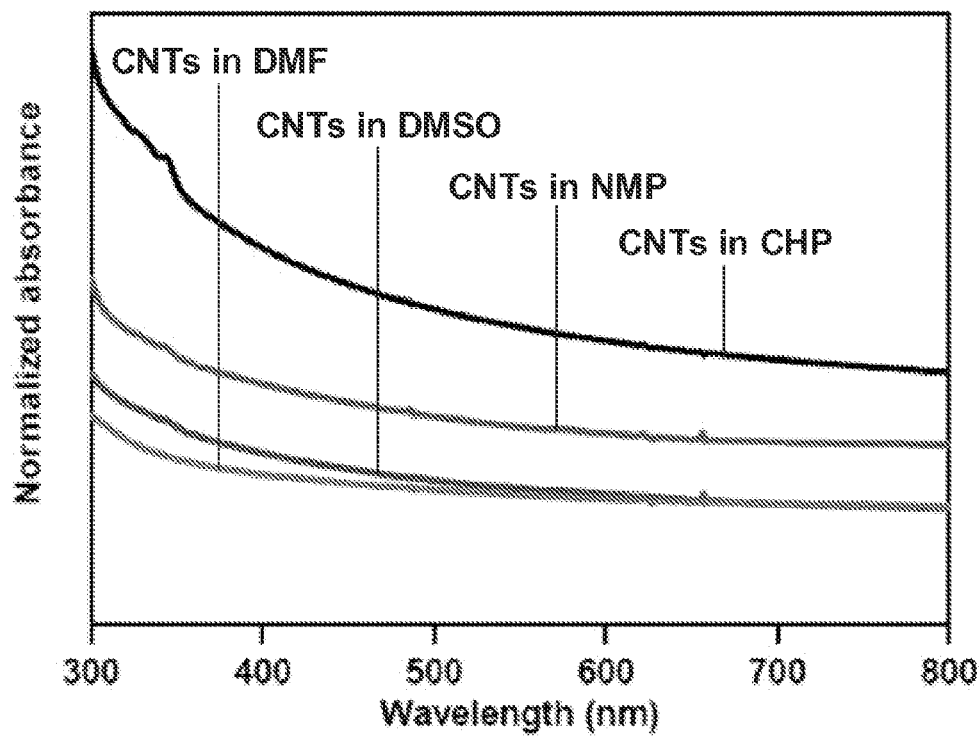
FIG. 1 depicts UV-vis spectra of CNTs dispersed in different organic solvents.
Figure 2:
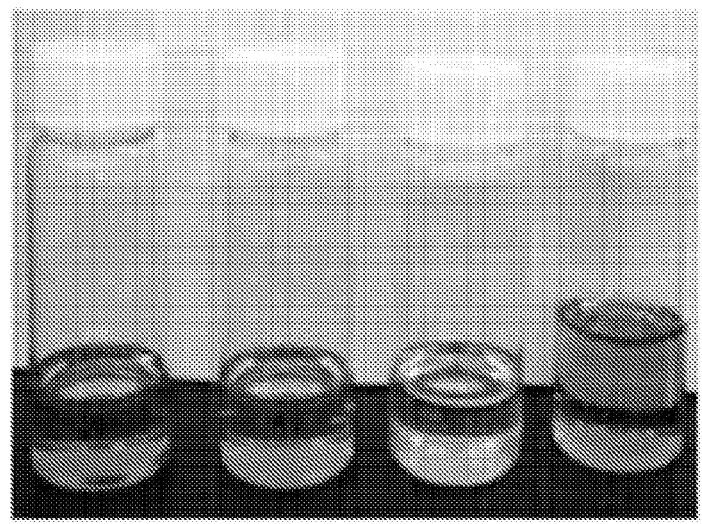
FIG. 2 depicts UV-vis spectra of PVK/CNTs nanocomposites. Inset shows the actual photograph of PVK/MWNTs solution in CHP/DCM after 90 days incubation at room temperature. The effect of added PVK is demonstrated by the presence and absence of MWNTs agglomeration.

FIG. 1 shows the UV-vis spectra of CNTs dispersed in different organic solvents. It has been identified that one of the most promising approaches to effectively resolve these problems is the functionalization of MWNTs with polymers, because long polymer chains aid the dissolution of nanotubes in good solvents or solvent systems and decrease the aggregation of the MWNTs in the solvents or solvent systems. The dispersion of MWNTs in a PVK solution was an attempt to increase the solubility of MWNTs without going through the functionalization route, which generally requires a chemical modification of the MWNTs through the formation of covalent bonds. The dispersion of MWNTs in a PVK solution is thought to enhance dissolution of nanotubes and decrease aggregation of nanotubes by the wrapping of PVK chains onto or around the surface of the MWNTs. The polymer as a dispersant is usually more effective for MWNTs in organic solvents compared to small molecules or monomers. In this case, the carbazole units are expected to have better π-π stacking properties on the benzenoid rings of the MWNT surface and should have greater compatibility in terms of electro-optical properties. Thus, the dispersion containing well-dispersed and exfoliated MWNTs will lead to the preparation of PVK/MWNTs nano-composites through a strong π-π stacking interaction. This π-π stacking property has been observed in other aromatic, heteroaromatic, or polyacene ring systems, which may be used as substitutes for the carbazole used in this embodiment. PVK comprises a polyvinyl backbone. It is possible that other polymer backbones both non-conjugated or conjugated, flexible or semi-rigid may show the same property under certain or optimized conditions. One important aspect of the present invention is the formation of homogeneous PVK/MWNTs solution/dispersion. N-cyclohexyl-2-pyrrolidone (CHP) is a most effective solvent for the MWNTs. It is also miscible with methylene dichloride ($CH_2Cl_2$). By first preparing a MWNTs dispersion in CHP and separately a PVK solution in $CH_2Cl_2$, relatively high concentrations of each component may be achieved. The solution composed of MWNTs, PVK, and the two miscible solvents is also aided by sonication, which plays an important role in improving the interaction between the MWNTs and PVK and facilitates the wrapping of MWNTs by PVK. The homogeneity of the solution was proven by the formation of clear and stable solution/dispersion in mixed solvents as shown in FIG. 2. The PVK, which was previously dissolved in a solvent, was absorbed onto the sidewalls of MWNTs surface through π-stacking and the long PVK polymer chains acts as functional species to provide the MWNTs with high dispersion properties.

Figure 3:
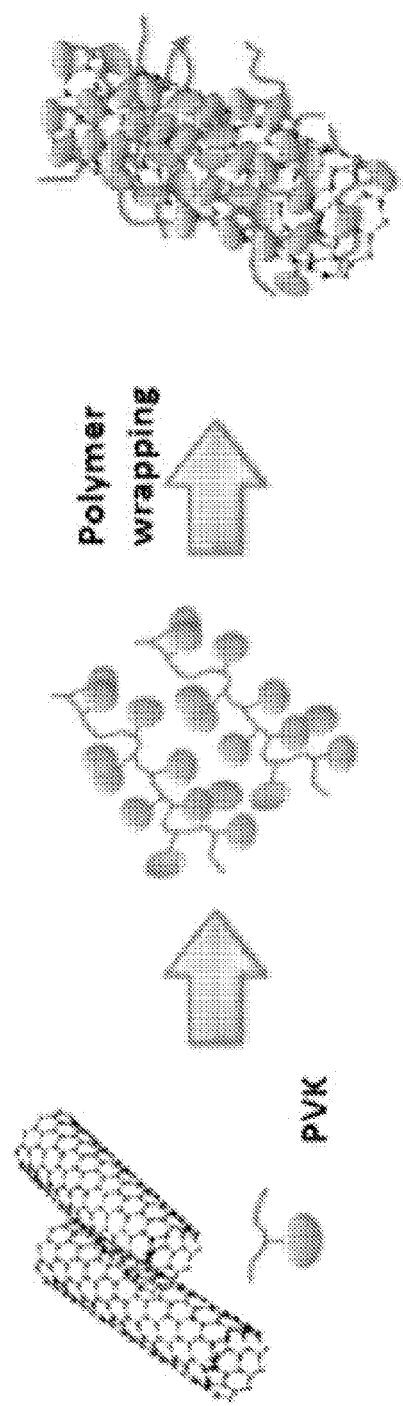
FIG. 3 depicts a schematic depiction of PVK/MWNTs nanocomposites formation through solvent mixing process.

FIG. 1 presents the UV-vis spectra of PVK/CNTs nano-composites. FIG. 2 shows the actual photograph of PVK/MWNTs solutions in CHP/DCM after 90 days incubation at room temperature. The effect of added PVK was demonstrated by the presence and absence of MWNTs agglomeration. The dispersion of MWNTs may be explained through the following: (1) the PVK polymer chains coat the MWNTs sidewalls due to strong electronic interactions between the aromatic pendants groups of PVK and the MWNTs surfaces, and (2) the affinity of the PVK polymer chains with the solvent used that allows the PVK polymer chains to wrap around the MWNTs leading to a more dispersed MWNTs in the organic solvents as presented in FIG. 3. The solutions are stable for months without MWNTs precipitation, which supports the conclusion that the PVK polymer chains are wrapped around the MWNTs sidewalls. The long term stability of these solution is advantageous in processability and commercial use of these solutions. The dispersion of PVK/MWNTs in mixed solvent systems was affected not only by sonication time, but also by the percentage by weight of the final PVK/MWNTs concentration. The different percentages of PVK/MWNTs (3%, 5%, and 7%) in the solutions were investigated in terms of their dispersion and adherence on ITO glass substrate using a spin-coating technique. FIG. 3 summarizes the Schematic depiction of PVK/MWNTs nano-composites formation through solvent mixing process.

Figure 4:
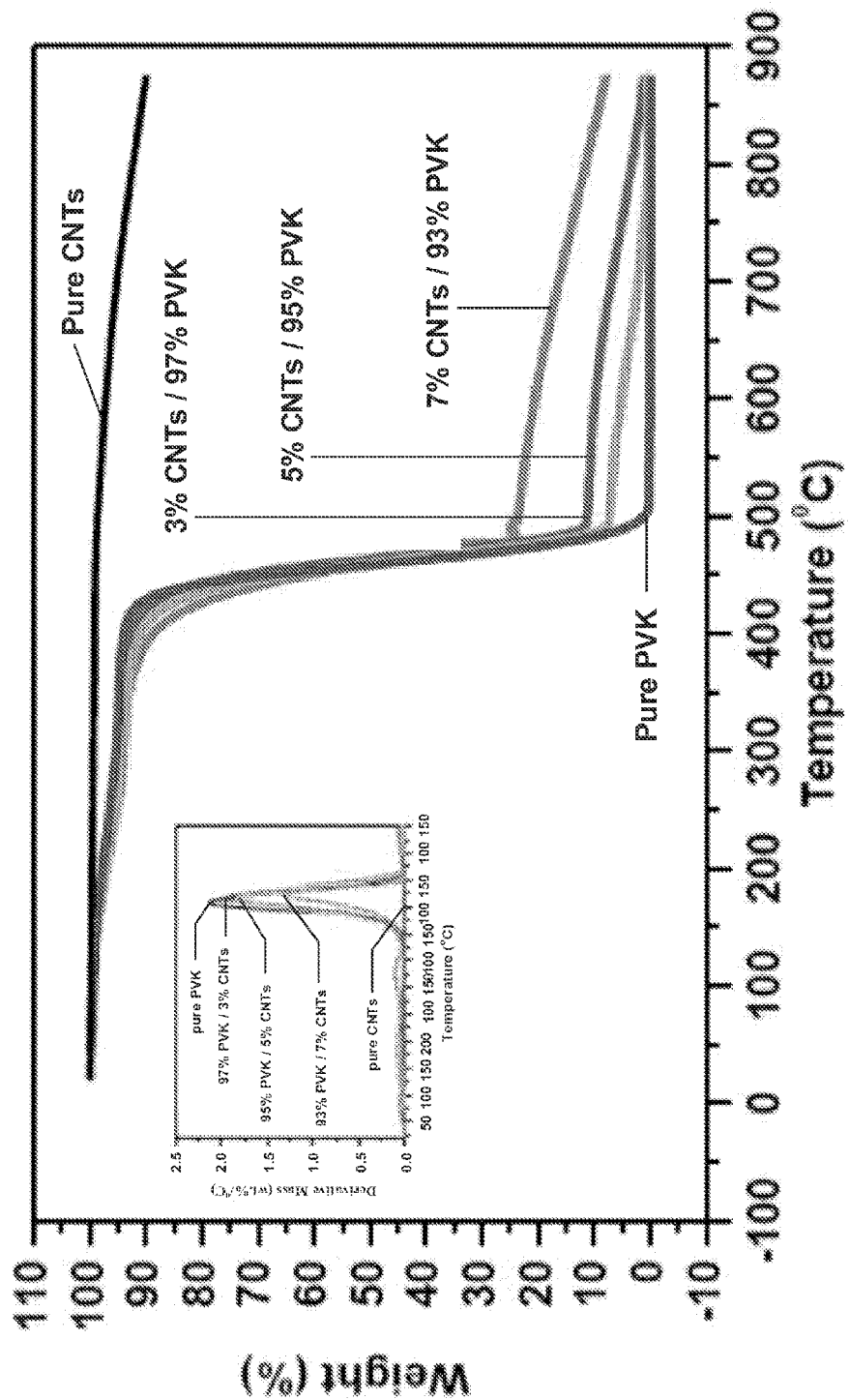
FIGS. 4A-D depict TGA thermograms of pure MWNTs, pure PVK and PVK/MWNTs solution under $N_2$ at a heating rate of 20° C./min. In set graph of 1st derivative (dTGA) curves of pure PVK, 97% PVK/3% MWNTs, 95% PVK/5% MWNTs and 93% PVK/7% MWNTs solution.
Figure 5:
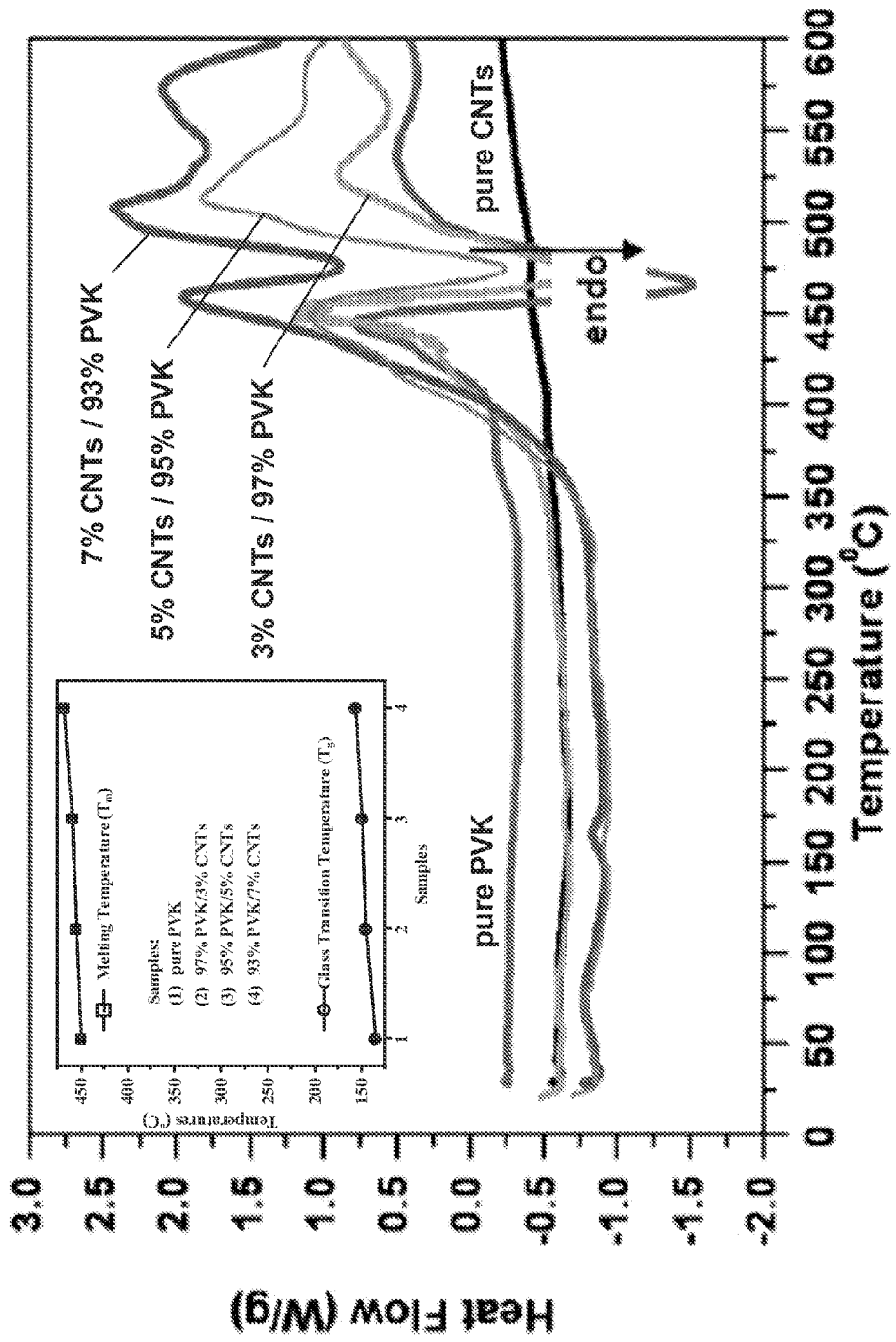
FIG. 5 depicts a DSC curve of pure MWNTs, pure PVK and PVK/MWNTs nanocomposites at a heating rate of 20° C./min. In set graph shows the increase in Tm and Tg as the MWNTs loading increases.

FIG. 4 describes the TGA thermograms of pure MWNTs, pure PVK and PVK/MWNTs solution under $N_2$ at a heating rate of 20° C./min. In set graph of 1st derivative (dTGA) curves of pure PVK, 97% PVK/3% MWNTs, 95% PVK/5% MWNTs, and 93% PVK/7% MWNTs solution. To confirm the formation (mixing) and macromolecular interactions of PVK/MWNTs solutions, TGA and DSC analyses of pure MWNTs, pure PVK, and different ratios of the PVK/MWNTs are conducted. The TGA thermograms of the pure MWNTs, pure PVK and different ratio of PVK/MWNTs nanocomposites are recorded under $N_2$ atmosphere scanned in the range 20° C. to 900° C. and DSC from 20 to 600° C. both at a heating rate of 20° C./min are shown in FIG. 4 and FIG. 5, respectively. TGA thermogram of pure PVK exhibited 2 degradation steps as presented in FIG. 4. The 1st degradation step takes place at 260° C. and then the polymer shows a fast 2' degradation step reaching a 98% weight loss at 408° C. and almost total degradation at 455° C. It is evident in the graph that the pure MWNTs exhibit a higher stability showing only a 2% weight loss after heating the composite to 650° C. For the 3 different compositions of PVK/MWNTs nanocomposites, the temperature of the distinct weight loss is lower compared to the pure PVK. The 93% PVK/7% MWNTs show a higher thermal stability compared to the two other ratios, at 490° C. a 25% weight still remains. Compared to the pure PVK, the 7% weight MWNTs composite prepared using mixed solvents show delayed decomposition. The thermal stability of the composites is enhanced with increasing MWNTs in the nanocomposites. This can be explained by the polymer chains near the nanotubes may degrade more slowly, which helps to shift the decomposition temperature to the higher side. Another possible reason is the increased thermal stability of the polymer composites due to the effect of higher thermal conductivity of MWNTs that facilitates heat dissipation within the composite. An improvement of the thermal stability can be associated with a better dispersion of MWNTs, since it hinders the flux of decomposition product and thus delay the decomposition. It is important to point out that the extent of interaction between pure PVK and PVK/MWNTs nanocomposites could be responsible for the higher thermal stability of the composites. These results indicate that the addition of MWNTs in PVK is shown to be more thermally stable as compared to pure PVK. The first derivative TGA curves of various samples are shown in this FIG. 4 in set graph. The dTGA curves are chosen for the presentation to highlight the difference in the thermal stability of all samples. On the other hand, the dTGA peak intensifies of the PVK/MWNTs sample decrease significantly compared to other samples. Note that the higher amount of MWNT loading is a possible advantage for intrinsically improved electro-optical properties and commercial application of this method.

To understand the interfacial differences between the PVK/MWNTs solutions as compared to pure PVK, DSC analysis is also performed in this study. FIG. 5 shows the DSC traces of pure MWNTs, pure PVK and PVK/MWNTs nanocomposites. For pure PVK, the melting temperature ($T_m$) is observed around 420° C. and glass transition temperature ($T_g$) at 190° C. The introduction of MWNTs into the PVK polymer matrix leads to an increase in the $T_g$ and $T_m$ which could be due to high interfacial area of interaction between MWNTs and PVK, which in turn decreases the mobility of the outer polymer chain segments due to steric hindrance. This also presents further evidence of the wrapping around of the PVK chains on the MWNTs. These results could be a manifestation of the compatibility of PVK and MWNTs as has been reported elsewhere.

Figures 7A, 7B:
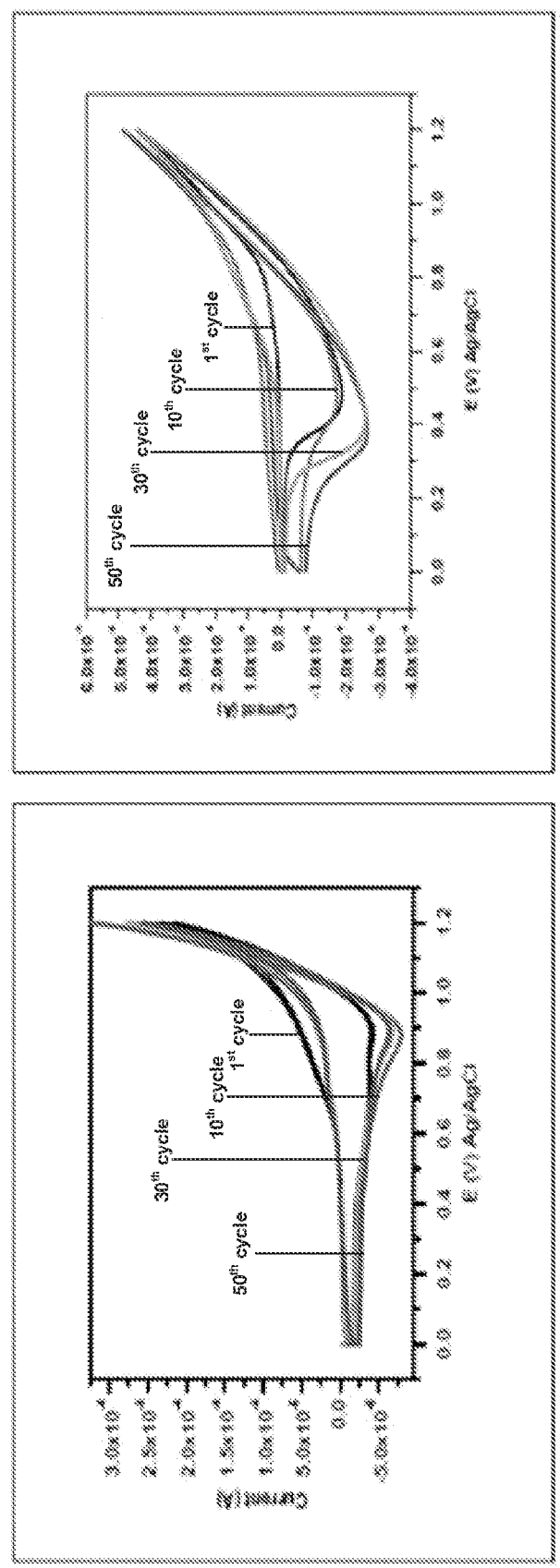
FIGS. 7A&B depict cyclic voltammograms recorded on ITO glass electrode spin-coated with (A) pure PVK and (B) 97% PVK/3% MWNTs CPN film in 0.1 M $LiClO_4$ in ACN at 50 mV/s for 50 cycles. Potentials reported against Ag/AgCl reference electrode.

Another embodiment of the present invention discloses the electrochemical deposition, characterization, and spectroscopic analysis of nanocomposite films made of PVK/MWNTs or π-conjugated polymer network (CPN). FIG. I.6 describes the cyclic voltammograms recorded on Au electrode spin-coated with PVK and PVK/MWNTs nanocomposite in 0.1 M $LiClO_4$ in ACN at different scan rates; (a) pure PVK, (b) 97% PVK/3% MWNTs, (c) 95% PVK/5% MWNTs, and (d) 93% PVK/7% MWNTs. In all cases the 1st cyclic voltammogram is presented. Potentials are reported against Ag/AgCl reference electrode. CV electrodeposition, cross-linking and characterization of the prepared PVK (control) and PVK/MWNTs nanocomposite films are done in 0.1 M $LiClO_4$ in ACN with potential scans from 0-1.2 V. The solutions prepared as described previously are spin-casted on the ITO glass substrate and in Au substrate to directly measure the thickness of the film. Note that the spin-coated films are insoluble to ACN. FIG. 6 shows the cyclic voltammograms of pure PVK scanned at 50 mV/s for 50 cycles and PVK/MWNTs films at different scan rates in order to cross-link the PVK film forming the π-conjugated polymer network (CPN) film (FIG. 6). For pure PVK, an irreversible oxidation peak at about 0.9-1.0 V and reduction peak at 0.7 V is observed in the voltammogram which suggest the formation of the of carbazolylium radical cation, and a cross-linked material having a higher electrical conducting behavior compared to the PVK precursor. This essentially represents the formation of a CPN control film. FIG. 7 depicts the cyclic voltammograms recorded on ITO glass electrode spin-coated with (A) pure PVK and (B) 97% PVK/3% MWNTs CPN film in 0.1 M $LiClO_4$ in ACN at 50 mV/s for 50 cycles. Potentials are reported against Ag/AgCl reference electrode. The scan rate dependence studies for pure PVK at scan rates 10-200 mV/s was also investigated. The current of the oxidation/reduction peaks are dependent on scan rates in the range of 50-200 mV/s (FIG. 6). The electron transfer rate depends on the electron transfer resistance across the electrode/conductive polymer/electrolyte layer model. The shapes of the voltammogram are different when the MWNTs are added to the electrochemically cross-linkable PVK. A downshift in the reduction peak is observed for PVK/MWNTs and this could be due to the doping behavior of the negatively charged MWNTs. No anodic peak is observed regardless of the number of cycles employed on the PVK/MWNTs film deposited in ITO glass substrate. The electrochemical cross-linking of PVK and MWNTs carried out at different voltage scan rates shows a good correlation with the cathodic peak current and voltage scan rate indicating that the electron transfer is diffusion controlled. The observed correlation is in agreement with the EIS analysis as will be discussed further. With increasing number of cycles recorded for the PVK/MWNTs nanocomposites, a gradual shift in peak potentials for the reduction peaks is indicative of the doping role of MWNTs which would assume a negative charge. Such a down-shift in the cathodic peak could be due to the doping role of MWNTs, which are known to be amphoteric in character (can be doped with either electron donor or acceptor). Taking into account in this CPN nanocomposite films the PVK acting as electron donor and MWNTs which act as the electron acceptor. Note that CV is used herein as a representative method among other existing potentiodynamic electropolymerization methods. Other potentiostatic methods or constant potential electropolymerization methods can be used to achieve the same or a similar goal. Similarly a chemical oxidant such as, but not limited to $FeCl_3$ or $NH_4S_2O_8$ or other oxidizing agents can be used for polymerization, the common mechanism being the formation of a radical cation during the polymerization process. Therefore as an alternative method based on prior art, the use of a chemical oxidant to provide for the reaction of carbazole (or other electro-active monomer units) via a radical cation coupling mechanism can be employed. This can involve the spin-coating or casting of the solution to a non-conducting or conducting (electrically) substrate followed by drying. The dried film is then treated to a solvent (immiscible to the film) containing the chemical oxidant. This will result in a similar polymerization mechanism and conversion of the precursor to a conjugated polymer network composite.

Figure 8A:
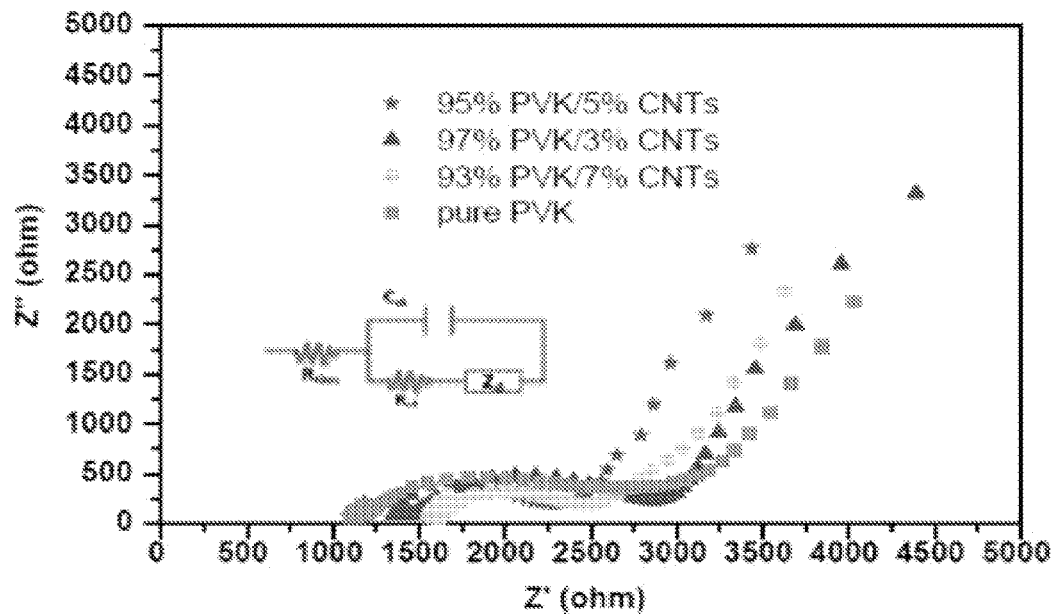
FIGS. 8A&B depict EIS Nyquist plots of the PVK/MWNTs nanocomposite films prepared via spin-coating in ITO glass substrate; (A) PVK/MWNTs nanocomposites film and (B) PVK/MWNTs CPN nanocomposite films. The equivalent circuit is given in the inset graph.
Figure 8B:
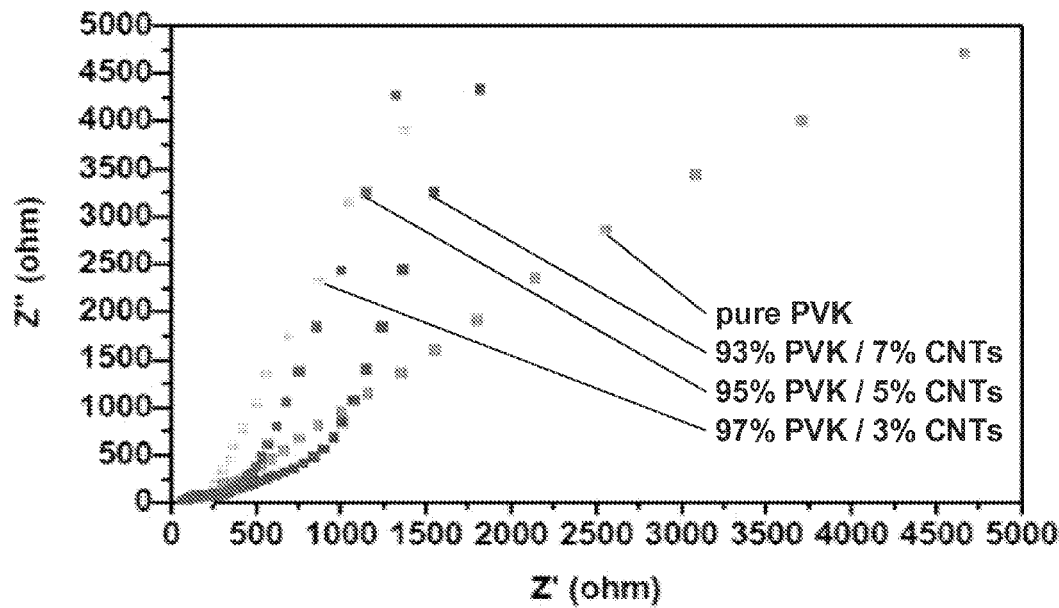

Electrochemical impedance spectroscopy (EIS) is well established as a powerful tool for investigating interfacial charge-transfer of a given system. It is also useful for investigating ion-transport phenomena in thin films. The charge-transfer in nanocomposites can occur at both the interface between the PVK and MWNTs and the PVK and the electrodes used. Thus, the need to investigate the interfacial properties of PVK/MWNTs nanocomposites films is important for understanding fundamental properties of the nanocomposites and in evaluating their utility for devices. To evaluate the variations in interfacial properties of PVK/MWNTs, the qualitative differences in impedance spectra according to the different ratios of the MWNTs in PVK polymer matrix is considered. The pure PVK and PVK/MWNTs nanocomposite films are spin coated in ITO glass substrate and are electropolymerized using CV at 50 mV/s for 50 cycles from 0-1.4 V. The equivalent circuit model for the working electrode employed in this work and the physical significance of the components are presented in an inset graph. The equivalent circuit for this state is based on the modified Randles circuit, wherein the sum of the electrolyte resistance and polymer electronic resistance, $C_{dl}$ electrolyte interface, $R_{ct}$, the charge-transfer resistance and $Z_d$ a complex circuit element is included. In this case, $R_{film}$ is attributed primarily to the charge transfer resistance. A 45° slope in the Nyquist plot as the percentage of MWNTs in the composite increases signals the presence of a Warburg element ($Z_d$), which represents diffusion mass transport. At low frequencies it is possible to estimate the faradaic pseudocapacitance (redox) which is associated with the capacitive behavior of a film. The physical origin of $C_{dl}$ means that its magnitude increases with the quantity of electroactive material deposited in the substrate. As presented in FIG. 8A, in spite of similar shape of the impedance spectra, an obvious difference in the diameters of the semicircles which corresponds to the electron transfer-limited process measured at higher frequencies, the $R_{ct}$ of PVK/MWNTs nanocomposites decreases as the loading of the MWNTs increases. The spectra proved the formation of the charge-transfer complex of PVK/MWNTs nanocomposites occurs and that charge-transfer flows through the film. The complex plane impedance plots produced from the analysis of PVK/MWNTs CPN nanocomposite films are presented inset graph of FIG. 8B. The intercepts of the pure PVK and CPN nanocomposites film with the real impedance 55.78 and for 97% PVK/3% MWNTs is 48.10, this result shows that the CPN nanocomposite film is 7.68 less resistive than pure PVK. While this result is in agreement with a conductive contribution from the addition of MWNTs, this decrease in resistance could also be due to the formation of CPN between the nanotubes and PVK polymer chains.

Figure 9A:
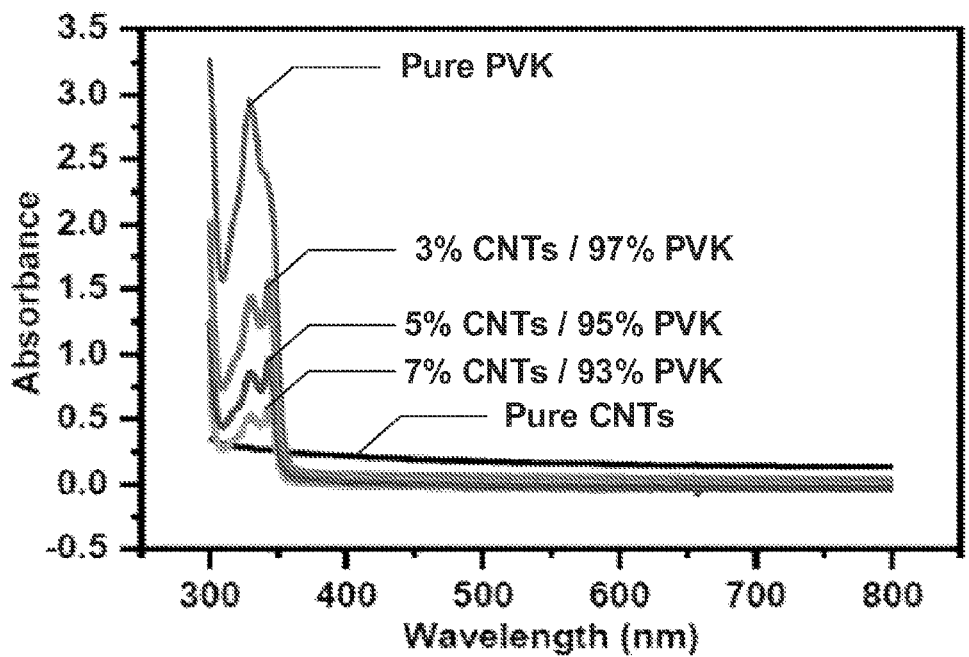
FIGS. 9A&B depict UV-vis spectra of (A) pure PVK and PVK/MWNTs nanocomposite films and (B) pure PVK and PVK/MWNTs CPN films.
Figure 9B:
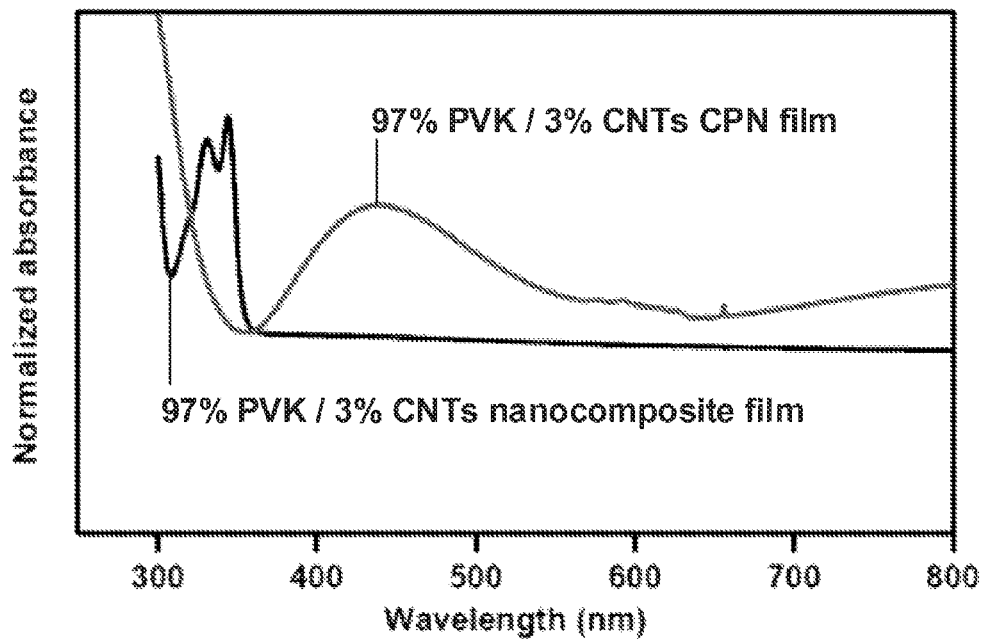

FIGS. 9A&B shows UV-vis spectra of (A) pure PVK and PVK/MWNTs nanocomposite films and (B) pure PVK and PVK/MWNTs CPN films. UV-visible spectra are used to characterize the interfacial interaction between the PVK/MWNTs nanocomposite films and the CPN nanocomposite films. No well-defined absorption peaks at this region of the electro-magnetic spectrum are observed for the pure MWNTs. For pure PVK nanocomposite film in the wavelength range of 300-800 nm, its main absorption bands occur at 331 and 345 nm regions similar to the PVK peak reported in the literature which can be attributed to $\pi$-$\pi$* and n-$\pi$* attributed to optical transitions in pendant carbazole moieties, whereas it is quite transparent at wavelength longer than 350 nm. It can be seen from the graph that the main absorption peaks for pure PVK still appears for the PVK/MWNTs nanocomposites, but with a substantial decrease in absorbance occurs as the content of MWNTs in nanocomposites are increased (FIG. 9). The UV-vis absorbance after the electropolymerization shows a spectral difference which is due to the formation of conjugated oligocarbazole species. The defined peaks for spin-coated PVK/MWNTs film before cross-linking at 330 and 344 nm are eliminated and a new band is formed at 440 nm (FIG. 9). The said observation is consistent with the previous works on electropolymerized PVK CPN approach. The observed slight spectral red shift after cross-linking can be attributed to an increase in conjugation through the introduction of MWNTs.

Figure 10A:
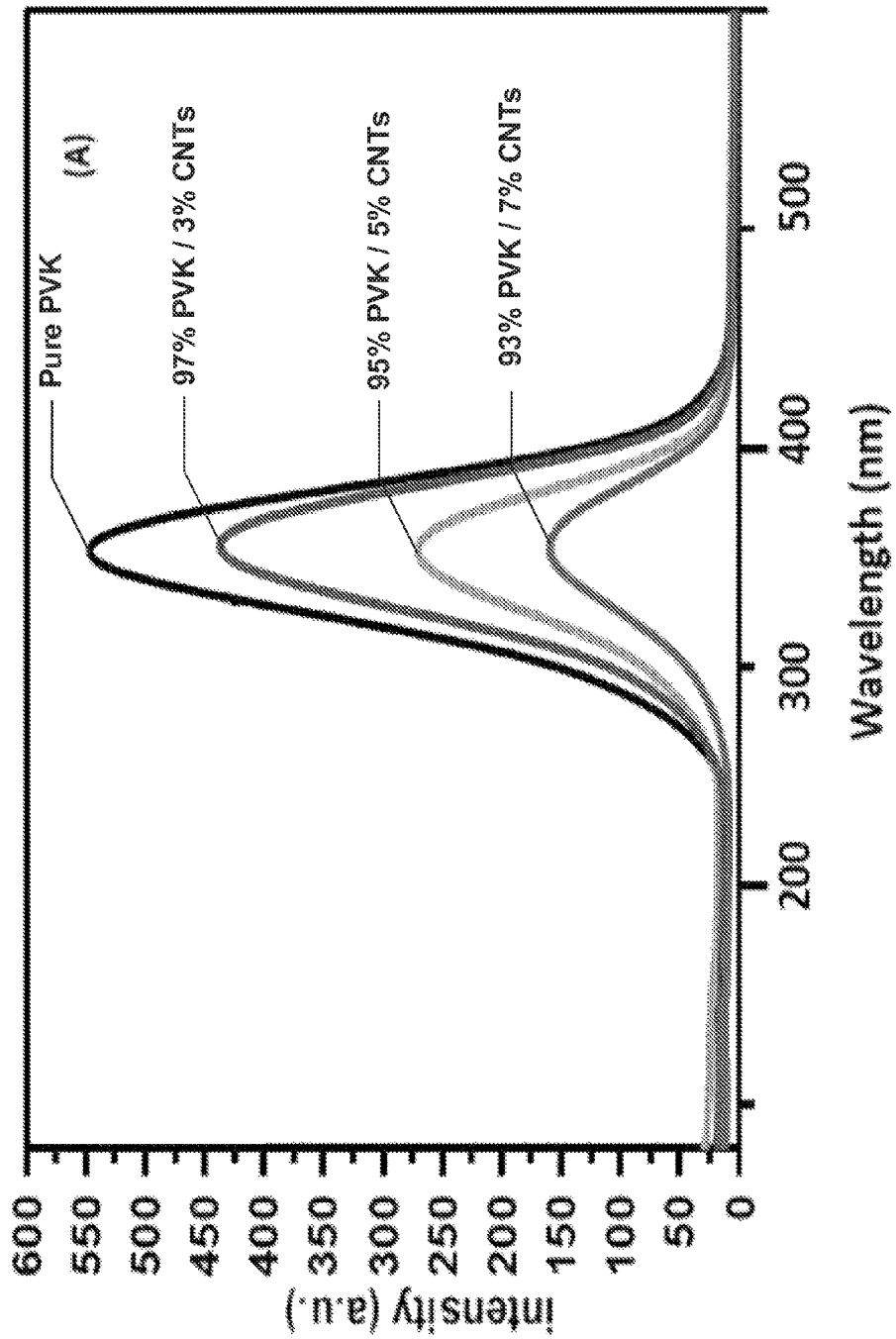
FIGS. 10A&B depict fluorescence spectra of pure PVK and PVK with different proportions of MWNTs nanocomposite films (A) PvK/MWNTs nanocomposite films and (B) PVK/MWNTs CPN nanocomposite films.
Figure 10B:
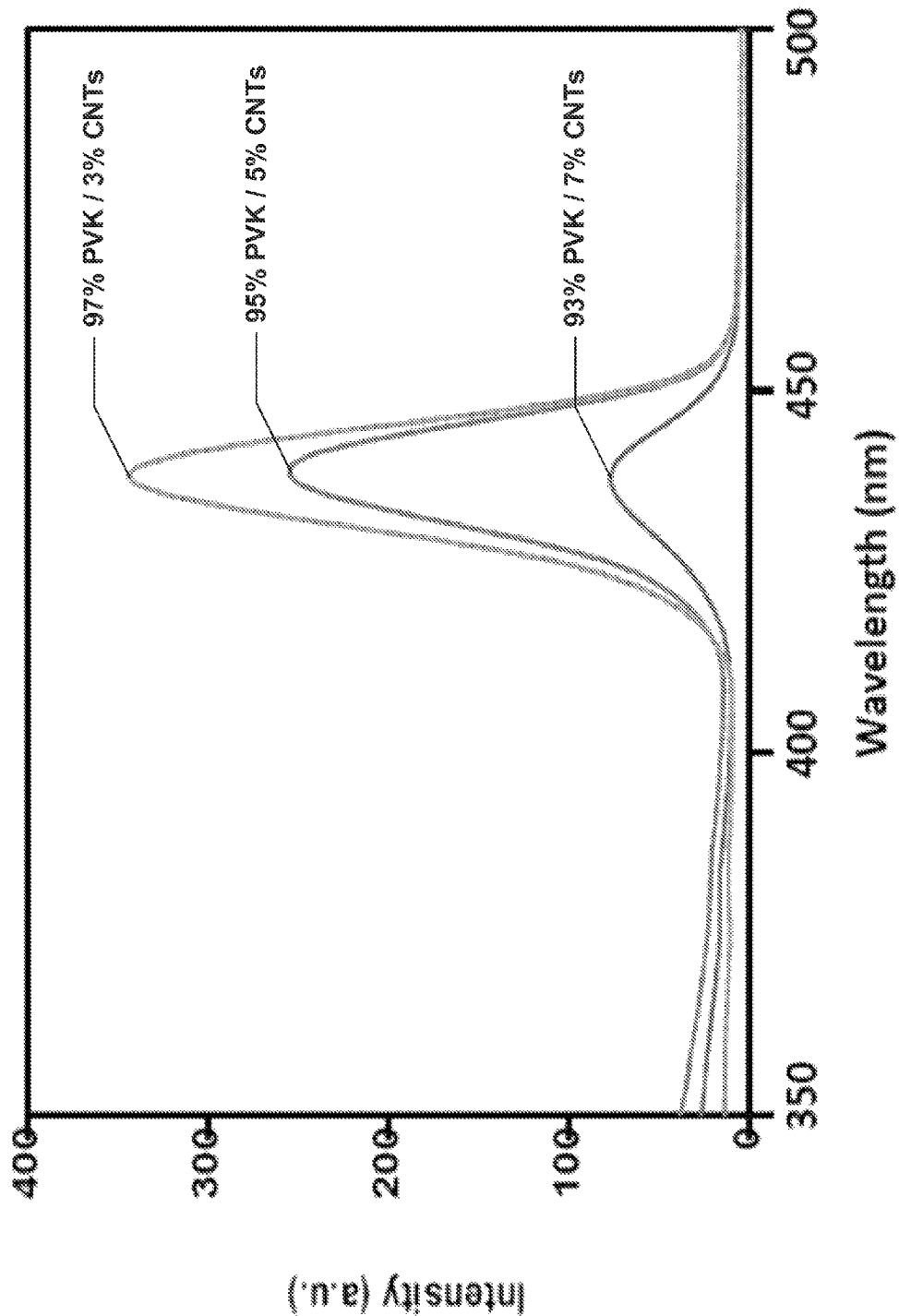

FIGS. 10A&B display the fluorescence spectra of pure PVK and PVK with different proportions of MWNTs nanocomposite films. FIG. 10A show fluorescence spectra of PvK/MWNTs nanocomposite films. FIG. 10B shows fluorescence spectra PVK/MWNTs CPN nanocomposite films. Fluorescence spectroscopy using an emission wavelength of 300 nm gives further evidence of the interaction between PVK/MWNTs nanocomposite films and CPN nanocomposite films. The fluorescence spectra of pure PVK, pure MWNTs and PVK/MWNTs nanocomposites are presented in FIG. 10A and are measured at an emission wavelength of 300 nm. No characteristic emission peaks are observed in the case of pure MWNTs film. The fluorescence spectrophotometric pattern of pure PVK is composed of a band centered on 360 nm that could be due to optical transitions in pendant carbazole moieties. These bands are formed between adjacent carbazole units only when the carbazole is attached directly to the chain backbone at the nitrogen position. The fluorescence of pure PVK is quenched by the addition of MWNTs, which clearly suggest an electron transfer from PVK to the MWNTs moieties. The same peak is also observed in the case of PVK/MWNTs nanocomposites, however, the emission peak intensity for nanocomposites increases with the decreasing percentage of MWNTs in the PVK/MWNTs nanocomposites loading. The strength of intensity quenching effect due to the addition of MWNTs can be clearly seen in the ratio of intensities related to pure PVK and PVK/MWNTs nanocomposites films. But, free PVK polymer chains are still present in the solution and in the nanocomposite films, which shows that the fluorescence is not completely quenched. MWNTs are $\pi$-conjugated polymers system and the PVK which are attached to the sidewalls of MWNTs can increase the intramolecular interaction and the $\pi$-delocalization which probably improves the nonlinear absorption of MWNTs. The solubility of PVK in MWNTs will provide an idea on MWNTs-chromophores interaction. In this study, the observed decrease in the intensity of the PVK emission peak in the blend of PVK/MWNTs nanocomposite films suggests that the excitation energies in PVK (donor) can effectively transfer to MWNTs which clearly act as electron acceptor/quenchers. The fluorescence analysis of the CPN nanocomposite films are shown in FIG. 10B. The fluorescence is significantly decreased with the addition of MWNTs, which shows the $\pi$-stacking due to the interaction/wrapping of PVK polymer with MWNTs. The fluorescence peak appears at a longer wavelength (435 nm) as compared to the PVK/MWNTs nanocomposite films. The peak shows sharp vibronic bands and appears to have a higher stokes shift, which is indicative of a large difference between the ground and excited state. The highest red shift observed for the CPN nanocomposite films indicates an intermolecular cross-linking between the PVK polymer and the MWNTs. Note that the fluorescence and energy transfer properties imbued by the combination of the PVK and the MWNT is not only an intrinsic property but also a possible application of such films where the mechanism of energy transfer or charge transfer is employed.

Figure 11:
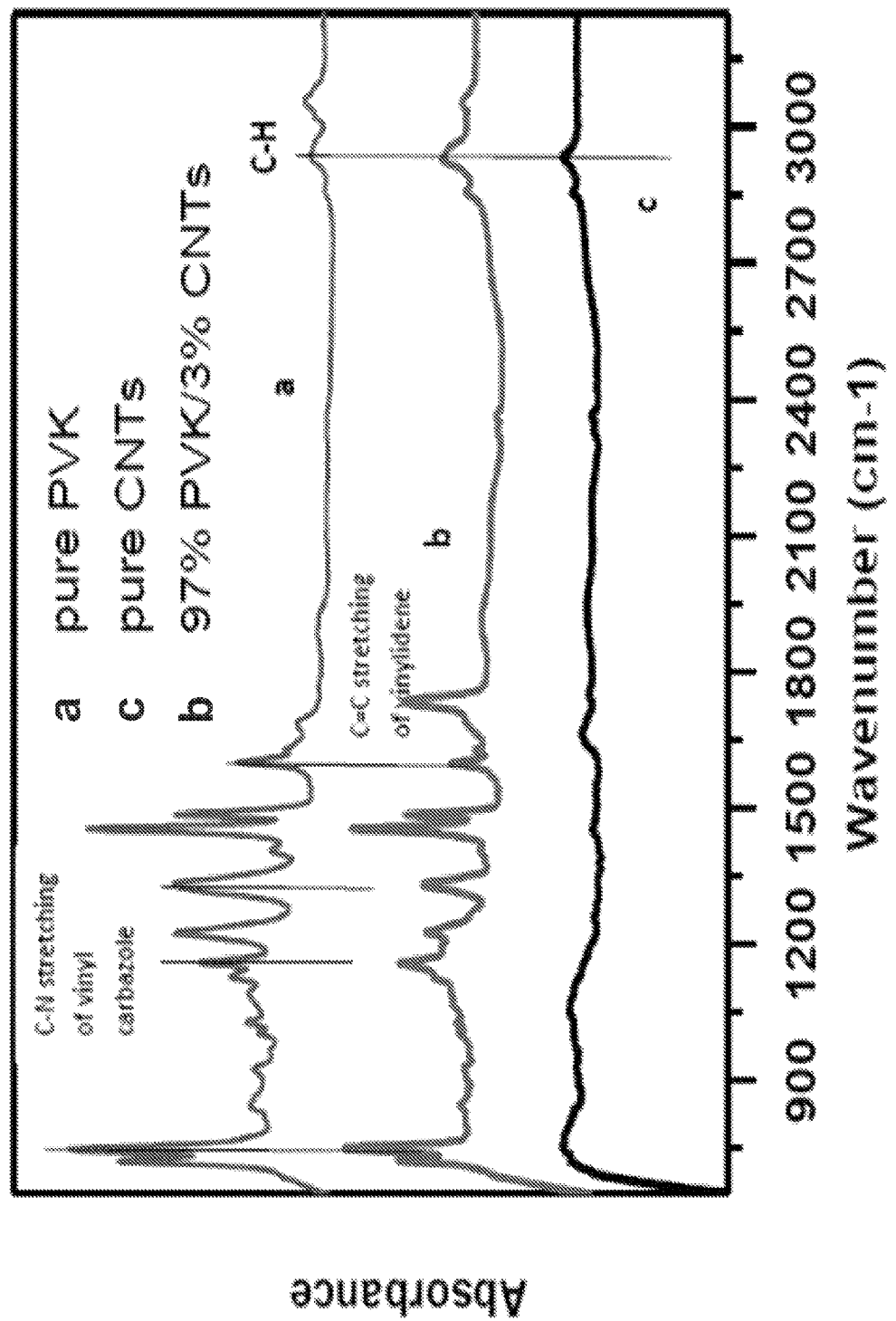
FIGS. 11A-C depict FT-IR-ATR spectra of PVK/MWNTs CPN films (A) pure PVK, (B) 97% PVK/3% MWNTs CPN film and (C) pure MWNTs.

The FT-IR-ATR spectra of pure MWNTs, pure PVK and 97% PVK/3% MWNTs CPN films spin-coated in ITO glass substrate are shown in FIG. 11 ranging from 700 to 3500 cm$^{-1}$. For pure MWNTs, the peak at 1630 cm$^{-1}$ is due to the C=C stretch mode in the MWNTs. The main absorption peaks of pure PVK structure are shown at the following characteristic bands at around 700-800 cm$^{-1}$ (out of plane —C—H aromatic), 1100-1150 cm$^{-1}$ (in plane —C—H aromatic) and at around 1600 cm$^{-1}$ (C=C stretching). The peaks of pure PVK are attributed to the following vibrations at 720 (ring deformation of substituted aromatic structure), 744 (>CH$_2$ rocking vibration due tail to tail addition), 1159 (out of plane deformation of vinylidene group and C—H in plane deformation of aromatic ring), 1220 (C—N stretching of vinyl carbazole), 1326 (—CH$_2$ deformation of vinylidene group), 1459 (ring vibration of n-vinyl carbazole), and 1626 cm$^{-1}$ (C=C stretching vibration of vinylidene group). However, the 97% PVK/3% MWNTs CPN film material significantly changes bonds at 744 and 1459 cm$^{-1}$. The addition of MWNTs in the PVK solution result in a new absorption band from 744 to 749 cm$^{-1}$, 1459 to 1449 cm$^{-1}$, and 1626 to 1620 cm$^{-1}$. The FTIR spectra of pure PVK and PVK/MWNTs CPN film show similar bands with a little variation in the stretching frequencies. The shift in the peak region between 700-1600 cm$^{-1}$ is related to the change in the structure of the polymer, in which the spectra shows a shift to a lower wave number is an indicative of an increase in the conjugation length and these observed changes in characteristics peaks in PVK provides the information that the MWNTs are wrapped by PVK and PVK is successfully cross-linked with MWNTs. Note that the IR properties imbued by the combination of the PVK and the MWNT is not only an intrinsic property but also a possible application of such films where the functional group chemistry is employed.

Figure 12A:
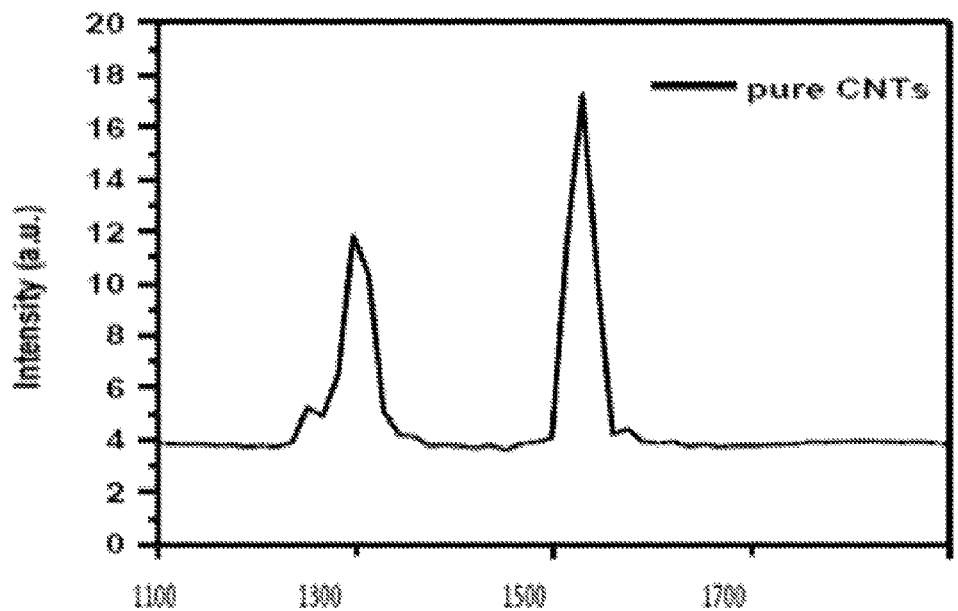
FIG. 12 depicts a Raman spectra at $\lambda_{exc}$=1064 nm of pure MWNTs and 93% PVK/7% MWNTs nanocomposites.
Figure 12B:
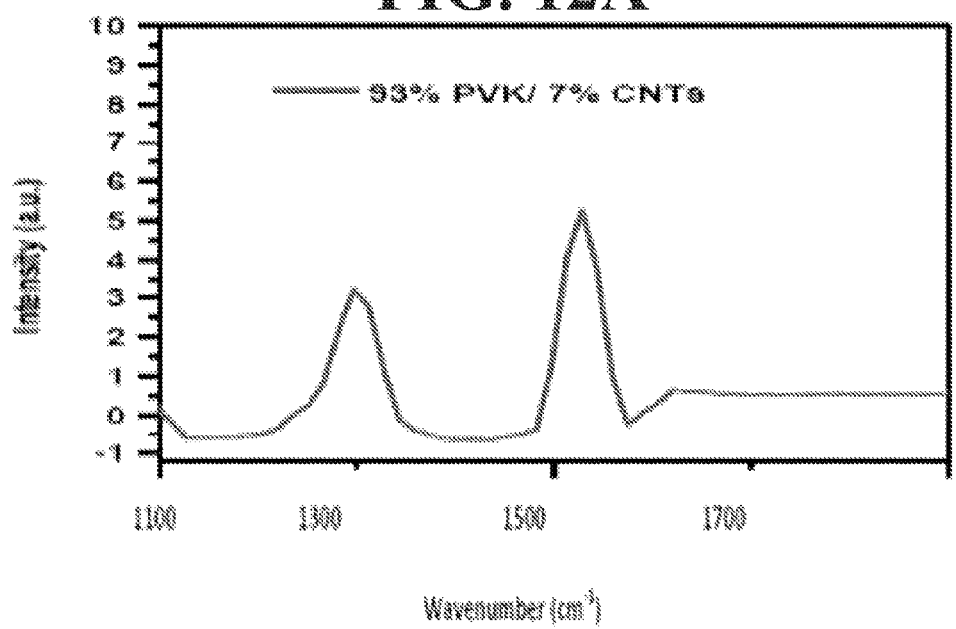

Raman spectroscopic analysis further supports the wrapping of MWNTs by PVK matrix. The Raman spectroscopic results of pure MWNTs and its corresponding PVK/MWNTs nanocomposites are presented in FIGS. 12A&B, respectively. The Raman spectra for the pure MWNTs show two peaks around (D-band) known as the disorder or defect band at 1340 cm$^{-1}$ and (G-band) known as the graphitic or tangential band at 1594 cm$^{-1}$. The peak at G-band represents the sp$^2$ bonds having a planar configuration. The D-band corresponds to the sp$^3$ bonds, the tetrahedral configuration and this band could also explain the disorder in sp$^2$ bonds (graphene edge configuration). The intensities of the characteristic bands of PVK/MWNTs nanocomposites bands shifted towards the higher wavenumber. This suggests that the PVK/MWNTs nanocomposite material needs more energy to vibrate the individual nanotube and each tube became bulky that could be due to the MWNTs wrapped by the PVK polymer chains and some of the PVK polymer chains are even grafted in the MWNTs outer surface. Note that the Raman properties imbued by the combination of the PVK and the MWNT are not only an intrinsic property but also a possible application of such films where the functional group chemistry is employed.

Another embodiment of the present invention discloses the electrical properties of nanocomposite films made of PVK/MWNTs or PVK/MWNTs CPN. One of the important methods to compare the state of the nanotube dispersion at a given concentration is electrical conductivity measurements on films. In this study the conductivity of pure PVK, and PVK/MWNTs nanocomposites at various compositions are measured using the four point probe conductivity test. For the four-point probe test, a fixed current is injected into the substrate through the two outer probes and a voltage is measured between the two inner probes. The measured resistances are converted into conductivity by multiplying the constant 4.532. The product is the sheet resistance in/area of the film being measured. The calculated sheet resistance is multiplied by the film thickness to get the conductivity of the prepared film. The measured conductivity is summarized in Table 1. Table 1 tabulates the dc conductivity of pure PVK, pure MWNTs and PVK/MWNTs CPN nanocomposite films measured using four point probe technique (mean conductivity at 10 measurements per sample).

TABLE 1

| Sample | Measured Conductivity (S/cm) |
| --- | --- |
| Pure PVK | $1 \times 10^{-12}$ |
| 97% PVK/3% MWNTs | $5.53 \times 10^{-4}$ |
| 95% PVK/5% MWNTs | 0.53 |
| 93% PVK/7% MWNTs | 1.79 |
| 91% PVK/9% MWNTs | 1.64 |

An important issue in producing superior PVK/MWNTs nanocomposites is the ability to control deagglomeration and dispersion of MWNTs in PVK matrices which are directly correlated with the achievable conductivity. PVK belongs to a class of conjugated polymers that become electrically conductive upon the addition of electron donors or acceptors. The conductivity of PVK is about 10$^{-12}$ to 10$^{-16}$ S/cm, whereas with increasing MWNTs level, the conductivity increases. Dispersing the conducting filler, MWNTs in the polymer matrix forms a conductive polymer nanocomposite. The prepared CPN nanocomposite films of compositions 97% PVK/3% MWNTs, 95% PVK/5% MWNTs, and 93% PVK/7% MWNTs show the conductivity of 5.53×10', 0.53, and 1.79 S/cm which clearly shows a remarkable increase in conductivity. This increase in conductivity could be due to the formation of an interconnected network between PVK and MWNTs which then permits a very high percentage of electrons to flow through the conductive path in the PVK/MWNTs matrix. But, increasing the concentration of MWNTs in PVK solution to 9% by weight, the MWNTs started to agglomerate as evidenced from the PVK/MWNTs nanocomposite solution (Supporting information). Insulating polymers are transformed to conductive composites by addition of MWNTs above a critical concentration or percolation threshold. When the positions of MWNTs in the polymer matrix form a conducting film, the conductivity of nanocomposites greatly increased, this may be due to the formation of percolating network. Percolation means that at least one pathway of connected MWNTs exists in the sample which in case of conductive fillers allows the charge to flow through the sample. In conductive fillers like MWNTs, electrical measurements are suitable to detect the percolation composition. In this study the percolation threshold is found to be in the range of 3% to 5% MWNTs. In this range the conductivity shows a high increase and the composites with MWNTs content higher than 5% weight can be regarded as electrically conductive. These values mean that in the presence of 5% MWNTs in the PVK matrix is enough to form a network of conductive path. Above the percolation threshold concentration, 3% MWNTs independent fillers tend to link together to form conductive networks which leads to a significant increase in the conductivity of the prepared CPN nanocomposite films. Note that the conducting properties imbued by the combination of the PVK and the MWNT are not only an intrinsic property but also a possible application of such films where the conducting property is employed.

The conductivity study of the nanocomposites shows that better dispersion of MWNTs in the polymer matrix greatly enhances the conductivity. The minimum MWNTs sidewall damage and improved percolation in PVK/MWNTs CPN nanocomposite films leads to an improvement in its electrical conductivity. Hence, this study suggests an effective way to improve dispersion of MWNTs into PVK matrices and also retain the electronic structure of MWNTs that could be used in various functional materials and coatings. In principle, utilizing single walled nanotubes (SWNT) should even show a more remarkable change in conductivity and electro-optical properties assuming the same dispersion qualities.

Figure 13A:
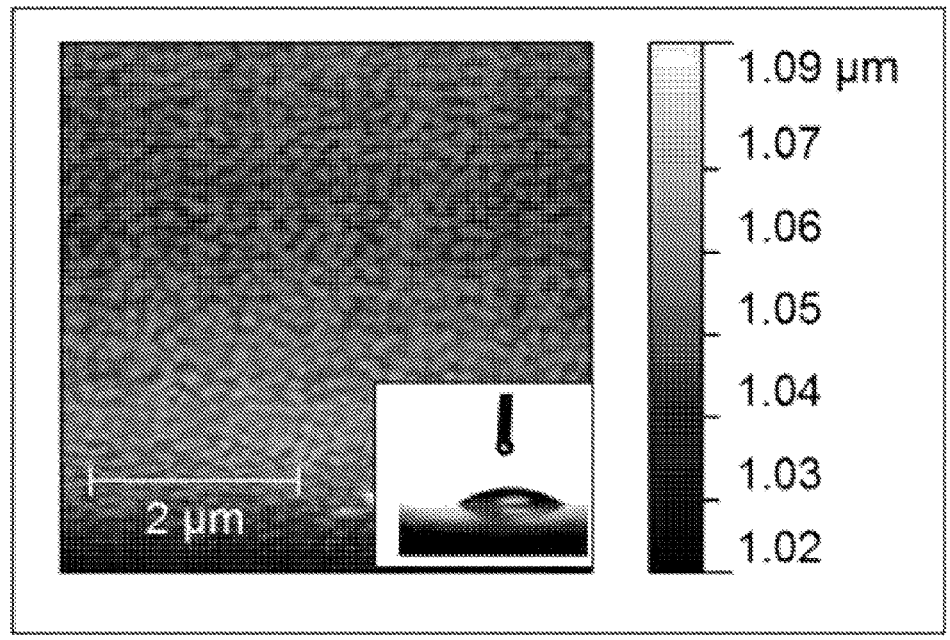
FIGS. 13A&B depict AFM topography of (A) 93% PVK/7% MWNTs nanocomposite film spin-coated on ITO glass substrate and (B) 93% PVK/7% MWNTs CPN nanocomposite film. The AFM image of CPN nanocomposite film is electropolymerized for 50 cycles at a range of 0-1.4 V with a scan rate of 50 mV/s in 0.1 M $LiClO_4$/ACN as electrolyte.
Figure 13B:
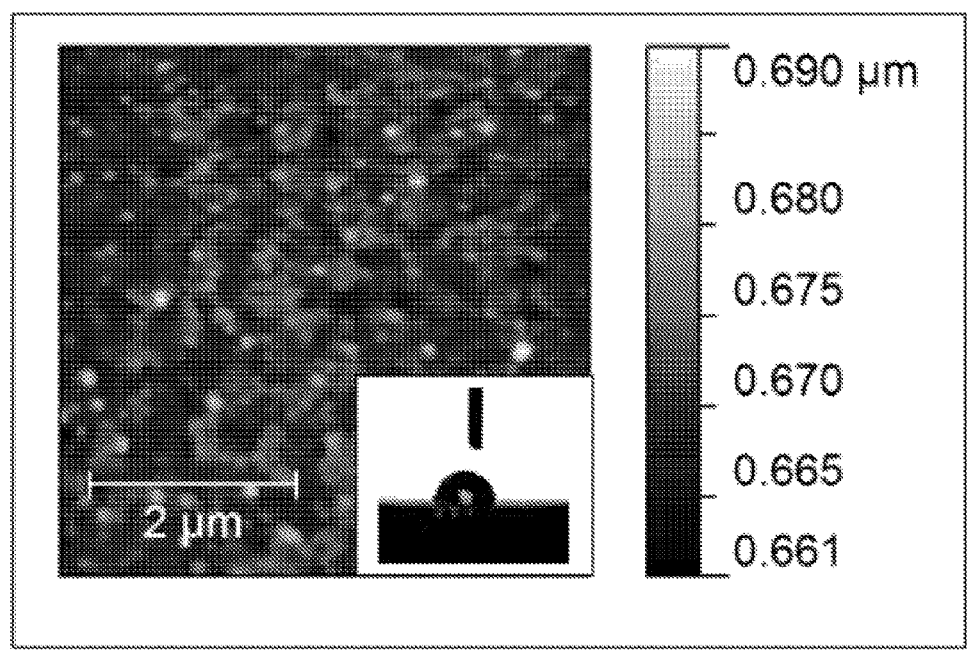

Another embodiment of the present invention discloses the morphology of nanocomposite films made of PVK/MWNTs nanocomposite films, and PVK/MWNTs CPN. FIG. 13 shows the AFM topography of (A) 93% PVK/7% MWNTs nanocomposite film spin-coated on ITO glass substrate and (B) 93% PVK/7% MWNTs CPN nanocomposite film. The AFM image of CPN nanocomposite film is electropolymerized for 50 cycles at a range of 0-1.4 V with a scan rate of 50 mV/s in 0.1 M LiClO$_4$/ACN as electrolyte. AFM is a very useful tool for investigating the morphology of the modified surfaces because it provides spatial resolution, film topology, and nanostructure formation. The surface topography of PVK/MWNTs nanocomposites in terms of roughness values of the interfaces can also be analyzed by AFM. FIG. 13 shows the topographies of PVK/MWNTs nanocomposite films deposited using spin casting in ITO glass substrate before and after electropolymerization. The 93% PVK/7% MWNTs nanocomposite film shows an elongated globular kind of clusters that can be attributed to the presence of MWNTs, since there composition is in agreement with 3% with respect to the composition of PVK with rms value of 3.11 nm. This result suggests a homogeneous wrapping of MWNT within the PVK polymer matrix is achieved especially at the 93% PVK/7% MWNTs composition. The measured water contact angle is found to be 53.30° in water. The PVK/MWNTs CPN nanocomposite film shows rms value of 4.86 nm which is also correlated to the decrease in the surface energy of the film as revealed in the measured WCA of 89.13°. The increase in the measured WCA indicates that a more hydrophobic PVK/MWNTs CPN nanocomposite films is grafted in the substrate.

Figure 14:
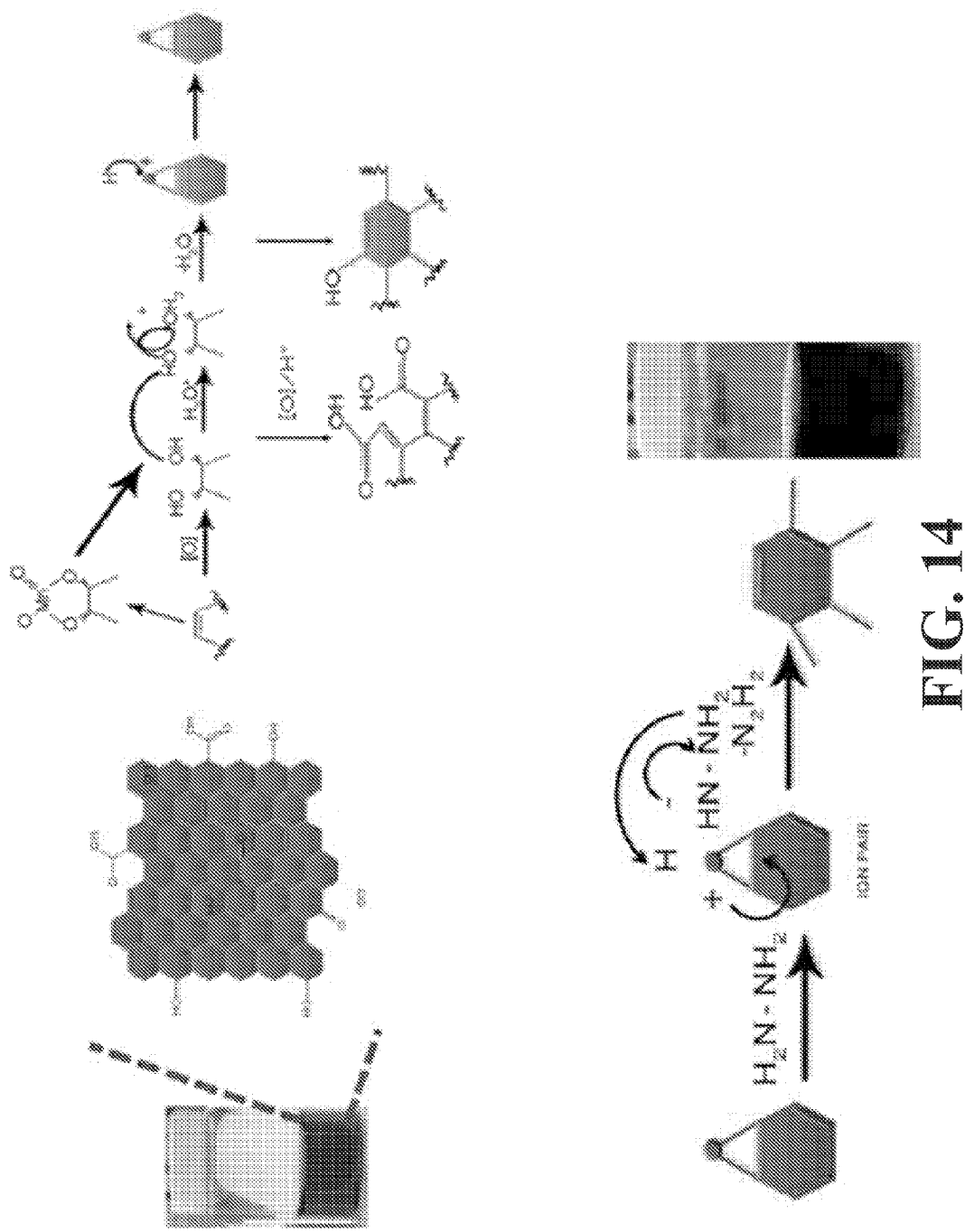
FIG. 14 depicts an oxidation-reduction mechanism of pristine graphite.

Another embodiment of the present invention discloses the preparation and characterization of nanocomposites made of poly (N-vinyl carbazole) and graphene oxide (GO). Stable graphene dispersion is hard to prepare under common mechanical method like stirring and sonication because of inter and intra pi-pi stacking of graphene with a mount of carbon leads to aggregation. The action of mechanical forces is beneficial in dispersing the graphene but it is not enough to control the aggregation of graphene sheets through van der waals interactions. In this work the pristine graphite is oxidized using Hummers method to produce graphene oxide (GO). The GO containing oxygen functionalities, such as carboxyl, hydroxyl and epoxide easily forms GO dispersion in most organic solvents. But GO, is not as conductive as pristine graphite thus reduction of GO using chemical method like hydrazine could produce electrically conductive graphene. As the reduction of GO proceeds, the brown solution of GO turns into black. The mechanism for oxidation-reduction of graphite using Hummers method is presented in FIG. 14.

Figure 15:
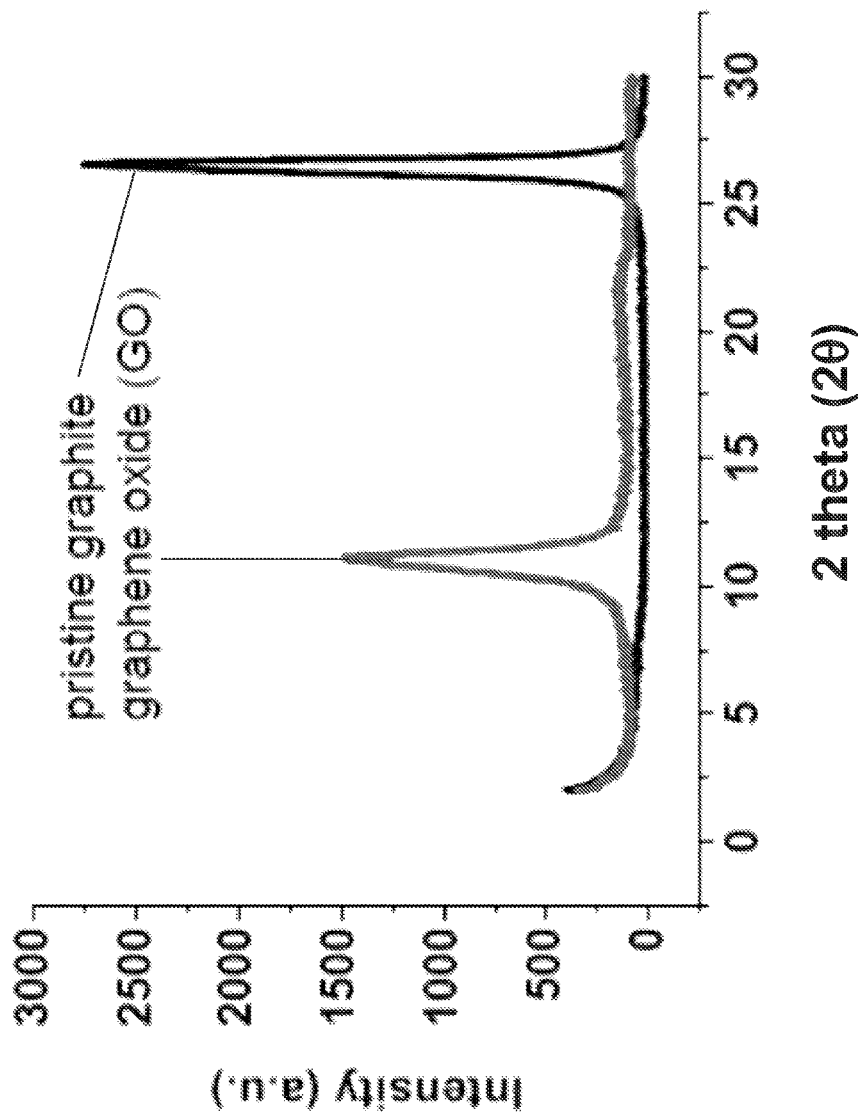
FIG. 15 depicts a XRD patterns of pristine graphite and GO.

FIG. 15 shows the XRD patterns of pristine graphite and GO. The XRD patterns of the pristine graphite and GO show the transformation of interlayer spacing which is indicative of complete transformation of graphite to GO. The GO is characterized by a peak at 2θ with 10.95° having a larger d-spacing of 0.823 nm compared to the typical value of graphene which is 0.34 nm. The increase in the d-spacing is due to the insertion of hydroxyl and epoxy groups between the carbon sheets and the carboxyl groups along the terminal and lateral sides of the sheets as a result of the oxidation process.

Figure 16:
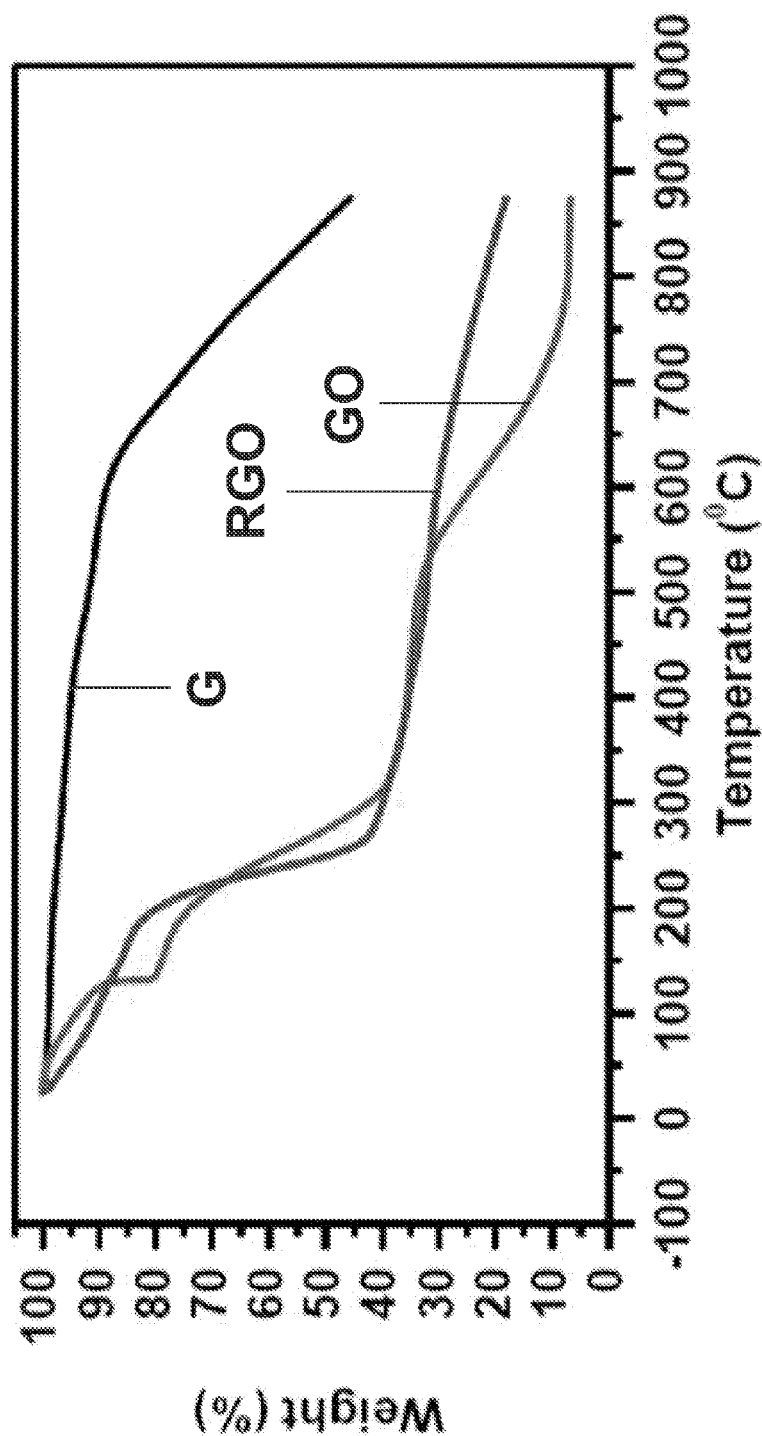
FIG. 16 depicts a TGA thermograms of pristine graphite, GO and R-GO. Inset graph shows the first derivative curve (dTGA).

FIG. 16 shows the thermogravimetric curve and its derivative plot for pristine graphite, GO, and R-GO (reduced graphene oxide). The main mass observed for graphene oxide which takes place around 200° C. can be ascribed to the decomposition of labile oxygen functionalities. Comparing with the pristine graphite, GO shows much lower thermal stability, which could be due to the lowered thermal stability because of the disrupted and reduced van der Waals interaction. The lowered onset temperature is due to pyrolysis of the labile oxygen containing functional groups. This behavior can be explained through the oxidation product of graphite has a layered morphology with oxygen-containing functionality which thereby weakens the van der waals forces between layers. This disrupts the hexagonal carbon basal planes on the interior of multilayered stacks of GO which accelerates the weight loss of the material. This decomposition disappears after the reduction process and the mass loss around 300° C. is still present in R-GO. This mass loss can be attributed to loss of carboxylic groups given that the mass losses at that temperature have been confirmed to come from strong acidic carboxylic groups and hydrazine is not supposed to reduce these groups, and that they are still present in R-GO.

Figure 17:
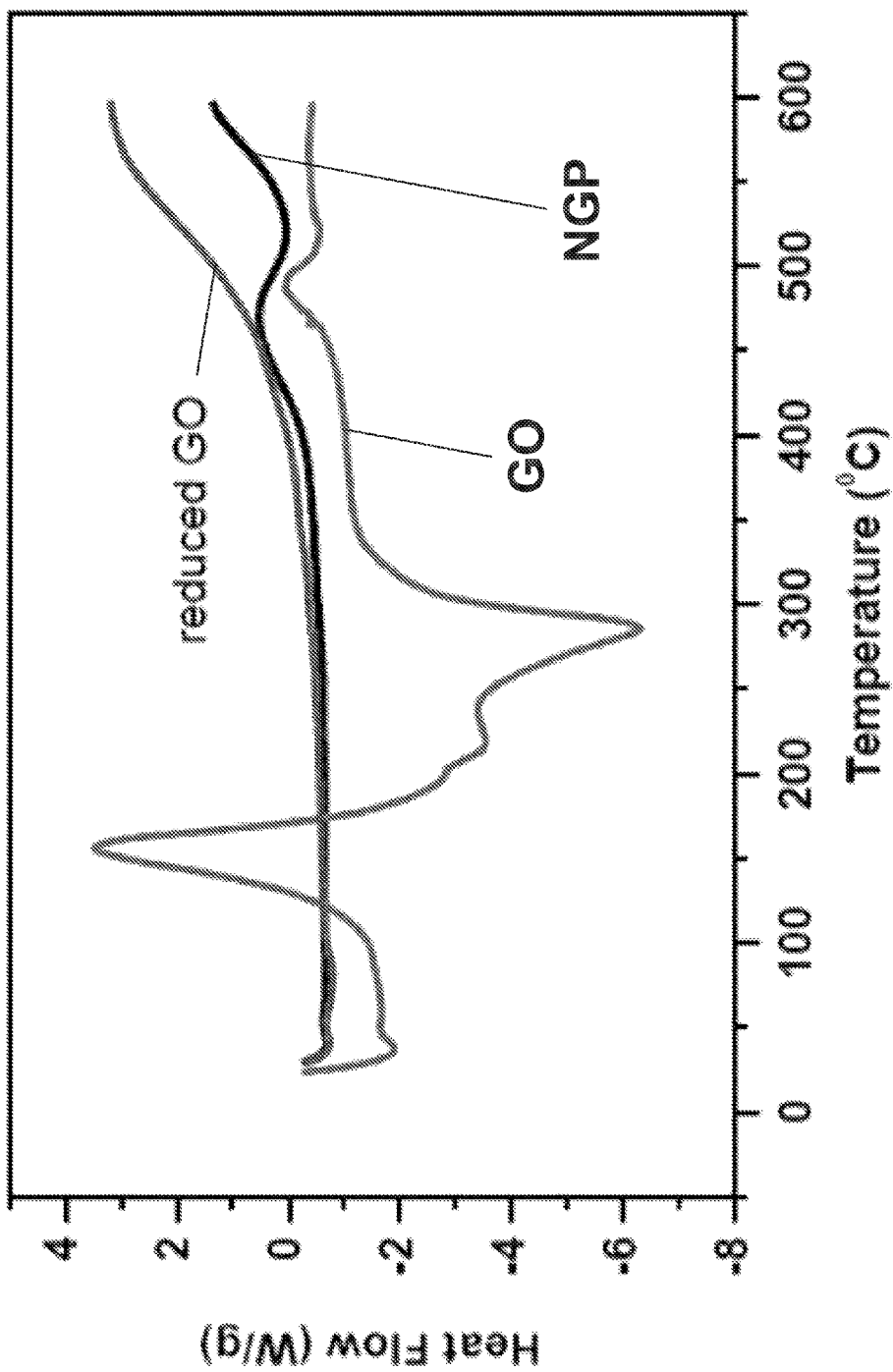
FIG. 17 depicts a DSC curve for pristine graphite, GO and reduced-GO.

To understand the formation of GO and R-GO, DSC analysis is also performed in this study. FIG. 17 shows the DSC traces of pure NGP, GO and R-GO. For pure NGP, the melting temperature ($T_m$) is observed around 470° C. The formation of GO shows $T_g$ at around 150° C. and $T_m$ at around 290° C.

Figure 18:
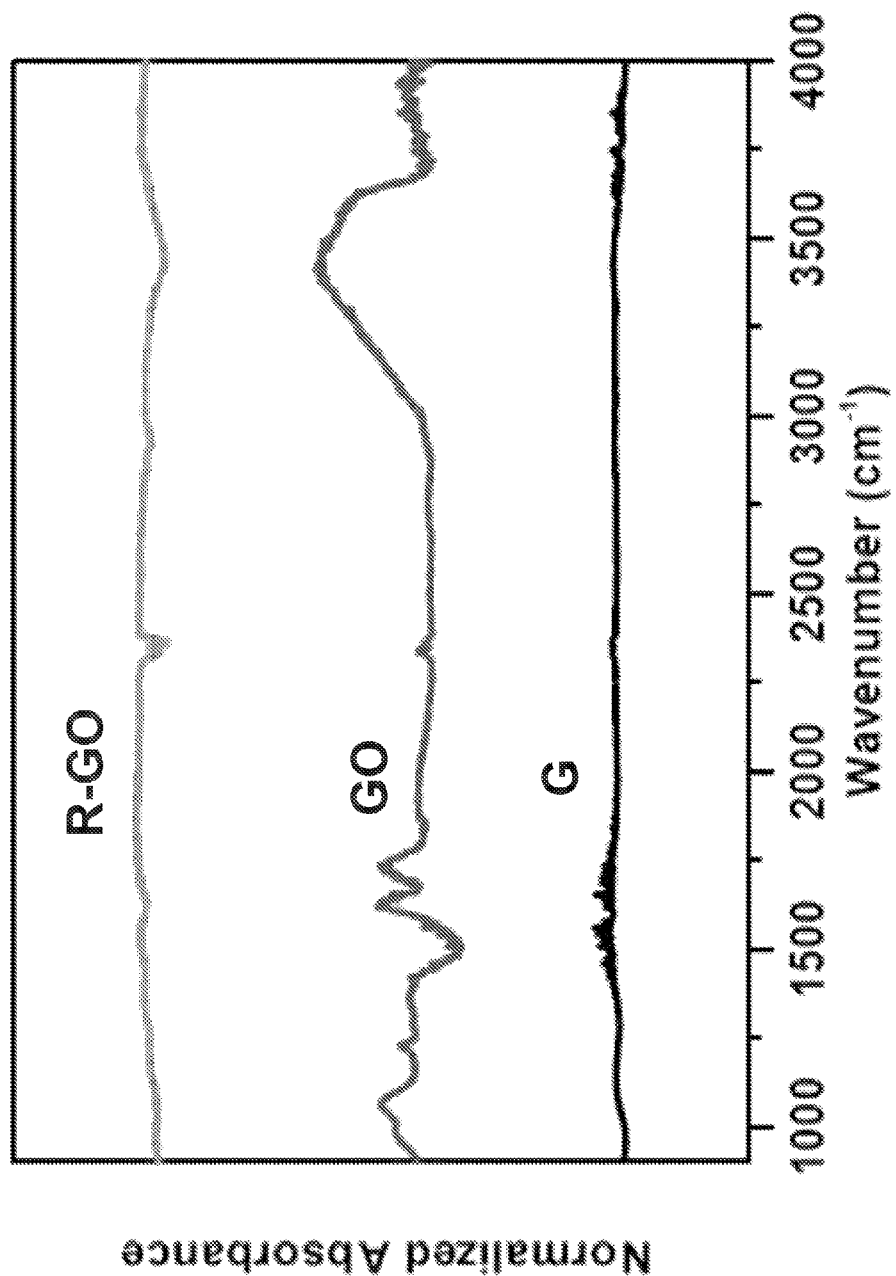
FIG. 18 depicts a FTIR-KBr spectra of pristine graphite, GO and R-GO.

FIG. 18 shows the FTIR spectra of pristine graphite, GO and R-GO. The spectrum of GO illustrates O—H (carboxyl) at 1400 cm$^{-1}$ and O—H at 3445 cm$^{-1}$ which originates from carboxylic acid group and the O—H stretching mode of intercalated water, C═O in carboxylic acid and carbonyl moieties at 1729, the C-0 from the epoxy and alkoxy group at 1055 cm$^{-1}$ and the C═C at 1620 cm$^{-1}$ assigned to skeletal vibrations of unoxidized graphitic domains or the contribution from the stretching deformation vibration of intercalated water. After the reduction of GO using hydrazine, the peaks for the oxygen functionalities disappear and that the spectrum of R-GO is similar to that of pristine graphite. Note that the spectroscopic properties imbued by the combination of the PVK and the GO and G are not only an intrinsic property but also a possible application of such films where the spectroscopic property is employed.

Figure 19:
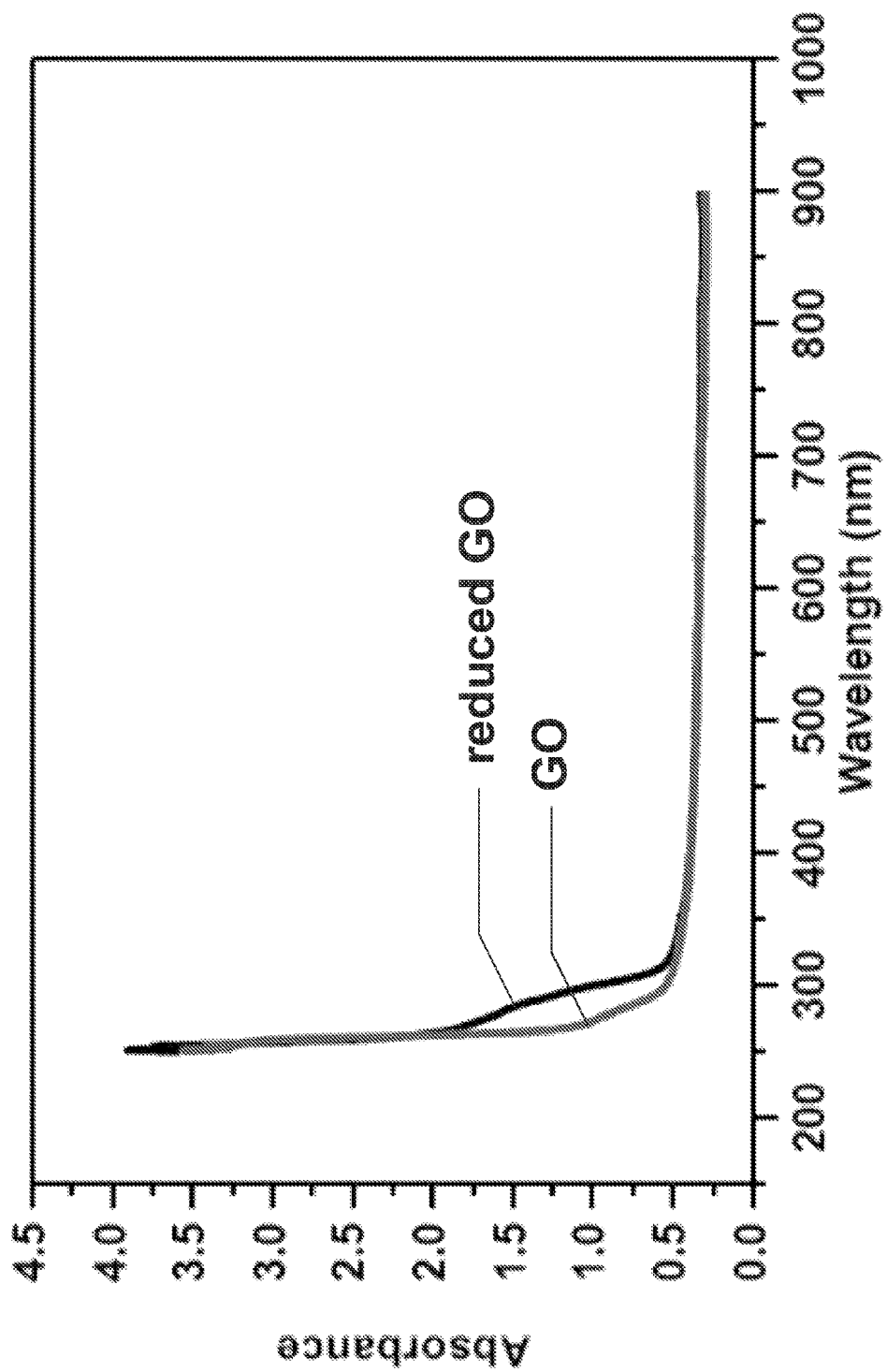
FIG. 19 depicts a UV-vis analysis of GO and reduced GO.

FIG. 19 shows the UV-vis spectra of GO and R-GO dispersion in CHP. The increase in absorption for the R-GO signify that the reduction is successful and that the aromatization is enhanced. The spectrum of GO dispersion presents a characteristic feature of n-π* which shows a shoulder at around 300 nm which is assigned to the transitions of C═O bonds. Note that the spectroscopic properties imbued by the combination of the PVK and the GO and G are not only an intrinsic property but also a possible application of such films where the spectroscopic property is employed.

Figure 20:
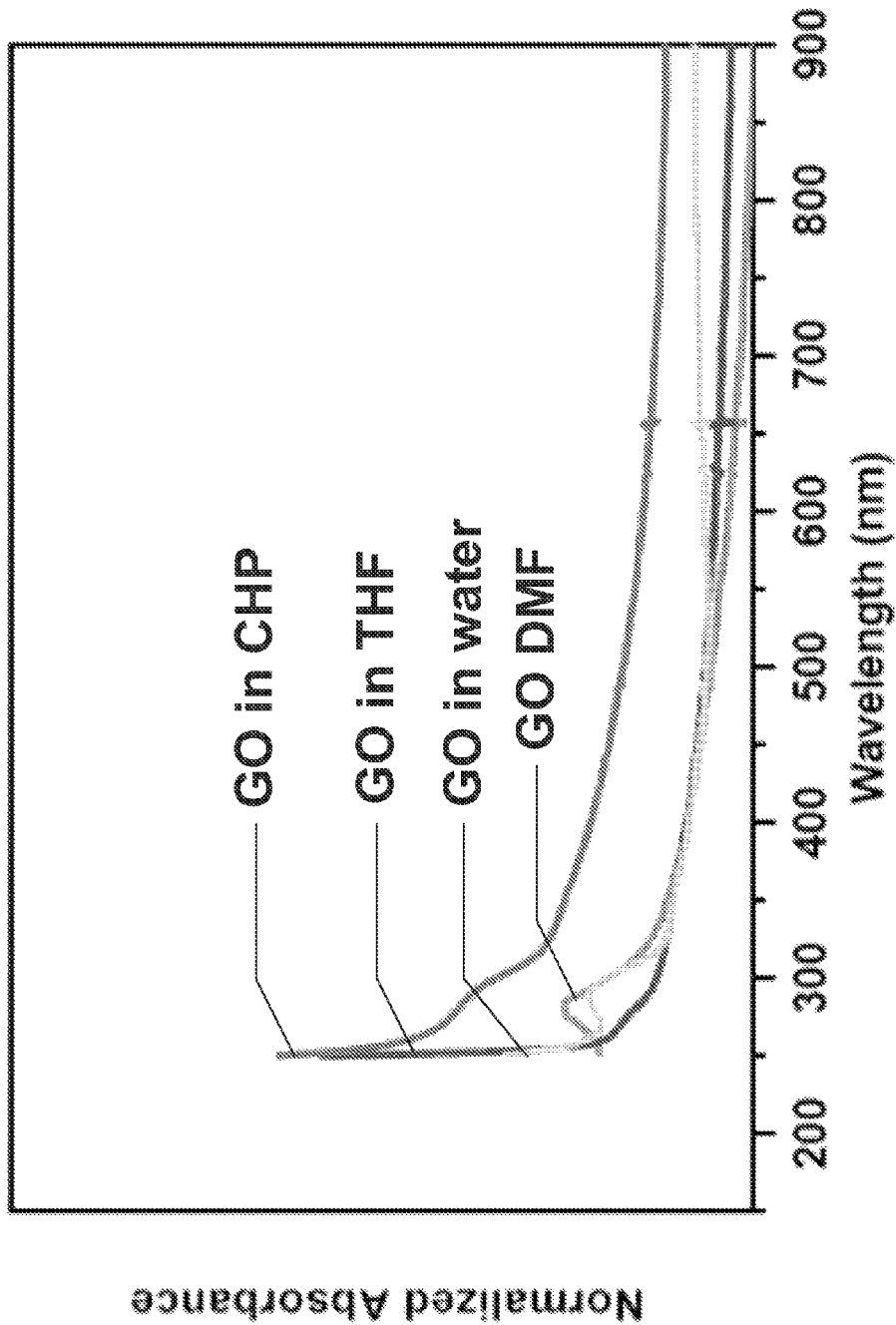
FIG. 20 depicts a UV-vis absorption spectra of as-prepared GO dispersed in different solvents by means of sonication. The spectra are recorded for stabilized dispersion after 24 hours incubation.

FIG. 20 shows the UV-vis absorption spectra of as-prepared GO dispersed in different solvents by means of sonication. The spectra are recorded for stabilized dispersion after 24 hours incubation. The GO is dispersed in different organic solvents to a concentration of 1 mg/ml with the aid of sonication and the dispersions are allowed to settle for days. FIG. 20 shows the UV-vis spectra and digital photographs of all the dispersions immediately after sonication and after 30 days after sonication. For the freshly sonicated materials, it can be observed from the picture that the GO can be dispersed in most organic solvents but after 30 days of incubation most of the dispersion starts to agglomerate and the most stable dispersion are those solvent s like DMF, THF, water and CHP.

Figure 21:
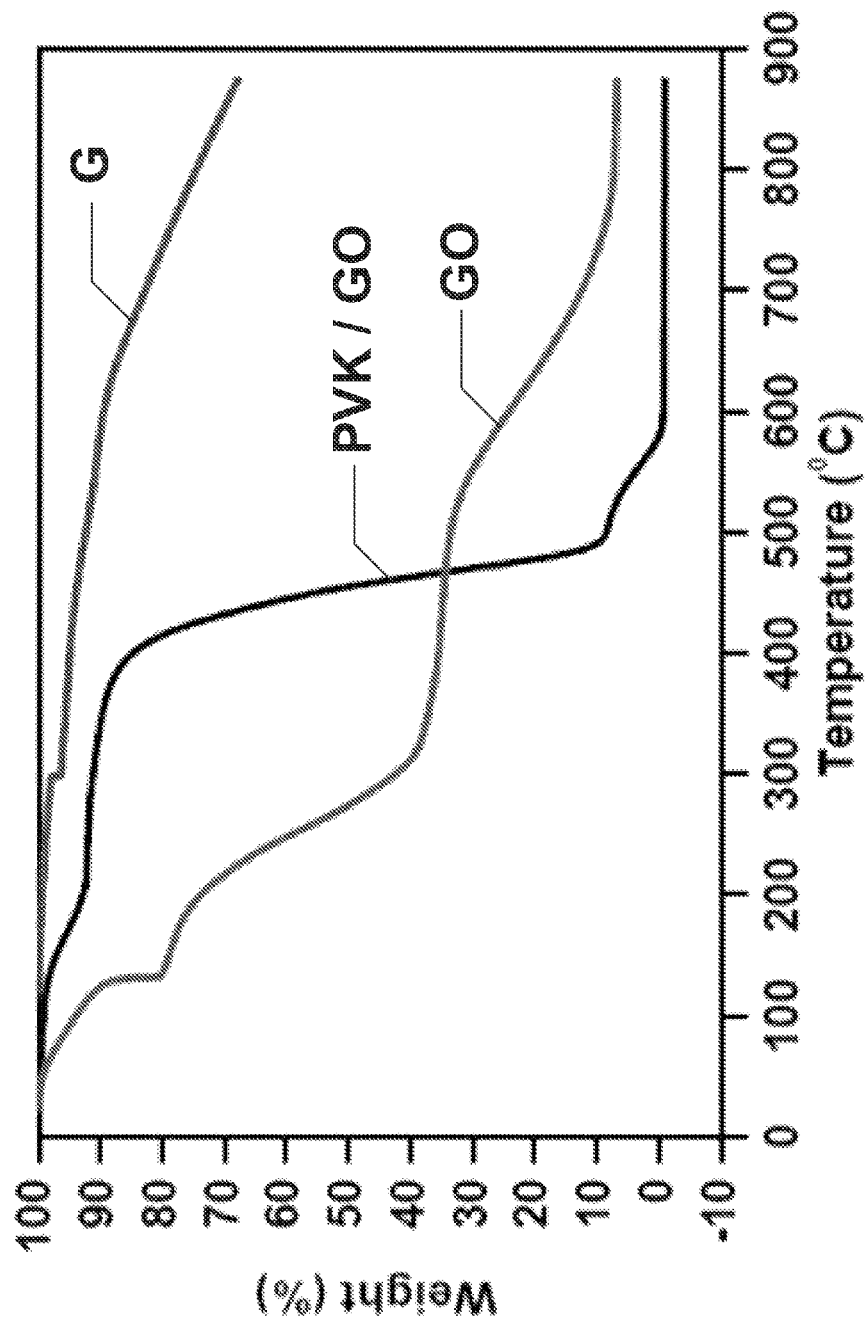
FIG. 21 depicts a TGA analysis of pristine graphite, GO and PVK/GO nanocomposite.

FIG. 21 shows the thermal stability of pristine graphite, GO and PVK/GO nanocomposites using TGA (Thermogravimetric analysis). TGA is performed to study the decomposition pattern and thermal stability of the nanocomposites. The TGA curve of pristine graphite indicates a 25% mass loss that could be attributed to the residual oxygen-containing groups. The TGA data for the PVK/GO nanocomposites indicates a three-step decomposition process. The first 2 steps are consistent with the thermal degradation of the PVK, corresponding to the degradation of the side chains and polymer backbone. The observed third decomposition step corresponds to the oxidation and decomposition of GO.

Electrodepostion of PVK/GO

Cyclic voltammetry (CV) experiments are carried out on a Princeton Applied Research Parstat 2263 using a three (3) electrode set-up from a solution of 0.1 M $LiClO_4$ dissolved in acetonitrile (ACN). The coated ITO glass substrate is used as the working electrode (WE), Pt wire as the counter electrode (CE) and Ag/AgCl as the reference electrode (RE). Electrochemical cross-linking of PVK/GO nanocomposite films is accomplished by repeatedly cycling an electrode potential between the limits 0 to 1.4 V for up to 50 cycles at a potential scan rate of 50 mV/s (FIG. 33). The π-conjugated polymer network (CPN) nanocomposite film being insoluble in ACN solvent is thoroughly washed with ACN and is dried in nitrogen before the analysis of the film to remove excess PVK. Note that an alternative method based on prior art is the use of a chemical oxidant to provide for the reaction of carbazole (or other electro-active monomer units) via a radical cation coupling mechanism. This can involve the spin-coating or casting of the solution to a non-conducting or conducting (electrically) substrate followed by drying. The dried film is then treated to a solvent (immiscible to the film) containing the chemical oxidant. This will result in a similar polymerization mechanism and conversion of the precursor to a conjugated polymer network composite.

Figure 22:
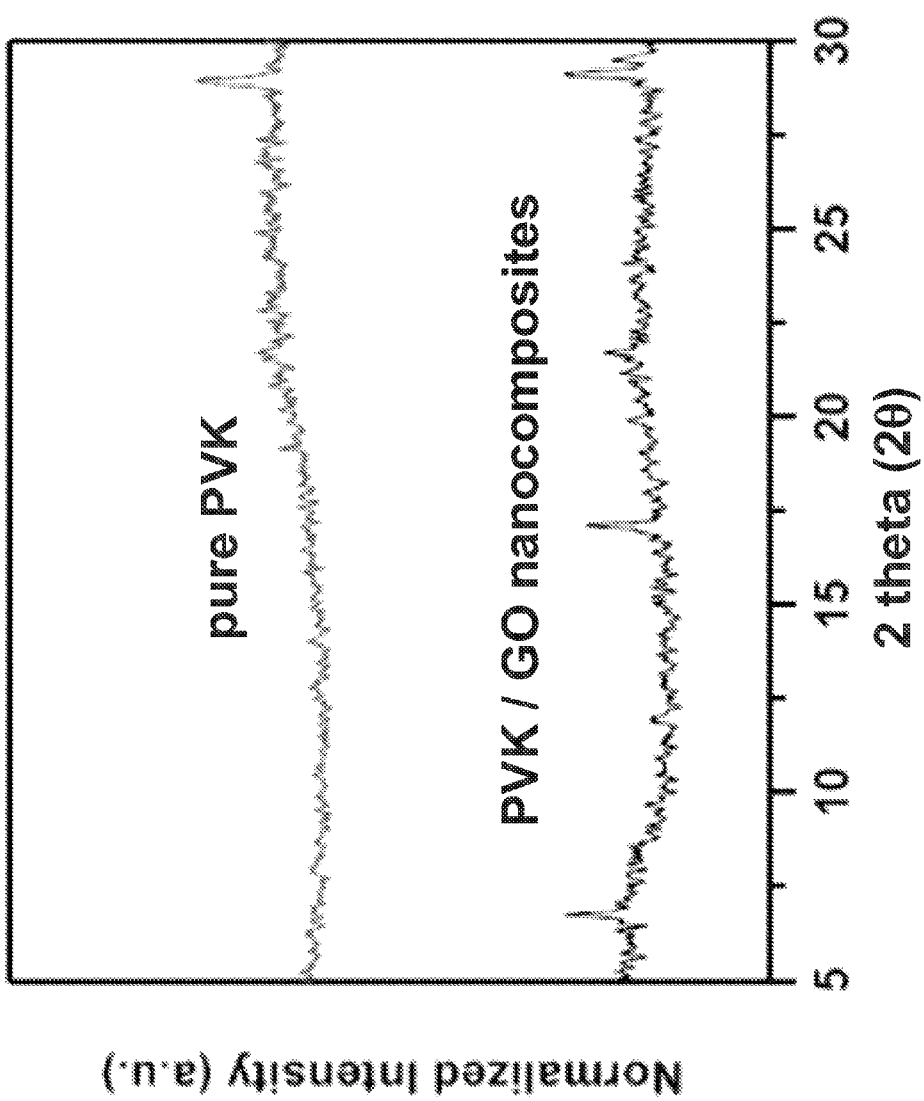
FIG. 22 depicts a XRD patterns of pure PVK and PVK/GO nanocomposites.

XRD is an effective method to evaluate the interlayer changes of graphite-related powders and crystalline properties of nanocomposite. XRD patterns of the nanocomposites further support the preparation of PVK/GO as individual graphene sheets in the nanocomposites as presented in FIG. 22. After the electrochemical cross-linking of GO in PVK matrix, the XRD pattern of the PVK/GO nanocomposites shows only the diffraction peak for PVK and the peak for GO is shifted to a larger 2 theta. A similar phenomenon can also be observed for many polymer/GO nanocomposites and is considered to be a result of polymer crystallization that is induced by graphene. This result could be due to the electrostatic interaction that may contribute to the ordered arrangement of the PVK attached to GO.

Figure 23:
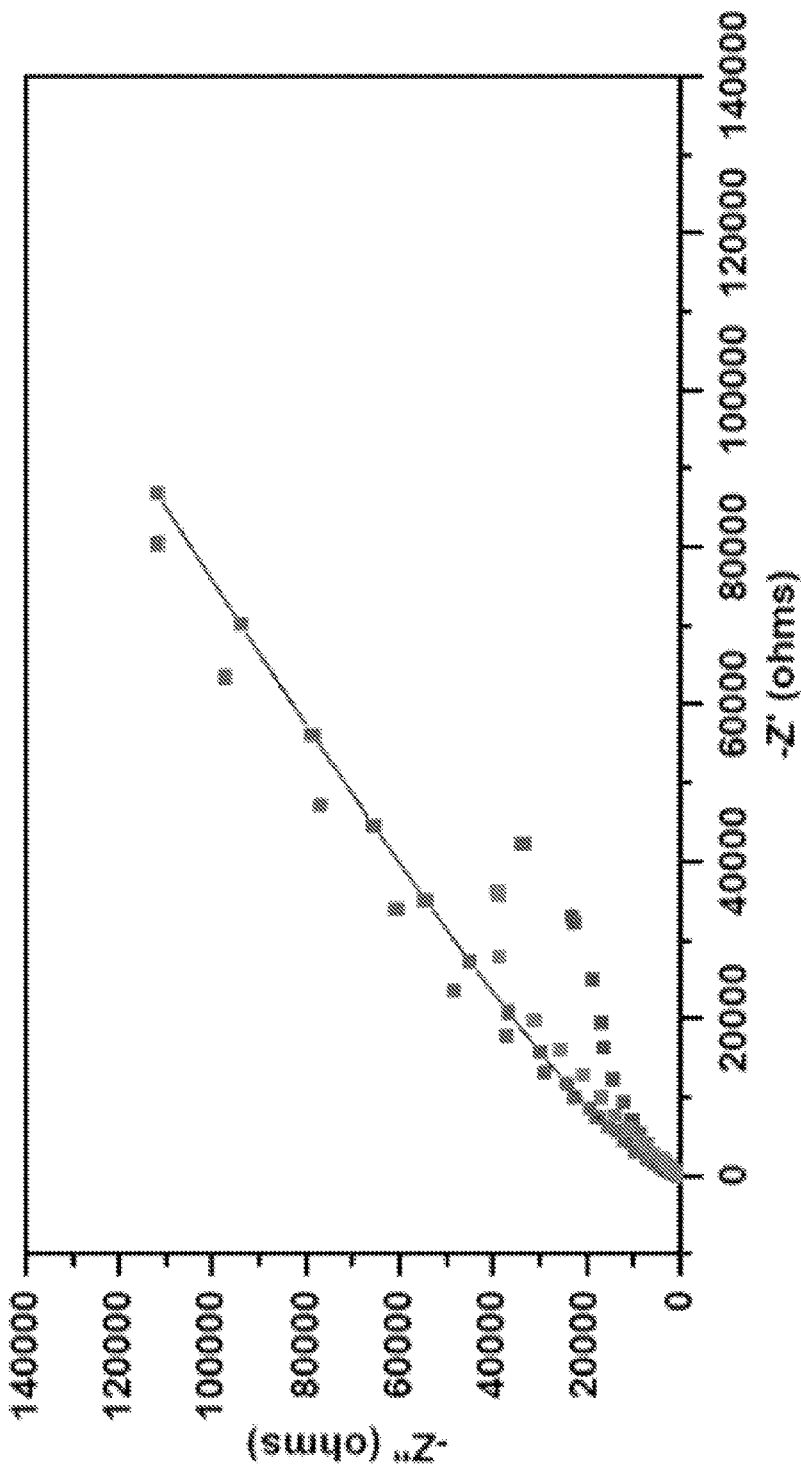
FIG. 23 depicts a Nyquist plots of pure PVK, GO and PVK/GO nanocomposite film. Inset shows the equivalent circuit

Electrochemical impedance spectroscopy (EIS) is used to investigate the change of electrochemical system and interface within PVK/GO nanocomposites. EIS measurements for the PVK/NGP-GO nanocomposite films are performed under open circuit potential in an ac frequency range from 100,000 to 0.01 Hz with an excitation signal of 5 mV. The EIS data are analyzed using the nyquist plot which show the frequency response of the electrode/electrolyte system and are the plots of the imaginary component (Z") of the impedance against the real component (Z'). From the nyquists plots shown in FIG. 23 of the pure PVK, GO and PVK/GO display a small semicircle at high frequency followed by a transition to linearity at low frequency. The intercepts of the pure PVK and PVK/GO nanocomposites film with the real impedance 58.65 and for PVK/GO is 35.10, this result shows that the PVK/GO nanocomposite film is 23.55 less resistive than pure PVK. While this result is in agreement with a conductive contribution from the addition of GO, this decrease in resistance could also be due to the formation of between the cross-linking of GO and PVK polymer chains.

Another embodiment of the present invention discloses the use of nanocomposite films made of PVK/MWNTs and PVK/GO to create patterns on their surface. First, nanoparticles of polystyrene microbeads (or colloidal crystals) are layered. This layering is accomplished using a similar procedure described earlier by Grady and co-workers. The method is called Langmuir-Blodgett (LB)-like technique for it forms a monolayer of PS particles onto flat surfaces without using the conventional LB set-up that employs floating barriers. Briefly, the substrate is attached into the dipper motor via Teflon clip and is dipped into an aqueous solution containing PS particles (1 wt. %) and sodium n-dodecyl sulfate or SDS (34.7 mM) as spreading agent. Note that a higher concentration of anionic surfactant (SDS) will result to multiple layers of highly disordered latex spheres while a lower concentration will not form a full coverage in hexagonal array. Then the substrate is withdrawn vertically from the solution at a lift-up rate between 0.1 to 0.3 mm/min. Finally, the substrate is dried by suspending it in air for a few minutes. The monolayer ordering of the microsphere particles has been reported to be dependent on the LB-like technique and the concentration of the particles and surfactant (SDS) in solution. The addition of surfactant has been explained to increase the ionic strength of the solution, and thus creating a driving force for the migration of particles from the bulk solution to the air-liquid interface. Also, the surfactant molecules at the air-liquid interface has been reported to slow down the evaporation rate of the latex-surfactant solution with respect to the latex solution, giving more time for the particles to rearrange and form a highly ordered arrays on the substrate as the liquid film evaporates. The other roles of surfactant towards the formation of well-ordered arrays of latex spheres have been explained elsewhere.

Figure 24:
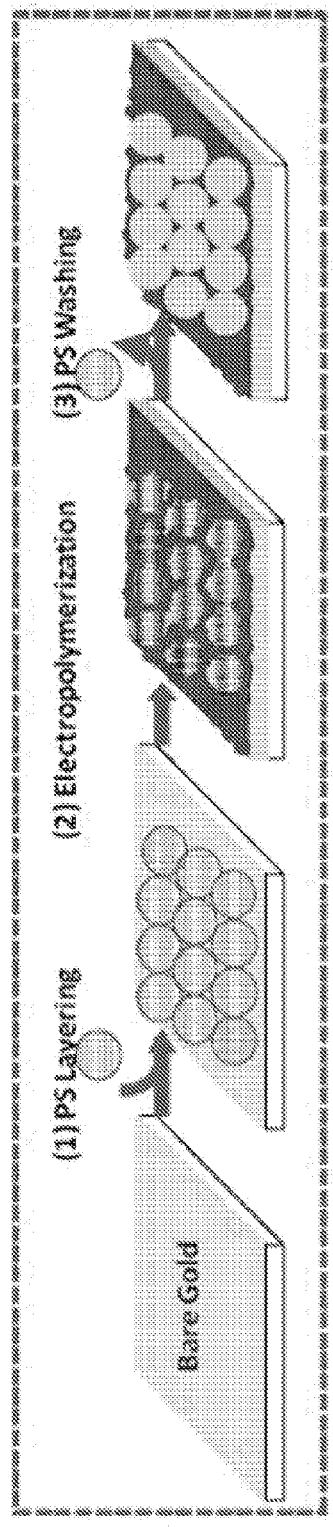
FIG. 24 depicts a Fabrication scheme of 2D patterned arrays (called inverse opals) using the composite solutions.
Figure 25:
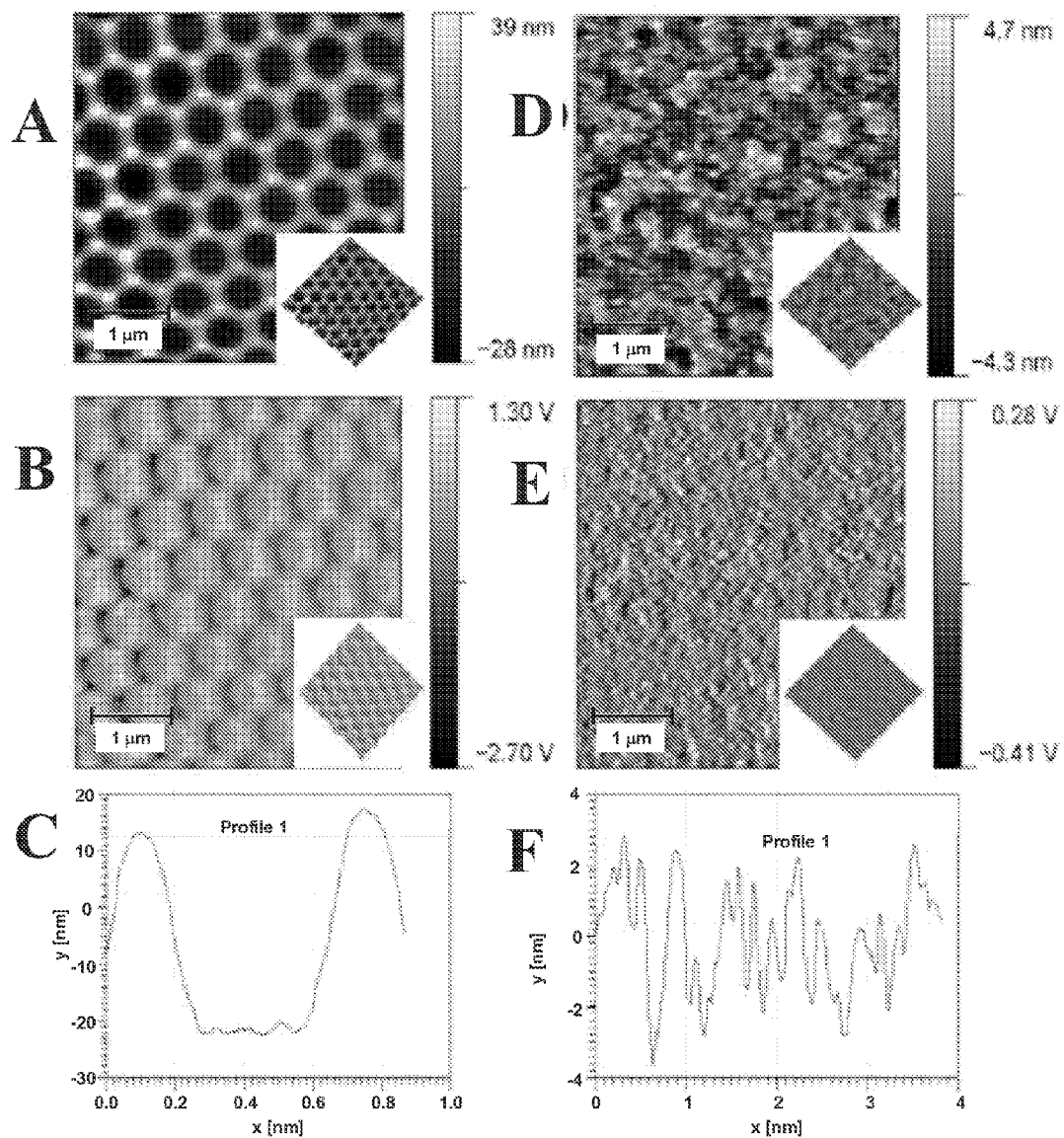
FIGS. 25A-F depict AFM (A,D) topography, (B,E) phase and (C,F) line profile measurements of CNT+PVK (A,B,C) patterned (using 500 nm PS particles) and (D,E,F) unpatterned surfaces. Note: CV deposition at 0V-1.5V, 10 mV/s, 10 cycles.

The electropolymerization (as illustrated in step 2 of FIG. 24) is done using cyclic voltammetric (CV) and chronoamperometric techniques using an Autolab PGSTAT 12 potentiostat (Brinkmann Instruments now MetroOhm Inc) in a standard three electrode measuring cell (fabricated electrochemical cell with a diameter of 1.0 cm and 0.785 $cm^3$, Teflon made) with platinum wire as the counter electrode, Ag/AgCl wire as the reference electrode, and the bare Au or PS coated Au substrate as the working electrode (FIG. 25). The PVK/MWNTs and PVK/GO nanocomposite solution (1 mg/ml) by (w/v) is further diluted with ACN (1:200) dilution factor. The potential is scanned between 0 V to 1.5 V at varying scan rate and cycles. After the electrodeposition, the resulting film is washed in ACN (for 3 times), and a monomer free scan is performed by using exactly the same experimental parameters but for 1 CV cycle only. Then the electropolymerized substrate is dried with $N_2$ gas. The PS microspheres are removed from the surface after electropolymerization by dipping the PS coated substrate in THF for 30 minutes (2 times) to create the inverse colloidal crystals of composite films. The THF removes the PS particles only and not the electropolymerized composite film. Then the substrate is allowed to dry naturally under ambient condition.

One interesting application of the CNT and PVK nanocomposite is to make a robust and conducting patterned surface of 2D arrays (called inverse opals) via facile approach called colloidal template assisted electropolymerization. Recently, inverse opals have become a significant interest due to myriad applications such as photonic crystals, diffraction gratings, biosensors, and surface-enhanced Raman scattering (SERS). The use of polymers in making inverse opals is advantageous since they have unique mechanical, optical, and electrochemical properties. These properties are highly enhanced with the incorporation of CNT, which are known to have inherent electrochemical, electrical and mechanical properties. To date, CNTs have been applied to nanoelectronic devices, composite materials, field-emission devices, atomic force microscope probes, gas and chemical sensors, lithium ion storage, 3D electrode, etc. Previously, single walled carbon nanotubes (SWNTs) have been reported to have a great potential for the reinforcement of polymer matrix composites because of their high strength, outstanding thermal property and good electrical conductivity.

To illustrate the patterning, the nanocomposite is electrodeposited via CV around a sacrificial template layer of PS particles (500 nm size) thru PVK, which has a carbazole moiety that is an electropolymerizable unit. The use of CV technique endows several advantages—ease in control of thickness and lateral dimension of the pattern, site-directed patterning, and deposition over large surface areas onto various conducting substrates. After electropolymerization using cyclic voltammetric technique, the layer of PS particles is removed from the surface by solvent washing (2×, 30 mins) using THF, dichloromethane, or toluene. The fabrication scheme is summarized in FIG. 24.

FIG. 25 shows the 2D patterned surface on ITO composed of CNT and PVK nanocomposites. The AFM topography 2D image with 3D image on inset (FIG. 25A) reveals highly ordered triangular objects or simply inverse colloidal monolayer crystal arrays with cavity lateral dimension about the size of the PS particle (500 nm). The 2D patterned surface is also evident in the AFM phase image (FIG. 25B). The height of the wall cavity is determined from the AFM line profile analysis of the topography image, which is between 30-35 nm. As a control, the same solution of the CNT and PVK composites is electropolymerized onto bare ITO using the same CV parameters. As expected, no pattern is formed on the surface but rather a layer of CNT/PVK film is adsorbed (FIG. 25D) as later confirmed by UV-Vis and FTIR spectroscopy measurements. The phase image (FIG. 25E) illustrates nanometer scale granular features atop the ITO substrate (as shown to be a flaky surface), which is typical for a polymer electrodeposition. The AFM cross sectional analysis (FIG. 25F) presents a random profile (−2 to +2 nm) of the polymer film deposition unlike in the patterned surface that shows a high regularity of the line profile.

Figure 26:
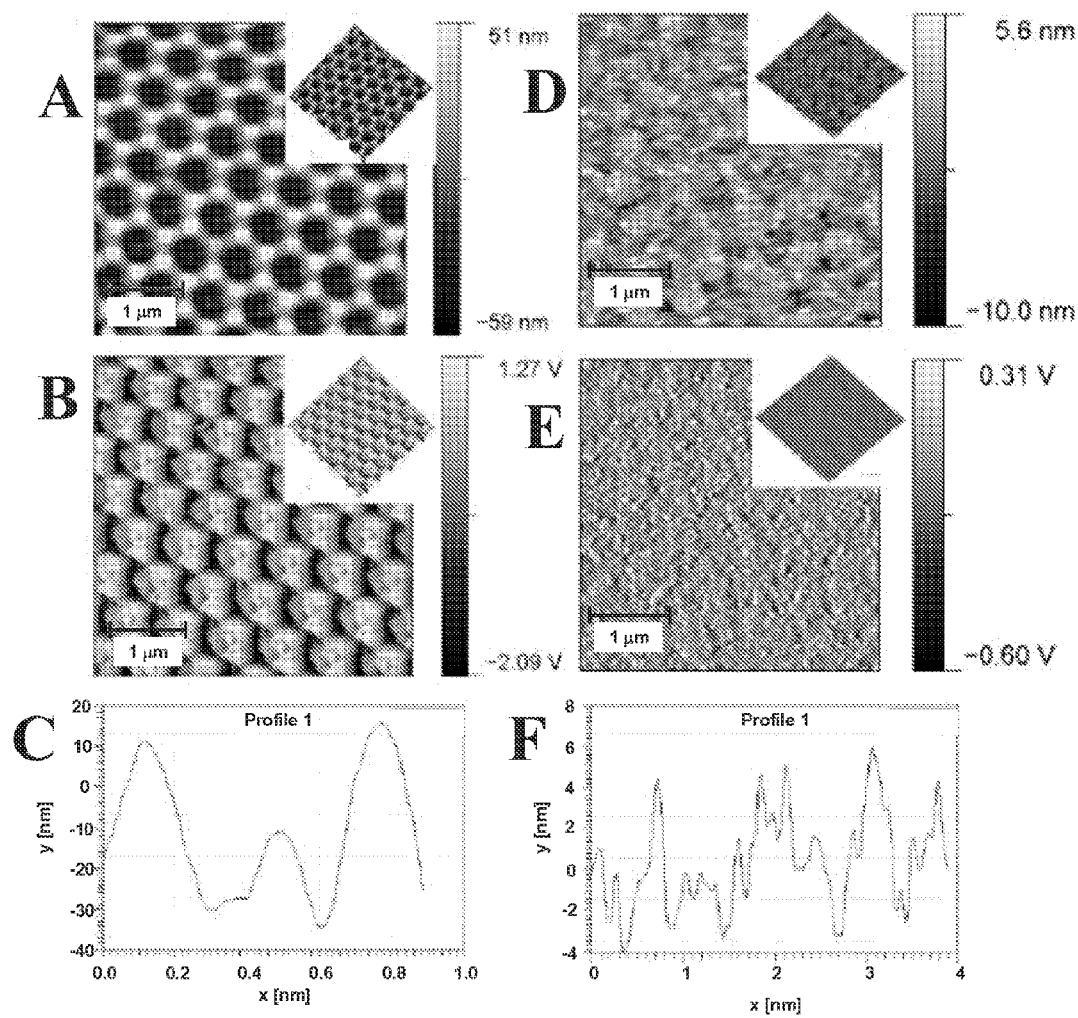
FIGS. 26A-F depict AFM (A,D) topography, (B,E) phase and (C,F) line profile measurements of CNT+PVK (A,B,C) patterned (using 500 nm PS particles) and (D,E,F) unpatterned surfaces. Note: CV deposition at 0V-1.5V, 25 mV/s, 25 cycles.

By simply varying the conditions for the CV electropolymerizations, the pattern on the surface can be easily modified or optimized. For instance, by increasing the number of cycles and scan rate, a thicker cavity wall is formed (FIG. 26A). This finding is seen clearly in the AFM phase image (FIG. 26B) and also observed in the line profile analysis (FIG. 26C). Still, the pattern is present on the surface. Furthermore, with these electropolymerization conditions, the composite film starts to form on the inside cavity as observed in the topography and phase images. More compelling evidence is the result of the line profile, which shows a decrease in the peak-to-base distance (as compared to FIG. 25C). Similarly, the same solution of the CNT and PVK composites is electropolymerized onto bare ITO using these parameters. Again, a random deposition of the composite film is observed on the surface (FIG. 26D) with the same granular features depicted on the phase image (FIG. 26E). Like the earlier control experiment, a random profile (FIG. 26F) is seen in the cross sectional analysis but the height has increased (−4 to +4 nm). Note that the size of the pattern can be changed by varying the size of the PS masks. Moreover, the cavity wall and cavity dimensions can also be modified by electrodeposition of a thicker polymer film composite.

Figure 27:
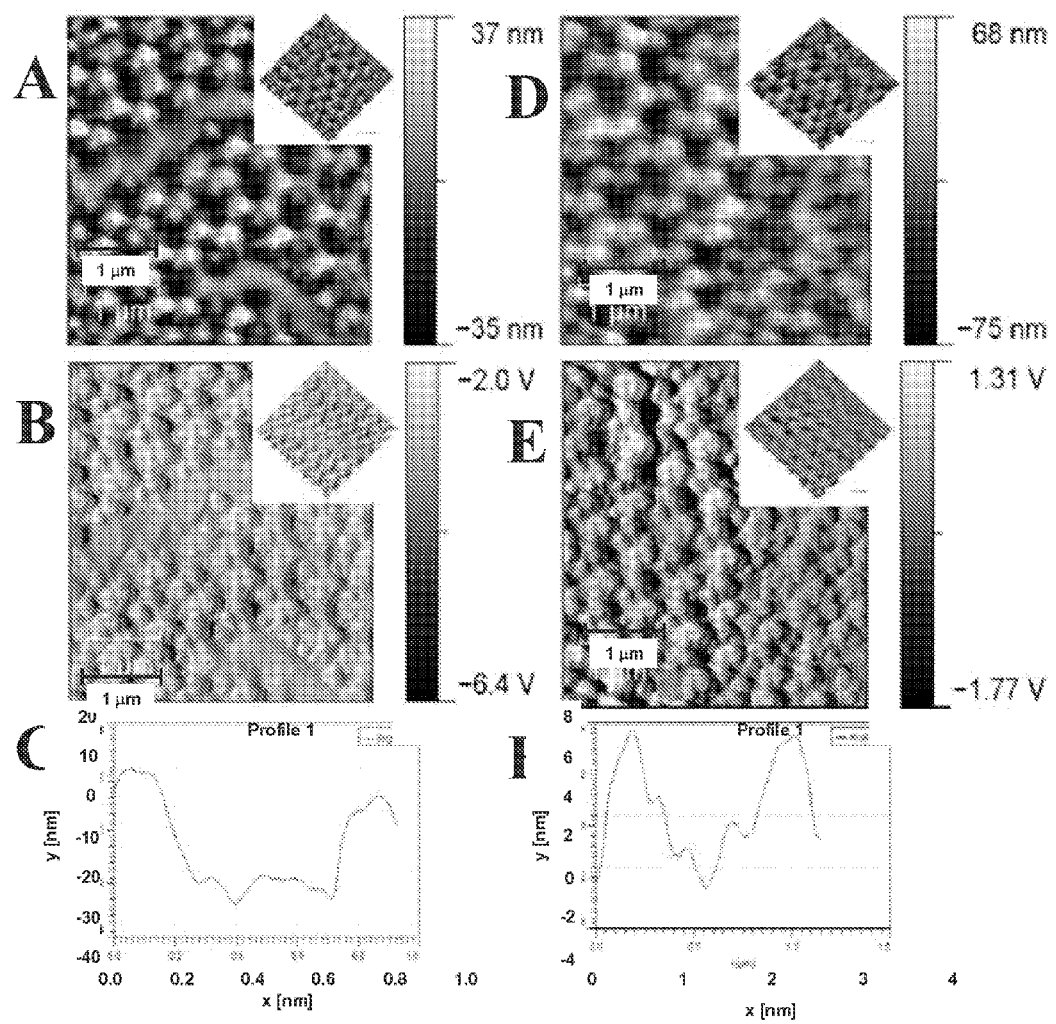
FIG. 27A-F depict AFM (A,D) topography, (B,E) phase and (C,F) line profile measurements of CNT+PVK patterned surfaces (using 500 nm PS particles) prepared using constant potential growth (at 1.5 V) for (A,B,C) 1000 sec and (D,E,F) 2000 sec.

Chronoamperometric technique (constant potential deposition alternative to CV deposition) is also exploited in the electrodeposition of the composite film. An oxidation potential of 1.5 V is used for the electropolymerization (1000 sec) of the PVK. After etching the sacrificial template layer, a patterned surface is also seen but not as defined and ordered as the CV electrodeposition (FIG. 27A and FIG. 27B). Also, the inside cavity is slightly backfilled with the composite film. The formation of the patterned surface is also evident in the AFM line profile (FIG. 27C). With the longer deposition time at 2000 seconds, a thicker cavity wall (FIG. 27D and FIG. 27E) is formed that almost covered the inside hole (FIG. 27F). At this condition, the PS templated-pattern almost disappeared.

Previously, we have compared the CV versus constant potential deposition of poly(3,4-ethylenedioxythiophene) on conducting substrate. The film formation is monitored in-situ by combination of electrochemistry, surface Plasmon resonance spectroscopy, and atomic force microscopy called EC-SPR-AFM technique. Results show that CV deposition is more reproducible and homogenous than the constant potential. Both techniques have been explained to exhibit different electrodeposition mechanisms. For constant potential, an induction period for the build-up of charge is required, which will eventually cause nucleation and gradual deposition of the film to the substrate. At the start, a slow initial stage occurs that is related to the nucleation on bare substrate involving a double layer charging effect. The next stage involves the rapid deposition of the polymer film corresponding to autocatalytic growth. In the case of CV, the formation of radical cation via oxidation process occurs simultaneously with electrodeposition of the film onto the substrate. This is probably the reason why the CV deposition demonstrated a more ordered and periodic pattern on ITO. It is also believed that the formation of patterned film via constant potential can be improved by further optimization of the parameters.

Figure 28:
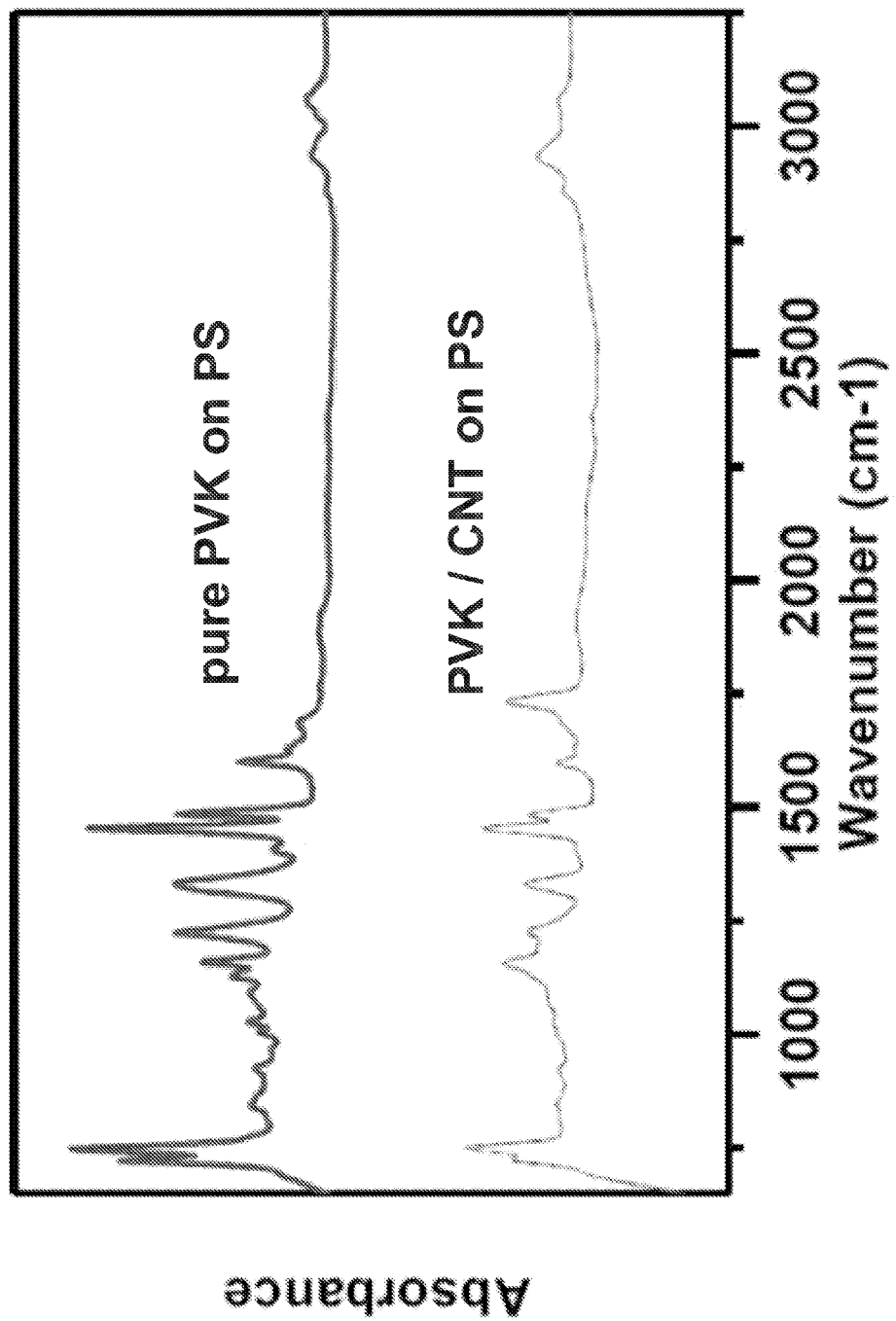
FIG. 28 depicts a FTIR-ATR analysis of patterned surface for pure PVK and PVK/CNTs.
Figure 29:
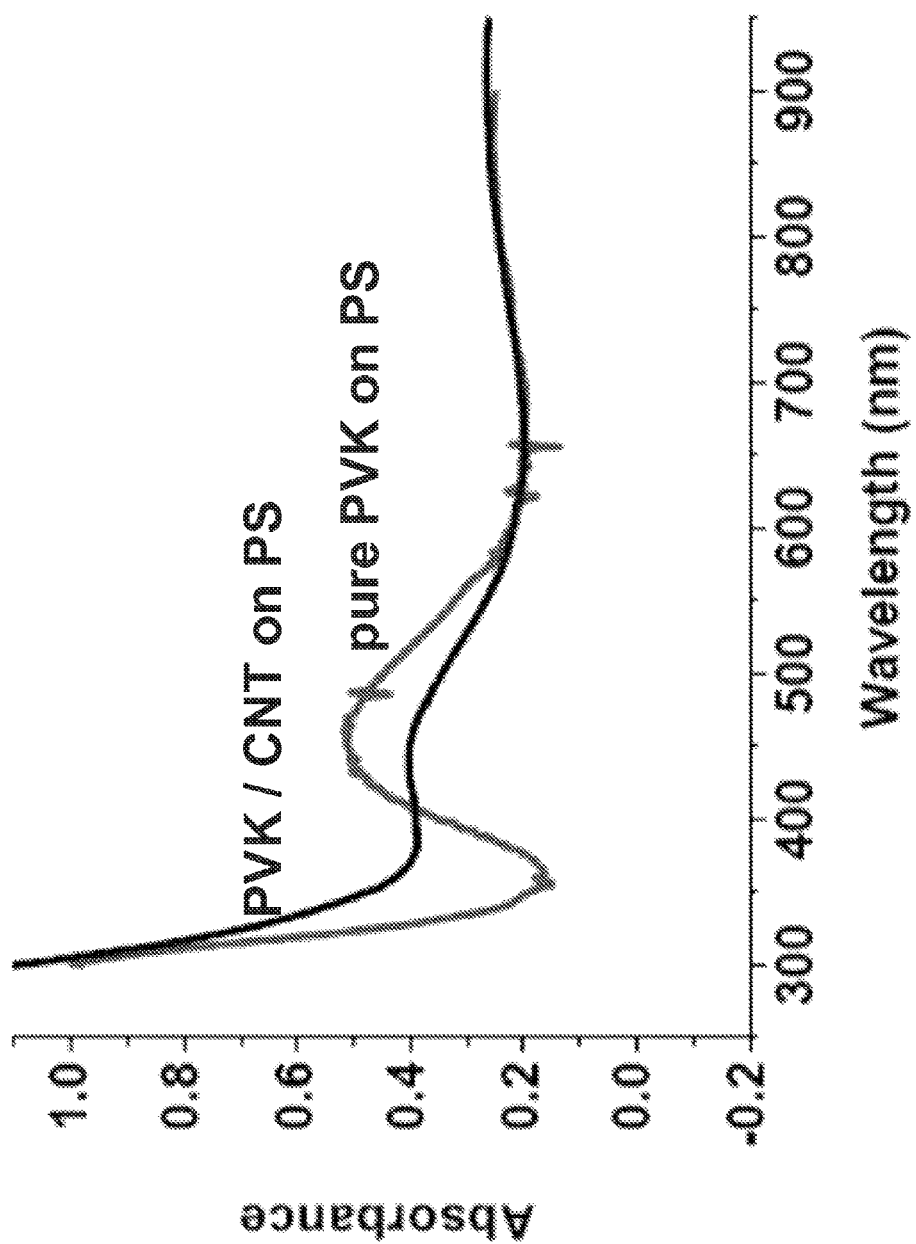
FIG. 29 depicts a UV-vis analysis of patterned surface for pure PVK and PVK/CNTs.

FIG. 28 shows the FTIR-ATR analysis of patterned surface for pure PVK and PVK/CNTs. The FT-IR-ATR spectra of electropolymerized pure PVK and PVK/MWNTs films on PS coated ITO glass substrate are shown in FIG. 28 ranging from 700 to 3500 cm$^{-1}$. The peaks of pure PVK are attributed to the following vibrations at 720 (ring deformation of substituted aromatic structure), 746 ($>CH_2$ rocking vibration due tail to tail addition), 1158 (out of plane deformation of vinylidene group and C—H in plane deformation of aromatic ring), 1224 (C—N stretching of vinyl carbazole), 1326 (—$CH_2$ deformation of vinylidene group), 1454 (ring vibration of n-vinyl carbazole), and 1603 cm$^{-1}$ (C=C stretching vibration of vinylidene group). However, the PVK/MWNTs on PS film material significantly changed bonds at 1329 and 1459 cm$^{-1}$. The addition of MWNTs in the PVK solution resulted to a new absorption band from 746 to 751 cm$^{-1}$, 1492 to 1481 cm$^{-1}$, and 1696 to 1720 cm$^{-1}$. The FTIR spectra of pure PVK and PVK/MWNTs patterned film show similar bands with a little variation in the stretching frequencies show that the film is successfully electropolymerized on PS patterned substrate. FIG. 29 depicts the UV-vis analysis of patterned surface for pure PVK and PVK/CNTs.

Figure 30:
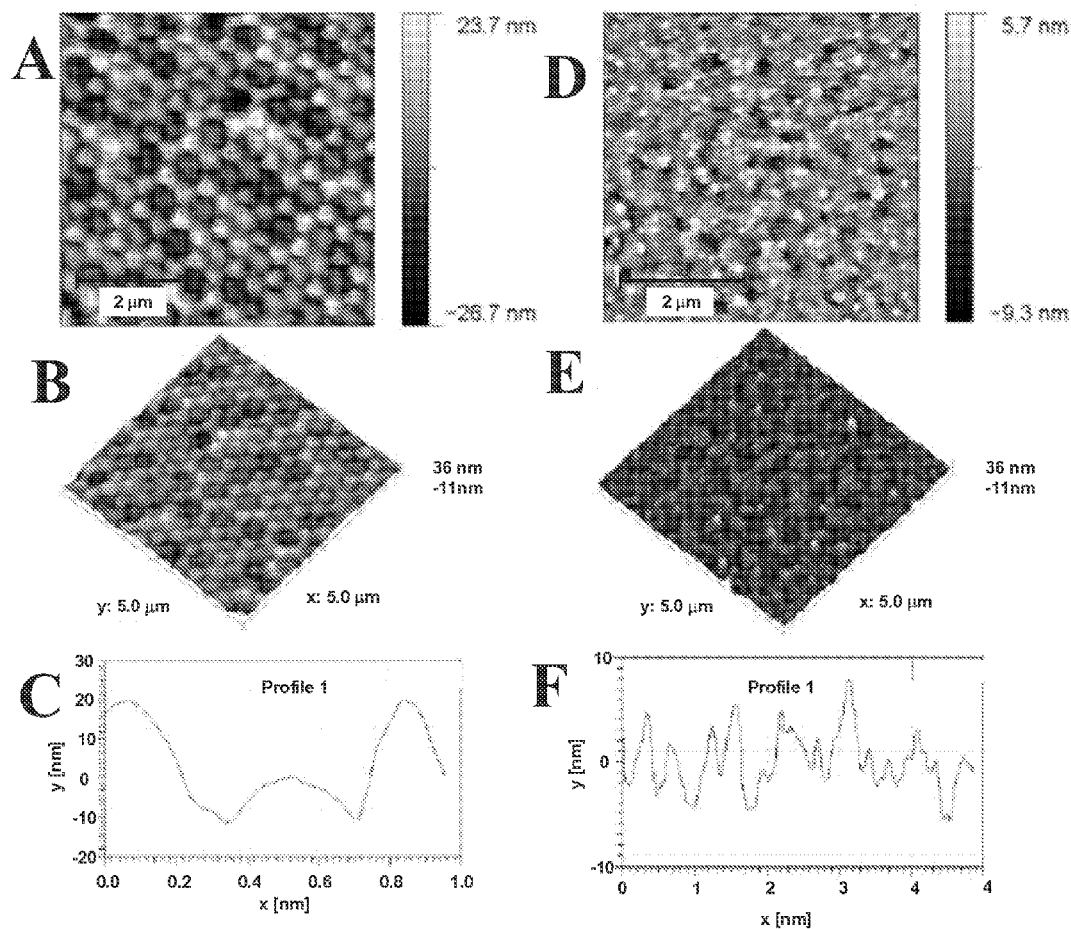
FIGS. 30A-F depict AFM (A,D) 2D-topography, (B,E) 3D-topography, and (C,F) line profile measurements of GO+PVK (A,B,C) patterned (using 500 nm PS particles) and (D,E,F) unpatterned surfaces. Note: CV deposition at 0V-1.5V, 25 mV/s, 50 cycles.

The patterning is extended to the use of GO and PVK nanocomposite. The same above fabrication scheme (FIG. 30) is applied but this time CV technique is only used for electrodeposition of the composite film. Likewise, a patterned surface of GO and PVK composite film is observed in the AFM topography 2D (FIG. 30A) and 3D (FIG. 30B)

images with a cavity dimension similar to the size of the PS particle (500 nm). The line profile (FIG. 30C) shows the height of the wall cavity that is equivalent to −30 nm. Upon electropolymerization of the same solution on bare ITO, an unpatterned composite film is formed that shows the same granular features (FIGS. 30d and 30e). The AFM cross sectional analysis of the topography image reveals a random profile due to composite film deposition onto the substrate (FIG. 30F).

Figure 31:
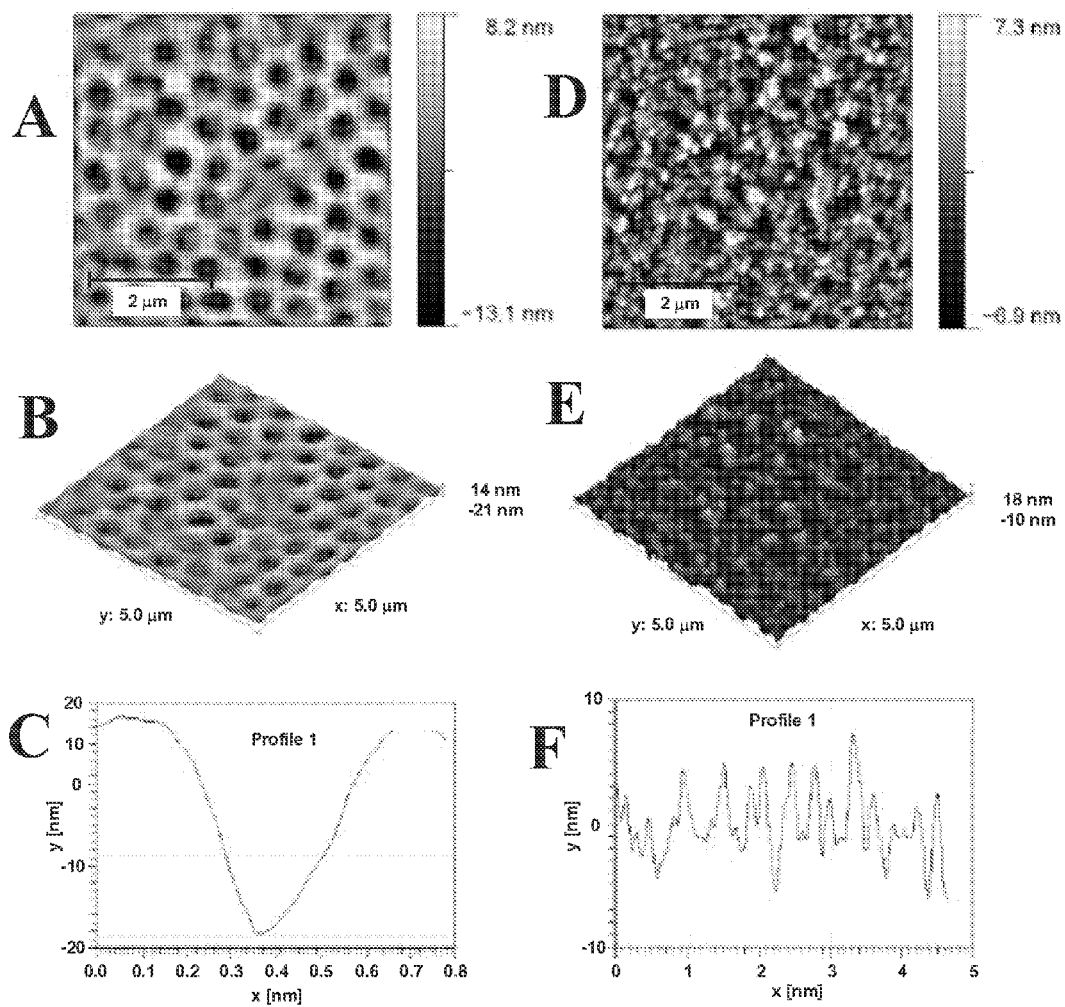
FIGS. 31A-F depict AFM (A,D) 2D-topography, (B,E) 3D-topography, and (C,F) line profile measurements of GO+PVK (A,B,C) patterned (using 500 nm PS particles) and (D,E,F) unpatterned surfaces. Note: CV deposition at 0V-1.5V, 10 mV/s, 2 cycles.

Varying the parameters for CV deposition changes the morphology of the pattern surface. For instance, the electrodeposition of the same GO and PVK solution but with different condition (10 mV/s, 10 cycles) disrupted the formation of a highly ordered triangular and periodic pattern. Instead, a macroporous network array of the composite film is formed (FIG. 31A and FIG. 31B). The height of the wall cavity is similar about −30 nm but the lateral dimension of the cavity has changed. The cavity has narrowed due to the formation of a thicker cavity wall (FIG. 31C). As expected, the electropolymerization of the same solution on bare ITO revealed an unpatterned surface of composite film (FIG. 31D and FIG. 31E) with the same granular features in nanometer sizes. A random profile (FIG. 31F) of the composite film is depicted in the AFM cross sectional analysis.

Figure 32:
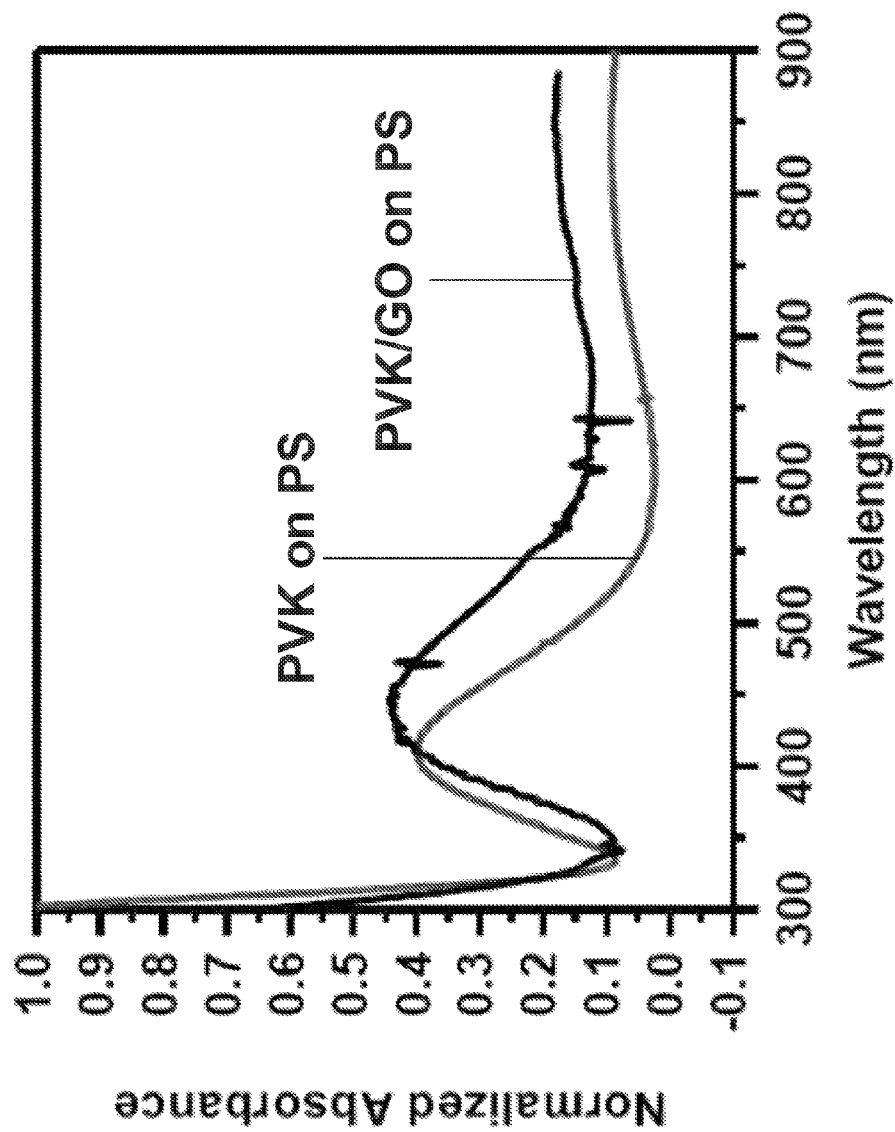
FIG. 32 depicts a UV-vis analysis of patterned PVK and PVK/GO nanocomposite film.

To confirm the PVK/GO nanocomposite films on the patterned surface UV-vis and FTIR-ATR analysis is done. The UV-vis absorbance after the electropolymerization shows a spectral difference which is due to the formation of conjugated oligocarbazole species. The band observed at 440 nm is consistent with the previous works on electropolymerized PVK CPN approach. The observed slight spectral red shift after cross-linking can be attributed to an increase in conjugation through the introduction of GO. FIG. 32 shows the UV-vis analysis of patterned PVK and PVK/GO nanocomposite film.

The FTIR-ATR spectra of PVK and PVK/GO nanocomposite film are presented in FIG. 33. The main peaks of pure PVK are attributed to the following vibrations at 741 ($>CH_2$ rocking vibration due tail to tail addition), 1159 (out of plane deformation of vinylidene group and C—H in plane deformation of aromatic ring), 1226 (C—N stretching of vinyl carbazole), 1328 ($>CH_2$ deformation of vinylidene group), 1488 (ring vibration of n-vinyl carbazole), and 1561 $cm^{-1}$ (C=C stretching vibration of vinylidene group). The peaks at 749, 1255, 1328, 1597 indicate the doped PVK and shift to 1335 when GO is introduced to the composites. This could be explained to the doping of the carboxyl acid of GO to the PVK backbone and pi-pi stacking of PVK and GO.

Note that the formation of the observed patterns and the resolution may vary as a function of the composition of the colloidal templating solution (dispersion of colloids and surfactants) and the electrochemical deposition parameters such as, but not limiting to the choice of the solvent, scan rate, number of cycles, concentrations of precursor polymer (or monomer), induction time, constant potential, substrate geometry, etc. Also as a matter of resolution and patterning, the templated or non-templated patterning method can be employed where the solution or the formation of such a pattern can be demonstrated using optimized solutions of the precursor and the particle (CNT or GO) in this embodiment. Other methods to achieve patterning include the use of surface probe microscopy (SPM), patterned electrodes, site-directed, site activated, and selectively addressable area patterning, or any other suitable method employing this precursor dispersion.

While the invention described here specifically relates to the design, fabrication, characterization, and use of new types of electrodeposited polymer coatings (soluble precursor conjugated polymer) that is co dispersed with a carbon nanotube (CNT) and/or graphene (G) or graphene oxide (GO) which is then electrodeposited by cyclic voltammetry (CV) or potentiostatic method to form thin films or patterns on surfaces, one of ordinary skills in the art, with the benefit of this disclosure, would recognize the extension of this approach to other types of electrodeposition process or chemical oxidative polymerization or chemical reductive polymerization processes and patterning. It should also be recognized that other forms of particles, nanoparticles, and filler materials-carbon or non-carbon where such a favorable precursor polymer solubilization and electropolymerizability is observed can be used as substitutes to achieve similar goals; those include but are not limited to carbon fibers, clay particles, metal particles, metal oxide particles, diatomaceous earth, carbon black, etc. It should also be recognized that other types of polymer precursors and combinations of polymer backbone and electropolymerizable monomers can be used as mean to prevent aggregation and/or lamination; those include but are not limited to polyolefins, polyacrylates, polymethacrylates, polyesters, polyamides, polyvinyl polymers, polystyrenes, polythiophenes, polypyrroles, polyphenylene, polyanilines, and others may be employed. In addition, other types of polymer structures may be used, including but not limited to linear, branched, star, graft, hyperbranched, dendrimeric can be employed, including copolymers. Electropolymerizable monomers such as include but are not limited to pyrrole, aniline, thiophene, oligomeric thiophenes, fluorenes, carbazole, oligomeric phenylenes, polyacenes, and others may be employed. It should be possible to further modify the electro-optical and thermo-mechanical properties by copolymers of the backbone or copolymerization with an electropolymerizable monomer.

The present invention is particularly well suited for the design, synthesis, characterization, fabrication and use of new conducting films, pressure-sensitive sensors, anti-static films, electrically conducting electrodes, transparent conducting electrodes, chemical sensors, pressure sensors, piezolelectric sensors, transducers, bio-sensors, thermo-resistive heating elements, anti-corrosion coatings, biocidal coatings, anti-microbial coatings, superhydrophobic coatings, superhydrophilic coatings, stimuli-responsive coatings, fluorescent coatings, self-cleaning coatings, membranes, electrochromic films, electro-wetting coatings or patterns, stimuli-responsive membranes, selective solvent separation, filtration, ink jet printing, on-demand delivery, selective wetting, and other applications involving the thermo-mechanical, optical, chemical, electro-optical, wetting, adhesion, and electrically conducting properties of these materials and their film/coating and pattern formation.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

Section II

PVK/MWNT Electrodeposited Conjugated Polymer Network Nanocomposite Films

Background of Section II

Polymer nanocomposites containing carbon nanotubes (CNTs) have received much interest due to its unique properties, such as high electrical conductivity, robust thermo-mechanical properties, and the potential to create new materials with improved characteristics coupled with a good chemical stability. The CNTs used for these nanocomposites could either be single-walled nanotubes (SWNTs) or multi-walled nanotubes (MWNTs), the latter being more commercially relevant. However, effective utilization of the excellent properties of CNT-based composites depends on the quality of their dispersion and the level of polymer/CNT interfacial contact through covalent or non-covalent interactions. The use of π-conjugated polymers provides a tailored structure to interact with CNTs by means of π-π electronic interactions, which promotes better dispersion of CNTs. It was also suggested that the enhanced solvating power of π-electron rich polymers for CNTs can be ascribed to the donor-acceptor mechanism, which results in the intimate contact of the polymer to the walls of the CNTs. The additive effects of these interactions lead to the wrapping of the polymer backbone around the sidewalls of the CNTs that causes its dispersion.

The formation of a homogeneous film of polymer/CNT nanocomposite has remained a great challenge because of the tendency of the CNTs to remain agglomerated. As the processing of CNT is generally hindered by their insolubility in most common organic solvents, only low weight/weight (w/w) or weight/volume (w/v) concentrations are usually obtained. For optimum transparent film preparation by casting, it is necessary to obtain a homogeneous dispersion of CNT in an organic solvent. One approach that has been commonly employed is the direct grafting of small molecules or polymers on the surface of the CNT, e.g. surface-initiated polymerization (SIP), but with a resulting disruption of the primary structure of the nanotubes. Another involves solution mixing methods of a dispersant polymer and CNT. This method is a convenient and facile route and is highly desirable because the surface of the CNT is preserved during the process (i.e. the dispersant is only non-covalently adsorbed on the CNT).

Detailed Description of Section II

The facile preparation of poly (N-vinyl carbazole) (PVK) and multi-walled carbon nanotubes (MWNTs) solution and conjugated polymer network (CPN) nanocomposite film is described. The stable solutions of PVK/MWNT were prepared in mixed solvents by simple sonication method, which enabled successful deaggregation of the MWNTs with the polymer matrix. MWNT was most effectively dissolved in N-cyclohexyl-2-pyrrolidone (CHP) compared to other solvents like N-methylpyrrolidone (NMP), dimethyl formamide, and dimethyl sulfoxide (DMSO). The solution was relatively stable for months with no observable precipitation of the MWNTs. Thermogravimmetric analysis (TGA) revealed the thermal stability of the nanocomposite while the differential scanning calorimetry (DSC) showed an increasing melting ($T_m$) and glass transition ($T_g$) temperatures as the fraction of the MWNTs in the nanocomposite was increased. Cyclic voltammetry (CV) allowed the electrodeposition of the nanocomposite film on indium tin oxide (ITO) substrates and subsequent cross-linking of the carbazole pendant group of the PVK to form CPN films. Ultraviolet-visible (UV-Vis), fluorescence, and Fourier transform infrared (FTIR) confirmed film composition while atomic force microscopy (AFM) revealed its surface morphology. Four-point probe measurements revealed an increase in the electrical conductivity of the CPN nanocomposite film as the composition of the MWNTs was increased: $5.53 \times 10^{-4}$ (3% MWNTs), 0.53 (5%), and 1.79 S cm$^{-1}$ (7%). Finally, the interfacial charge transfer resistance and ion transport on the CPN nanocomposite film was analyzed by electrochemical impedance spectroscopy (EIS) with a measured real impedance value of ~48.10Ω for the 97% PVK and 3% MWNT ratio of the CPN nanocomposite film.

The combination of the unique properties of CNT and organic polymers like poly(N-vinyl carbazole) (PVK) makes it an interesting composite material for the development of practical semi-conductor devices. PVK is well-known for its high chemical and thermal stability, photoconductivity, and opto-electronic properties, e.g. hole transporting properties. It has been established that CNT could exhibit an amphoteric behavior by exchanging electrons with electron acceptors or electron donors to form the corresponding positive or negatively charged counterions. Thus, the incorporation of CNT into the PVK matrix may be one of the interesting ways to extend the electro-optical properties of PVK and vice versa. Several studies have reported the preparation and characterization of different types of PVK/CNTs nanocomposites through chemical and electrochemical methods.

The use of PVK to form the polymer/CNT nanocomposite could not only contribute to the unique properties of the composite but could also serve as a precursor polymer to electrodeposit a homogeneous film of nanocomposite on conducting surfaces. We have reported a series of methods for depositing high optical quality ultrathin films of π-conjugated polymer network (CPN) system on a flat conducting substrate through the precursor polymer approach, including electro-nanopatterning. Combining this approach with the CNT nanocomposite film preparation would be of advantage since PVK can serve as both CNT dispersant and surface immobilizer at the same time.

Referring now the FIG. 34, a schematic representation describing CNT dispersion and CPN nanocomposite film formation is shown as Scheme 1.

Here, we report the preparation of PVK/MWNT nanocomposites by sonication-dispersion of the MWNTs with PVK in a mixed solvent, spin-coating, and subsequent electrodeposition on surface by cyclic voltammetry (CV) (Scheme 1). The latter procedure leads to the formation of a CPN nanocomposite film. The method for accomplishing this depends on an optimized dispersion of PVK and MWNT in a highly miscible solvent for both. This procedure involved a slow and continuous addition of dissolved PVK in a MWNT solution with the expectation that the PVK polymer chains would wrap around the MWNTs. These dispersions were then used to form spin-casted films that are electro-immobilized by CV to form cross-linked CPN nanocomposite films. The spectral properties of the PVK/MWNT nanocomposite were examined by UV-vis and fluorescence spectroscopy, while thermal properties were analyzed using thermogravimetric analysis (TGA) and differential scanning calorimetry (DSC). The formation of the PVK/MWNT nanocomposite film was investigated by CV, UV-vis spectroscopy, electrochemical impedance spectroscopy (EIS), ATR spectroscopy, and atomic force microscopy (AFM). Four-point probe test was also used to probe conductivity behavior of the prepared films.

Materials and Methods of Section II

Materials

The MWNTs (purity≥95%) used in this study were obtained commercially from Baytubes (C150 P). The prepared MWNTs from Baytubes were produced in a high-yield catalytic process based on chemical vapor deposition (CVD). The outer and inner diameter, length, and density of the MWNTs were 13 nm, 4 nm, 1 μm and 130-150 kg/m$^3$ respectively. The obtained MWNTs were further purified by heating at 200° C. for 6 hours prior to use. Poly (N-vinyl carbazole) (PVK) was purchased from Sigma-Aldrich Chemicals (USA) (ca MW=50,000 g/mol). All solvents were of analytical grade and used without further purification and purchased from Sigma-Aldrich Chemicals or VWR: N-cyclohexyl-2-pyrrolidone (CHP), N-methylpyrrolidone (NMP), dichloromethane (DCM), dimethyl formamide (DMF) and dimethyl sulfoxide (DMSO). Indium tin oxide (ITO)-coated glass plate (1 inch× 0.5 inch) was used as the substrate for PVK/MWNT nanocomposites and CPN film fabrication. The ITO-coated glass plates were cleaned by sequentially sonicating the plates in deionized water, isopropanol, hexane and toluene, each for 15 min and the substrates were dried in an oven. The ITO-glass substrates were plasma cleaned for 3 minutes prior to their use.

Synthesis of PVK/MWNTs Nanocomposites

The PVK/MWNTs nanocomposites were prepared using a solution mixing process. In a typical dissolution experiment, separate solutions of PVK in DCM and MWNTs in CHP with weight/volume (mg/mL) (w/v) concentration were first prepared. The purified MWNTs (5 mg/mL) was dissolved in CHP and ultrasonically agitated for 4 hours. The PVK was dissolved in DCM using a sonication process for 30 minutes to disperse the PVK in the solvent. An appropriate amount of the PVK solution was slowly mixed to the MWNTs solution, which was followed by 1 hour sonication. The PVK/MWNT dispersion was subjected to a high-speed centrifugation (4400 rpm, 1 hour) and the black precipitate (mostly aggregates of MWNTs) obtained after centrifugation was removed. Methanol (5 mL) was then added to the remaining solution of the PVK/MWNTs dispersion. The mixture was then again placed in a high-speed centrifugation (4400 rpm, 30 minutes) and another batch of black precipitate was obtained. From the initial mass of PVK and MWNT used and the small amount of MWNTs that were removed after sonication/centrifugation, the final mass ratio of PVK to MWNT is 1:1. The above PVK/MWNTs precipitate was redispersed in CHP (mg/mL) followed by 20 minutes of ultrasonication which produced a very stable PVK/MWNT solution.

PVK/MWNTs Nanocomposites Film Fabrication

The PVK/MWNT nanocomposite solution was spin-coated on ITO substrate prior to its electrodeposition on the substrate. The spin-coating speed was decided depending on the viscosity of the prepared solutions. In a typical run, a thin PVK/MWNT film was spin-coated onto the ITO surface at a rate of 500 rms for 60 seconds and 1500 rms for 30 seconds consecutively to deposit a film on the ITO substrate surface. After spin-coating deposition, the PVK/MWNT nanocomposite films were thoroughly dried in vacuum oven for 24 hours at 70° C. to remove any solvent.

After the deposition of the PVK/MWNT film through spin-coating, the film was electrochemically crosslinked using CV. CV experiments were carried out on a Princeton Applied Research Parstat 2263 using a three-electrode set-up from a solution of 0.1 M LiClO$_4$ dissolved in acetonitrile (ACN). The coated ITO glass substrate was used as the working electrode (WE), Pt wire as the counter electrode (CE), and Ag/AgCl as the reference electrode (RE). Electrochemical cross-linking of PVK and MWNTs nanocomposite film was accomplished by repeatedly cycling an electrode potential between the potential range of 0 to 1.4 V for up to 50 cycles at a potential scan rate of 50 mV/s. The highly crosslinked nanocomposite film was thoroughly washed with ACN and was dried in nitrogen before its analysis.

Characterization of PVK/MWNT Nanocomposites and Films

All UV-vis spectra of the PVK/MWNT nanocomposite films and solutions were recorded using an Agilent 8453 spectrometer. Fluorescence spectra were obtained on a Perkin-Elmer LS-45 luminescence spectrometer. Thermal stability measurements of the prepared PVK/MWNT nanocomposites were performed using thermogravimetric analysis (TGA). The samples were heated from 20 to 900° C. at a heating rate of 20° C./min on a TA Instruments 2950 thermogravimetric analyzer. All experiments were operated under a $N_2$ atmosphere at a purge rate of 80-90 mL/min. DSC measurements were carried out on all samples from 20 to 600° C. at a heating rate of 20° C./min. TGA and DSC data were analyzed using TA Instruments' Universal Analysis software.

Attenuated total reflection (ATR) spectra were obtained using an FTS 7000 Digilab Spectrometer within the 700-4000 cm$^{-1}$ range in multiple ATR geometry at the surface of the waveguide prism equipped with a liquid $N_2$-cooled MCT detector. The morphology before and after the electrodeposition of the PVK/MWNT nanocomposite on ITO substrates were characterized by atomic force microscopy (AFM). AFM imaging was done under ambient conditions with a Pico SPM II (PicoPlus, Molecular Imaging—Agilent Technologies) using an intermittent contact mode. Scanning Electron Microscopy (SEM) was also used to determine the surface morphologies of the PVK/MWNT nanocomposite films. The micrograph images were observed by performing SEM investigation on a LEO 550 scanning electron microanalyzer. Silver sputtering of PVK/MWNT nanocomposite films were done using a silver coater to enhance the conductivity of the sample. Afterwards, it was placed on copper stubs with carbon tape. The microscope chamber was maintained at a pressure below 10$^{-6}$ Torr. The SEM filament was set at a voltage of 10 kV and a current of 5 nA using 200K× magnifications. The water contact angle of the films was measured using a KSV CAM 200 instrument utilizing a bubble drop method with water.

Electrochemical impedance spectroscopy (EIS) (Princeton Applied Research Parstat 2263) was used to investigate the ion-transport and dielectric/impedance properties of the PVK/MWNT nanocomposite and crosslinked PVK/MWNTs CPN films. EIS measurements were performed under an open circuit potential in an AC frequency range from 100,000 to 0.01 Hz with an excitation signal of 5 mV. All electrochemical experiments were carried out at room temperature. The DC conductivity of the PVK polymer alone and PVK/MWNT nanocomposite films were measured by an Alessi four-point probe method at room temperature (Keithley 2400). For the four-point probe test, a fixed current is injected into the substrate through the two outer probes and a voltage is measured between the two inner probes. The measured resistances were converted into conductivity by multiplying the constant 4.532. The product is the sheet resistance in/square of the film being measured. The calculated sheet resistance was multiplied by the film thickness to get the conductivity of the prepared film. The data were represented by mean measurement values from at least 10 trials for every sample.

Results and Discussion of Section II

Solution Characterization and Mixing Optimization

Figure 36B:
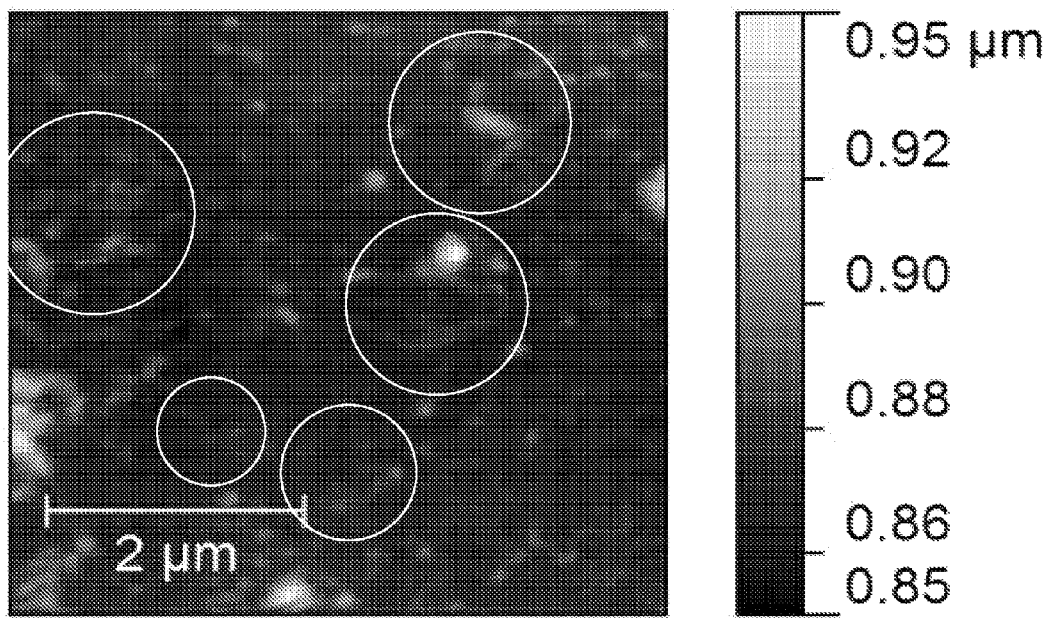

CNTs have unique structural, mechanical, thermal and electronic properties, and have extensive applications in many fields. However, the manipulation and processing of CNTs have been limited by their insolubility in most common organic solvents and their tendency to aggregate. UV-vis spectroscopy was first employed to gain insight on the developed solution-mixing and sonication method to disperse the MWNTs as visual-optical inspection of dispersions only indicates the presence or absence of particles that are larger than 10 The UV-vis spectra were obtained under identical conditions and were diluted by the same factor so that qualitative comparisons between the different solvents could be made. The UV-vis absorbance of MWNT solutions using different solvents is presented in FIG. 35A. All the solutions had the same starting concentration of MWNTs and the observed increase in absorbance indicates an increase in concentration of the unbundled MWNTs remaining in the solution after the sonication/centrifugation process. Different organic solvents (CHP, NMP, DMF and DMSO) demonstrated stable dispersions of MWNTs. From the UV-vis spectra (FIG. 35A), however, it can be observed that CHP exhibited the highest absorbance as compared to NMP, DMF, and DMSO, signifying that CHP would be the best suitable solvent for the dispersion of MWNTs. The AFM image of the spin-casted solution of MWNT/CHP on mica depicts the de-aggregation of the individual MWNT as shown in FIG. 35B, while FIG. 36 shows the same process for MWNT in CHP before and after sonication for comparison.

The sonication process has been proven to be necessary in dispersing MWNTs in a solvent. However, excessive sonication has been reported to damage and cut the MWNTs. To monitor the dispersion as a function of sonication time used in this work, UV-vis spectroscopy was also carried out as a function of time. With the increasing sonication time up to 4 hours, the intensity of the whole spectral region increased and the dispersion of MWNTs became better (data not shown). Increasing the sonication time to 5 hours, showed no significant difference in the absorbance as compared to 4 hour sonication, which indicates that the concentration of the unbundled MWNTs in the solution approaches the solubility limit at this period. The SEM (FIG. 37) and AFM analysis of the dispersed CNTs (FIG. 35B) showed disentangled and long CNTs indicative that after sonication cutting was not observed in MWNTs (also FIG. 36). Upon monitoring the absorbance of the sonicated MWNT in CHP for 4 h, it was observed that the dispersion was stable only up to 10 days (see FIG. 38) where the absorbance decreased after 11 days due to aggregation.

It has been identified that one of the most promising approach to effectively disperse CNTs is through its functionalization with polymers that could prevent its agglomeration. However, this approach requires several tedious synthetic steps. The dispersion of MWNTs in PVK solution is an attempt to increase the solubility of MWNTs without going through the surface functionalization route but to induce adsorption through the wrapping of the PVK chains on the MWNTs. The polymer as a dispersant is usually more effective for MWNTs in organic solvents compared to small molecules or monomers. In this case, the carbazole units are expected to have better $\pi$-$\pi$ stacking properties on the benzenoid rings of the MWNTs surface and should have greater compatibility in terms of electro-optical properties. Thus, the dispersion containing well-dispersed and exfoliated MWNTs should lead to the preparation of PVK/MWNTs nanocomposites through a strong $\pi$-$\pi$ stacking interaction. One critical element is the formation of a homogeneous PVK/MWNT solution. The UV-vis of the PVK/MWNT nanocomposite in different organic solvents (CHP, DMSO, DMF, and NMP) are presented in FIG. 39, showing distinct peaks between 320 and 350 nm assigned to the $\pi$-$\pi^*$ and n-$\pi^*$ band of the carbazole moieties in PVK, which were not found in the MWNT solutions alone (FIG. 35A). From the previously described, CHP is the most effective solvent for the MWNTs. CHP is also miscible with DCM, which is a good solvent for PVK. By first preparing separate solutions of the MWNTs in CHP and PVK in DCM, relatively high concentrations of each component can be made. The solution composed of MWNTs, PVK, and the two miscible solvents was also aided by sonication, which plays a significant role in improving the interaction between the MWNTs and PVK. The homogeneity of the solution was proven by the clear and stable solution in mixed solvents (see FIG. 40). A possible explanation for the stable dispersion of MWNTs in the mixed solvent of CHP/DCM is that the PVK polymer chains are adsorbed to the MWNTs sidewalls due to strong $\pi$-$\pi$ electronic interactions between the aromatic pendants and the MWNTs surfaces. Another reason is the donor-acceptor interaction between the PVK (donor) and the MWNTs (acceptor). These interactions keep the MWNTs from its aggregation. Furthermore, the affinity of the polymer chains with the solvent leads to a more dispersed MWNTs in the organic solvents as presented in FIG. 40. The solution was stable for months without MWNTs precipitating out, which indicates effective solubilization of MWNTs by using PVK as the dispersant. The absorbance of PVK/MWNTs solution as a function of days was found to be stable even after 90 days of incubation of the prepared solution. The PVK/MWNTs nanocomposites also showed a good dispersion with other organic solvents (see FIG. 41).

The dispersion of PVK/MWNTs in mixed solvent system was affected not only by sonication time but also by the percentage weight of the final PVK/MWNTs solutions. The different percentages of MWNTs in PVK (3, 5, and 7%) were investigated in terms of dispersion and adherence on ITO glass substrate using the spin-coating technique as discussed in the next sections.

Analysis of the PVK/MWNT Nanocomposites in Solid-State or as Bulk Material

Figure 42B:
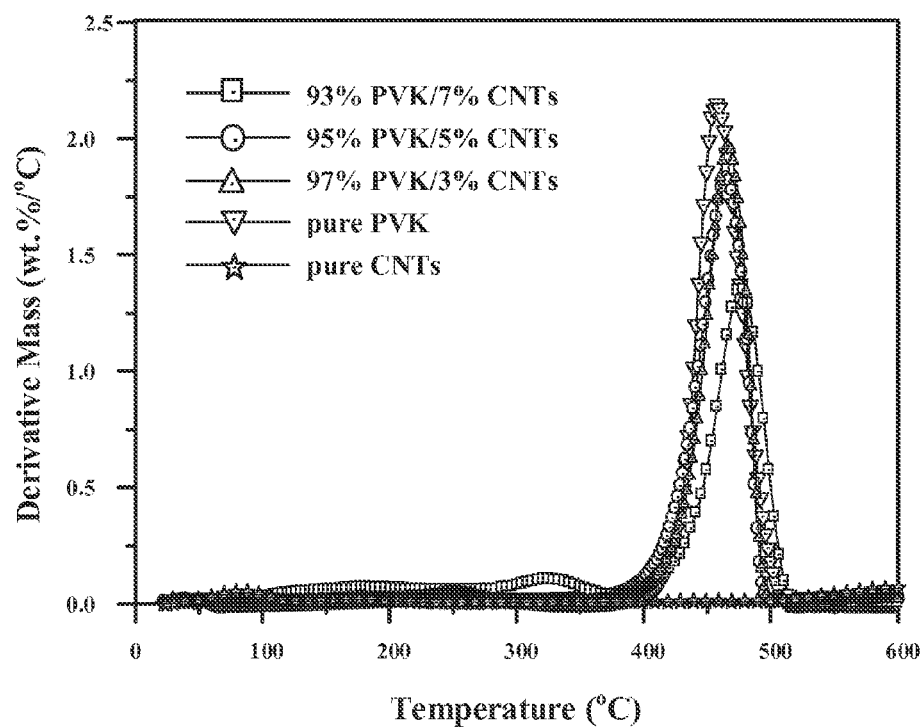

To confirm the formation (mixing) and the macromolecular interactions of the PVK/MWNTs solutions, TGA and DSC analyses of pure MWNTs, pure PVK, and different ratios of the PVK/MWNTs were conducted. The TGA thermograms of the pure MWNTs, pure PVK and different ratios of PVK/MWNTs nanocomposites were recorded under $N_2$ atmosphere scanned in the range of 20-900° C. (FIG. 42A). The TGA thermogram of pure PVK exhibited 2 degradation steps. The 1st degradation step takes place at 260° C. and then the polymer showed a fast 2' degradation step reaching a 98% weight loss at 408° C. and almost total degradation at 455° C. It is evident in the graph that the pure MWNTs exhibited a higher stability showing only a 2% weight loss even after heating the composite to 500° C. For the 3 different compositions of PVK/MWNTs nanocomposites, the temperature of the distinct weight loss is lower compared to the pure PVK. The 7% MWNTs in PVK showed a lower % weight loss at 490° C. as compared to the two other ratios (5% and 3% MWNTs in PVK), which is attributed to the presence of more thermally stable MWNTs. It should be noted that the decrease in the % MWNTs leads to more weight loss due to the higher composition of more degradable PVK at this temperature range. The first derivative TGA (dTGA) curves of various samples are also shown in FIG. 42B. The dTGA curves were added to identify the point where significant weight loss is most apparent. From the dTGA curves, it can be seen that there is a shift to higher degradation temperature for the PVK/MWNTs nanocomposites as compared to the pure PVK. Polymer chains near the nanotubes may degrade more slowly, which helps to shift the decomposition temperature to higher values. Another possible reason is the increased thermal stability of the polymer composite due to the higher thermal conductivity of MWNTs that facilitates heat dissipation within the composite. An improvement of the thermal stability can be associated with a better dispersion of MWNTs, since it hinders the flux of decomposition product and thus delay the decomposition. It is important to point out that the difference in extent of interaction between pure PVK and PVK/MWNT nanocomposites could be responsible for the higher thermal stability of the composites, i.e. the addition of MWNTs in PVK improves thermal stability to degradation as compared to PVK alone.

Figure 43B:
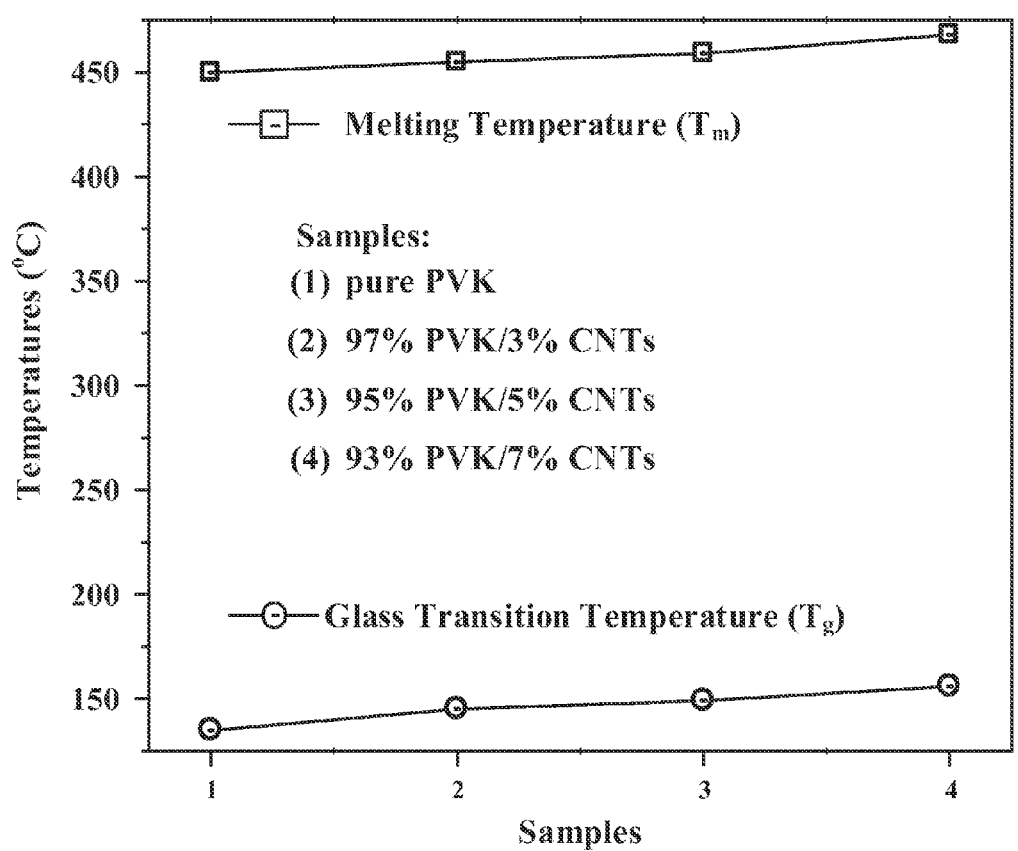

To understand the difference in behavior of the nanocomposites as compared to pure PVK with respect to temperature, DSC analysis was also performed. FIG. 43 shows the DSC traces of pure MWNTs, pure PVK and PVK/MWNTs nanocomposites. For pure PVK, the glass transition temperature ($T_g$) was observed at around 190° C. while the melting temperature ($T_m$) is found at 420° C. The introduction of MWNTs into the PVK polymer matrix leads to an increase in the $T_g$ and $T_m$, which could be due to high interfacial area of interaction between MWNTs and PVK that may lead to the decrease in the mobility of the outer polymer chain segments due to steric hindrance. This observation also presents further evidence of the wrapping around of the PVK chains to the MWNTs.

Figure 45B:
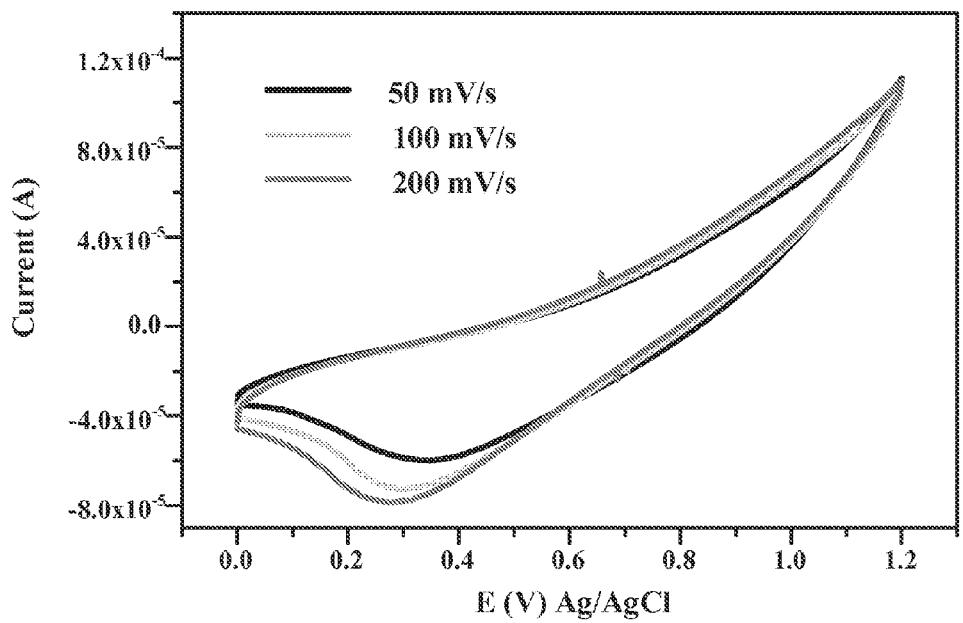

Electrochemical Deposition and Characterization of the PVK/MWNTS Nanocomposite Films and CPN Nanocomposite Films CV electrodeposition, cross-linking and characterization of the prepared PVK (control) and PVK/MWNTs nanocomposite films were done in 0.1 M $LiClO_4$ in ACN with potential scans between 0-1.2 V. The prepared solutions were spin-casted on the ITO-glass and Au substrate to directly measure the thickness of the film. Note that the spin-coated films are insoluble to ACN. The electrochemical crosslinking of the carbazole moieties was executed by employing CV. The reaction proceeded via a radical cation mechanism, typical of carbazolic moieties. FIG. 44 shows the cyclic voltammograms of pure PVK and PVK/MWNTs films scanned at different scan rates. For pure PVK (FIG. 44A), an oxidation peak at about 0.9-1.0 V and a reduction peak at 0.7 V were observed in the voltammogram, which suggest the formation of the of carbazolylium radical cation, and a cross-linked material having more $\pi$-conjugated species compared to the PVK precursor. This result essentially represents the formation of a CPN control film. The scan rate dependence studies for PVK/MWNTs with different weight % at scan rates 50-200 mV/s is shown in FIG. 45. The current of the oxidation/reduction peaks were dependent on scan rates in the range of 50-200 mV/s. The electron transfer rate depends on the electron transfer resistance across the electrode/conductive polymer/electrolyte layer model. The shapes of the voltammogram were clearly different when the MWNTs were present together with the electrochemically cross-linked PVK. A downshift in the reduction peak was observed for PVK/MWNTs which could be due to the doping behavior of the negatively charged MWNTs. No prominent anodic peak was observed regardless of the number of cycles employed as deposited in ITO glass substrate. The electrochemical cross-linking of PVK and MWNTs carried out at different scan rates shows a good correlation with the cathodic peak current and voltage scan rate indicating that the electron transfer is diffusion controlled. The electron transfer rate depends on the electron transfer resistance across the electrode/conductive polymer/electrolyte layer model. The PVK/MWNT CPN film exhibited a good linear relationship I and $v^{1/2}$. The slope of the plot is relative to the number of electrons in unit volume (n, $cm^{-3}$), diffusion coefficient (D, $m^2/s$), and the concentration of electrolyte ions ($C_0$, $mol/cm^3$), as indicated in Cottrell equation:

$$I(t) = NFAD^{1/2}C_0/\pi^{1/2}t^{1/2}$$

Figure 46B:
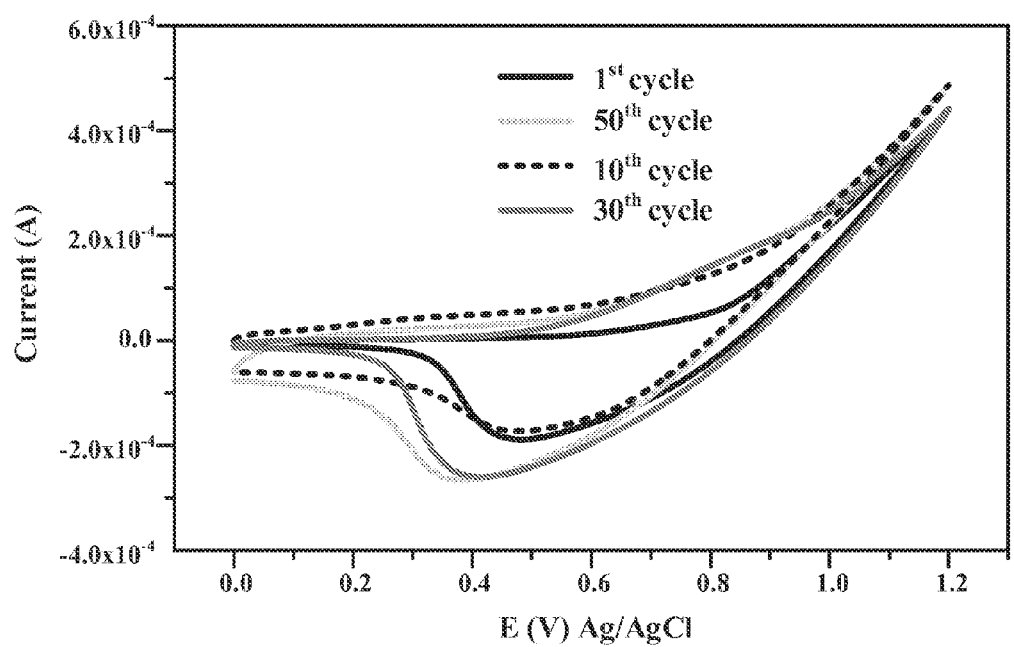

The observed correlation is in agreement with the EIS analysis as will be discussed further. FIG. 46 also shows that with increasing number of cycles, a gradual shift in peak potentials for the reduction peaks is indicative of the doping role of MWNTs, which would assume a negative charge. Such a downshift in the cathodic peak could be due to the doping role of MWNTs, which are known to be amphoteric in character (can be doped with either electron donor or acceptor). Taking into account this observation in the CPN nanocomposite films, in which the PVK act as electron donor and MWNTs acts as the electron acceptor.

Electrochemical Impedance Spectroscopy of the PVK/MWNTs and CPN Nanocomposite Films EIS is a well-established and powerful tool for investigating interfacial charge-transfer in films. It is also useful for investigating ion-transport phenomena. The charge-transfer in nanocomposites can occur at both the interface between the PVK and MWNTs and the PVK and the electrodes used. To evaluate variations in interfacial properties of PVK/MWNTs, the qualitative differences in impedance spectra according to the different ratios of the MWNTs in PVK polymer matrix was considered. The equivalent circuit model for the working electrode employed and the physical significance of the components are presented in FIG. 47 (inset graph). The equivalent circuit for this state is based on the modified Randles circuit, wherein the sum of the electrolyte resistance and polymer electronic resistance, $C_{dl}$ electrolyte interface, $R_{ct}$, the charge-transfer resistance and $Z_d$ a complex circuit element is included. In this case, $R_{film}$ is attributed primarily to charge transfer resistance. A 45° slope in the Nyquist plot as the percentage of MWNTs in the composite increases the signal in the presence of a Warburg element ($Z_d$), which represents diffusion mass transport. At low frequencies it is possible to estimate the faradaic pseudocapacitance (redox) which is associated with the capacitive behavior of a film. The physical origin of $C_{dl}$ means that its magnitude increases with the quantity of electroactive material deposited in the substrate. As presented in FIG. 47A, in spite of the similar shape of the impedance spectra, an obvious difference in the diameters of the semicircles which corresponds to the electron transfer-limited process measured at higher frequencies, the $R_{ct}$ of PVK/MWNTs nanocomposites decreases as the loading of the MWNTs increased. The spectra proved that the formation of the charge-transfer complex of PVK/MWNTs nanocomposite occurs and that charge-transfer flows through the film. The complex plane impedance plots produced from the analysis of PVK/MWNTs CPN nanocomposite films are also presented in FIG. 47B. The intercepts of the pure PVK and CPN nanocomposites film with the real impedance 55.78 and for 97% PVK/3% MWNTs is 48.10. This result shows that the CPN nanocomposite film is 7.68 less resistive than pure PVK. While this result is in agreement with a conductive contribution from the addition of MWNTs, this decrease in resistance could also be due to the formation of a-conjugated CPN between the nanotubes and PVK polymer chains.

Spectroscopic Analysis

Figure 48B:
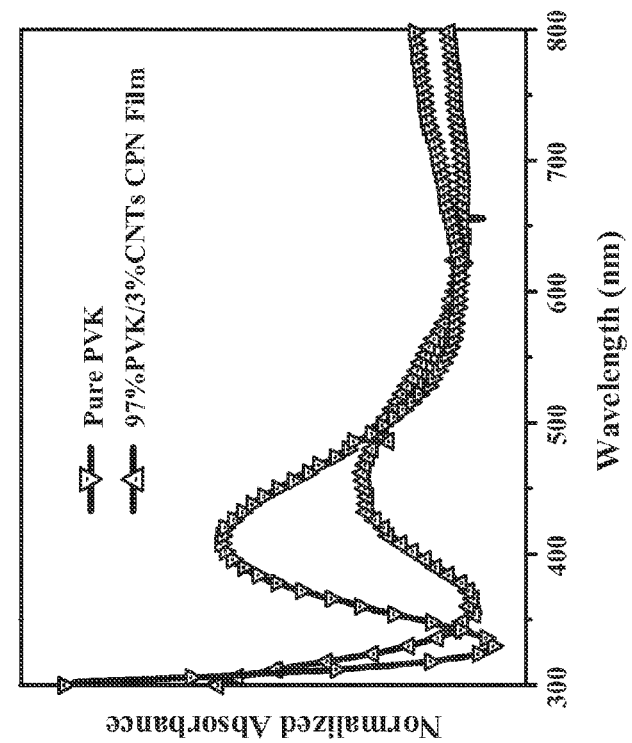

UV-visible spectra were used to characterize the interfacial interaction between the PVK/MWNT nanocomposite films and after the CPN nanocomposite film formation. As expected, no absorption peaks at the visible region of the electro-magnetic spectrum were observed for pure MWNTs, similar to the observation in solution. For the spin-casted nanocomposite film (FIG. 48A), the main absorption bands occur at 331 and 345 nm, indicative of the $\pi$-$\pi$* and n-$\pi$* attributed to optical transitions in pendant carbazole moieties of PVK. It can be seen from the spectra that the main absorption peaks for pure PVK is still prominent for the PVK/MWNTs nanocomposite. There is also a slight red shift of ~5 nm in wavelength when MWNTs is incorporated in PVK (FIG. 48A). This shifting maybe attributed to the lowering of energy due to the electronic interaction between the PVK and MWNTs. The UV-vis absorbance after electrochemical crosslinking showed a different spectra due to the formation of $\pi$-conjugated oligocarbazole species (FIG. 48B). The defined peaks for spin-coated PVK/MWNT film before cross-linking at 331 and 345 nm disappeared and a new band was formed at 440 and 760 nm, which corresponds to the polaronic and bipolaronic carbazole species. The observation is consistent with previous works on electropolymerized PVK with the CPN approach. The observed spectral red shift for the PVK/MWNTs CPN nanocomposite film after cross-linking can be attributed to an increase in $\pi$-conjugation and aided by the presence of MWNTs (serving as electron acceptor). Clearly further studies by spectro-electrochemistry will also be useful.

The fluorescence spectra of the films were also obtained using an excitation wavelength of 300 nm (see FIG. 49). From all the prepared films, the peak for PVK is clearly evident even in the nanocomposite films. It is known that PVK fluorescence spectra are broad and structureless, which is the case observed from the spectra. The broad peak observed is a combination of the two emissions from the radioactive decay of two spectrally distinct excimers. The wavelength emission at 375 nm corresponds to the partially eclipsed configuration of the PVK (i.e. only one carbazole moiety is aligned with the polymer backbone or between adjacent chains). On the other hand, the peak at 420 nm is attributed to the totally eclipsed conformation of the carbazole pendants (i.e. carbazole groups are aligned face-to-face in adjacent positions along the polymer backbone).

ATR-IR Spectroscopy

IR spectroscopy is an important tool for confirming the presence of the components in the nanocomposite film. The ATR spectra of pure MWNTs, pure PVK and 97% PVK/3% MWNTs CPN films spin-coated in ITO glass substrate are shown in FIG. 50. The presence of interactions in the nanocomposite would shift the frequency of C—H stretching vibration of the polymer. For pure MWNTs, the peak at 1630 cm$^{-1}$ is due to the C=C stretch mode in the MWNTs. The main absorption peaks of pure PVK structure are shown at the following characteristic bands at around 700-800 cm$^{-1}$ (out-of-plane —C—H aromatic), 1100-1150 cm$^{-1}$ (in-plane —C—H aromatic), around 1600 cm$^{-1}$ (C=C stretching), 2900 cm$^{-1}$ (aliphatic C—H stretching), and 3050 cm$^{-1}$ (aromatic C—H stretching). The peaks of pure PVK are attributed to the following vibrations: at 720 cm$^{-1}$ (ring deformation of substituted aromatic structure), 744 cm$^{-1}$ (—CH$_2$ rocking vibration due to tail-to-tail addition), 1159 cm$^{-1}$ (out-of-plane deformation of vinylidene group and C—H in plane deformation of aromatic ring), 1220 cm$^{-1}$ (C—N stretching of vinyl carbazole), 1326 cm$^{-1}$ (>CH$_2$ deformation of vinylidene group), 1459 cm$^{-1}$ (ring vibration of n-vinyl carbazole), and 1626 cm$^{-1}$ (C=C stretching vibration of vinylidene group).

However, for the 97% PVK/3% MWNTs electropolymerized CPN film material, the peaks significantly changed at 744 and 1459 cm$^{-1}$. The addition of MWNTs in the PVK solution resulted to a new absorption band from 744 to 749 cm$^{-1}$, 1459 to 1449 cm$^{-1}$, and 1626 to 1620 cm$^{-1}$. The FTIR spectra of pure PVK and PVK/MWNTs CPN film show similar bands with a little variation in the stretching frequencies. The shift in the peak region between 700-1600 cm$^{-1}$ is related to the change in the structure of the polymer upon the addition of the MWNTs.

Electrical Conductivity

One of the important methods to compare the state of nanotube dispersion at a given concentration is through electrical conductivity measurements on films. The conductivity of pure PVK, and PVK/MWNTs CPN nanocomposite films at various compositions were measured using the four point probe conductivity test. For the four-point probe test, a fixed current is injected into the substrate through the two outer probes and a voltage is measured between the two inner probes. The measured resistances were converted into conductivity by multiplying the constant 4.532. The product is the sheet resistance in/square of the film being measured. The calculated sheet resistance was multiplied by the film thickness to get the conductivity of the prepared film. The measured conductivity is summarized in Table 2. A key issue in producing superior PVK/MWNTs nanocomposites is the ability to control deagglomeration and dispersion of MWNTs in PVK matrices which are directly correlated with the achievable conductivity. The conductivity of PVK was about $10^{-12}$ to $10^{-16}$ S/cm, whereas with increasing MWNTs level, the conductivity increases. Dispersing the conducting filler, MWNTs in the polymer matrix forms a conductive polymer nanocomposite. The prepared CPN nanocomposite films of compositions 97% PVK/3% MWNTs, 95% PVK/5% MWNTs, and 93% PVK/7% MWNTs show conductivity values of $5.53 \times 10^{-4}$, 0.53, and 1.79 S/cm which clearly shows a remarkable increase in conductivity. This increase in conductivity could be due to the formation of an interconnected network of MWNTs with the PVK matrix which then permits a very high percentage of electrons to flow through a conductive path in the PVK/MWNT composite film. However, by increasing the concentration of MWNTs in PVK solution to 9% by weight, the MWNTs started to agglomerate (data not shown). Insulating polymers are transformed to conductive composites by addition of MWNTs above a critical concentration or percolation threshold. When the positions of MWNTs in the polymer matrix form a conducting film, the conductivity of nanocomposites greatly increased, this may be due to the formation of a percolating network. Percolation means that at least one pathway of connected MWNTs exists in the sample which in case of conductive fillers allows the charge to flow through the sample. In conductive fillers like MWNTs, electrical measurements are suitable to detect the percolation composition. In this study, the percolation threshold was determined to be in the range of 3% to 5% MWNTs. In this range the conductivity shows a high increase and the composites with MWNTs content higher than 5% weight can be regarded as electrically conductive. These values indicated that in the presence of 5% MWNTs in the PVK matrix is enough to form a network of conductive path. Above the percolation threshold concentration, 3% MWNTs independent fillers tend to link together to form conductive networks which led to a significant increase in the conductivity of the prepared CPN nanocomposite films. The role of the CPN of the PVK is clear in comparison to the PVK alone.

TABLE 2

The DC Conductivity of Pure PVK and Various PVK/MWNTs CPN Nanocomposite Film Compositions as Measured by the Four-point Probe Technique

| Sample | Measured Conductivity (S/cm) |
| --- | --- |
| (1) Pure PVK | $1 \times 10^{-12}$ |
| (2) 97% PVK/3% MWNTs | $5.53 \times 10^{-4}$ |
| (3) 95% PVK/5% MWNTs | 0.53 |
| (4) 93% PVK/7% MWNTs | 1.79 |
| (5) 91% PVK/9% MWNTs | 1.64 |

*Note:
Mean conductivity at 10 measurements per sample.

The conductivity study of the nanocomposites shows that better dispersion of MWNTs in the polymer matrix greatly enhanced the conductivity. The absence of MWNTs sidewall damage and improved percolation in PVK/MWNTs CPN nanocomposite films led to an improvement in its electrical conductivity. Hence, this study suggests an effective way to improve dispersion of MWNTs into PVK matrices and also retain the electronic structure of MWNTs that could be used in various functional materials and coatings. In principle, utilizing single walled nanotubes (SWNT) should even show a more remarkable change in conductivity and electro-optical properties assuming the same dispersion qualities.

AFM Imaging

AFM is a very useful tool for investigating the morphology of the modified surfaces because it provides spatial resolution, film topology, and nanostructure formation. The surface topography of PVK/MWNTs nanocomposites in terms of roughness values of the interfaces can also be analyzed by AFM. FIG. 51 shows the topographies of PVK/MWNTs nanocomposite films deposited using spin casting in ITO glass substrate before and after electrochemical crosslinking. The 97% PVK/3% MWNTs nanocomposite film (FIG. 51A) showed elongated globular clusters that can be attributed to the presence of MWNTs (3% with respect to the composition of PVK) with rms value of 3.11 nm. This result suggests a homogeneous wrapping of MWNT within the PVK polymer matrix is achieved, especially at the 97% PVK/3% MWNTs composition since no domains of MWNT were observed. The measured water contact angle was found to be 53.30°±0.6 in water. The PVK/MWNTs CPN nanocomposite film (FIG. 51B) showed rms value of 4.86 nm, which is also correlated to the decrease in the surface energy of the film as revealed in the measured WCA of 89.13°±0.4. The increase in the measured WCA indicates that a more hydrophobic PVK/MWNTs CPN nanocomposite films was formed in the substrate.

Referring now to FIGS. 52A-G, a surface sensitive analytical technique, XPS, was used to investigate the elemental composition of the pure PVK and PVK/CNTs CPN nanocomposite film on Au substrate. FIGS. 52&B show XPS spectra of the N1s and C1s of Pure PVK. FIGS. 52C shows an XPS spectrum of the C1s for pure CNTs. FIGS. 52D&E show XPS spectra of the C1s and N1s of a composite including 97% PVK and 3% CNTs. FIGS. 52F&G show XPS spectra of the N1s and C1s of a composite including 93% PVK and 7% CNTs. Pure PVK. From high-resolution XPS scans presented that the nitrogen/carbon (N/C) ratio was found to be 0.109 for pure PVK compared to 0.102 for PVK/CNT nanocomposite. Both FT-IR ATR and XPS data confirmed the spectral data and distribution in the binding energy associated with the cross-linking of the carbazole units.

Referring now to FIG. 53, a show a nanotube wrapped with a PVK polymer in a film of this invention. The film is supported on a substrate. The film is then crosslinked through the electropolymerizable, reductively polymerizable moieties, and/or oxidative polymerizable moieties in the PVK polymers to form a crosslinked film, where the ovals are the polymerizable groups shown crosslinked by an equivalent molecular framework.

Conclusions of Section II

PVK/MWNT nanocomposites were successfully prepared via solvent mixing process. The said process disrupted the van der Waals interactions between bundled MWNTs upon addition of the PVK dispersant, leading to a better dispersion of MWNTs in a PVK polymer matrix. The electrochemical cross-linking of PVK/MWNTs nanocomposites showed the doping role in the charge-transfer interaction of MWNTs in PVK/MWNT nanocomposite preparation via CPN film formation. The EIS spectra for the PVK/MWNTs nanocomposites fitted to a modified Randles circuit showed that the charge-transfer resistance decreases as the loading of MWNTs in PVK/MWNTs nanocomposites increases. ATR demonstrated the interaction between the PVK and MWNTs chains via shifts in the vibronic spectra. The prepared nanocomposites also exhibited better thermal stability as revealed by the TGA and DSC data. The incorporation of a small weight percentage of MWNTs in the PVK polymer matrix relatively increased the DC conductivity for all the composite systems. Electrical conductivity in the composites showed a 3% weight of MWNT minimum percolation threshold for the nanotubes—which indicates a good dispersion of MWNTs within PVK polymer matrix. The surface topography exhibited an improved uniformity for the nanocomposite films.

Section III

Fabrication and Characterization of Electrodeposited Thin Films from Highly Dispersed Poly(N-Vinylcarbazole) (PVK)-Graphene Oxide (GO) Nanocomposites Background of Section III Organic-inorganic "hybrid" materials as thin film coatings are of great interest for various fields of applications. For electronic materials, thin films often produced higher efficiency of the diffusion of excitons. Likewise, for optical devices the control in film thickness affects the interference and absorption of light. In sensing applications, functionalized thin film coatings create a site of recognition with enhanced sensitivity and selectivity. Hence, the facile and large-scale fabrication of robust thin films is highly desirable.

Recently, the use of carbon materials such as graphene for thin films has produced hybrid materials for a wide range of applications due to its multi-functionality and versatility. This 2-dimensional single-atom-thick nanomaterial of hexagonally arrayed $sp^2$-bonded carbon atoms exhibits high aspect ratio, outstanding electrical conductivity, mechanical stability, and cost efficiency. With such unique properties and the spectrum of possible applications, graphene has been recognized as one of the most promising nanomaterial. However, just as with the newly discovered allotropes of carbon, the availability and processability have been the rate-determining factors in the evaluation of graphene applications.

A major challenge in working with graphene involves achieving homogeneous dispersions for large-scale coating fabrication. For example, in the creation of graphene-organic composites, thin graphitic layers require exfoliated graphite sheets. The non-dispersibility of graphite in aqueous medium and in organic solvents leads to the difficulty of working with graphite. The most common and effective approach is based on the use of graphene oxide (GO) as a precursor. Compared to its pristine counterpart, GO contains oxygen functional groups (i.e. epoxides, —OH, and —COOH group), which make it hydrophilic and disperse well in aqueous solutions. However, aqueous dispersion of graphene is of limited interest because in most of its proposed applications (electronics, sensors, composites), organic solvents are normally required in the processing and manufacturing of such materials. Therefore, it is highly desirable to find an easy and stable approach of exfoliating graphene in various organic solvents.

Polymers are often combined with graphene, as polymer nanocomposites for improved dispersion and solubility in organic solvents. Specifically, pi-electron rich polymers as matrix were used because of its ability to form pi-stacking with the graphene sheets. Zhang and co-workers observed the increased solubility of GO in toluene upon covalent modification with poly(N-vinylcarbazole) (PVK). Alternatively, the noncovalent incorporation of poly(3-hexylthiophene) (P3HT) on modified GO also resulted in greater dispersion in chloroform. Although both the covalent and noncovalent strategies showed better graphene exfoliation, none of the dispersion investigations reported to date have focused on the fabrication of robust polymer nanocomposite immobilized onto solid supports (i.e. as thin film coating).

Detailed Description of Section III

The electrodeposition of polymer nanocomposite thin films of PVK-GO on conducting ITO substrate are demonstrated. Prior to thin film formation, highly exfoliated and stable graphene oxide (GO) solutions were first prepared by incorporating poly(N-vinylcarbazole) (PVK) using solution mixing process. The resulting PVK-GO dispersions showed enhanced stability for up to 30 days in both aqueous and organic solvents as compared to the exfoliated GO without PVK. The successful dispersion of GO in the PVK matrix was characterized using thermogravimetric analysis (TGA), X-ray diffraction (XRD), Fourier transform infrared spectroscopy (FTIR), and UV-vis measurements. Film fabrication of the PVK-GO nanocomposite was presented using electrochemical methods. Cyclic voltammogram (CV) ascribed to the electrodeposition of the carbazole moieties of PVK were acquired to monitor the deposition. The presence of GO on the PVK-GO surface was confirmed with the appearance of the C=O (1700 cm$^{-1}$) and OH (3400 cm$^{-1}$) stretches, attributed to the carboxylic and hydroxyl functional groups, respectively of GO. Atomic force microscopy (AFM) measurements of the fabricated PVK-GO film showed homogeneous and well-defined film morphology.

The electrodeposition of PVK-GO nanocomposite thin film on conducting substrate is first demonstrated. Solutions of highly dispersed PVK-GO in both aqueous and non-aqueous solvent systems are first prepared via noncovalent incorporation of preformed PVK and GO using solution mixing process according to Scheme III.Scheme 1 as shown in FIG. 54.

Herein, we present a simple and facile route of preparing well-dispersed polymer-GO nanocomposites (PVK-GO) in both aqueous and organic solvents by solution mixing process for coating application. In particular, we have used a commercially available preformed polymer, PVK, as the matrix. This method provides a simple route of GO dispersion without the need of synthesizing the dispersant polymer or grafting approaches. Furthermore, the noncovalent approach maintains the pristine nature of graphene oxide where the subsequent reduction of GO is still possible. More importantly, the electroactivity of the precursor polymer, PVK, allows for large-scale immobilization of the nanocomposite on any conducting surface via electrochemical method.

Experiments of Section III

Materials

The graphene nanoplatelets (GNPs) (purity 99.5%) used in this study were obtained commercially from XG sciences. The poly (N-vinylcarbazole) (PVK) was purchased from Sigma-Aldrich Chemicals (USA) (MW=25,000-50,000 g/mol). All solvents were of analytical grade and used without further purification. The indium tin oxide (ITO) substrate was cleaned by sequentially sonicating the ITO plates in deionized water, isopropanol, hexane and toluene, each for 15 minutes prior to use. The ITO was dried in the oven and plasma cleaned prior to use.

Preparation of the Graphene Oxide

Graphene oxide (GO) were synthesized using the modified procedure reported by Macarno et al. Briefly, GNPs (3.0 g) were oxidized by mixing with $KMnO_4$ (18.0 g). A 9:1 mixture of concentrated $H_2SO_4/H_3PO_4$ (360:40 mL) was then added producing an exothermic reaction that raised the temperature to 35° C.-40° C. The reaction was heated further to 50° C. with stirring and maintained for 12 hours, then cooled to room temperature.

The cooled mixture was poured into ice (~400 mL) with 30% $H_2O_2$ (3 mL). The mixture was sifted through 425 nm and 250 nm US Standard Testing Sieves and then centrifuged at 4000 rpm for 4 hours. The solids were washed with Millipore water (200 mL) while passing it through 425 nm and 250 nm US Standard Testing Sieve and then the mixture was centrifuge at 4000 rpm for 1 hour. The residue was washed with ethanol (400 mL), then coagulated with ether (200 mL) before it was placed in vacuum oven to dry overnight.

Preparation of the PVK-GO Nanocomposites in Solution

The PVK-GO nanocomposites were prepared using solution mixing process. In a typical experiment, the weight/volume (mg/mL) (w/v) ratios of PVK and GO were dispersed in N-cyclohexyl-2-pyrrolidone (CHP) at 1 mg/mL concentration and ultrasonically agitated for 1 hour. The PVK solution was slowly mixed to a GO solution at 97:3 (wt %) ratio respectively followed by sonication for another 30 minutes. We also prepared 96:4, 95:5, 94:6, and 93:7 wt % ratios of PVK:GO.

Preparation of the solid PVK-GO Nanocomposites

Solid PVK-GO nanocomposite was prepared using solution mixing process but using THF as solvent. PVK and GO was dispersed separately in THF at 5 mg/mL concentration and ultrasonically agitated for 30 minutes to 1 hour. The mixture of PVK in THF was mixed slowly with GO in THF at 97:3 (wt %) ratio respectively. The mixture was agitated ultrasonically for 30 minutes before THF was evaporated from the mixture using a rotary evaporator. The obtained mixture was placed in a vacuum oven to thoroughly dry the product.

Preparation of the PVK-GO Drop-Casted Film

The PVK-GO nanocomposite solution was dropcasted (50 µL) onto an ITO-coated glass plate (1 in.×0.5 in.) substrate and thoroughly dried in a vacuum oven.

Preparation of the Electrodeposited PVK-GO Film

The solution for electrodeposition was prepared by mixing 0.1 M TBAH (2 mL) in acetonitrile with PVK-GO (50 µL) at 97:3 (wt %) ratio described above. The PVK-GO film was deposited on bare ITO by repeatedly scanning the potential between 0 to 1500 mV at a scan rate of 10 mV/s for 50 cycles. Ag and Pt wires were used as the reference and counter electrode, respectively. The deposited film was washed with acetonitrile (3×) to remove any unbound material from the surface.

Characterization of PVK-GO Bulk Nanocomposites and Films

UV-vis spectra were recorded using an Agilent 8453 spectrometer. Fourier transform infrared (FTIR) and attenuated total reflectance (ATR) spectra were recorded using an FTS 7000 Digilab Spectrometer within the 700-3500 $cm^{-1}$ range. X-ray diffraction (XRD) was taken using Rigaku Ultima III diffractometer with Cu Kα X-ray radiation (k=1.54056 Å) from 0.5°-30° at 0.04°/s.

Thermal stabilities of the prepared PVK-GO nanocomposites were performed from 20° C. to 900° C. at a heating rate of 20° C./min by thermogravimetric analysis (TGA) on a TA Instruments 2950 thermogravimetric analyzer. All experiments were operated under a $N_2$ atmosphere at a purge rate of 80-90 mL/min. The experimental samples weighed from 5 to 10 mg were prepared from 1 mL of PVK-GO solution, which was precipitated using methanol. TGA data was analyzed using TA Instruments' Universal Analysis software.

The morphologies of the electrodeposited PVK-GO on ITO substrates as well as the spin-casted GO films were characterized by AFM. The topography measurement was done under ambient conditions with a PicoSPM II (PicoPlus, Molecular Imaging-Agilent Technologies) using the intermittent contact mode.

Results and Discussion of Section III

Dispersions of Individual GO Sheets in PVK

Stable graphene dispersion is hard to prepare under common mechanical methods like stirring and sonication because of inter- and intramolecular pi-pi stacking that further leads to aggregation. The use of mechanical forces is beneficial in dispersing the graphene but it is not enough to control the aggregation of graphene sheets through Van der Waals interactions. In this work, the pristine graphite was first oxidized using the modified method reported by Macarno et al. to produce GO, wherein the cooled mixture produced after the reaction was allowed to pass through a series of microsifters followed by centrifugation. The sifting procedure removed the agglomerated GO leaving finer particles with relatively uniform sizes in the mixture. This procedure was done twice, which resulted in a more homogeneous dispersion of GO in aqueous and most organic solvents as shown in FIGS. 55A&B.

Analysis of a large number of AFM images (FIG. 55B) of spin-casted GO on mica dispersed in various solvents show that most GO sheets have average heights of approximately 1 nm and lengths ranging from nanometers to several micrometers. This result correlates well with the previously reported AFM morphologies suggesting the successful exfoliation of GO.[20] The solubility of the produced GO was tested in aqueous and organic solvents, in particular tetrahydrofuran (THF), dimethylformamide (DMF), N-cyclohexyl-2-pyrrolidone (CHP), and N-methylpyrolidone (NMP). FIG. 55A shows the digital images of the prepared GO dispersions in different solvents. All the dispersions remained stable for 24 h, after which GO started to settle and agglomerate.

To improve the stability of the exfoliated GO, we incorporated PVK, a precursor polymer containing aromatic groups. The use of polymer as a dispersant is usually more effective for GOs in organic solvents compared to small molecules or monomers. We hypothesize that the presence of this polymer will increase the dispersion through pi-pi stacking interaction between the carbazole groups of PVK and the aromatic groups of GO.

Different weight % compositions of GO in the nanocomposite (3, 4, 5, 6, and 7) were prepared to test the stability of the dispersions in NMP. More stable exfoliations were observed at higher PVK loadings and the greatest change in stability time was acquired at 97% loading (results not shown).

Specifically, enhanced solubility of PVK-GO nanocomposite was observed for 30 days in CHP and NMP, 2 days in DMF, 5 days in THF, and 2 days in water. For comparison, the digital images of the PVK-GO (3 wt. % GO) and GO solutions in NMP after 30 days of incubation are presented in FIG. 55C.

UV-vis absorption spectroscopy was employed to characterize the presence of PVK and GO in the nanocomposite. All the UV-vis measurements shown were taken in NMP because it yielded the most stable dispersion. As illustrated in FIG. 55C, the main absorption peaks for PVK are observed at 342 nm and 352 nm.[21] Similar peaks were also observed for the nanocomposite with a broad tailing from 400-800 nm (FIG. 55B). This tailing is comparable to the one acquired for the oxidized graphene sample (FIG. 55A) and thus, indicates the presence of GO in the nanocomposite.

Figure 57:
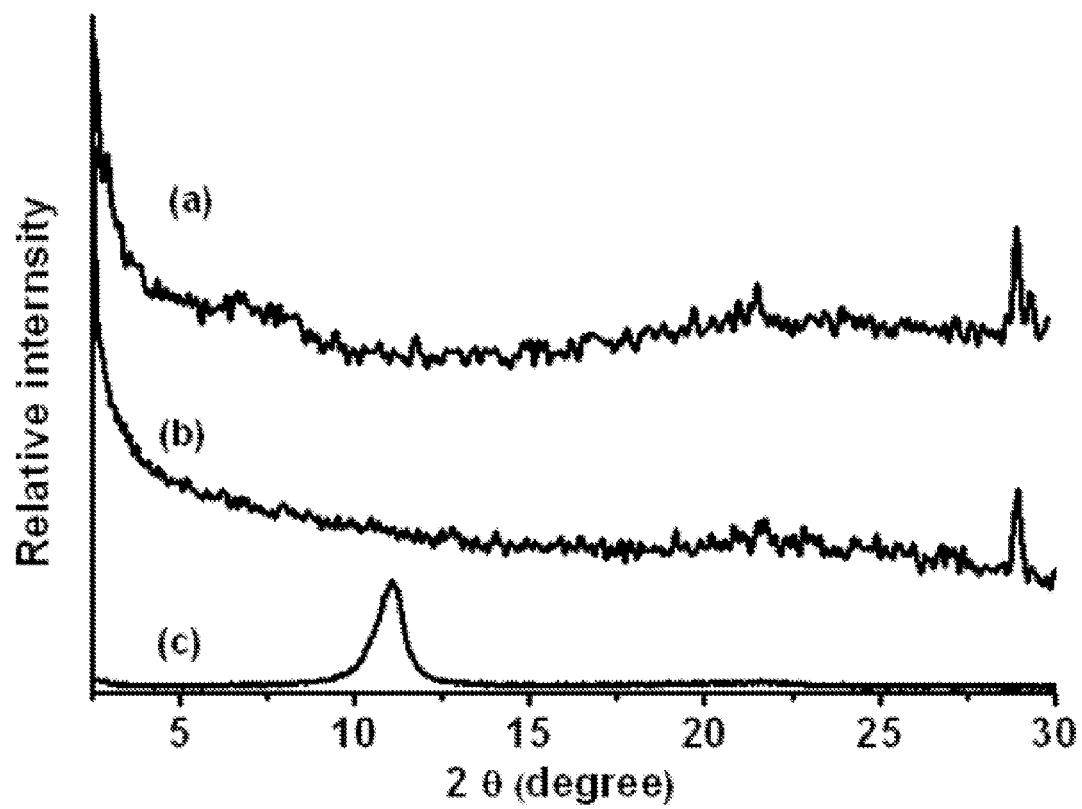

XRD measurement was performed to determine the dispersion state of GO in the PVK matrix. The XRD patterns of the pure PVK, GO, and their nanocomposite are shown in FIG. 57. The pristine GO nanosheet (FIG. 57C) exhibits a diffraction band at 2θ=11.1°, which corresponds to a d spacing of 0.8 nm. The diffraction peak of pure PVK appeared at around 2θ=28.9° indicative of its amorphous nature. This peak was also found in the XRD pattern for the PVK-GO nanocomposite (FIG. 57A). However, the characteristic peak of GO was not present in the diffractogram of PVK-GO. The disappearance of the GO peak in the nanocomposite clearly demonstrates the absence of the regular periodic structure of GO, indicating that GO was fully exfoliated in the polymer nanocomposite.

The functional groups present in the PVK-GO nanocomposite were determined using FTIR. The FTIR spectrum of the pure PVK is shown in FIG. 58B. The characteristic bands of PVK were given the following assignments: 3100 $cm^{-1}$ (aromatic C—H stretch), 2900-3000 $cm^{-1}$ (aliphatic C—H stretch from the polymer backbone), 1597 $cm^{-1}$ (C═C stretching), 1255 $cm^{-1}$ (C—N stretching of vinyl carbazole), 1100-1150 $cm^{-1}$ (in plane —C—H aromatic), and 749-800 $cm^{-1}$ (out of plane —C—H aromatic). Although all these peaks were observed in the PVK-GO nanocomposite, the successful incorporation of GO in the nanocomposite was only verified by the appearance of the C═O (1700 $cm^{-1}$) and OH (3200 $cm^{-1}$) stretch peaks coming from the carbonyl and carboxylic acid/hydroxyl groups, respectively of GO. These peaks were also observed for the GO control sample (FIG. 58A).

The thermal stabilities of the PVK-GO nanocomposites were analyzed by TGA against GO and PVK. The TGA curve of the graphene oxide (FIG. 59) indicated an abrupt ~30% decrease in weight at around 200° C. that could be attributed to the decomposition of its labile-oxygen containing functionalities. On the other hand, a slower and steady mass loss was observed at temperatures greater than 300° C. ascribed to the removal of the more stable oxygen groups. Compared with GO, the TGA data for the PVK-GO nanocomposites indicated a three-step decomposition process. The first 2 steps are consistent with the thermal degradation of the PVK, corresponding to the degradation of the side chains and polymer backbone, while the observed third decomposition step corresponds to the oxidation and decomposition of GO. The presence of GO in the composite contributed to a higher decomposition temperature at around 500° C. as compared to the pure PVK.

Fabrication of PVK-GO Films

The fabrication of PVK-GO films was done by electrochemical methods. As mentioned earlier, the presence of the electro-active carbazole groups in PVK facilitates the incorporation of the composite to the surface. Compared to the films fabricated by the conventional drop-casting, which resulted to an uneven coating distribution and removal of the film upon prolong solvent washing, the electrodeposited films were observed to be evenly coated and stable even after several washings (results not shown).

FIG. shows the representative CV plot obtained during the electrodeposition of PVK-GO on the ITO substrate. Although the PVK-GO nanocomposite is simultaneously being deposited on the substrate, the CV diagram would only provide the information for the electrochemical crosslinking of the electro-active carbazole moieties in the PVK. During the first cycle, the onset of the anodic peak is at 1.1 V, typical for the oxidation of the carbazole monomer. In the succeeding cycles, a lower oxidation onset was observed at ~0.9 V due to the formation of more conjugated crosslinked carbazole units. The increasing current as the number of cycles is increased evidenced the deposition of the PVK-GO nanocomposite on the surface. Furthermore, the monomer-free scan of the electrodeposited PVK-GO film (FIG. 60 inset) still displayed the redox peaks of the PVK nanocomposite, confirming the presence of the film on the surface.

The potentiodynamically deposited PVK-GO film was further characterized by UV-vis spectroscopy (FIG. 61). The well-defined peaks at 342 and 352 nm that are initially found in the PVK-GO nanocomposite disappeared after its electrodeposition on ITO. A new broad polaronic band centered at 450 nm was depicted after the electrodeposition process, signifying the electrochemical crosslinking of the carbazole pendants in PVK. These observations are consistent with our previous studies on electropolymerized PVK and carbazole-containing precursors.

To determine the morphology of the PVK-GO film after electrodeposition, AFM measurement was performed. As shown in FIG. 62, both the topography and phase images of the resulting film revealed a homogeneous and well-defined surface coverage with a root mean squared (rms) value of 2.4 nm. The average grain size obtained was about 160 nm, which corroborates well with the typical grain size reported for the presence of PVK on the surface.

Figure 63:
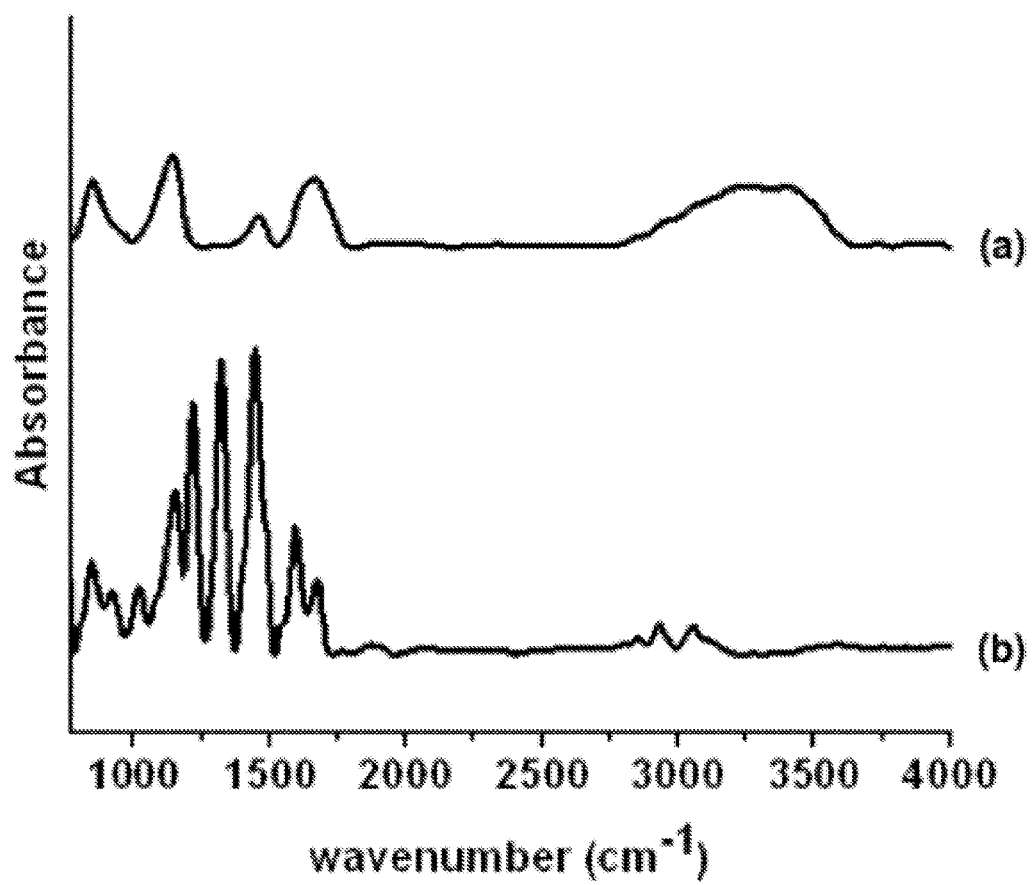

To verify that GO was indeed immobilized on the surface upon electrodeposition, FTIR-ATR spectroscopy measurement of the resulting film was acquired. As a control, ATR spectrum of the electrodeposited pure PVK film was also evaluated. Clearly, the electrodeposited PVK-GO film revealed expected peaks for PVK (FIG. 63). More importantly, the intense peak at 1700 cm$^{-1}$ assigned for the C=O stretch and the broad peak that extends from 3000-3500 cm$^{-1}$ attributed to the OH functional groups from the carboxylic acid alcohol groups, both of which are stretches only ascribed if GO is present were also observed.

Conclusions of Section III

In conclusion, we have presented an effective method of preparing PVK-GO nanocomposite coating on ITO substrate by electrodeposition of PVK-GO dispersion. Highly stable exfoliations of graphene oxide were first prepared in various solvents through the incorporation of a preformed PVK via solution mixing process. The resulting PVK-GO nanocomposite does not only exhibit good dispersibility but also show excellent storage stability (30 days in CHP and NMP). Electrodeposition of the PVK-GO dispersion facilitated the electrocrosslinking of the PVK on the surface to create a robust conducting polymer nanocomposite network thin film. We believe that simplicity of the method and the stability of the nanocomposite dispersions and films produced, will greatly facilitate useful and large-scale applications of graphene-based nanomaterials.

Section IV

Antimicrobial Graphene Polymer (PVK-GO) Nanocomposite Films

We demonstrate the fabrication of graphene oxide (GO)-containing polymer nanocomposite (PVK-GO) as an antimicrobial coating. The antimicrobial film was 90% more effective in preventing bacterial colonization relative to the unmodified surface. More importantly, the nanocomposite thin film showed higher bacterial toxicity than pure GO-modified surface.

Biofilm formation on conducting materials (metal, metal alloys, metal oxides, and electrodes) has emerged as a significant problem in the long-term use of bioimplants, biosensors, and marine and industrial apparatus. Strategies for controlling bacterial colonization have focused on improving and developing antimicrobial materials and design to inhibit biofilm formation. Examples of antimicrobial agents previously used as surface coatings that have shown reduced bacterial adhesion are antibiotics, quaternary ammonium salts, cationic peptides, and metal ions. However, problems related to the development of microbial resistance, surface coating difficulties, and relatively high costs make these approaches unsuitable for long-term antimicrobial coatings.

The incorporation of graphene on surfaces is an alternative method to prevent bacterial colonization. This ultrathin nanomaterial has been reported to show promising antibacterial activity. Furthermore, compared to other antibacterial surfaces, it is relatively inexpensive, possesses very high mechanical stiffness and has extraordinary electronic transport property. Despite the many advantages that it has to offer, the investigation of graphene as an antimicrobial coating film has not been well-established. To our knowledge, most of the antibacterial investigations were conducted either in solution or as free-standing graphene sheets. In this present study, we investigate the antimicrobial properties of graphene polymer nanocomposite coated surfaces. At present, the major challenges of working with pristine graphene are its non-dispersibility in either aqueous or organic solvents, direct immobilization on surfaces and processability, which leads to difficulty in working with pristine graphene alone. To address these issues, our group has developed a method of producing a more stable and easily dispersible graphene in a polymer matrix composed of graphene oxide (GO) and poly-N-vinyl carbazole (PVK). GO unlike its pristine counterpart contains both unoxidized aromatic and aliphatic regions with phenolic, carboxylic, and epoxide groups that allow it to be easily dispersed in various solvents. PVK on the other hand forms a p-p stacking interaction with GO through the carbazole group that stabilizes the dispersion of the nanocomposite (NC) and creates a conducting polymer network (CPN) which can be immobilized and patterned on any conducting substrate via electrochemical methods.

We present the first report on the immobilization of graphene on conducting surfaces as an antimicrobial coating. Specifically, we tethered GO-PVK nanocomposite via electrodeposition on indium tin oxide (ITO). Cyclic voltammetry (CV), attenuated total reflectance infrared (ATR IR) spectroscopy and atomic force microscopy (AFM) were used to monitor its deposition. The antibacterial property of the electrodeposited GO-PVK films was then tested against *Escherichia coli* K12 MG1655 (*E. coli*).

The preparation of the PVK-GO nanocomposite film was carried out by electrodeposition on the ITO interface. FIG. 64A shows the CV plot monitoring the immobilization of PVK-GO on the surface. The first oxidation peak was observed at 1.4 V, which moved towards lower oxidation potential as the cycle is increased. This lowering of potential is expected due to the formation of more p-conjugated species upon the crosslinking of the carbazole pendant moieties of the vinyl backbone. The irreversible oxidation process could possibly be due to the reduced electron transfer kinetics caused by the presence of the graphene oxide. The monomer-free scan of the film also showed the oxidation peak observed during the electrodeposition procedure, signifying the presence of the material on the surface as shown in FIG. 65.

ATR-IR was used to verify the presence of electrodeposited GO-PVK on ITO. The ATR-IR spectra for the PVK and GO-PVK-modified surfaces are depicted in FIG. 64C. For the electropolymerized PVK, absorption peak assignments are as follows: 3100 cm$^{-1}$ (aromatic C—H stretch), 2900-3000 cm$^{-1}$ (aliphatic C—H stretch from the polymer backbone), 1600 cm$^{-1}$ (C=C stretching), 1226 cm$^{-1}$ (C—N stretching of vinyl carbazole), 1100-1150 cm$^{-1}$ (in plane —C—H aromatic), and 700-800 cm$^{-1}$ (out of plane —C—H aromatic). While all these peaks were observed on the PVK-GO film, the presence of GO on the surface was verified by the appearance of an intense peak at 1700 cm$^{-1}$ assigned for the C=O stretch; and OH stretch the broad peak that extends from 3000-3500 cm$^{-1}$ attributed to the OH functional groups from the carboxylic acid alcohol groups present in the GO.

Figure 66B:
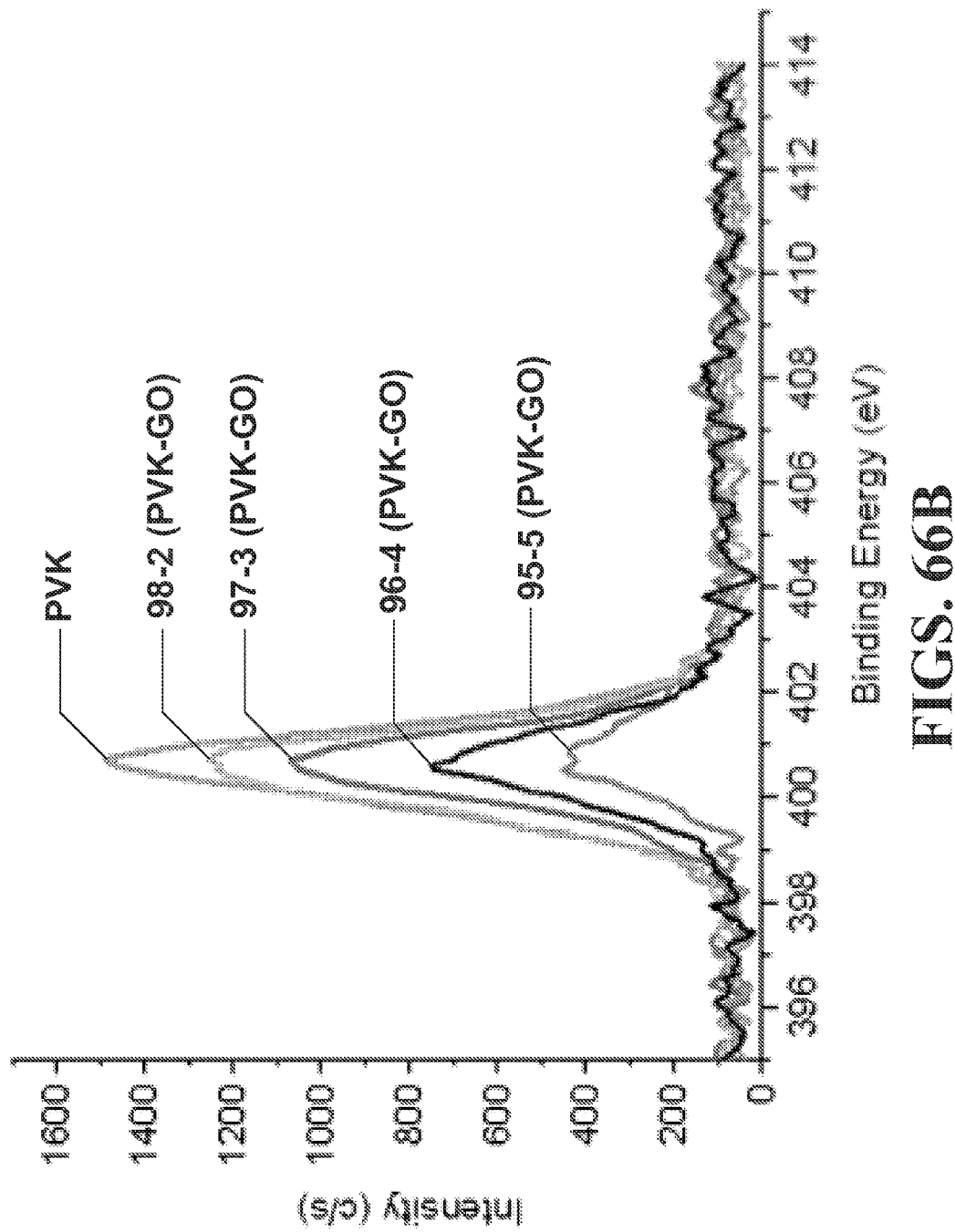
Figures 68E, 68F:
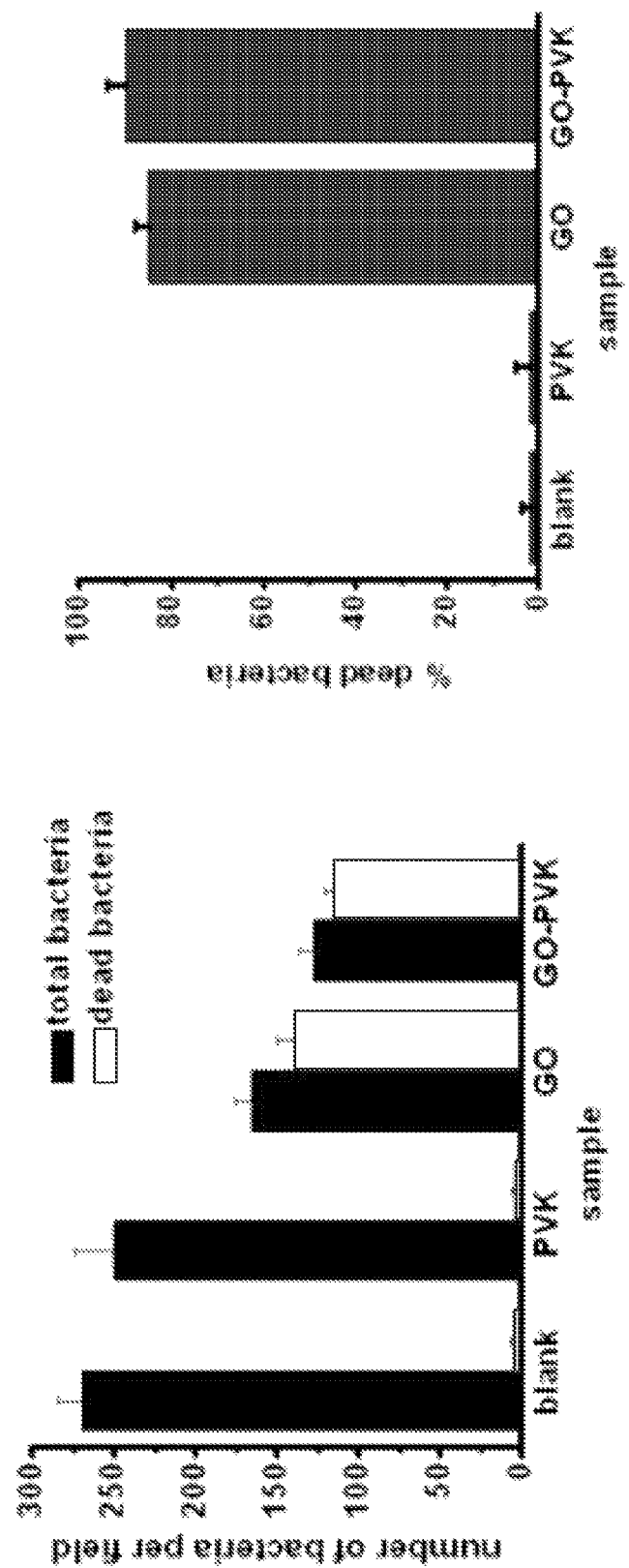

To determine the composition of GO on the surface. High resolution X-ray photoelectron spectroscopy (XPS) scans in the C1s and N1s regions (FIG. 66) were acquired for the PVK and PVK-GO films. From the obtained atomic concentrations of the high resolution scans (C1s and N1s), the C/N ratios of PVK and PVK-GO were obtained 14.0 and 14.4, respectively. By using these values, the amount of GO on the surface was estimated to be 3%. This value correlates well with the initial 3 wt % loading for GO. The homogeneity of the deposited film was determined via AFM (FIG. 64B). The electrodeposited PVK-GO surface revealed excellent well-defined film coverage with a root mean squared (rms) roughness value of 2.38 nm. The average grain size was about 160 nm typical of the grain size observed for the presence of PVK on the surface.

Prior to testing bacterial toxicity on modified surfaces, the antibacterial property of the nanocomposite, GO-PVK, GO, and PVK were evaluated by incubating each of the solution with *E. coli* cells for 1 h. The growth curves of bacterial-treated with GO-PVK nanocomposite, GO and PVK samples were examined via optical density (OD) measurements, which corresponded to the number of live cells that are able to grow after 1 h of exposure to the samples. In general, compared to the control, the samples containing GO were observed to be antibacterial.

This activity was shown by the low OD values observed for all measured samples (FIG. 67A). To evaluate the antimicrobial effectiveness of the different nanomaterials, we measured for each of the growth curves the time required to reach $10^7$ CFU/mL, which corresponds to an $OD_{600}$ of 0.5. Based on the results, all the GO-containing samples took longer time to reach OD of 0.5 as compared to the untreated samples (control) and the PVK samples (FIG. 68B). GO is already known to be toxic to bacteria, however, the addition of PVK resulted in an increased dispersion of GO in the solution providing a greater aspect ratio, thereby resulting in an increased interaction with the bacteria and higher toxicity.

After testing the antibacterial properties of the composites in solution, we tested the effects of modified films of PVK, PVK-GO, and GO on *E. coli*. In situ live-dead staining of the bacterial organisms attached to the differently modified surfaces were performed to determine the ratio of dead bacteria versus the total number of bacteria. SYTO 9 dye was used to show both the live and dead cells, while the dead bacteria with compromised membranes were stained only by propidium iodide (PI). Fluorescence images of the surface reveal that after incubation a more pronounced antibacterial activity was observed for the GO-modified surfaces than the unmodified and PVK films (FIG. 68A-D). In fact, the PVK-GO and GO-modified surfaces were successful in inactivating *E. coli* by approximately 90% and 84%, respectively. This result showed that GO remained effective even after surface immobilization. It is worth noting that the addition of PVK did not hinder its efficacy but showed an enhanced bacterial toxicity than the GO alone. We infer that the improved dispersion caused by the presence of PVK led to the observed results. Although investigating the detailed mechanism of antibacterial toxicity is beyond the scope of this study, it is inferred that GO has similar antimicrobial mechanisms as other carbon based nanomaterials such as carbon nanotubes, i.e., the direct contact of GO or carbon allotrope with bacteria can lead to cell inactivation through cell-membrane disruption and subsequent lysis.

In conclusion, we have presented the antibacterial properties of a PVK-GO graphene nanocomposite dispersion electropolymerized on ITO surface. In principle, this robust antimicrobial coating can be applied on most electrically conducting substrates such as most metals. The use of PVK allowed GO immobilization as a homogeneous film via electropolymerization. Moreover, it allowed better exposure of the GO surface as quantified by XPS measurements. Antibacterial properties of the GO-containing films and solutions resulted in increased bacterial inactivation even at 3 wt %, relative to the control as shown in FIG. 69. This result shows the potential use of PVK-GO nanocomposite films as an alternative antimicrobial coating for electrode or metal surfaces that can be widely used in the biomedical and industrial fields.

Experiments of Section

Preparation of the Electropolymerized PVK-GO Film

The preparation of the antimicrobial PVK-GO (97-3 PVK-GO wt %) film was similar to previously reported literature. Briefly, the polymerizing solution was prepared by mixing 0.1 M TBAH (2 mL) in acetonitrile with PVK-GO (50 µL) at 97:3 (wt %) ratio described above. The PVK-GO film was deposited on bare ITO by repeatedly scanning the potential between 0 to 1500 mV at a scan rate of 10 mV/s for 50 cycles. Ag and Pt wires were used as the reference and counter electrode, respectively. The deposited film was washed with acetonitrile (3×) to remove any unbound material from the surface.

Surface Characterizations

Atomic Force Microscopy

The morphology before and after electropolymerization of PVK/GO on ITO glass substrates were characterized by AFM. Atomic force microscopy (AFM) imaging was done under ambient conditions with a PicoSPM II (PicoPlus, Molecular Imaging—Agilent Technologies) in the Magnetic AC mode (MAC mode) using a magnetic field to drive a magnetically coated cantilever in the top-down configuration. Type II MAC levers with a spring constant of 2.8 nN/M with about 10 nm tip radius were used for all scans.

Attenuated Total Reflectance Fourier Transformed Infrared (ATR FTIR)

The ATR FTIR spectra were obtained on a Digilab FTS 7000 equipped with a HgCdTe detector from 4000 to 600 $cm^{-1}$) wavenumbers. All spectra were taken with a nominal spectral resolution of 4 $cm^{-1}$ in absorbance mode. All films were measured under ambient and dry conditions for several trials at different areas of the sample surface.

X-ray Photoelectron Spectroscopy (XPS) Measurements

XPS measurements of the samples were performed using a PHI 5700 X-ray photoelectron spectrometer (XPS), which was equipped with a monochromatic Al Kα X-ray source (hn=1486.7 eV) incident at 90° relative to the axis of a hemispherical energy analyzer. The spectrometer was operated both at high and low resolutions with pass energies of 23.5 and 187.85 eV, respectively, a photoelectron take off angle of 45° from the surface, and an analyzer spot diameter of 1.1 mm. High-resolution spectra were obtained for photoelectrons emitted from C 1s and N 1s. All spectra were collected at room temperature with a base pressure of $1\times10^{-8}$ ton. Electron binding energies were calibrated with respect to the C1s line at 284.8 eV. A PHI Multipak software (ver 5.0A) was used for all data processing. The high-resolution data was first analyzed by background subtraction using the Shirley routine and a subsequent nonlinear fitting to mixed Gaussian-Lorentzian functions. Atomic compositions were derived from the high-resolution scans. Peak areas were obtained after subtraction of the integrated baseline and corrected for sensitivity factors.

Antibacterial Measurements

Bacterial Culture

A single isolated *Escherichia coli* K12 MG1655 (*E. coli*) colony was inoculated in 5 mL Tryptic Soy Broth (TSB) overnight at 35° C. The bacterial culture was centrifuged at 3000 rpm for 10 minutes, and the bacteria pellet was resuspended in TSB. The optical density of the suspension was adjusted to 0.5 at 600 nm, which corresponds to a concentration of $10^7$ colony forming units per milliliters (CFU/ml).

Treatment of Samples with Bacterial Culture

Aliquots of 180 μl of bacterial suspensions ($10^7$CFU/ml) were placed in an Eppendorf tube containing 20 μl of sample (GO, GO-PVK, PVK) of 1000 μg/ml concentration in DI water. Control samples contained 180 μl of bacterial suspensions added with 20 μl of DI water. The tubes were shaken at 50 rpm for 1 h at room temperature.

Antimicrobial Activity Determined by Growth Curve Measurements

The antimicrobial property of GO, GO-PVK, and PVK samples were evaluated by examining the bacterial growth curves via $OD_{600}$ after 1 h exposure to these materials. Briefly, the mixtures of bacteria and samples were transferred into 5 mL TSB broth, and incubated at 37° C. Bacterial growth was monitored by measuring the $OD_{600}$ every hour using Spectrophotometer (Perkin Elmer). The OD curves were generated by plotting the OD values versus growth time. The fast or slow increase in OD during the incubation represents the ability of *E. coli* to survive and grow in the presence of the different nanomaterials.

Antibacterial Measurements on Stainless Steel Substrates

PVK-GO, PVK, GO-modified films and unmodified ITO substrate were individually placed in a 12 well-plate (Falcon). To each well was added 1.0 ml of bacterial culture and then incubated at 37° C. (without shaking) for 2 h. The samples were then removed and immediately prior to viewing were stained with 3 ml of L 7007 Live-dead stain solution for 10 minutes from Molecular Probes (Leiden, The netherlands) containing a green fluorescent dye (Syto 9) marking viable bacteria cells and red fluorescence dye (PI) for detection of dead cells. The surfaces were placed in microscope slides, covered with a cover slip and imaged using BX 51 Olympus Fluorescent Microscope equipped with a DP72 digital camera under 100× objective. All images were acquired and analyzed using cell Sens Dimension software (Olympus). Percent dead was expressed as the percent of the ratio of the total number of dead cells to the total number of bacteria attached.

Section V

Figure 70:
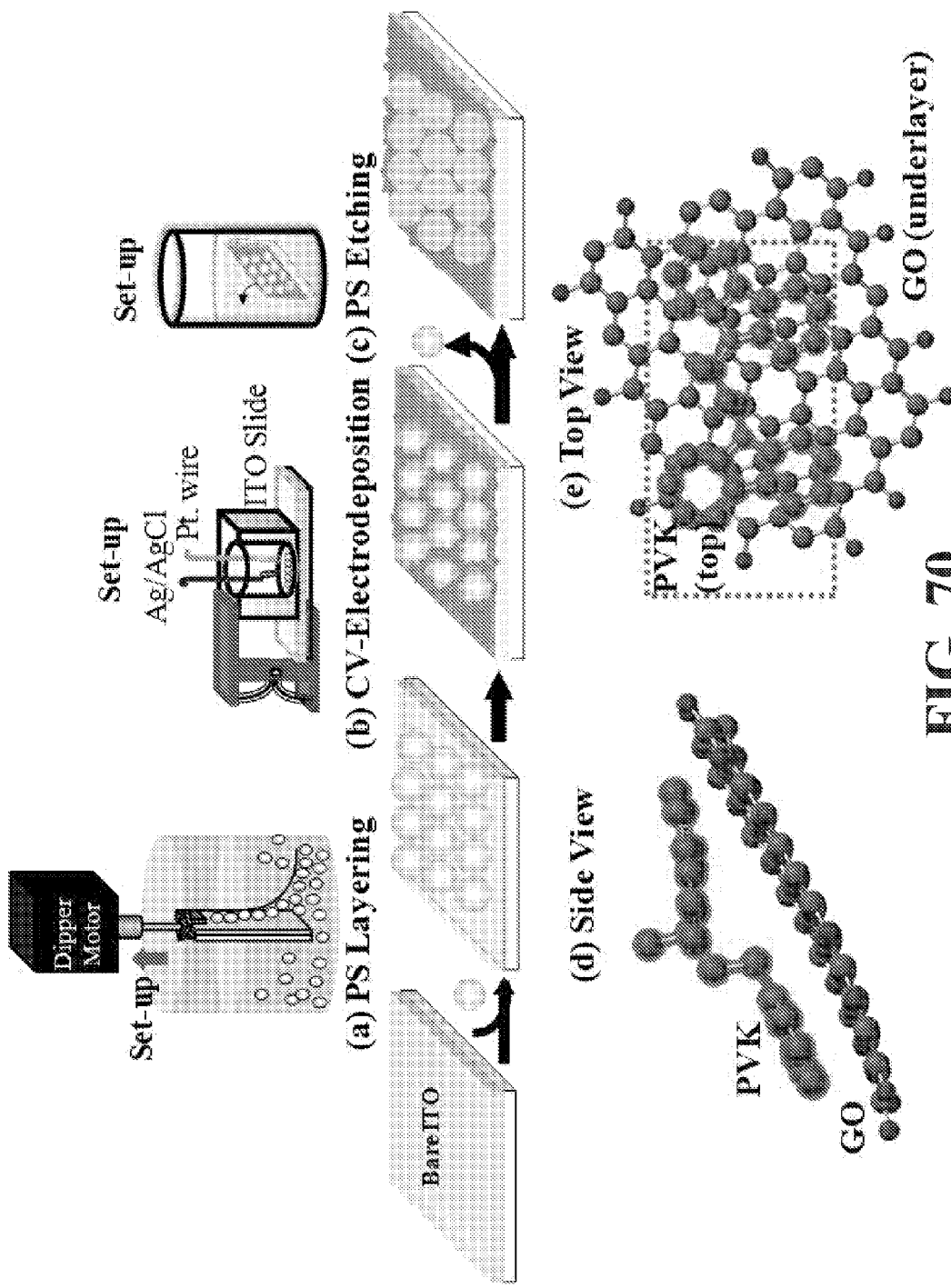

Facile Approach to Graphene Oxide and Poly(N-Vinylcarbazole) Electro-Patterned Films A facile approach of making scalable nanocomposite and electro-patterned films using graphene oxide (GO) and poly (N-vinylcarbazole) (PVK) is reported. The method involves the layering of polystyrene colloidal templates, electrodeposition of the composite film on template array, and finally removal of the sacrificial templates to reveal the patterned GO-PVK arrays. Due to its well-known fast electron transport, excellent mechanical and thermal properties, and very high surface area, graphene has been the subject of intense scientific interest as evidenced by the rapid increase in the number of publications since 2004. Equally important and relatively more processable is the graphene oxide (GO), which is being exploited as useful graphene precursor for incorporation into ceramics, metals, and polymers and is being developed as thin film electronic materials, hydrogen storage devices, anti-bacterial paper, etc. The combination of GO and polymer into composites has created many unique physical properties including improved conductivity and thermal stability particularly of the host polymer. Recently, creating or patterning well-ordered graphene nanostructures have gained significant attention as well due to its application as an effective field effect transistor device. Graphene nanostructures were earlier fabricated by a combination of electron beam (e-beam) lithography and dry etching, which can limit their practical applications. Lately, Tour and co-workers reported periodic two-dimensional (2D) graphene nanostructures through self-assembled monolayers of colloidal microspheres. Here, we present a simple and alternative route of patterning GO and polymer nanocomposites via colloidal template assited electrodeposition technique (FIGS. 70A-C), which can be done at room temperature and without intricate instrumental set-up. To our knowledge, this is the first report on patterning GO with a conducting polymer precursor to form 2D well-ordered nanocomposite film arrays on conducting electrode surfaces like Indium Tin Oxide (ITO). Briefly, the process begins with the layering of sacrificial templates of 500 nm sized polystyrene (PS) particles using a Langmuir-Blodgett (LB)-like deposition technique. This step is followed by cyclic voltammetric (CV) electrodeposition of GO/PVK (3/97 wt %) nanocomposite film, and finally removal of the PS templates via dissolution in tetrahydrofuran (THF). We hypothesized that the carbazole moieties of the PVK creates π-π* interactions with the GO, which was confirmed using semi-empirical and density functional theory (DFT) calculations (FIGS. 70D-E).

Figure 71A:
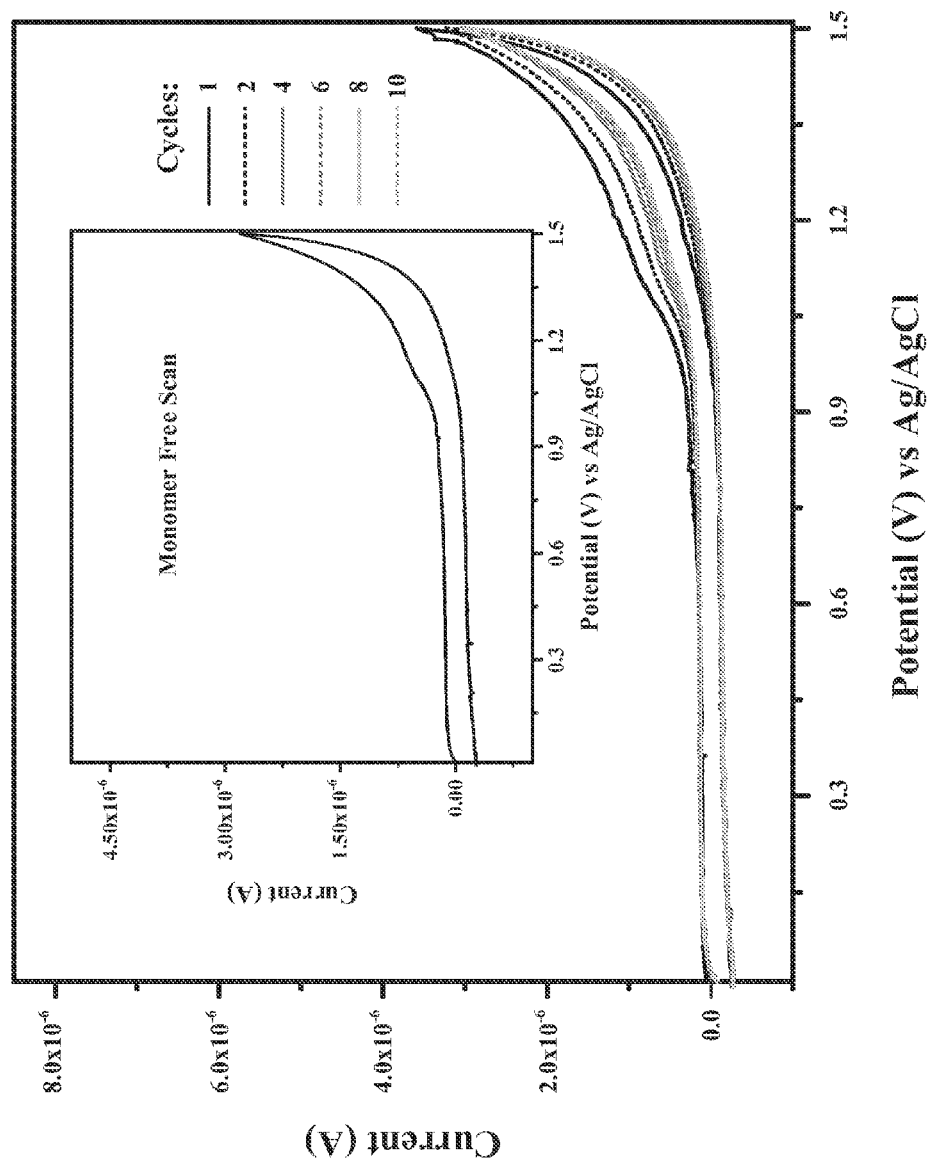
Figure 71B:
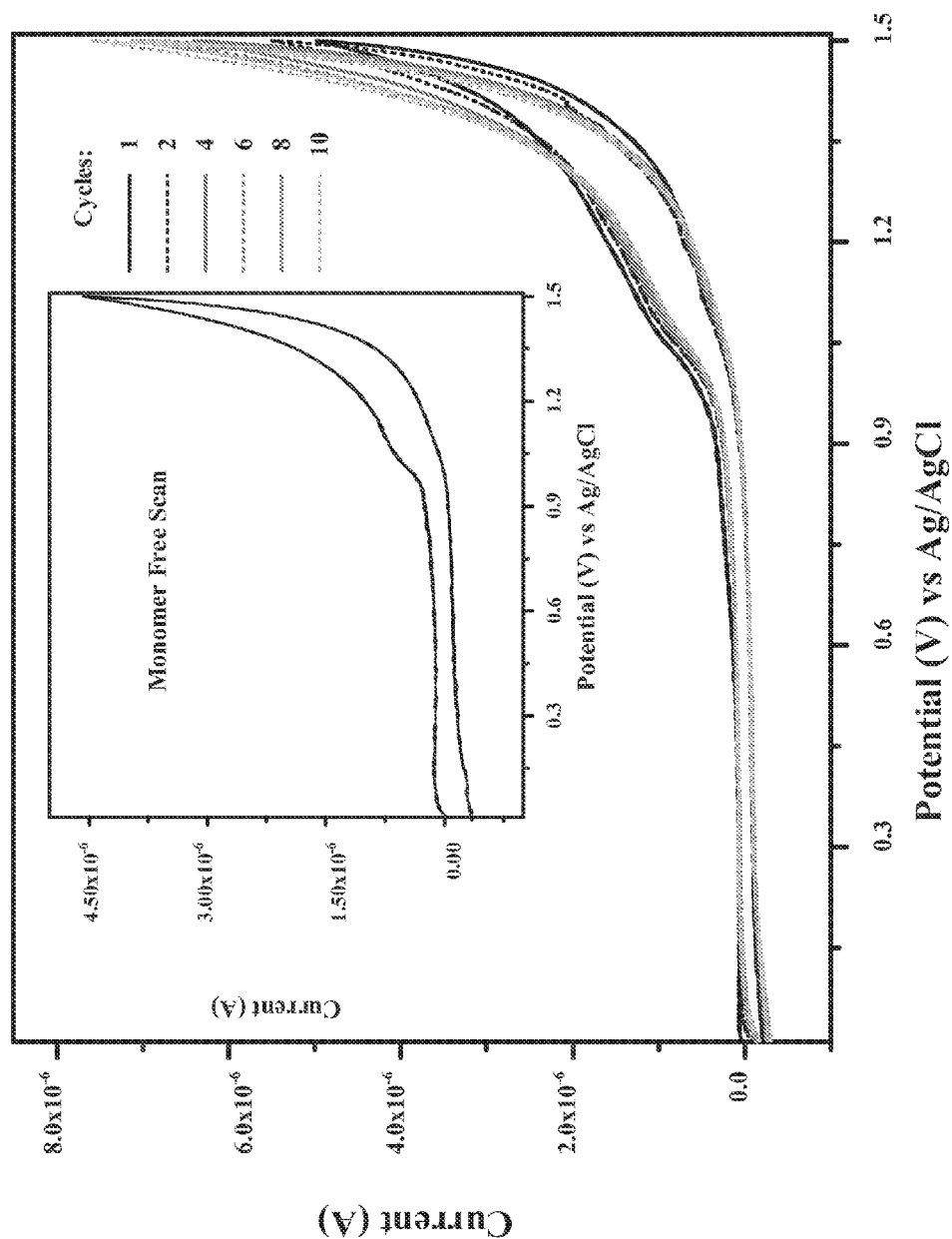
Figure 71C:
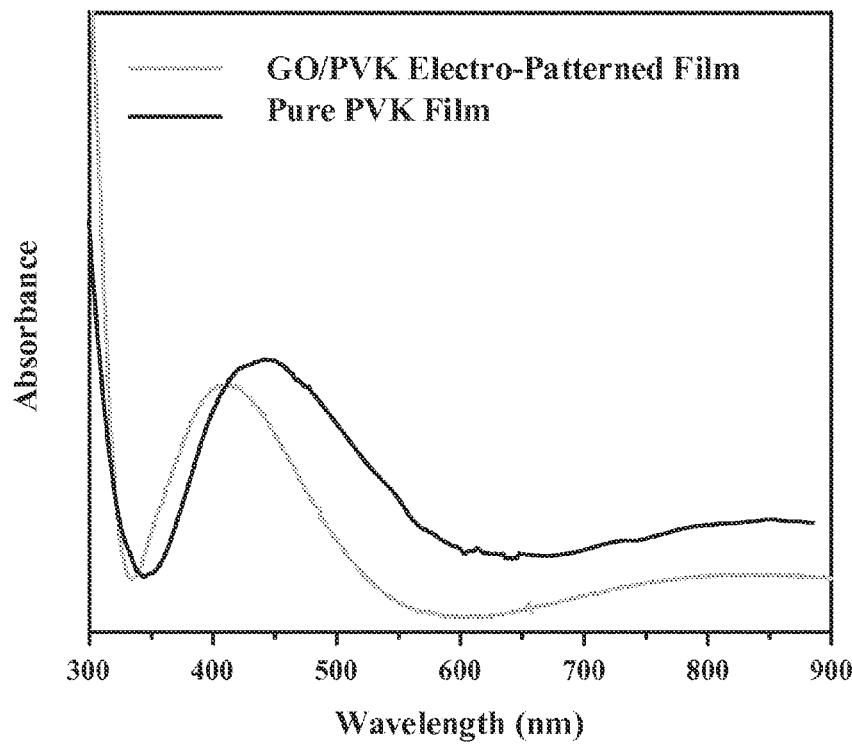

The proposed patterning method also offers the advantage of facile and accurate control of preparing arrays by varying the size of the colloidal templates and the different electrodeposition process parameters. FIG. 71A (in the Supporting Document) presents the CV-electrodeposition of the GO/PVK nanocomposite film onto the PS-colloidal template array that shows the typical oxidation peak due to the cross-linking of the carbazole electroactive groups of the PVK. A similar oxidation peak with an onset potential of about 0.95 V is displayed in the CV diagrams for the electrodeposition of the same nanocomposite solution (FIG. 72) and pure PVK (FIG. 70B) on bare ITO substrates (control). In all the CV diagrams, a decreasing oxidation peak was observed in the range between ~0.95 V to ~1.3 V, which is due to the depletion of the cross-linkable mono-carbazole moieties of the already electrodeposited PVK film. This result may be feasible since a very dilute concentration of the PVK solution was used for both electrodepositions. Unlike our previous results that utilized a concentrated solution of PVK (1 mg/mL), increasing oxidation peak was observed during the CV electrodeposition. To confirm the formation of the GO/PVK nanocomposite and pure PVK films on ITO substrates, a post-polymerization monomer free-scan was performed, which was done after thoroughly washing the electrodeposited films. The appearance of the same CV diagram (inset of FIG. 71A&B) with the signature oxidation peak of the cross-linked carbazole units as that of the electrodepositions verifies the successful formation of the electrodeposited films. The UV-Vis measurements (FIG. 71C) of these films further substantiate the results that show the characteristic peaks of a typical electrodeposited or cross-linked carbazole (black curve) with peaks centered at ~445 nm and ~850 nm, which are consistent with our earlier reports. These peaks are assigned to the π-π* transition of the cross-linked carbazole and the polaronic band of the conjugated or cross-linked carbazole specie and their complex redox ion couple with hexafluorophosphate ions (from the TBAH), respectively. These two peaks are also present but are slightly shifted to lower wavelength in the GO/PVK nanocomposite and electro-patterned film, approaching the reported absorption range (227-231 nm) for GO. The shift may be related also to the p-p stacking phenomena between GO and the carbazole moeities, which was earlier observed in the DFT calculations (FIG. 70D-E).

Figure 71D:
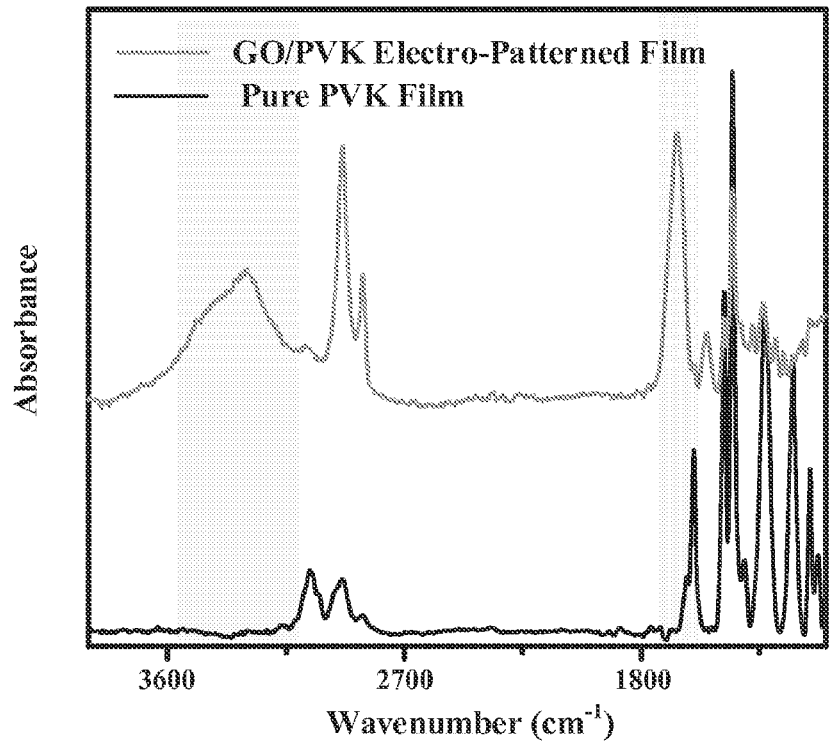

A more compelling evidence about the formation of the GO/PVK nanocomposite film is shown by ATR IR analysis. FIG. 71D shows the IR spectrum of the electrodeposited pure PVK film (black curve) with the characteristic peaks of an electrodeposited polycarbazole: 3050 $cm^{-1}$ (aromatic CH stretch due to pendant carbazol moiety), 2850-3000 $cm^{-1}$ (aliphatic C—H stretch due to the polymer backbone), and 1596 $cm^{-1}$ (C=C stretch), 1450-1500 $cm^{-1}$ (CH stretch), and 1220 $cm^{-1}$ (C—N stretch) of the pendant carbazol moiety. With the GO/PVK nanocomposite and electro-patterned film (red curve), the IR spectrum also depicts signature peaks for PVK with additional peaks at 1700 $cm^{-1}$ and in between ~3100 to ~3650 $cm^{-1}$ due to the C=O and OH stretching vibrations, respectively. These peaks are known to be attributed to the numerous hydroxyl and carbonyl groups that are present in the GO. Complementary X-ray photoelectron spectroscopy (XPS) reveals a strong N 1s peak (between 398 to 403 eV) (FIG. 73A) in the GO/PVK electro-patterned surface and a significant increase in the C 1s signal (282 to 287 eV) (FIG. 73B and FIG. 74) by ~130% in the GO/PVK than the prinstine PVK electro-patterned surface, indicating the formation of the nanocomposite film. Its 0 is signal (FIG. 74C) shows maximum peak intensity at 532.0 eV and a shouldering peak at 529.9 eV, attributed to the C—O and C=O moieties, respectively of the GO in the composite electro-patterned film. XPS was used to determine the exact composition of GO in the film to be ~3%, equivalent to the feed ratio or composition.

Prior to the fabrication of the GO/PVK nanocomposite and electro-patterned film, the formation of graphene oxide was verified by a combination of surface analytical techniques. For instance, the atomic force microscopy (AFM) images (FIG. 75) demonstrate the typical flaky morphology for the spin casted GO layer on mica that shows an average thickness between ~1.20 to ~1.40 nm (FIG. 76) while the reduced graphene oxide (RGO) layer also on mica shows the usual thickness between 0.8 to 1.0 nm (FIG. 77). Moreover, the results of the other techniques like TGA (FIG. 78A) and XRD (FIG. 78B) clearly confirm the synthesis of GO and the formation of the GO/PVK nanocomposite, which were also consistent with the other reported works.

Figure 79A:
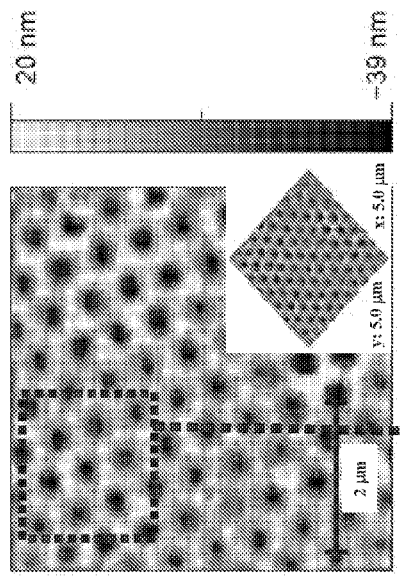
Figure 79B:
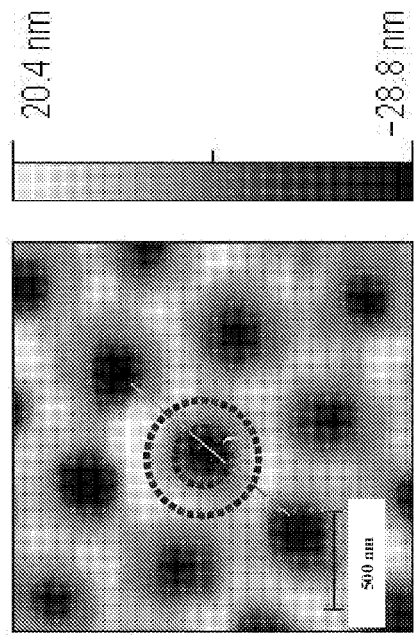
Figure 79C:
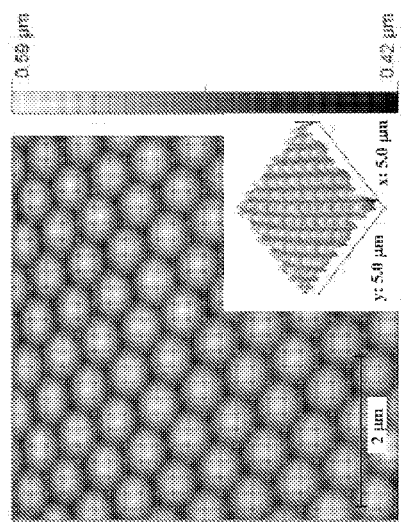
Figure 79D:
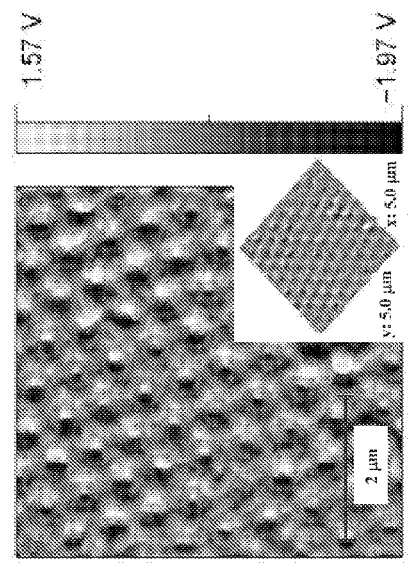
Figure 80B:
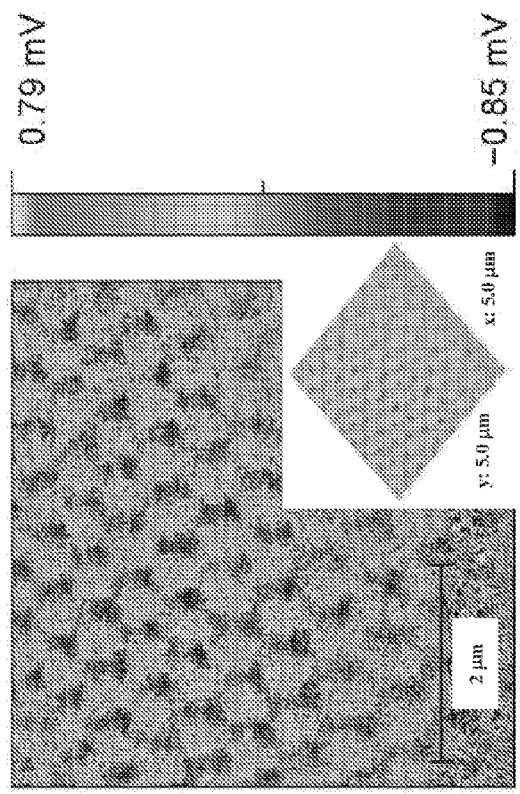
Figure 80A:
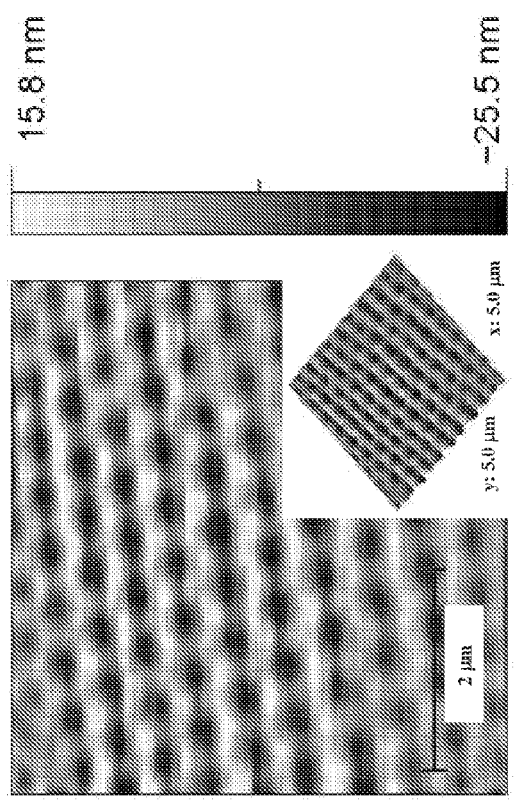
Figure 80D:
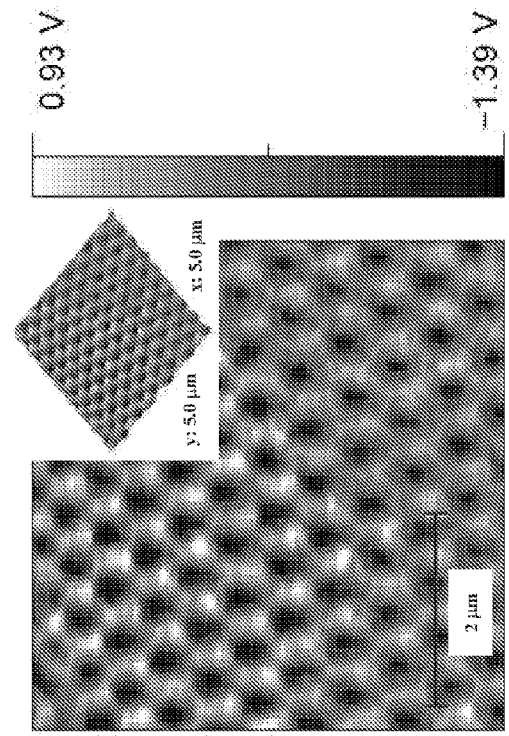
Figure 80C:
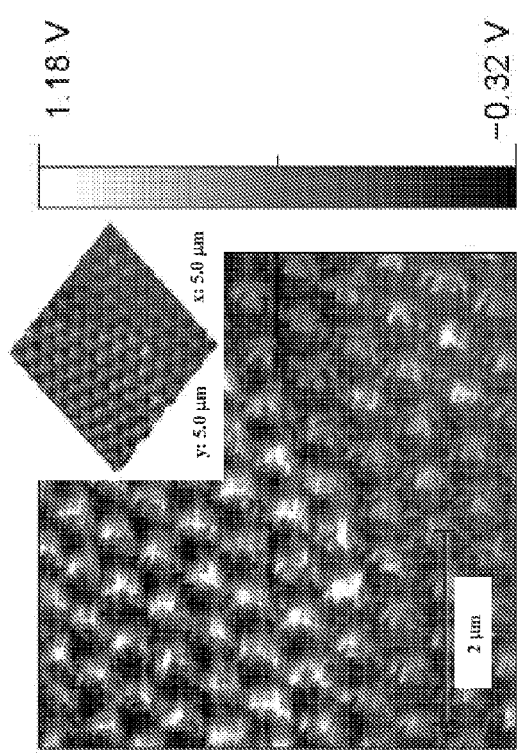

The electro-patterned film of GO/PVK nanocomposite was evidenced by the AFM topography measurements. FIG. 79A shows the hexagonally and highly closed packed 2D colloidal PS (500 nm size) template array on ITO substrate. The same AFM image was observed after the electrodeposition of the GO/PVK nanocomposite. Therefore, the employed CV conditions have not disrupted the PS assembly and have enabled the controlled electrodeposition of the nanocomposite film at the interstitial void spaces underneath and in between the sacrificial colloidal sphere monolayer. This was verified by the AFM image taken of the nanocomposite film after washing the colloidal spheres with THF (2×, 30 mins), which leaves behind a highly ordered inverse colloidal array of the GO/PVK nanocomposite and electro-patterned film (FIG. 79B). Similarly, the electro-patterned film is vividly observed in the AFM amplitude image (FIG. 79C). The high magnification AFM image on FIG. 79D clearly illustrates the highly porous and inter-connected 2D hexagonal network of the GO/PVK nanocomposite film. The line profile analysis (FIG. 79E) of the high magnification image determines an average total thickness ($t_1$) of the patterned film of about 42±2 nm. This value is the measured distance between the baseline and the highest peak of the line profile. A smaller protrusion (FIG. 79F) of thickness ($t_2$) of about 8.5±2 nm is observed on top of the cavity wall. The line profile also measures the inner ($d_1$) and outer ($d_2$) diameters of the cavity with an average values of 290±10 nm and 625±5 nm, respectively. The GO/PVK nanocomposite and electro-patterned film may have possibly swelled laterally during the washing of the PS colloidal templates, and thus the peak-to-peak distance between cavities is much greater than the size of the templated PS particles. To further verify the electro-patterned nanocomposite film, a contact mode current sensing (CS)-AFM (FIG. 79G and FIG. 80) was performed on the same sample. This technique is feasible to use since the nanocomposite film is expected to be relatively conducting than the electro-patterned PVK. This was substantiated by measuring first the conductivity of the GO/PVK nanocomposite solution versus the PVK solution alone. As expected, the GO/PVK solution (97:3 wt. %) showed a conductivity reading between 0.2 to 0.3 $\mu S \cdot cm^{-1}$ whereas the pure PVK solution registered a nil value for several trials. This result underscores the importance of having GO in the nanocomposite array to enhance its conductivity. Therefore the CS-AFM allowed the successful imaging of the electro-patterned nanocomposite film with a good contrast due to differing conductivities between the patterned material (GO/PVK nanocomposite) and the unmodified region (bare ITO). The contact mode and current topography images confirmed more the electro-patterned GO/PVK nanocomposite film that shows the same inverse colloidal array of highly ordered and hexagonal interconnected network.

Lastly, to demonstrate the usefulness of the pattern as a highly porous material for potential patterned electrodes and electrochemical devices, molecular diffusion of an ionic probe $[Fe(CN)_6]^{3-}$ was performed using CV (FIG. 81A). The GO/PVK electro-patterned film displays the typical redox couple of the $K_3Fe(CN)_6$ between 0.0 V to 0.5 V with similar current peak intensity as that of the bare ITO. This result implies that the molecular ion probe is able to diffuse freely in and out of the surface of the GO/PVK electro-patterned surface like the unmodified ITO. However, the non-templated and continuous GO/PVK film illustrates a relatively much lower redox peak intensity, which means that the ionic probe was somewhat prevented from freely moving into the surface. Also, the porosity of the GO/PVK electro-patterned film is validated by the appearance of the doublet In 3d (440 to 455 eV) (FIG. 81B) and Sn 3d (484 to 498 eV) (FIG. 81C) peaks in the XPS, which are unique elemental makers of the underlayer ITO substrate.

Conclusions of Section V

In conclusion, a facile and versatile method of making scalable nanocomposite and electro-patterned film was demonstrated by colloidal template assisted electrodeposition. The composite electro-patterned substrate maybe utilized in various applications such as biological scaffold, catalysis, sensors, photonics and nanostructured functional composites. Also, with the numerous H-bonding sites in the GO that are useful for complexing with another molecule (i.e. template analyte), the nanocomposite and electro-patterned film can be potentially applied for molecular imprinting purposes, which are currently being pursued by our group.

Experiments of Section V

Materials

Polystyrene (PS) latex microbeads (0.5 mm in diameter, 2.5% solids (w/v) aqueous suspension, $3.64 \times 10^{11}$ particles/mL) were purchased from Polysciences, Inc. and were used without any purification. These particles contain a slight anionic charge from sulfate ester. Sodium n-dodecyl sulfate (SDS) was used to control the organization of the PS microbeads at the air-liquid interface. Millipore water (18 MΩ·cm) was used to dilute the PS suspension solution and to control the total concentration of the mixture solution. The acetonitrile (ACN), tetrahydrofuran (THF), sodium n-dodecyl sulfate (SDS), and tetrabutylammonium hexafluorophosphate (TBAH) were obtained from Sigma-Aldrich. All solvents were of analytical grade and used without further purification. The nano graphene platelets (NGP) (purity 99.5%) were obtained commercially from XG Sciences. The NGP has a thickness of 5-15 nm and width between 5-25 μm. The tin-doped indium oxide, ITO ($In_2[Sn_x]O_{3-y}$, one side coated on glass, sheet resistance≤30 Ωcm$^{-2}$) was purchased from SPI Supplies/Structure Probe, Inc. Prior to use, the ITO substrate was sonicated in Alconox detergent followed by rinsing with ultra pure water. The ITO was then sonicated for 10 min in isopropanol, hexane, and then toluene, respectively, prior to oxygen plasma cleaning for ~120 sec. The poly (N-vinyl carbazole) (PVK) was purchased from Sigma-Aldrich Chemicals (USA) (ca MW=25,000-50,000 g/mol).

Instrumentation Used in Section V

Electrochemistry

Cyclic voltammetry were performed in a conventional three-electrode cell using an Autolab PGSTAT 12 potentiostat (Brinkmann Instruments now MetroOhm USA). The potentiostat was controlled by GPES software (version 4.9). The electrodeposition of the GO/PVK nanocomposite was done using cyclic voltammetric (CV) technique in a standard three electrode measuring cell (fabricated electrochemical cell with a diameter of 1.0 cm and 0.785 cm$^3$, Teflon made) with platinum wire as the counter electrode, Ag/AgCl wire as the reference electrode, and the bare or PS coated ITO-substrate as the working electrode.

Atomic Force Microscopy (AFM)

The AFM measurements were carried out in a piezo scanner from Agilent Technologies. The scanning rate was between 0.8 to 1.0 lines/s. Commercially available tapping mode tips (TAP300, Silicon AFM Probes, Ted Pella, Inc.) were used on cantilevers with a resonance frequency in the range of 290-410 kHz. The scanning of the electropolymerized film was performed under ambient and dry conditions. All AFM topographic images (AAC tapping mode) were filtered and analyzed by using SPIP software (Scanning Probe Image Processor, Imagemet.com) or Gwyddion 2.19 software.

The current sensing (CS) AFM analyses in contact mode were done on the same set up using Pt-coated $Si_3N_4$ tip with radius around 20 nm and force constant of 0.5 N/m. The measurements were done under ambient conditions at ~40-50% relative humidity and 20-25° C. temperature. All AFM topographic images (AAC tapping mode) were also filtered and analyzed by using SPIP software (Scanning Probe Image Processor, Imagemet.com) or Gwyddion 2.19 software.

Attenuated Total Reflectance Fourier Transform Infrared (ATR-FTIR)

The ATR FTIR spectra were obtained on a Digilab FTS 7000 equipped with a HgCdTe detector from 4000 to 600 (cm$^{-1}$) wavenumbers. All spectra were taken with a nominal spectral resolution of 4 cm$^{-1}$ in absorbance mode. All films were measured under ambient and dry conditions.

Ultraviolet-Visible Spectroscopy (UV-Vis)

The UV-Vis spectra were recorded on a HP-8453 UV-Vis spectrometer within the 300-900 nm range. The UV-Vis measurement was done at ambient and dry condition at different areas of the film. The UV-Vis spectra were recorded for an equal concentration of each material.

X-ray Diffraction (XRD)

The XRD data was taken using Rigaku Ultima III diffractometer with Cu Kα X-ray radiation (λ=1.54056 Å) from 0.5°-30° at 0.04°/s.

Thermogravimetric Analysis (TGA)

The TGA analysis was performed on a TA Instruments 2950 thermogravimetric analyzer. The experiment was done by heating the sample from 20 to 900° C. at a heating rate of 20° C./min. All experiments were operated under a $N_2$ atmosphere at a purge rate of 80-90 mL/min.

X-ray Photoelectron Spectroscopy (XPS) Measurement

A PHI 5700 X-ray photoelectron spectrometer was equipped with a monochromatic Al Kα X-ray source (hν=1486.7 eV) incident at 90° relative to the axis of a hemispherical energy analyzer. The spectrometer was operated both at high and low resolutions with pass energies of 23.5 eV and 187.85 eV, respectively, a photoelectron take off angle of 45° from the surface, and an analyzer spot diameter of 1.1 mm. All spectra were collected at room temperature with a base pressure of $1 \times 10^{-8}$ torr. The peaks were analyzed first by background subtraction using the Shirley routine. All the samples were completely dried in argon gas prior to XPS measurements.

Preparation of Graphene Oxide and Poly(N-Vinylcarbazole) Nanocomposite

Preparation of Graphene Oxide

Graphene oxide was synthesized using the improved method reported by Tour and co-workers. Briefly, graphene nanoplatelet (GNP) (3.0 g) were oxidized by mixing GNP with $KMnO_4$ (18 g). A 9:1 mixture of concentrated $H_2SO_4$/$H_3PO_4$ (360:40 mL) was added producing an exothermic reaction that raised the temperature to 35-40° C. The reaction was heated further to 50° C. with stirring and maintained for 12 hours, and cooled to room temperature.

The cooled mixture was poured into ice (~400 mL) with 30% $H_2O_2$ (3 mL). The mixture was sifted through 425 μm and 250 μm US Standard Testing Sieve and then centrifuge at 4000 rpm for 4 hours. The solids were washed with 200 mL of Millipore water while passing it through 425 and 250 μm US Standard Testing Sieve and then the mixture was centrifuge at 4000 rpm for 1 hour. The residue was washed with 400 mL of ethanol, then coagulated with 200 mL ether before it was placed in vacuum oven to dry overnight.

Preparation of GO/PVK Nanocomposite Solution

The GO/PVK nanocomposite was prepared using solution mixing process. In a typical synthesis experiment, the weight/volume (mg/mL) (w/v) ratios of PVK and GO were dispersed in N-cyclohexyl-2-pyrrolidone (CHP) at 1 mg/mL concentration and ultrasonically agitated for 1 hour. The PVK solution was slowly mixed to a GO solution at 97:3 (% wt.) ratio, respectively followed by sonication for another 30 minutes. The mixture was used to prepare the PVK/GO film. Previously, GO and other polymer composites were also prepared using other methods.

Preparation of Graphene Oxide and Poly(N-Vinylcarbazole) Nanocomposite and Electro-Patterned Film Polystyrene Layering by Langmuir-Blodgett (LB)-Like Technique The layering of PS microbeads (or formation of colloidal crystals) was accomplished using a similar procedure described earlier by Grady and co-workers. The method was called Langmuir-Blodgett (LB)-like technique for it formed a monolayer of PS particles onto flat surfaces without using the conventional LB set-up that employs floating barriers. As shown in FIG. 75, the substrate was attached into the dipper motor via Teflon clip and was dipped into an aqueous solution containing PS particles (1 wt. %) and SDS (34.7 mM) as spreading agent. A higher concentration of anionic surfactant (SDS) will result in multiple layers of highly disordered latex spheres while a low concentration will not form a full coverage in hexagonal array. Then the substrate was withdrawn vertically from the solution at a lift-up rate between 0.1 to 0.3 mm/min. Finally, the substrate was dried by suspending it in air for few minutes.

Electrodeposition of the Graphene Oxide and Poly(N-vinylcarbazole) Nanocomposite The electrodeposition of the GO/PVK nanocomposite was done using cyclic voltammetric (CV) technique in a standard three electrode measuring cell with platinum wire as the counter electrode, Ag/AgCl wire as the reference electrode, and the bare or PS-coated ITO substrate as the working electrode. The solution for electropolymerization was prepared by mixing 0.1 M TBAH in ACN (4 mL) with GO/PVK (8 μL) at 3:97 (% wt. ratio) as described above. The potential was scanned between 0 V to 1.5 V at 10 mV/s for 10 CV cycles. After the electrodeposition, the resulting film was washed with ACN thrice, and a monomer free scan was performed by using exactly the same experimental parameters but for 1 CV cycle only. The electrodeposited substrate was dried with nitrogen gas for few minutes.

Dissolution of the Polystyrene Template

The PS particles were removed from the surface after CV electrodeposition by dipping the PS-coated substrate in THF twice for 30 minutes. This step is to create the nanocomposite and electro-patterned film array. The THF will remove the PS particles only and not the electrodeposited film of GO and PVK. Then the substrate was allowed to dry naturally under ambient condition.

The composition of GO and PVK in the electrodeposited nanocomposite film was ascertained using high resolution XPS analysis by determining the C/N ratio. For instance, from the obtained atomic concentrations of the high resolution scans (C 1s and N 1s), the C/N ratios of PVK and PVK-GO were calculated. By using the formula ($[(C/N)_{PVK/GO}—(C/N)_{PVK}]—(C/N)_{PVK}$), the amount of GO on the surface was estimated to be ~3%, which correlates well with the initial 3 wt % loading of GO in solution.

The TGA data shows the formation of the nanocomposite pattern. First, the TGA data for graphene oxide is consistent with the published literature with weight loss between 150° C. to 300° C. corresponding to CO, $CO_2$, and steam release from the most labile functional groups. The weight loss from 450° C. to 900° C. can be attributed to the removal of more stable oxygen functionalities. The TGA data for the PVK-GO nanocomposites indicated a three-step decomposition process. The first 2 steps are consistent with the thermal degradation of the PVK, corresponding to the degradation of the side chains and polymer backbone, while the observed third decomposition step corresponds to the oxidation and decomposition of GO. The XRD data shows the typical peak for graphene oxide with a diffraction band at $2\theta=11.1°$, corresponding to a d spacing of 0.8 nm. The peak at $2\theta \sim 25°$, which is known peak for graphite, has disappeared in the XRD curve for the graphene oxide.

CLOSING PARAGRAPH

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A methods for making nano-composite comprising:
   contacting a graphite material dispersion in a first solvent system with a polymer solution in a second solvent system, where the polymers include sufficient π-conjugatedpolymerizable pendant moieties to interact with surfaces of the graphite material to form a partially or completely polymer coated graphite material, where the polymerizable pendant moieties are selected from the group consisting of thiophene, terthiophene, carbazole, fluorene, aniline, pyrrole, and mixtures or combinations thereof,
   forming a second dispersion comprising the partially or completely polymer coated graphite material;

preparing a substrate; and applying the second dispersion to the substrate or a surface thereof to form a substrate including a layer comprising the partially or completely polymer coated graphite material.

2. The method of claim 1, further comprising:

crosslinking the layer electrochemically, reductively and/or oxidatively via the polymerizable pendant moieties to form a substrate having a crosslinked layer comprising the crosslinked partially or completely polymer coated graphite material disposed thereon or on a surface thereof with sufficient adhesion.

3. The method of claim 1, wherein the film is uniform.

4. The method of claim 1, wherein the film is non-uniform.

5. The method of claim 1, wherein the layer comprises a pattern prepared by lithographic or non-lithographic methods including: printing, embossing, templating, masking, gravure, depositing, and dip-pen writing.

6. The method of claim 5, wherein the pattern is pre-defined, regular or random.

7. The method of claim 1, wherein the layer comprises a pattern of two or more partially or completely polymer coated graphite materials, where the coated graphite materials differ either in their graphite material, their polymer or both their graphite material and their polymer and/or their patterning sequence.

8. The method of claim 7, wherein the pattern is pre-defined, regular or random.

9. The method of claim 1, wherein the contacting step includes the steps of:

prior to forming the second dispersion, separating a non-coated graphite material from the partially or completely polymer coated graphite material by centrifugation; and isolating the partially or completely polymer coated graphite material by adding a precipitation solvent to precipitate the partially or completely polymer coated graphite material.

10. The method of claim 1, wherein the contacting step includes the steps of:

forming the graphite material dispersion in the first solvent system with mixing and/or sonicating;

forming the polymer solution in the second solvent system with mixing and/or sonicating;

slowly adding the polymer solution to the graphite material dispersion with mixing and/or sonicating;

separating a non-coated graphite material from the partially or completely polymer coated graphite material by centrifugation; and isolating the partially or completely polymer coated graphite material by adding a precipitation solvent to precipitate the partially or completely polymer coated graphite material.

11. The method of claim 8, wherein the preparing step comprises:

depositing nanoparticles of polystyrene microbeads or colloidal crystals to form the pattern.

12. The method of claim 1, further comprising:

electrochemically crosslinking the layer to form a substrate having an electrochemically crosslinked layer having sufficient adhesion to the substrate.

13. The method of claim 1, wherein the graphite material comprises carbon nanotubes, allotropes and/or polymorphs, graphene sheets, allotropes and/or polymorphs, oxidized graphene sheets, allotropes, and/or polymorphs, boron-nitride analogs, oxides, and mixtures or combinations thereof.

14. The method of claim 1, wherein the graphite material comprises carbon nanotubes, boron-nitride nanotubes, other allotropes or polymorphs, and mixtures or combinations thereof.

15. The method of claim 1, wherein the polymers include tethered electropolymerizable groups.

16. The method of claim 1, wherein the polymers are selected from the group consisting of polyvinylthiophene, polyvinylterthiophene, polyvinylcarbazole, polyvinylfluorene, polyvinylaniline, polyvinylpyrrole, and mixtures or combinations thereof.

* * * * *